US010254970B1

(12) United States Patent
Martin et al.

(10) Patent No.: US 10,254,970 B1
(45) Date of Patent: Apr. 9, 2019

(54) SYSTEM, METHOD AND COMPUTER READABLE MEDIUM FOR OBTAINING CONSISTENT READ PERFORMANCE FOR A PLURALITY OF FLASH DRIVES OR RAID GROUPS USING WORKLOAD AND CAPACITY LIMITS

(71) Applicant: EMC IP Holding Company LLC, Hopkinton, MA (US)

(72) Inventors: Owen Martin, Hopedale, MA (US); Hui Wang, Upton, MA (US); Malak Alshawabkeh, Franklin, MA (US); Adnan Sahin, Needham, MA (US); Arieh Don, Newton, MA (US); Xiaomei Liu, Southborough, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 147 days.

(21) Appl. No.: 15/198,772

(22) Filed: Jun. 30, 2016

(51) Int. Cl.
*G06F 3/06* (2006.01)

(52) U.S. Cl.
CPC .......... *G06F 3/0611* (2013.01); *G06F 3/0629* (2013.01); *G06F 3/0679* (2013.01); *G06F 3/0689* (2013.01)

(58) Field of Classification Search
CPC .... G06F 3/0611; G06F 3/0629; G06F 3/0679; G06F 3/0689
See application file for complete search history.

(56) References Cited

U.S. PATENT DOCUMENTS

| 7,949,637 | B1 | 5/2011 | Burke |
| 8,364,858 | B1 | 1/2013 | Martin et al. |
| 8,566,553 | B1 * | 10/2013 | Marshak ............... G06F 3/0619 711/170 |
| 8,583,838 | B1 | 11/2013 | Marshak et al. |
| 8,688,878 | B1 | 4/2014 | Dolan et al. |

(Continued)

OTHER PUBLICATIONS

Owen Martin, et al., U.S. Appl. No. 15/191,988, filed Jun. 24, 2016, "Techniques for Use With Physical Media Types Having Varying Allowable Write Quotas."

Primary Examiner — Glenn Gossage
(74) Attorney, Agent, or Firm — Muirhead and Saturnelli, LLC

(57) ABSTRACT

Techniques for obtaining consistent read performance are disclosed that may include: receiving measured read I/O (input/output) response times for flash storage devices; and determining, in accordance with a specified allowable variation, whether a first of the measured read I/O response times for a first of the flash storage devices is inconsistent with respect to other ones of the measured read I/O response times. Responsive to determining the first measured read I/O response time is inconsistent first processing may be performed that corrects or alleviates the inconsistency of the first measured read I/O response time. The first processing may include varying the first measured read I/O response time of the first flash storage device by enforcing, for the first flash storage device, a write I/O workload limit a read I/O workload limit and an idle capacity limit. Data portions may be ranked and selected for data movement based on read workload, write workload or idle capacity. The flash storage may include storage devices of the same type or technology, and the same capacity. Response times for RAID groups may also be measured.

20 Claims, 52 Drawing Sheets

(56) References Cited

U.S. PATENT DOCUMENTS

| | | | |
|---|---|---|---|
| 8,856,397 B1 | 10/2014 | Marshak et al. | |
| 8,935,493 B1 | 1/2015 | Dolan et al. | |
| 8,949,483 B1 | 2/2015 | Martin | |
| 8,972,694 B1 | 3/2015 | Dolan et al. | |
| 9,026,765 B1 * | 5/2015 | Marshak | G06F 3/061 |
| | | | 711/114 |
| 9,032,146 B2 * | 5/2015 | Nolterieke | G06F 3/061 |
| | | | 711/114 |
| 9,047,017 B1 | 6/2015 | Dolan et al. | |
| 9,052,830 B1 * | 6/2015 | Marshak | G06F 3/064 |
| 9,152,349 B2 | 10/2015 | Yochai | |
| 9,323,655 B1 | 4/2016 | Sahin et al. | |
| 9,378,136 B1 | 6/2016 | Martin | |
| 9,575,668 B1 | 2/2017 | Martin | |
| 9,626,116 B1 * | 4/2017 | Martin | G06F 3/0689 |
| 9,703,664 B1 * | 7/2017 | Alshawabkeh | G06F 11/3414 |
| 2009/0070541 A1 | 3/2009 | Yochai | |

* cited by examiner

| Media type 2210 | Read heavy Random Small | Read heavy Random Large | Read heavy Sequential Small or Large | Write heavy Random Small | Write heavy Random Large | Write heavy Sequential Small or Large | Idle |
|---|---|---|---|---|---|---|---|
| SLC | G | G | D | G | G | D | D |
| MLC | G | G | D | X | X | X | D |
| 7.2K RPM | X | X | G | X | X | D | D |
| 15K RPM | D | G | D | D | G | D | D |

2212: X=bad/not preferred; G=good/preferred; D=don't care

FIG. 28

|  | SP A | SP B | SP C | SP D | SP E |
|---|---|---|---|---|---|
| 2354 | 2ms | 4ms | 8 ms | 12 ms | 50ms |
| Capacity limit violation 2356 | T | T | S | T | T |
| SP performance goal not met 2358 | T | T | S | T | T |
| Increase SP performance (promotion) 2360 | T | S | T | S | S |
| Decrease SP performance (demotion) 2362 | S | S | S | T | T |

2350

2352 (row label for header row)

FIG. 31

| Media type | RAID-1 | RAID-5 | RAID-6 |
|---|---|---|---|
| EFD/Flash | 3 | 6 | 9 |
| 15K RPM | 1 | 4 | 7 |
| 10K RPM | 2 | 5 | 8 |
| 7.2K RPM | 10 | 11 | 12 |

FIG. 33

SYSTEM, METHOD AND COMPUTER READABLE MEDIUM FOR OBTAINING CONSISTENT READ PERFORMANCE FOR A PLURALITY OF FLASH DRIVES OR RAID GROUPS USING WORKLOAD AND CAPACITY LIMITS

BACKGROUND

Technical Field

This application generally relates to data storage.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices, or logical volumes. The logical disk units may or may not correspond to the actual disk drives. Allowing multiple host systems to access the single storage device unit allows the host systems to share data stored therein.

In connection with data storage, a variety of different technologies may be used. Data may be stored, for example, on different types of disk devices and/or flash memory devices. The data storage environment may define multiple storage tiers in which each tier includes physical devices or drives of varying technologies. The physical devices of a data storage system, such as a data storage array, may be used to store data for multiple applications.

SUMMARY OF THE INVENTION

In accordance with one embodiment of techniques herein is a method of obtaining consistent read performance comprising: receiving a plurality of measured read I/O response times, each of the plurality of measured read input/output (I/O) response times denoting a measured read I/O response time for a different one of a plurality of flash storage devices; determining, in accordance with a specified allowable variation, whether a first of the plurality of measured read I/O response times for a first of the plurality of flash storage devices is inconsistent with respect to other ones of the plurality of measured read I/O response times; and responsive to determining the first measured read I/O response time is inconsistent with respect to other ones of the plurality of measured read I/O response times, performing first processing that corrects or alleviates the inconsistency of the first measured read I/O response time, the first processing including varying the first measured read I/O response time of the first flash storage device by enforcing, for the first flash storage device, a write I/O workload limit, a read I/O workload limit, and an idle capacity limit. The first processing may include: receiving workload information for the first flash storage device, the workload information including a measured write I/O workload, a measured read I/O workload, and an amount of idle capacity; determining whether the workload information for the first flash storage device violates any of a first write I/O workload limit, a read I/O workload limit, and a first idle capacity limit; and responsive to determining the workload information for the first flash storage device violates any of the first write I/O workload limit, the read I/O workload limit, and the first idle capacity limit, performing a data movement that corrects or alleviates a detected violation of any of the first write I/O workload limit, the read I/O workload limit, and the first idle capacity limit. The first flash storage device may have a first storage capacity and may be a first type of flash technology. The plurality of flash storage devices may include a second flash storage device of the first type of flash technology, and the second flash storage device may have a second write I/O workload limit and may have a second storage capacity different from the first storage capacity. A write I/O workload ratio may denote a relative ratio of write performance achieved with the first storage capacity to write performance achieved with the second storage capacity, and wherein the first write I/O workload limit may have a value determined in accordance with the write I/O workload ratio and the second write I/O workload limit. A first idle capacity ratio may be a ratio of the first storage capacity relative to the second storage capacity, and the first idle capacity limit may be a value determined in accordance with the first idle capacity ratio and a second idle capacity limit of the second flash storage device. The read I/O workload limit may be the same limit enforced for the plurality of flash storage devices, and the write I/O workload ratio may be a ratio of the first write I/O workload limit relative to the second write I/O workload limit. The method may include: determining whether the measured read I/O workload for the first flash storage device exceeds, by at least a specified amount, the read I/O workload limit; responsive to determining that the measured read I/O workload for the first flash storage device exceeds, by at least a specified amount, the read I/O workload limit, performing second processing comprising: ranking first data portions stored on the first flash storage device in accordance with decreasing read I/O workloads of the first data portions; and selecting, in accordance with the ranking, a data portion set including one or more of the first data portions for movement from the first flash storage device to a target flash storage device of the plurality of flash storage devices. The target flash storage device may be underutilized with respect to read I/O workload and the one or more of the first data portions of the data portion set selected for movement to the target flash storage device may not result in a modeled read I/O workload for the target flash storage device exceeding the read I/O workload limit. Each data portion in the data portion set may have a read I/O workload that is greater than any other data portion of the first data portions not included in the data portion set. The plurality of flash storage devices may include a first set of flash storage devices of the first type of flash technology. The first set may include the first flash storage device having the first storage capacity and the second flash storage device having the second storage capacity. The method may include: determining, in accordance with a specified allowable variation, whether measured write I/O workloads of the flash storage devices of the first set are consistent; and responsive to determining that a measured write I/O workload of any flash storage device of the first set is inconsistent, performing a data movement that alleviates or corrects an inconsistent measured write I/O workload of the any flash storage device of the first set. The method may include: determining whether the measured write I/O workload of the first flash storage device exceeds the first write I/O workload limit; and responsive to determining the measured write I/O workload of the first flash storage device exceeds the first write I/O workload limit, performing second processing comprising: ranking first data portions stored on the first flash storage device in accordance with increasing write I/O workloads of the first data portions; and selecting, in accordance with the ranking, a data portion set including one or more of the first data portions for movement from the first flash storage device to a target flash storage device of the plurality of flash storage devices. The target flash storage device may be underutilized with respect to write I/O workload and wherein the one or more of the first data portions of the data portion set selected for movement to the target flash storage device may not result in a modeled write I/O workload for the target flash storage device exceeding a specified write I/O workload limit of the target flash storage device. Each data portion in the data portion set may have a write I/O workload that is greater than any other data portion of the first data portions not included in the data portion set. The method may include: determining whether the amount of idle capacity of the first flash storage device exceeds the first idle capacity limit; and responsive to determining the amount of idle capacity of the first flash storage device exceeds the first idle capacity limit, performing second processing comprising: selecting a first set of one or more data portions stored on the first flash storage device for movement from the first flash storage device to a target flash storage device of the plurality of flash storage devices, each data portion of the first set having an idle workload. The plurality of flash storage devices may include at least a first flash storage device of a first flash technology and a second flash storage device of a second flash technology that is different from the first flash technology.

In accordance with another embodiment of techniques herein is a system comprising: a processor; and a memory comprising code stored thereon that, when executed, performs a method of obtaining consistent read performance comprising: receiving a plurality of measured read I/O response times, each of the plurality of measured read I/O response times denoting a measured read I/O response time for a different one of a plurality of RAID groups, each of the plurality of RAID groups including flash storage devices of a same technology and a same capacity; determining, in accordance with a specified allowable variation, whether a first of the plurality of measured read I/O response times for a first of the plurality of RAID groups is inconsistent with respect to other ones of the plurality of measured read I/O response times; and responsive to determining the first measured read I/O response time is inconsistent with respect to other ones of the plurality of measured read I/O response times, performing first processing that corrects or alleviates the inconsistency of the first measured read I/O response time, the first processing including varying the first measured read I/O response time of the first RAID group by enforcing, for the first RAID group, a write I/O workload limit, a read I/O workload limit, and an idle capacity limit.

In accordance with another embodiment of techniques herein is a computer readable medium comprising code stored thereon that, when executed, performs a method of obtaining consistent read performance comprising: receiving a plurality of measured read I/O response times, each of the plurality of measured read I/O response times denoting a measured read I/O response time for a different one of a plurality of flash storage devices; determining, in accordance with a specified allowable variation, whether a first of the plurality of measured read I/O response times for a first of the plurality of flash storage devices is inconsistent with respect to other ones of the plurality of measured read I/O response times; and responsive to determining the first measured read I/O response time is inconsistent with respect to other ones of the plurality of measured read I/O response times, performing first processing that corrects or alleviates the inconsistency of the first measured read I/O response time, the first processing including varying the first measured read I/O response time of the first flash storage device by enforcing, for the first flash storage device, a write I/O workload limit, a read I/O workload limit, and an idle capacity limit. The first processing may include: receiving workload information for the first flash storage device, the workload information including a measured write I/O workload, a measured read I/O workload, and an amount of idle capacity; determining whether the workload information for the first flash storage device violates any of a first write I/O workload limit, a read I/O workload limit, and a first idle capacity limit; and responsive to determining the workload information for the first flash storage device violates any of the first write I/O workload limit, the read I/O workload limit, and the first idle capacity limit, performing a data movement that corrects or alleviates a detected violation of any of the first write I/O workload limit, the read I/O workload limit, and the first idle capacity limit. The first flash storage device may have a first storage capacity and may be a first type of flash technology. The plurality of flash storage devices may include a second flash storage device of the first type of flash technology. The second flash storage device may have a second write I/O workload limit and may have a second storage capacity different from the first storage capacity. A write I/O workload ratio may denote a relative ratio of write performance achieved with the first storage capacity to write performance achieved with the second storage capacity, and the first write I/O workload limit may have a value determined in accordance with the write I/O workload ratio and the second write I/O workload limit. A first idle capacity ratio may be a ratio of the first storage capacity relative to the second storage capacity, and the first idle capacity limit may have a value determined in accordance with the first idle capacity ratio and a second idle capacity limit of the second flash storage device. The read I/O workload limit may be the same limit enforced for the plurality of flash storage devices, and the write I/O workload ratio may be a ratio of the first write I/O workload limit relative to the second write I/O workload limit.

BRIEF DESCRIPTION OF THE DRAWINGS

Features and advantages of the present invention will become more apparent from the following detailed description of exemplary embodiments thereof taken in conjunction with the accompanying drawings in which:

FIG. 28 is an example illustrating ranking of I/O type preferences for different media types or PD technologies in an embodiment in accordance with techniques herein;

FIG. 31 is a table summarizing possible source and target SPs for data movements in an embodiment in accordance with techniques herein;

FIG. 33 is an example of a ranking of media types that may be used in an embodiment in accordance with techniques herein;

DETAILED DESCRIPTION OF EMBODIMENT(S)

Figure 1:
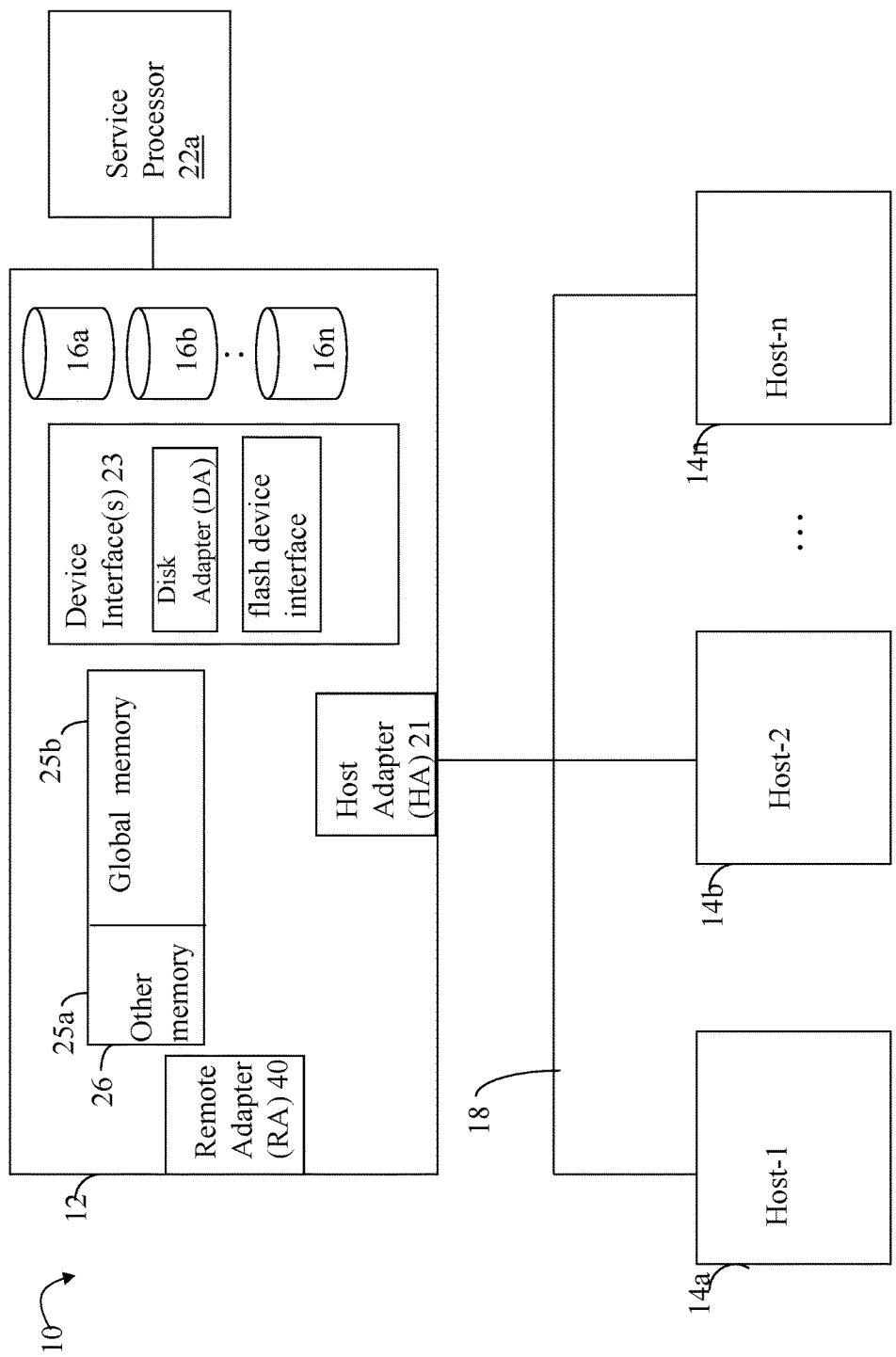
FIG. 1 is an example of an embodiment of a system including hosts and a data storage system that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor systems, such as processors by Intel® Corporation, or other type of computer system with a commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel, iSCSI, and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although the data storage system 12 is illustrated as a single data storage system, such as a single data storage array, the data storage system 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrating the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. As described in more detail in following paragraphs, the techniques herein may be used in an embodiment in which one or more of the devices 16a-16n are flash drives or devices. More generally, the techniques herein may also be used with any type of SSD although following paragraphs may make reference to a particular type such as a flash device or flash memory device.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM) 25b. In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory 25b of memory 26 may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other memory (portion) 25a is that portion of memory 26 that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices or logical volumes (LVs) which may also be referred to as logical units (e.g., LUNs). The LUNs may or may not correspond to the actual physical devices or drives 16a-16n. For example, one or more LUNs may reside on a single physical drive or multiple drives. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN(s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

The device interface, such as a DA, performs I/O operations on data storage devices 16a-16n. In the following description, data residing on an LUN may be accessed by the device interface following a data request in connection with I/O operations that other directors originate. Data may be accessed by LUN in which a single device interface manages data requests in connection with the different one or more LUNs that may reside on data storage devices 16a-16n.

Also shown in FIG. 1 is a service processor 22a that may be used to manage and monitor the system 12. In one embodiment, the service processor 22a may be used in collecting performance data, for example, regarding the I/O performance in connection with data storage system 12. This performance data may relate to, for example, performance measurements in connection with a data request as may be made from the different host computer systems 14a 14n. This performance data may be gathered and stored in a storage area. Additional detail regarding the service processor 22a is described in following paragraphs.

It should be noted that a service processor 22a may exist external to the data storage system 12 and may communicate with the data storage system 12 using any one of a variety of communication connections. In one embodiment, the service processor 22a may communicate with the data storage system 12 through three different connections, a serial port, a parallel port and using a network interface card, for example, with an Ethernet connection. Using the Ethernet connection, for example, a service processor may communicate directly with DAs and HAs within the data storage system 12.

Figure 2:
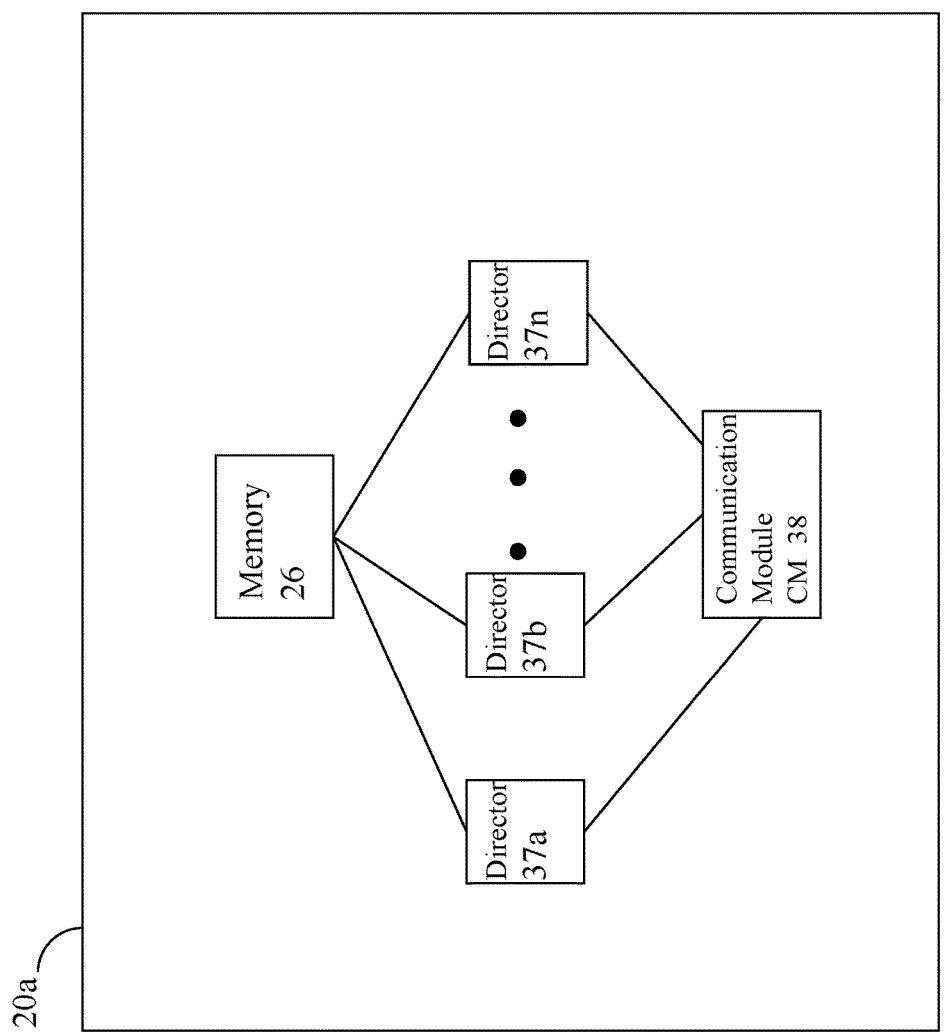
FIG. 2 is a representation of the logical internal communications between the directors and memory included in one embodiment of a data storage system of FIG. 1.

Referring to FIG. 2, shown is a representation 20a of the logical internal communications between the directors and memory included in a data storage system. Included in FIG. 2 is a plurality of directors 37a-37n coupled to the memory 26. Each of the directors 37a-37n represents one of the HAs, RAs, or device interfaces that may be included in a data storage system. In an embodiment disclosed herein, there may be up to sixteen directors coupled to the memory 26. Other embodiments may allow a maximum number of directors other than sixteen as just described and the maximum number may vary with embodiment.

The representation of FIG. 2 also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

With reference back to FIG. 1, components of the data storage system may communicate using GM 25b. For example, in connection with a write operation, an embodiment may first store the data in cache included in a portion of GM 25b, mark the cache slot including the write operation data as write pending (WP), and then later destage the WP data from cache to one of the devices 16a-16n. In connection with returning data to a host from one of the devices as part of a read operation, the data may be copied from the device by the appropriate device interface, such as a DA servicing the device. The device interface may copy the data read into a cache slot included in GM which is, in turn, communicated to the appropriate HA in communication with the host.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

As described above, the data storage system 12 may be a data storage array including a plurality of data storage devices 16a-16n in which one or more of the devices 16a-16n are flash memory devices employing one or more different flash memory technologies. In one embodiment, the data storage system 12 may be a Symmetrix® DMX™ or VMAX® data storage array by EMC Corporation of Hopkinton, Mass. In the foregoing data storage array, the data storage devices 16a-16n may include a combination of disk devices and flash devices in which the flash devices may appear as standard Fibre Channel (FC) drives to the various software tools used in connection with the data storage array. The flash devices may be constructed using nonvolatile semiconductor NAND flash memory. The flash devices may include one or more SLC (single level cell) devices and/or MLC (multi level cell) devices.

It should be noted that the techniques herein may be used in connection with flash devices comprising what may be characterized as enterprise-grade or enterprise-class flash drives (EFDs) with an expected lifetime (e.g., as measured in an amount of actual elapsed time such as a number of years, months, and/or days) based on a number of guaranteed write cycles, or program cycles, and a rate or frequency at which the writes are performed. Thus, a flash device may be expected to have a usage measured in calendar or wall clock elapsed time based on the amount of time it takes to perform the number of guaranteed write cycles. The techniques herein may also be used with other flash devices, more generally referred to as non-enterprise class flash devices, which, when performing writes at a same rate as for enterprise class drives, may have a lower expected lifetime based on a lower number of guaranteed write cycles. Thus, as described in more detail elsewhere herein, to guarantee a same lifetime of use for different types of flash-based physical storage devices, such as SLC and MLC, a different number of allowable writes per day may be specified for each type of flash-based physical storage device based on the write endurance variation of each type.

The techniques herein may be generally used in connection with any type of flash device, or more generally, any SSD technology. The flash device may be, for example, a flash device which is a NAND gate flash device, NOR gate flash device, flash device that uses SLC or MLC technology, and the like, as known in the art. In one embodiment, the one or more flash devices may include MLC flash memory devices although an embodiment may utilize MLC, alone or in combination with, other types of flash memory devices or other suitable memory and data storage technologies. More generally, the techniques herein may be used in connection with other technologies having a wear out or lifetime based on the number of expected writes or erasure cycles prior to failure, although particular flash memory technologies may be described herein for purposes of illustration.

An embodiment in accordance with techniques herein may have one or more defined storage tiers. Each tier may generally include physical storage devices or drives having one or more attributes associated with a definition for that tier. For example, one embodiment may provide a tier definition based on a set of one or more attributes. The attributes may include any one or more of a storage type or storage technology, a type of data protection, device performance characteristic(s), storage capacity, and the like. The storage type or technology may specify whether a physical storage device is an SSD drive (such as a flash drive), a particular type of SSD drive (such as using flash or a form of RAM), a type of magnetic disk or other non-SSD drive (such as rotating disk drives of various speeds or RPMs (revolutions per minute) (e.g., 10K RPM, 15K RPM) using one or more interfaces such as FC, NL-SAS, SAS, SATA, etc.), and the like. Data protection may specify a type or level of data storage protection such, for example, as a particular RAID level (e.g., RAID1, RAID-5 3+1, RAIDS 7+1, and the like). Performance characteristics may relate to different performance aspects of the physical storage devices of a particular type or technology. For example, there may be multiple types of FC or SAS disk drives based on the RPM characteristics of the FC or SAS disk drives (e.g., 10K RPM drives and 15K RPM drives) and disk drives having different RPM characteristics may be included in different storage tiers. Storage capacity may specify the amount of data, such as in bytes, that may be stored on the drives. An embodiment may allow a user to define one or more such storage tiers. For example, an embodiment in accordance with techniques herein may define two storage tiers including a first tier of all SSD drives and a second tier of all non-SSD drives. As another example, an embodiment in accordance with techniques herein may define three storage tiers including a first tier of all SSD drives which are flash drives, a second tier of all 15K RPM drives, and a third tier of all 7.2K RPM drives. The foregoing are some examples of tier definitions and other tier definitions may be specified in accordance with techniques herein.

Figure 3:
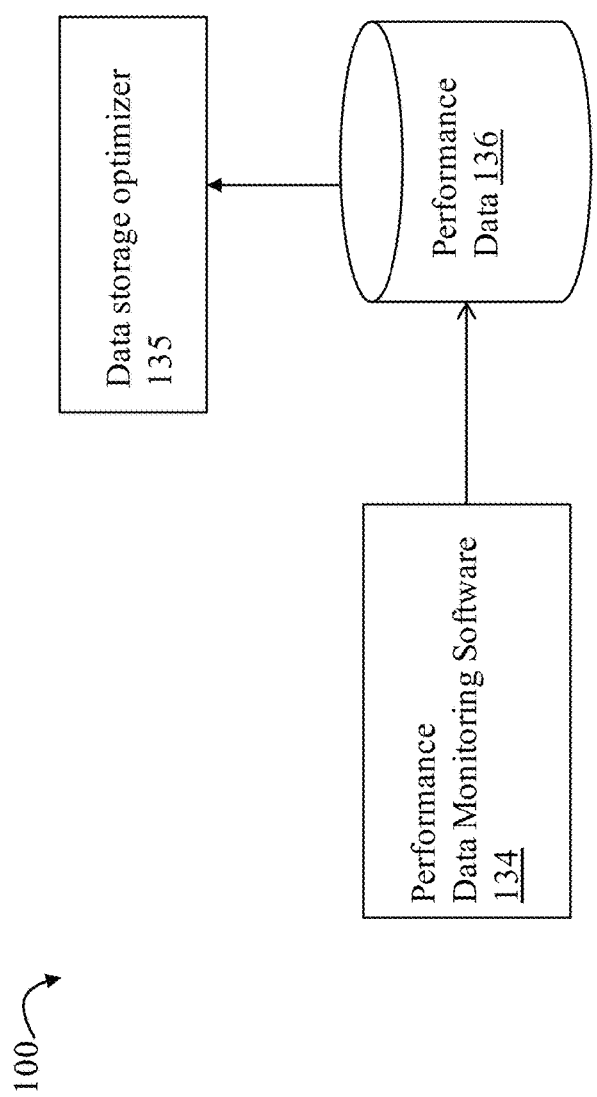
FIG. 3 is an example representing components that may be included in a service processor in an embodiment in accordance with techniques herein.

Referring to FIG. 3, shown is an example 100 of components that may be used in an embodiment in connection with techniques herein. The example 100 includes performance data monitoring software 134 which gathers performance data about the data storage system. The software 134 may gather and store performance data 136. This performance data 136 may also serve as an input to other software, such as used by the data storage optimizer 135 in connection with performing data storage system optimizations, which attempt to enhance the performance of I/O operations, such as those I/O operations associated with data storage devices 16a-16n of the system 12 (as in FIG. 1). For example, the performance data 136 may be used by a data storage optimizer 135 in an embodiment in accordance with techniques herein. The performance data 136 may be used in determining and/or optimizing one or more statistics or metrics such as may be related to, for example, a workload for one or more physical devices, a pool or group of physical devices, logical devices or volumes (e.g., LUNs), thin or virtually provisioned devices (described in more detail elsewhere herein), portions of thin devices, and the like. The I/O workload may also be a measurement or level of "how busy" a device is, for example, in terms of I/O operations (e.g., I/O throughput such as number of I/Os/second, response time (RT), and the like). Examples of workload information and other information that may be obtained and used in an embodiment in accordance with techniques herein are described in more detail elsewhere herein.

In one embodiment in accordance with techniques herein, components of FIG. 3, such as the performance monitoring software 134, performance data 136 and/or data storage optimizer 135, may be located and execute on a system or processor that is external to the data storage system. For example, in one embodiment, any one or more of the foregoing components may be located and execute on service processor 22a. As an alternative or in addition to having one or more components execute on a processor external to the data storage system, one or more of the foregoing components may be located and execute on a processor of the data storage system itself.

The response time for a storage device or volume may be based on a response time associated with the storage device or volume for a period of time. The response time may be based on read and write operations directed to the storage device or volume. Response time represents the amount of time it takes the storage system to complete an I/O request (e.g., a read or write request). Response time may be characterized as including two components: service time and wait time. Service time is the actual amount of time spent servicing or completing an I/O request after receiving the request from a host via an HA 21, or after the storage system 12 generates the I/O request internally. The wait time is the amount of time the I/O request spends waiting in line or queue waiting for service (e.g., prior to executing the I/O operation).

It should be noted that the operations of read and write with respect to a LUN, thin device, and the like, may be viewed as read and write requests or commands from the DA 23, controller, or other backend physical device interface. Thus, these are operations may also be characterized as a number of operations with respect to the physical storage device (e.g., number of physical device reads, writes, and the like, based on physical device accesses). This is in contrast to observing or counting a number of particular type of I/O requests (e.g., reads or writes) as issued from the host and received by a front end component such as an HA 21. To illustrate, a host read request may not result in a read request or command issued to the DA if there is a cache hit and the requested data is in cache. The host read request results in a read request or command issued to the DA 23 to retrieve data from the physical drive only if there is a read cache miss. Furthermore, when writing data of a received host I/O request to the physical device, the host write request may result in multiple reads and/or writes by the DA 23 in addition to writing out the host or user data of the request. For example, if the data storage system implements a RAID data protection technique, such as RAID-5, additional reads and writes may be performed such as in connection with writing out additional parity information for the user data. Thus, observed data gathered to determine workload, such as observed numbers of reads and writes, may refer to the read and write requests or commands performed by the DA. Such read and write commands may correspond, respectively, to physical device accesses such as disk reads and writes that may result from a host I/O request received by an HA 21.

The optimizer 135 may perform processing of the techniques herein set forth in following paragraphs to determine how to allocate or partition physical storage in a multi-tiered environment for use by multiple applications. The optimizer 135 may also perform other processing such as, for example, to determine what particular portions of thin devices to store on physical devices of a particular tier, evaluate when to move data between physical drives of different tiers, and the like. It should be noted that the optimizer 135 may generally represent one or more components that perform processing as described herein as well as one or more other optimizations and other processing that may be performed in an embodiment.

Described in following paragraphs are techniques that may be performed to determine what data portions of devices such as thin devices to store on physical devices of a particular tier in a multi-tiered storage environment. Such data portions of a thin device may be automatically placed in a storage tier where the techniques herein have determined the storage tier is best to service that data in accordance with criteria described herein. The data portions may also be automatically relocated or moved to a different storage tier as the work load and observed performance characteristics for the data portions change over time. In accordance with techniques herein, analysis of performance data for data portions of thin devices may be performed in order to determine whether particular data portions should have their data contents stored on physical devices located in a particular storage tier. The techniques herein may take into account how "busy" the data portions are in combination with defined capacity limits and defined performance limits (e.g., such as I/O throughput or I/Os per unit of time, response time, utilization, and the like) associated with a storage tier in order to evaluate which data to store on drives of the storage tier.

Promotion may refer to movement of data from a first storage tier to a second storage tier where the second storage tier is characterized as having devices of higher performance than devices of the first storage tier. Demotion may refer generally to movement of data from a first storage tier to a second storage tier where the first storage tier is characterized as having devices of higher performance than devices of the second storage tier. As such, movement of data from a first tier of flash devices to a second tier of 15K RPM devices and/or 7.2K RPM devices may be characterized as a demotion and movement of data from the foregoing second tier to the first tier a promotion. The promotion and demotion thresholds refer to thresholds used in connection with data movement.

As described in following paragraphs, one embodiment may use an allocation policy specifying an upper limit or maximum threshold of storage capacity for each of one or more tiers for use with an application. The partitioning of physical storage of the different storage tiers among the applications may be initially performed using techniques herein in accordance with the foregoing thresholds of the application's allocation policy and other criteria. In accordance with techniques herein, an embodiment may determine amounts of the different storage tiers used to store an application's data, and thus the application's storage group, subject to the allocation policy and other criteria. Such criteria may also include one or more performance metrics indicating a workload of the application. For example, an embodiment may determine one or more performance metrics using collected or observed performance data for a plurality of different logical devices, and/or portions thereof, used by the application. Thus, the partitioning of the different storage tiers among multiple applications may also take into account the workload or how "busy" an application is. Such criteria may also include capacity limits specifying how much of each particular storage tier may be used to store data for the application's logical devices.

As an example, the techniques herein may be described with reference to a storage environment having three storage tiers—a first tier of only flash drives in the data storage system, a second tier of only 15K RPM disk drives, and a third tier of only 7.2K RPM disk drives. In terms of performance, the foregoing three tiers may be ranked from highest to lowest as follows: first, second, and then third. The lower the tier ranking, the lower the tier's performance characteristics (e.g., longer latency times, capable of less I/O throughput/second/GB (or other storage unit), and the like). Generally, different types of physical devices or physical drives have different types of characteristics. There are different reasons why one may want to use one storage tier and type of drive over another depending on criteria, goals and the current performance characteristics exhibited in connection with performing I/O operations. For example, flash drives of the first tier may be a best choice or candidate for storing data which may be characterized as I/O intensive or "busy" thereby experiencing a high rate of I/Os to frequently access the physical storage device containing the LUN's data. However, flash drives tend to be expensive in terms of storage capacity. The 7.2K RPM drives may be a best choice or candidate for storing data of devices requiring a large storage capacity and which are not I/O intensive with respect to access and retrieval from the physical storage device. The second tier of 15K RPM disk drives may be characterized as "in between" flash drives and 7.2K RPM drives in terms of cost/GB and I/O performance. Thus, in terms of relative performance characteristics, flash drives may be characterized as having higher performance than both 15K RPM and 7.2K RPM disks, and 15K RPM disks may be characterized as having a higher performance than 7.2K RPM disks.

Since flash drives of the first tier are the best suited for high throughput/sec/GB, processing may be performed to determine which of the devices, and portions thereof, are characterized as most I/O intensive and therefore may be good candidates to have their data stored on flash drives. Similarly, the second most I/O intensive devices, and portions thereof, may be good candidates to store on 15K RPM disk drives of the second tier and the least I/O intensive devices may be good candidates to store on 7.2K RPM drives of the third tier. As such, I/O workload for an application may be determined using some measure of I/O intensity, performance or activity (e.g., I/O throughput/ second (e.g., I/Os per second), percentage of read operation, percentage of write operations, response time, etc.) of each device used for the application's data. Some measure of workload may be used as a factor or criterion in combination with others described herein for determining what data portions are located on the physical storage devices of each of the different storage tiers.

Figure 4:
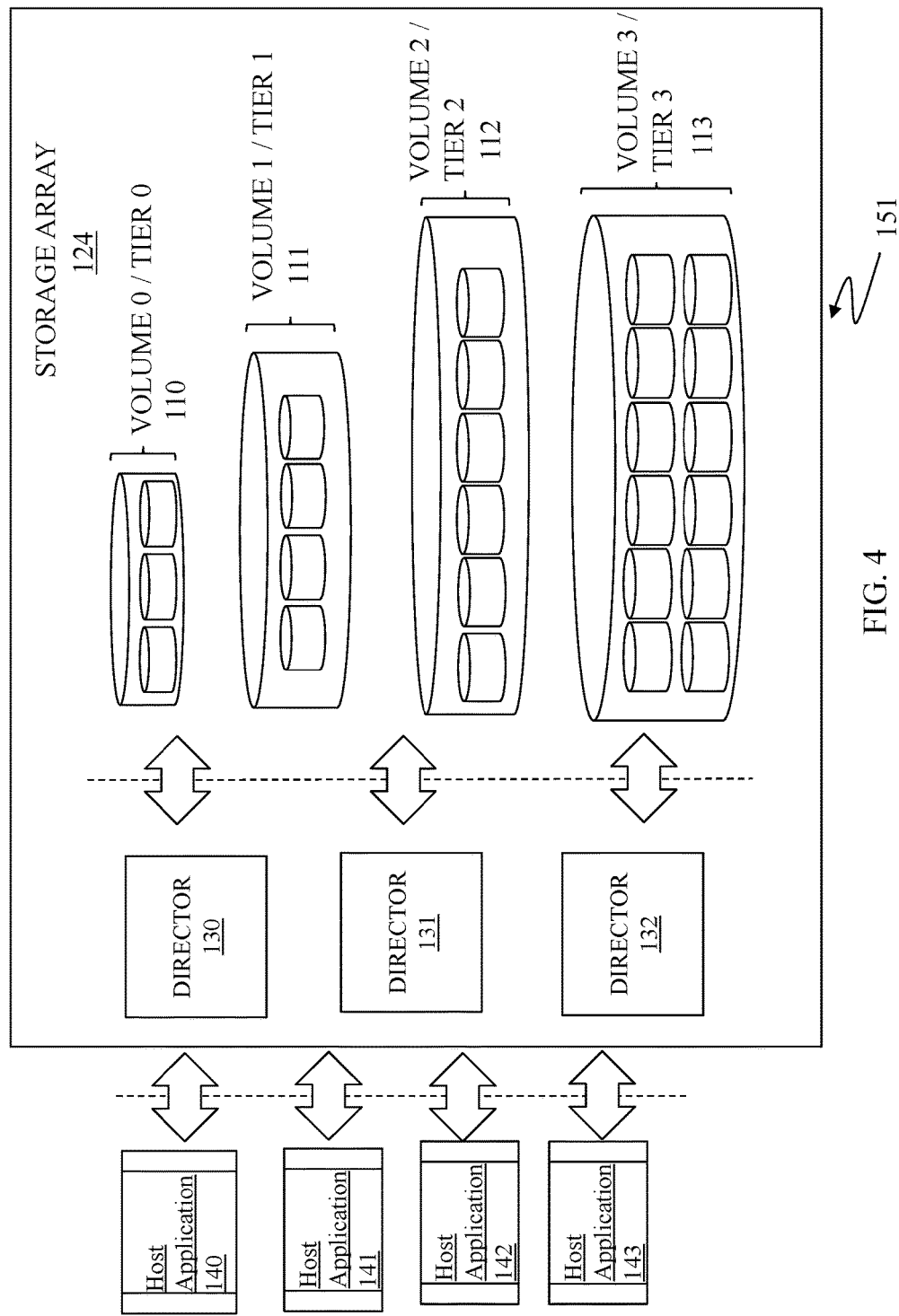
FIGS. 4, 5A and 5B are examples illustrating a data storage system, such as data storage array, including a plurality of storage tiers in an embodiment in accordance with techniques herein.

FIG. 4 is a schematic illustration showing a storage system 151 that may be used in connection with an embodiment of the system described herein. The storage system 151 may include a storage array 124 having multiple directors 130-132 and multiple storage volumes (LUNs, LVs, logical devices or VOLUMES 0-3) 110-113. Host applications 140-144 and/or other entities (e.g., other storage devices, SAN switches, etc.) request data writes and data reads to and from the storage array 124 that are facilitated using one or more of the directors 130-132. The storage array 124 may include similar features as that discussed above.

The volumes 110-113 may be provided in multiple storage tiers (TIERS 0-3) that may have different storage characteristics, such as speed, cost, reliability, availability, security and/or other characteristics. As described above, a tier may represent a set of storage resources, such as physical storage devices, residing in a storage platform. Examples of storage disks that may be used as storage resources within a storage array of a tier may include sets of 7.2K RPM disks, 15K RPM disks and/or EFDs, among other known types of storage devices.

According to various embodiments, each of the volumes 110-113 may be located in different storage tiers. Tiered storage provides that data may be initially allocated to a particular fast volume/tier, but a portion of the data that has not been used over a period of time (for example, three weeks) may be automatically moved to a slower (and perhaps less expensive) tier. For example, data that is expected to be used frequently, for example database indices, may be initially written directly to fast storage whereas data that is not expected to be accessed frequently, for example backup or archived data, may be initially written to slower storage. In an embodiment, the system described herein may be used in connection with a Fully Automated Storage Tiering (FAST) product produced by EMC Corporation of Hopkinton, Mass., that provides for the optimization of the use of different storage tiers including the ability to easily create and apply tiering policies (e.g., allocation policies, data movement policies including promotion and demotion thresholds, and the like) to transparently automate the control, placement, and movement of data within a storage system based on business needs. The techniques herein may be used to determine amounts or allocations of each storage tier used by each application based on capacity limits in combination with performance limits. In one embodiment, the FAST product may be the data storage optimizer 135 which performs data movement optimizations such as using techniques described herein.

Figure 5A:
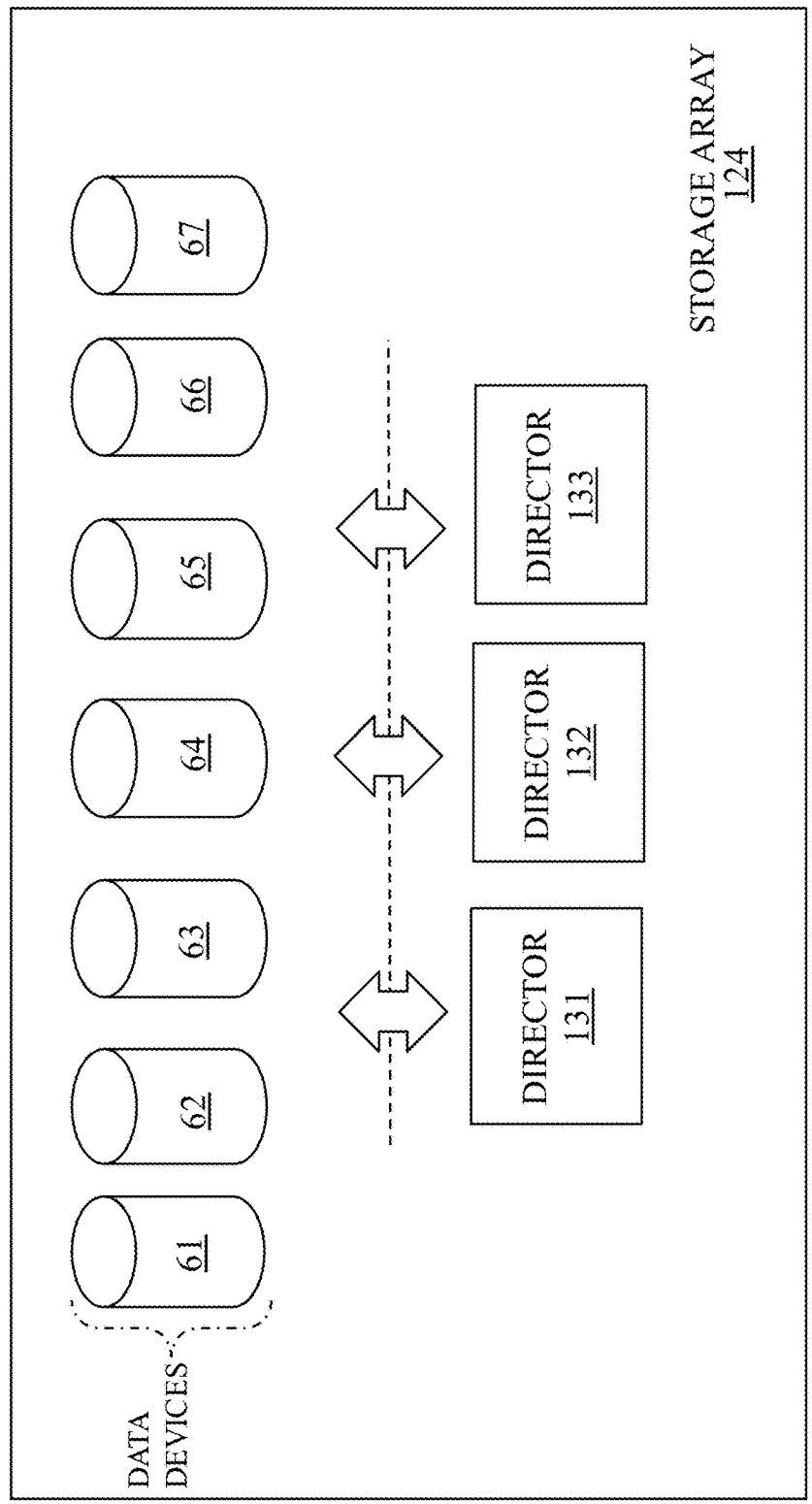

Referring to FIG. 5A, shown is a schematic diagram of the storage array 124 as including a plurality of data devices 61-67 communicating with directors 131-133. The data devices 61-67 may be implemented as logical devices like standard logical devices (also referred to as thick devices) provided in a Symmetrix® data storage system produced by EMC Corporation of Hopkinton, Mass., for example. In some embodiments, the data devices 61-67 may not be directly useable (visible) to hosts coupled to the storage array 124. Each of the data devices 61-67 may correspond to a portion (including a whole portion) of one or more of the disk drives (or more generally physical devices). Thus, for example, the data device section 61 may correspond to a disk drive, may correspond to a portion of the disk drive, or may correspond to a portion of the disk drive and a portion of another disk drive. The data devices 61-67 may be designated as corresponding to different classes, so that different ones of the data devices 61-67 correspond to different physical storage having different relative access speeds or RAID protection type (or some other relevant distinguishing characteristic or combination of characteristics), as further discussed elsewhere herein. Alternatively, in other embodiments that may be used in connection with the system described herein, instead of being separate devices, the data devices 61-67 may be sections of one data device.

Figure 5B:
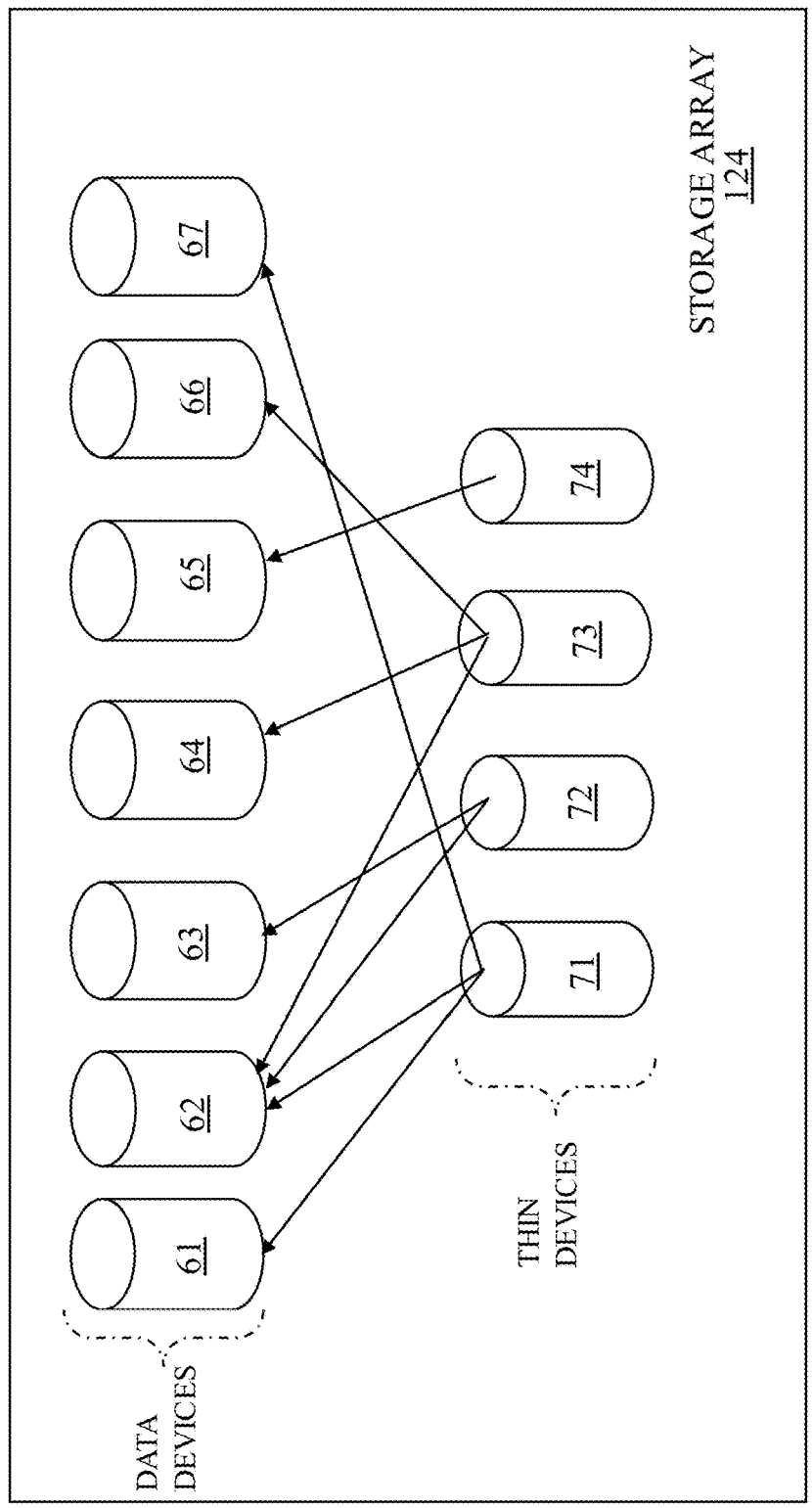

As shown in FIG. 5B, the storage array 124 may also include a plurality of thin devices 71-74 that may be adapted for use in connection with the system described herein when using thin provisioning. In a system using thin provisioning, the thin devices 71-74 may appear to a host coupled to the storage array 124 as one or more logical volumes (logical devices) containing contiguous blocks of data storage. Each of the thin devices 71-74 may contain pointers to some or all of the data devices 61-67 (or portions thereof). As described in more detail elsewhere herein, a thin device may be virtually provisioned in terms of its allocated physical storage. Physical storage for a thin device, that is presented to a host as having a particular capacity, is allocated as needed rather than allocate physical storage for the entire thin device capacity upon creation of the thin device. As such, a thin device presented to the host as having a capacity with a corresponding LBA (logical block address) range may have portions of the LBA range for which storage is not allocated.

Figure 5C:
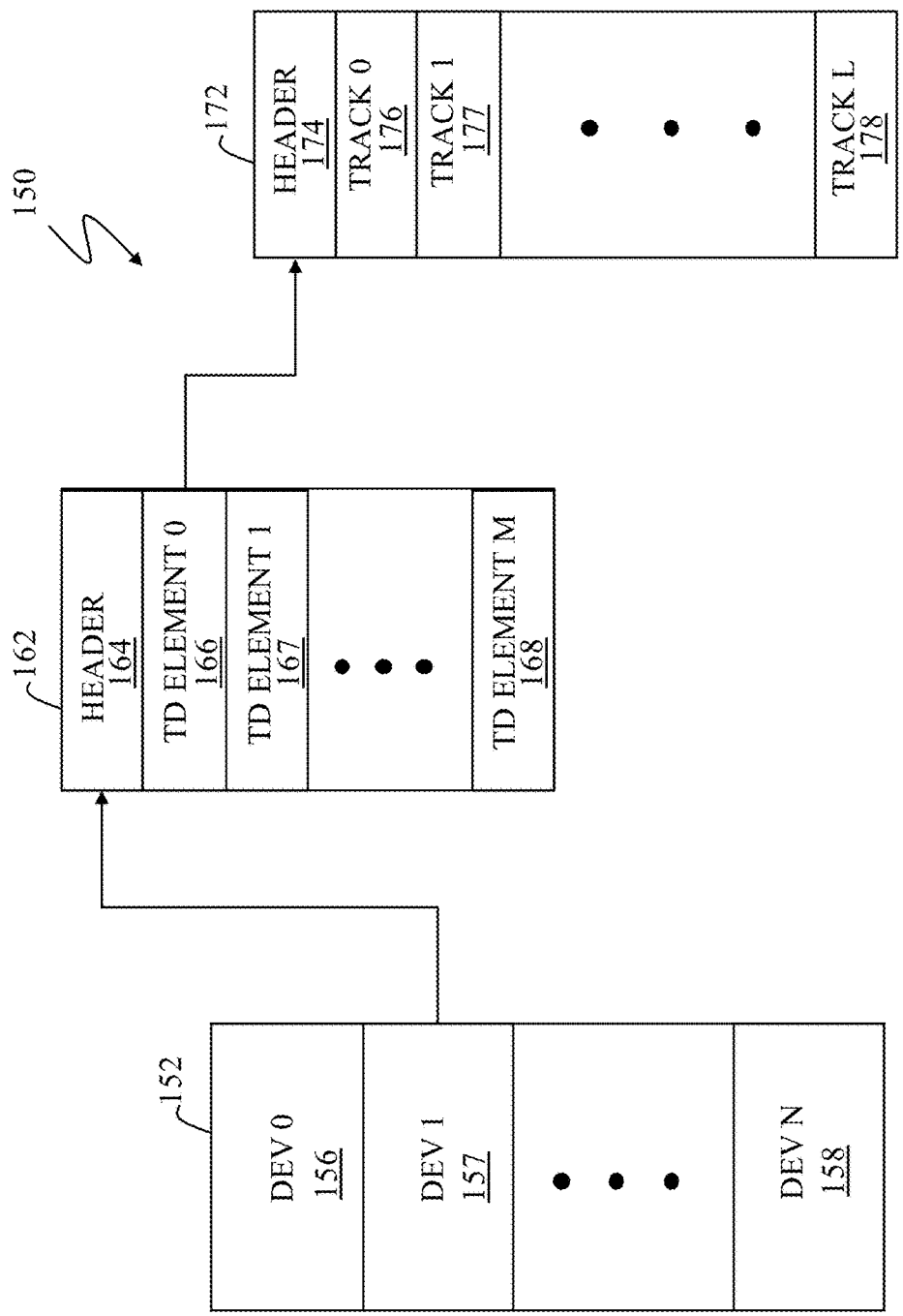
FIG. 5C is a schematic diagram illustrating tables that are used to keep track of device information in connection with an embodiment of the system described herein.

Referring to FIG. 5C, shown is a diagram 150 illustrating tables that are used to keep track of device information. A first table 152 corresponds to all of the devices used by a data storage system or by an element of a data storage system, such as an HA 21 and/or a DA 23. The table 152 includes a plurality of logical device (logical volume) entries 156-158 that correspond to all the logical devices used by the data storage system (or portion of the data storage system). The entries in the table 152 may include information for thin devices, for data devices (such as logical devices or volumes), for standard logical devices, for virtual devices, for BCV (business continuance volume) devices, and/or any or all other types of logical devices used in connection with the system described herein.

Each of the entries 156-158 of the table 152 correspond to another table that may contain information for one or more logical volumes, such as thin device logical volumes. For example, the entry 157 may correspond to a thin device table 162. The thin device table 162 may include a header 164 that contains overhead information, such as information identifying the corresponding thin device, information concerning the last used data device and/or other information including counter information, such as a counter that keeps track of used group entries (described below). The header information, or portions thereof, may be available globally to the data storage system.

The thin device table 162 may include one or more thin device (TD) group elements 166-168, that contain information corresponding to a group of tracks on the data device. A group of tracks may include one or more tracks, the number of which may be configured as appropriate. In an embodiment herein, each group has sixteen tracks, although this number may be configurable.

One of the group elements 166-168 (for example, the group element 166) of the thin device table 162 may identify a particular one of the data devices 61-67 having a track table 172 that contains further information, such as a header 174 having overhead information and a plurality of entries 176-178 corresponding to each of the tracks of the particular one of the data devices 61-67. The information in each of the entries 176-178 may include a pointer (either direct or indirect) to the physical address on one of the physical disk drives of the data storage system that maps to the logical address(es) of the particular one of the data devices 61-67. Thus, the track table 162 may be used in connection with mapping logical addresses of the logical devices corresponding to the tables 152, 162, 172 to physical addresses on the disk drives or other physical devices of the data storage system.

The tables 152, 162, 172 may be stored in the global memory 25b of the data storage system. In addition, the tables corresponding to particular logical devices accessed by a particular host may be stored (cached) in local memory of the corresponding one of the HA's. In addition, an RA and/or the DA's may also use and locally store (cache) portions of the tables 152, 162, 172.

Figure 5D:
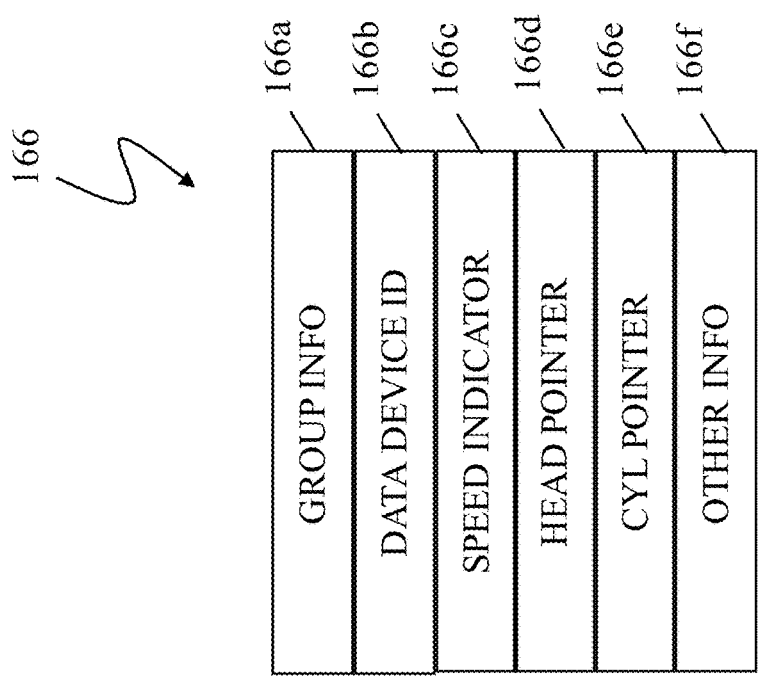
FIG. 5D is a schematic diagram showing a group element of a thin device table in connection with an embodiment of the system described herein.

Referring to FIG. 5D, shown is a schematic diagram illustrating a group element 166 of the thin device table 162 in connection with an embodiment of the system described herein. The group element 166 may include a plurality of entries 166a-166f. The entry 166a may provide group information, such as a group type that indicates whether there has been physical address space allocated for the group. The entry 166b may include information identifying one (or more) of the data devices 61-67 that correspond to the group (i.e., the one of the data devices 61-67 that contains pointers for physical data for the group). The entry 166c may include other identifying information for the one of the data devices 61-67, including a speed indicator that identifies, for example, if the data device is associated with a relatively fast access physical storage (disk drive) or a relatively slow access physical storage (disk drive). Other types of designations of data devices are possible (e.g., relatively expensive or inexpensive). The entry 166d may be a pointer to a head of the first allocated track for the one of the data devices 61-67 indicated by the data device ID entry 166b. Alternatively, the entry 166d may point to header information of the data device track table 172 immediately prior to the first allocated track. The entry 166e may identify or point to a cylinder of a first allocated track for the one the data devices 61-67 indicated by the data device ID entry 166b. The entry 166f may contain other information corresponding to the group element 166 and/or the corresponding thin device. In other embodiments, entries of the group table or element 166 may identify a range of cylinders of the thin device and a corresponding mapping to map cylinder/track identifiers for the thin device to tracks/cylinders of a corresponding data device. In an embodiment, the size of table element 166 may be eight bytes.

Accordingly, a thin device presents a logical storage space to one or more applications running on a host where different portions of the logical storage space may or may not have corresponding physical storage space associated therewith. However, the thin device is not mapped directly to physical storage space. Instead, portions of the thin storage device for which physical storage space exists are mapped to data devices, which are logical devices that map logical storage space of the data device to physical storage space on the disk drives or other physical storage devices. Thus, an access of the logical storage space of the thin device results in either a null pointer (or equivalent) indicating that no corresponding physical storage space has yet been allocated, or results in a reference to a data device which in turn references the underlying physical storage space.

Thin devices and thin provisioning are described in more detail in U.S. patent application Ser. No. 11/726,831, filed Mar. 23, 2007 (U.S. Patent App. Pub. No. 2009/0070541 A1), now U.S. Pat. No. 9,152,349, AUTOMATED INFORMATION LIFE-CYCLE MANAGEMENT WITH THIN PROVISIONING, Yochai, EMS-147US, and U.S. Pat. No. 7,949,637, Issued May 24, 2011, Storage Management for Fine Grained Tiered Storage with Thin Provisioning, to Burke, both of which are incorporated by reference herein.

As discussed elsewhere herein, the data devices 61-67 (and other logical devices) may be associated with physical storage areas (e.g., disk drives, tapes, solid state storage, etc.) having different characteristics. In various embodiments, the physical storage areas may include multiple tiers of storage in which each sub-tier of physical storage areas and/or disk drives may be ordered according to different characteristics and/or classes, such as speed, technology and/or cost. The devices 61-67 may appear to a host coupled to the storage device 24 as a logical volume (logical device) containing a contiguous block of data storage, as discussed herein. Accordingly, each of the devices 61-67 may map to storage areas across multiple physical storage drives. The granularity at which the storage system described herein operates may be smaller than at the file level, for example potentially as small as a single byte, but more practically at the granularity of a single logical block or collection of sequential data blocks. A data block may be of any size including file system or database logical block size, physical block, track or cylinder and/or other size. Multiple data blocks may be substantially the same size or different sizes, such as different size data blocks for different storage volumes or different sized data blocks within a single storage volume.

In accordance with techniques herein, an embodiment may allow for locating all of the data of a single logical portion or entity in a same tier or in multiple different tiers depending on the logical data portion or entity. In an embodiment including thin devices, the techniques herein may be used where different portions of data of a single thin device may be located in different storage tiers. As such, an embodiment in accordance with techniques herein may have added flexibility in that the first portion of data of the thin device may be located in a different higher performance storage tier than the second portion. For example, the first portion may be located in a tier comprising flash devices and the second portion may be located in a different tier of 15K RPM or 7.2K RPM drives.

Figure 6:
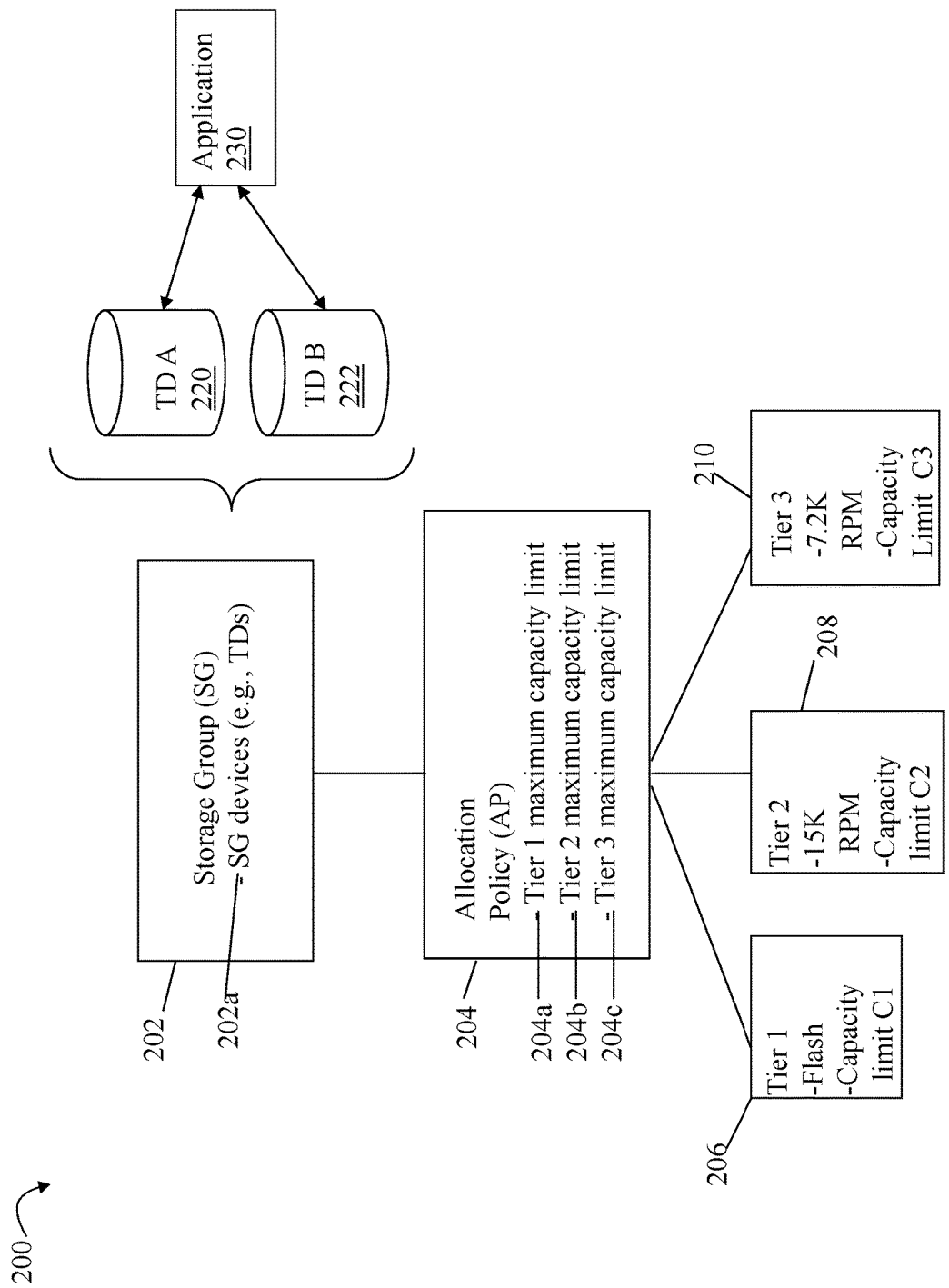
FIGS. 6 and 7 are examples illustrating a storage group, allocation policy and associated storage tiers in an embodiment in accordance with techniques herein.

Referring to FIG. 6, shown is an example illustrating information, including storage groups and allocation policies, that may be defined and used in connection with techniques herein. The example 200 includes multiple storage tiers 206, 208, and 210, an allocation policy (AP) 204, and storage group (SG) 202. The SG 202 may include one or more thin devices (TDs), such as TD A 220 and TD B 222, used by an application 230. The application 230 may execute, for example, on one of the hosts of FIG. 1. The techniques herein may be used to determine how to partition physical storage of the multiple storage tiers 206, 208 and 210 for use in storing or locating the application's data, such as data of the TDs 220 and 222. It should be noted that the particular number of tiers, TDs, and the like, should not be construed as a limitation. An SG may represent a logical grouping of TDs or other logical volumes used by a single application although an SG may correspond to other logical groupings for different purposes. An SG may, for example, correspond to TDs used by multiple applications.

Each of the storage tiers 206, 208 and 210 may correspond to a tier definition as described elsewhere herein. Storage tier 206 represents a first storage tier of flash drives having a tier capacity limit C1. Storage tier 208 represents a second storage tier of 15K RPM drives having a tier capacity limit C2. Storage tier 210 represents a third storage tier of 7.2K RPM drives having a tier capacity limit C3. Each of the capacity limits C1, C2 and C3 may represent an available or maximum amount of storage capacity in the storage tier that may be physical available in the system. The AP 204 may be associated with one of more SGs such as SG 202. The AP 204 specifies, for an associated SG 202, a capacity upper limit or maximum threshold for one or more storage tiers. Each such limit may identify an upper bound regarding an amount of storage that may be allocated for use by the associated SG. The AP 204 may be associated with one or more of the storage tiers 206, 208 and 210 that may be defined in a multi-tier storage environment. The AP 204 in this example 200 includes limit 204a identifying a maximum or upper limit of storage for tier1, limit 204b identifying a maximum or upper limit of storage for tier2, and limit 204c identifying a maximum or upper limit of storage for tier3. The SG 202 may be based on an SG definition identifying 202a the logical devices, such as TDs included in the SG.

In connection with techniques herein, the maximum limits 204a, 204b and 204c each represent an upper bound of a storage capacity to which an associated SG is subjected to. The techniques herein may be used to partition less than the amount or capacity represented by such limits. An amount of physical storage of a tier allocated for use by an application is allowed to vary up to the tier limit as defined in the AP 204 in accordance with other criteria associated with the application such as, for example, varying application workload. The optimizer may vary the amount of storage in each tier used by an SG 202, and thus an application, based on workload and possibly other criteria when performing a cost benefit analysis, where such amounts are subject to the limits of the SG's AP and also performance limits described in more detail elsewhere herein. At a second point in time, the workloads and possibly other criteria for the applications may change and the optimizer may repartition the storage capacity used by each application subject to the capacity limits of APs and performance limits.

Figure 7:
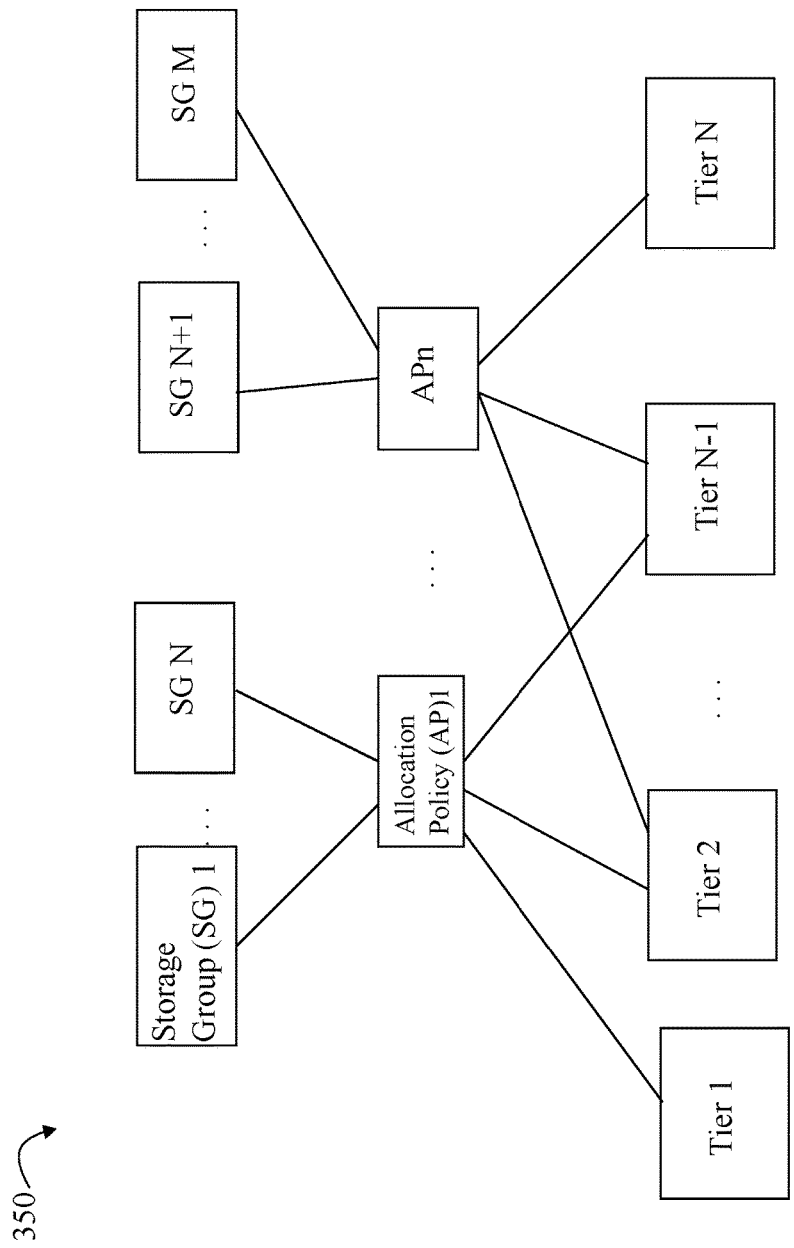

Referring to FIG. 7, shown is an example which more generally illustrates different associations between SGs, APs and tiers in an embodiment in accordance with techniques herein. The example 350 illustrates that an embodiment may have multiple storage tiers (e.g., tiers 1-N), multiple APs (e.g., AP1-N), and multiple SGs (e.g., SG 1-M). Each AP may be associated with one or more of the storage tiers. Each AP may also be associated with different tiers than other APs. For example, APn is associated with Tier N but AP1 is not. For each tier associated with an AP, the AP may define a maximum capacity limit as described in connection with FIG. 6. Each AP may be associated with one or more SGs. For example SGs1-N may be associated with a same AP1, and SGs N+1 through M may be associated with a same APn.

With reference back to FIG. 6, each of the maximum capacity limits may have any one of a variety of different forms. For example, such limits may be expressed as a percentage or portion of tier total storage capacity (e.g., such as a percentage of C1, C2, or C3), as an integer indicating an amount or quantity of storage (e.g., indicating a number of bytes or other number of storage units), and the like.

Data used in connection with techniques herein, such as the performance data of FIG. 3 used in determining device and SG workloads, may be obtained through observation and monitoring actual performance. Data may also be determined in other suitable ways such as, for example, through simulation, estimation, and the like. Observed or collected data may be obtained as described in connection with FIG. 3 by monitoring and recording one or more aspects of I/O activity for each TD, and portions thereof. For example, for each TD, and/or portions thereof, an average number of reads occurring within a given time period may be determined, an average number of writes occurring within a given time period may be determined, an average number of read misses occurring within a given time period may be determined, and the like. It should be noted that the operations of read and write with respect to an TD may be viewed as read and write requests or commands from the DA, controller or other backend physical device interface. Thus, these are operations may also be characterized as a average number of operations with respect to the physical storage device (e.g., average number of physical device reads, writes, and the like, based on physical device accesses). This is in contrast to observing or counting a number of particular type of I/O requests (e.g., reads or writes) as issued from the host and received by a front end component such as an FA. To illustrate, a host read request may not result in a read request or command issued to the DA if there is a cache hit and the requested data is in cache. The host read request results in a read request or command issued to the DA to retrieve data from the physical drive only if there is a read miss. Furthermore, when writing data of a received host I/O request to the physical device, the host write request may result in multiple reads and/or writes by the DA in addition to writing out the host or user data of the request. For example, if the data storage system implements a RAID data protection technique, such as RAID-5, additional reads and writes may be performed such as in connection with writing out additional parity information for the user data. Thus, observed data gathered to determine workload, such as observed numbers of reads and writes, may refer to the read and write requests or commands performed by the DA. Such read and write commands may correspond, respectively, to physical device accesses such as disk reads and writes that may result from a host I/O request received by an FA.

It should be noted that movement of data between tiers from a source tier to a target tier may include determining free or unused storage device locations within the target tier. In the event there is an insufficient amount of free or unused storage in the target tier, processing may also include displacing or relocating other data currently stored on a physical device of the target tier. An embodiment may perform movement of data to and/or from physical storage devices using any suitable technique.

One embodiment in accordance with techniques herein may include multiple storage tiers including a first tier of flash devices and one or more other tiers of non-flash devices having lower performance characteristics than flash devices. The one or more other tiers may include, for example, one or more types of disk devices. The tiers may also include other types of SSDs besides flash devices.

As described above, a thin device (also referred to as a virtual provision device) is a device that represents a certain capacity having an associated address range. Storage may be allocated for thin devices in chunks or data portions of a particular size as needed rather than allocate all storage necessary for the thin device's entire capacity. Therefore, it may be the case that at any point in time, only a small number of portions or chunks of the thin device actually are allocated and consume physical storage on the back end (on physical disks, flash or other physical storage devices). A thin device may be constructed of chunks having a size that may vary with embodiment. For example, in one embodiment, a chunk may correspond to a group of 12 tracks (e.g., 12 tracks*64Kbytes/track=768Kbytes/chunk). As also noted with a thin device, the different chunks may reside on different data devices in one or more storage tiers. In one embodiment, as will be described below, a storage tier may consist of one or more storage pools. Each storage pool may include multiple LUNs and their associated physical devices. With thin devices, a system in accordance with techniques herein has flexibility to relocate individual chunks as desired to different devices in the same as well as different pools or storage tiers. For example, a system may relocate a chunk from a flash storage pool to a 7.2K RPM storage pool. In one embodiment using techniques herein, a thin device can be bound to a particular storage pool of a storage tier at a point in time so that any chunks requiring allocation of additional storage, such as may occur when writing data to the thin device, result in allocating storage from this storage pool. Such binding may change over time for a thin device.

A thin device may contain thousands and even hundreds of thousands of such chunks. As such, tracking and managing performance data such as one or more performance statistics for each chunk, across all such chunks, for a storage group of thin devices can be cumbersome and consume an excessive amount of resources. Described in following paragraphs are techniques that may be used in connection with collecting performance data about thin devices where such information may be used to determine which chunks of thin devices are most active relative to others. Such evaluation may be performed in connection with determining promotion/demotion thresholds used in evaluating where to locate and/or move data of the different chunks with respect to the different storage tiers in a multi-storage tier environment. In connection with examples in following paragraphs, details such as having a single storage pool in each storage tier, a single storage group, and the like, are provided for purposes of illustration. Those of ordinary skill in the art will readily appreciate the more general applicability of techniques herein in other embodiments such as, for example, having a storage group include a plurality of storage pools, and the like.

Figure 8A:
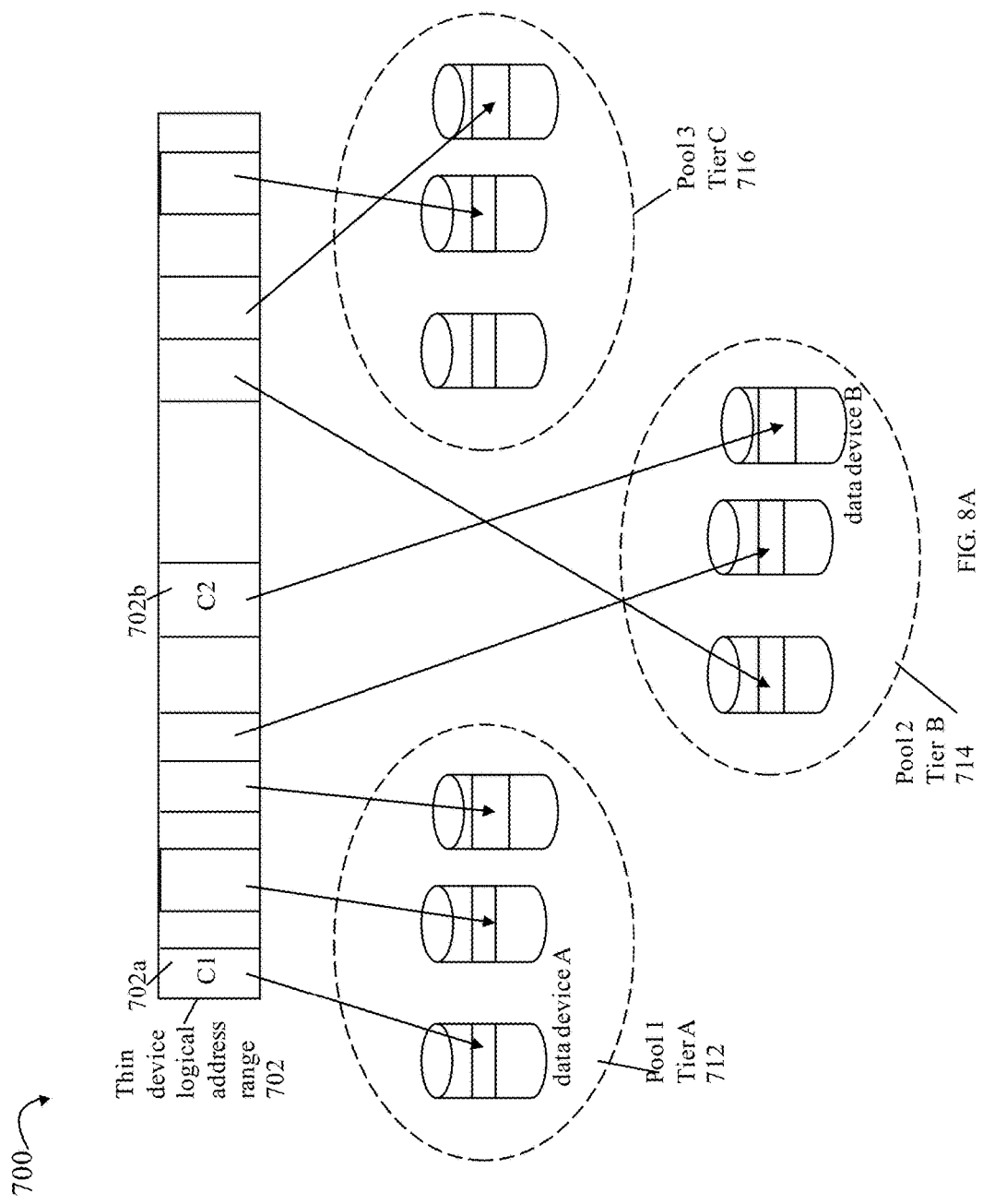
FIGS. 8A and 8B are examples illustrating thin devices and associated structures that may be used in an embodiment in accordance with techniques herein.

Referring to FIG. 8A, shown is an example 700 illustrating use of a thin device in an embodiment in accordance with techniques herein. The example 700 includes three storage pools 712, 714 and 716 with each such pool representing a storage pool of a different storage tier. For example, pool 712 may represent a storage pool of tier A of flash storage devices, pool 714 may represent a storage pool of tier B of 15K RPM storage devices, and pool 716 may represent a storage pool of tier C of 7.2K RPM storage devices. Each storage pool may include a plurality of logical devices and associated physical devices (or portions thereof) to which the logical devices are mapped. Element 702 represents the thin device address space or range including chunks which are mapped to different storage pools. For example, element 702a denotes a chunk C1 which is mapped to storage pool 712 and element 702b denotes a chunk C2 which is mapped to storage pool 714. Element 702 may be a representation for a first thin device which is included in a storage group of one or more thin devices.

It should be noted that although the example 700 illustrates only a single storage pool per storage tier, an embodiment may also have multiple storage pools per tier.

Figure 8B:
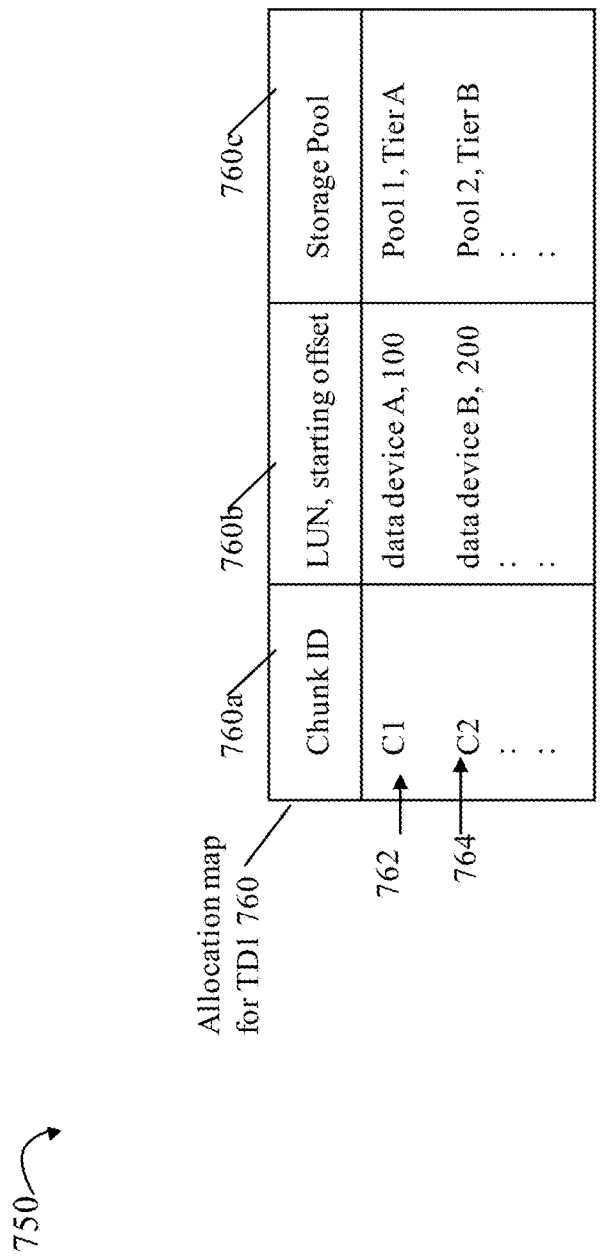

Referring to FIG. 8B, shown is an example representation 750 of information that may be included in an allocation map 760 in an embodiment in accordance with techniques herein. An allocation map 760 may be used to identify the mapping for each thin device (TD) chunk (e.g. where each chunk is physically located). An allocation map 760 may be maintained for each TD. In this example, 760 represents an allocation map as may be maintained for a single TD although another allocation map may be similarly used and maintained for each other TD in a storage group. Allocation map 760 may represent mapping information as illustrated in FIG. 8A such as in connection the mapping of 702 to different storage pool devices. The allocation map 760 may contain an entry for each chunk and identify which data device and associated physical storage is mapped to the chunk. For each entry or row of the map 760 corresponding to a chunk, a first column 760a, Chunk ID, denotes an identifier to uniquely identify the chunk of the TD, a second column 760b, indicates information about the data device and offset to which the chunk is mapped, and a third column storage pool 760c denotes the storage pool and tier including the data device of 760b. For example, entry 762 represents chunk C1 illustrated in FIG. 8A as 702a and entry 764 represents chunk C2 illustrated in FIG. 8A as 702b. It should be noted that although not illustrated, the allocation map may include or otherwise use other tables and structures which identify a further mapping for each data device such as which physical device locations map to which data devices. This further mapping for each data device is described and illustrated elsewhere herein such as, for example, with reference back to FIG. 5B. Such information as illustrated and described in connection with FIG. 8B may be maintained for each thin device in an embodiment in accordance with techniques herein.

In connection with collecting statistics characterizing performance, I/O workload and/or activity for a thin device, one approach may be to collect the information per chunk or, more generally, for the smallest level of granularity associated with allocation and deallocation of storage for a thin device. Such statistics may include, for example, a number of reads/unit of time, #writes/unit of time, a number of prefetches/unit of time, and the like. However, collecting such information at the smallest granularity level does not scale upward as number of chunks grows large, such as for a single thin device which can have up to, for example, 300,000 chunks.

Therefore, an embodiment in accordance with techniques herein may collect statistics on a grouping of "N" chunks also referred to as an extent, where N represents an integer number of chunks, N>0. N may be, for example, 480 in one embodiment. Each extent may represent a consecutive range or portion of the thin device in terms of thin device locations (e.g., portion of the address space or range of the thin device). Note that the foregoing use of consecutive does not refer to physical storage locations on physical drives but rather refers to consecutive addresses with respect to a range of addresses of the thin device which are then mapped to physical device locations which may or may not be consecutive, may be on the same or different physical drives, and the like. For example, in one embodiment, an extent may be 480 chunks (N=480) having a size of 360 MBs (megabytes).

An extent may be further divided into subextents, where each subextent is a collection of M chunks. M may be, for example 10 in one embodiment. In one embodiment, the sub-extent size may correspond to the smallest granularity of data movement. In other words, the subextent size represents the atomic unit or minimum amount of data that can be operated upon when performing a data movement such as between storage tiers.

Figure 9:
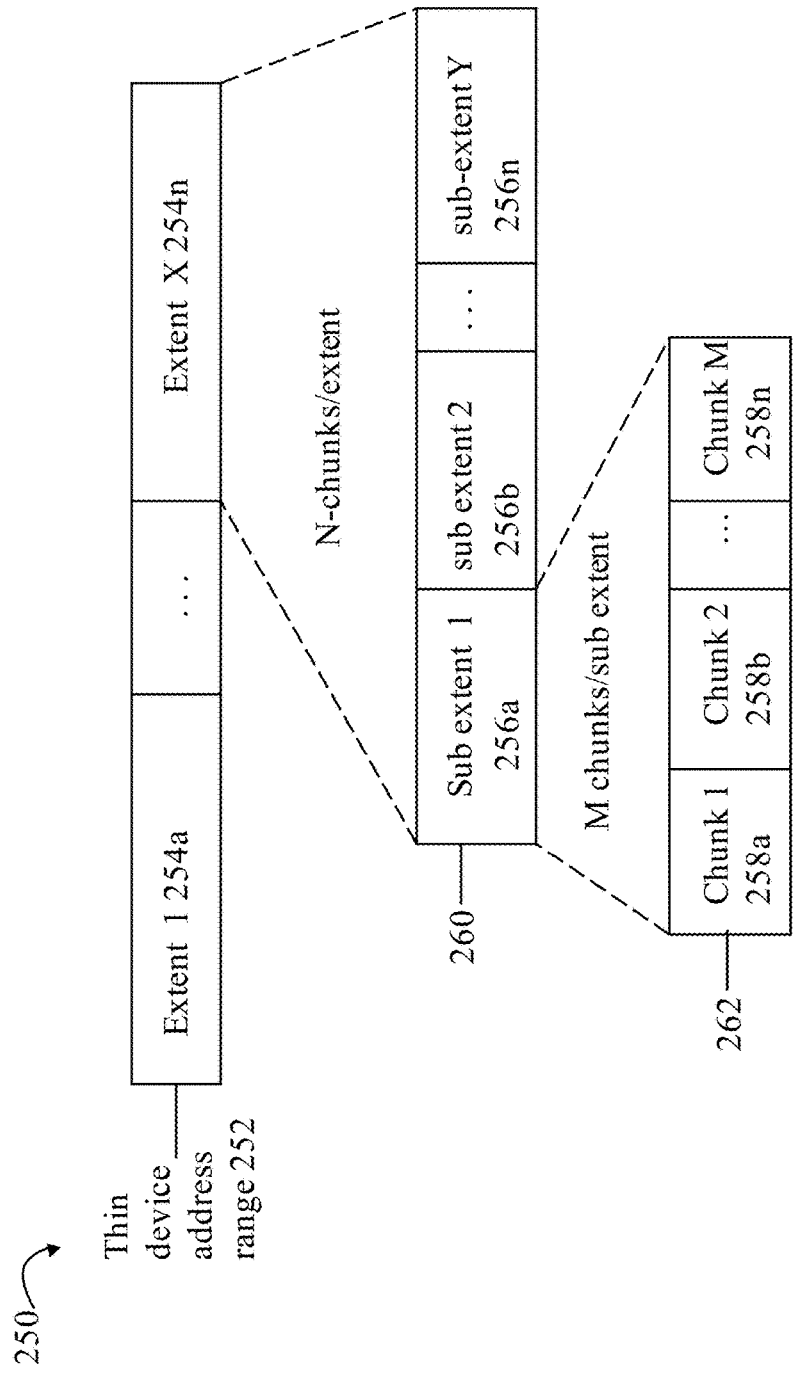
FIG. 9 is an example illustrating data portions comprising a thin device's logical address range.

Referring to FIG. 9, shown is an example illustrating partitioning of a thin device's address space or range in an embodiment in accordance with techniques herein. The example 250 includes a thin device address space or range 252 which, as described elsewhere herein, includes chunks mapped to physical storage locations. The thin device address space or range 252 may be partitioned into one or more extents 254a-254n. Each of the extents 254a-254n may be further partitioned into sub-extents. Element 260 illustrates that extent X 254n may include subextents 256a-256n. Although only detail is illustrated for extent 254n, each of the other extents of the thin device also include a same number of subextents as illustrated for 254n. Each of the subextents 256a-256n may represent a grouping of "M" chunks. Element 262 illustrates that subextent 1 256a may include chunks 258a-258n. Although only detail is illustrated for subextent 256a, each of the other subextents 256b-256n also include a same number of "M" chunks as illustrated for 256a. Thus, each of the extents 254a-254n may represent an a grouping of "N" chunks, where $$N = \text{\# subextents/extent} * M \text{ chunks/subextent} \quad \text{EQUATION B1}$$

An embodiment in accordance with techniques herein may collect statistics for each extent, or more generally data portion, as described in more detail elsewhere herein.

It should be noted that although the techniques described herein are used with thin devices providing virtual storage provisioning, the techniques herein may also be used in connection with other types of devices such as those not providing virtual provisioning.

Described herein are different techniques that may be performed by an optimizer, for example, such as the optimizer 135 with reference back to FIG. 3. The optimizer may perform processing in accordance with the techniques herein to determine how to allocate or partition physical storage in a multi-tiered environment for use by multiple applications. The optimizer may perform processing such as, for example, to determine what particular portions of LUNs, thin devices, and the like, to store on physical devices of a particular tier; evaluate when to move data between physical drives of different tiers; and the like. In connection with description herein, embodiments are described whereby the optimizer may be included as a component of the data storage system, such as a data storage array. In such embodiments, the optimizer may perform optimizations, such as the data movement optimization, with respect to physical devices of a single data storage system such as a single data storage array. Such data movement optimizations may be performed with respect to different data storage units of granularity that may vary with embodiment and/or type of logical devices. For example, an embodiment may provide for partitioning data of a logical device (as may be stored on one or more physical devices (PDs)) into multiple data portions of any suitable size. The data movement optimization processing may provide for evaluation and data movement of individual data portions (each of which can be much less than the size of the entire LUN or other logical device such as a thin or virtually provisioned logical device) between storage tiers based on the workload or activity of I/Os directed to each such data portion. As the I/O workload may change dynamically over time, the data storage optimizer may continuously evaluate and perform data movement optimizations between different storage tiers as needed responsive to such changing workloads.

It should be noted that the target data storage system may be connected to one or more other external data storage systems whereby one or more storage tiers managed by the data storage optimizer of the target data storage system include storage located on such external data storage systems. For example, the target system may include the three storage tiers as described above and also include a fourth storage tier of physical storage devices located on an external data storage system whereby the data storage optimizer of the target system performs automated data movement optimizations between storage tiers including those three tiers having physical devices located on the target system and additionally including physical devices of the tier located on the external data storage system. The external data storage system and its storage may be accessible to a host indirectly through the target data storage system. In this manner, the host or other client may send I/Os to the target system and physical storage for the I/Os may be located on physical device of the target system or another external data storage system connected to the target system.

The data storage optimizer may be located in a first or primary data storage system and may perform data storage optimizations, such as data movement and other optimizations, for PDs stored on the first data storage system. Additionally, the optimizer, or more generally, the one or more components performing the optimization processing, may perform data storage optimizations with respect to such externally located data storage systems and PDs. For example, the first data storage system may be connected, directly or through a network or other connection, to a one or more external data storage systems. The optimizer of the first data storage system may perform data storage optimizations such as data movement optimizations with respect to PDs of the first data storage system and also other PDs of the one or more other external data storage systems. In this manner, the data storage optimizer may perform data storage optimizations of its own local devices and/or other devices physically located in another component other than the data storage system. In other words, the techniques herein for performing data movement evaluation, performing the actual movement of data such as between physical devices of different storage tiers, and the like, may be performed by code executing on a component that is external with respect to the data storage system including the physical devices for which such data movement optimization is performed.

Figure 10:
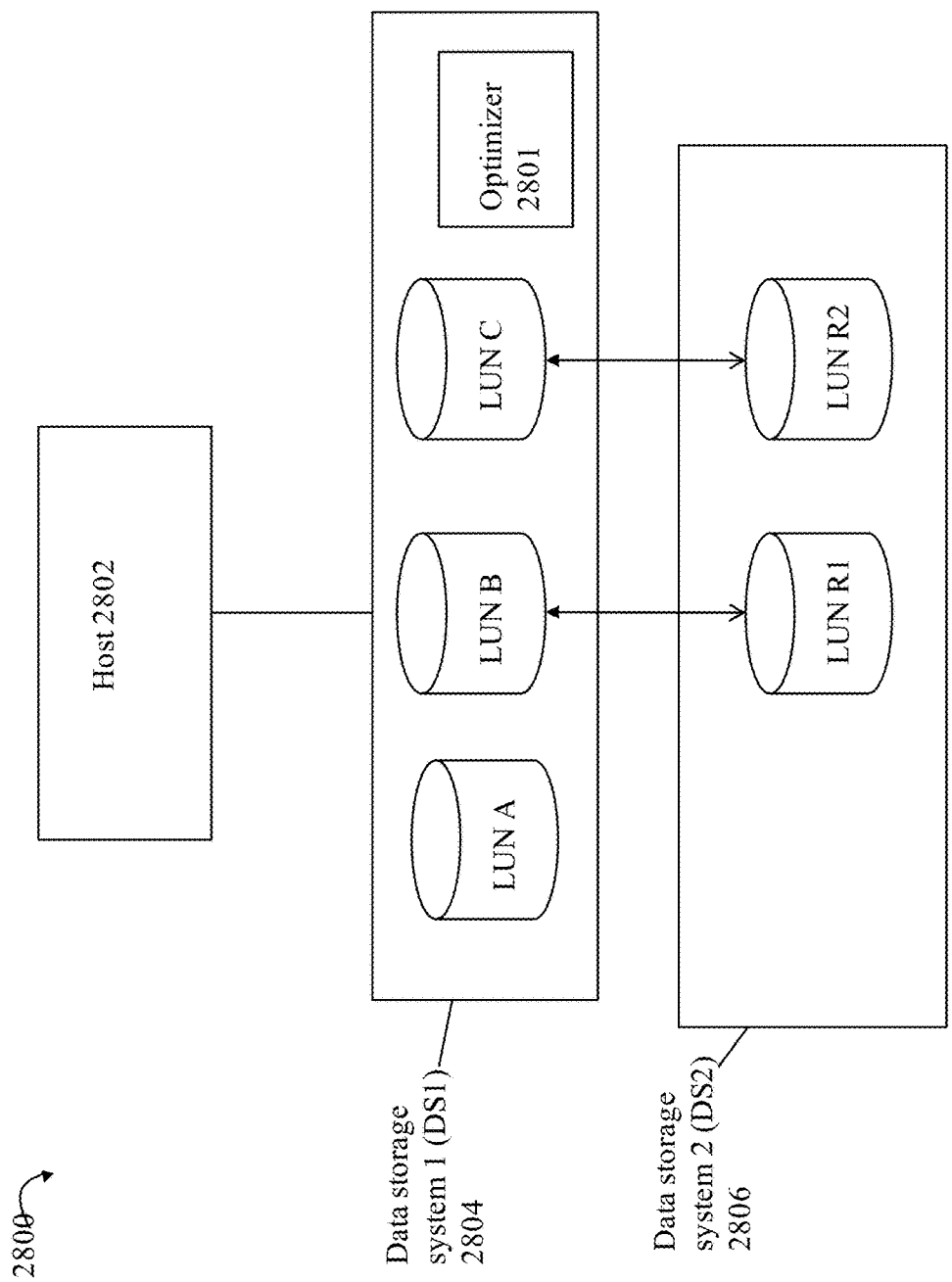
FIGS. 10 and 11 are exemplary embodiments in which the data storage optimizer manages storage across multiple data storage systems including external data storage systems in accordance with techniques herein.

For example, with reference now to FIG. 10, shown is an example 2800 of a system and network including a host 2802, data storage system 1 (DS1) 2804 and data storage system 2 (DS2) 2806. The data storage optimizer 2801 as may be included in DS 1 2804 may perform data storage optimizations across multiple storage tiers of PDs included in DS1 2804 and also PDs of DS2 2806. The optimizer 2801 may perform optimization processing such as in connection with data movement evaluation for moving data portions of LUNs between different underlying PDs providing the physical storage for the LUNs. DS1 2804 may provide for presenting to the host 2802 storage on both DS1 and DS2. LUNs A, B and C may be presented as devices of DS1 where LUN A may have underlying storage provisioned on PDs of DS1 and LUNs B and C may have underlying storage provisioned on PDs of DS2. For example, as illustrated, DS1 may map LUNs B and C (presented to the host as devices of DS1) to LUNs R1 and R2, respectively, of DS 2.

DS1 may utilize one or more components providing a "virtualized backend" to DS2 such as, for example, where a DA of DS1 communicates with an FA of DS2 to access LUNs R1 and R2 of DS2. In connection with SCSI terminology, a port of a DA of DS1 may be an initiator and a port of an FA of DS2 may be a target forming a path over which DS1 may access a LUN of DS2 (e.g., access one of the LUNs R1, R2). Thus, the example 2800 is an illustration whereby the host 2802 communicates directly with DS1 2804 issuing commands and operations to LUNs A-C. Host 2802 is provided access to storage and devices of DS2 only indirectly through DS1. As such, DS1 may want to know different types of information about DS 2 2806 (e.g., such as regarding the underlying PD storage from which LUNs R1 and R2 of DS2 are provisioned in connection with providing data services, and other information as described elsewhere herein) in connection with performing data storage optimizations. Information regarding DS2, such as related to the configuration of DS2, the performance or storage tier classification for PDs providing storage for LUNs R1 and R2 of DS2, and the like, may or may not be available to DS1. Since such information may not be provided to DS1, an embodiment may perform testing or collect observed data regarding I/Os DS2 to discover such information regarding DS2 and the PDs of DS 2 providing storage for the LUNs of DS2. The techniques herein may be performed by executing code on DS1 to determine such information including performance classifications or storage tiers of underlying PDs providing storage for LUNs R1 and R2. The foregoing information may be used as described elsewhere herein in connection with optimizations whereby an optimizer of DS1 does data movement and placement of LUN data of LUNs A-C. For example, DS1 may control movement and placement of data for LUNs B and C on selected ones of LUNs R1, R2 of DS2 based on particular storage tier classifications of PD groups for LUNs R1 and R2. For example, LUN R1 of DS2 may be classified as having its data stored on a first group of PDs which are EFDs, or have average RTs which approximate that as expected with EFD, and LUN R2 may be classified as having its data stored on a second group of PDs which are SAS 15K RPM disk drives (or have average RTs which approximate that as expected with SAS 15K RPM rotating disk drives of a particular RPM). At a first point in time, DS1 may store data of LUN B which is frequently accessed by the host on LUN R1 and may store data of LUN C which is much less frequently accessed by the host on LUN R2 as illustrated in the example 2800. At a second point in time, the optimizer may determine that the data of LUN B is now much less frequently accessed than the data of LUN C and may relocate or move data of LUN B to LUN R2 and may move data of LUN C to LUN R1. Thus, DS1 may address each LUN of DS2 in a manner similar to one of its own PDs for placement and data movement optimizations.

It should be noted that the foregoing example describes performing data storage optimizations, such as data movement and placement, with reference to an entire LUN. However, as described elsewhere herein and also appreciated by those skilled in the art, such data movement and placement may be performed with respect to varying and different levels of storage granularity rather than per LUN. For example, the foregoing may be used in connection with data movement and placement for a portion of a LUN such as LUN B whereby a first very active portion of LUN B may have its data stored on LUN R1 and a second much less active portion of LUN B may have its data stored on LUN R2 and yet a third portion of LUN B may have its data stored on PDs of DS1. DS1 may then perform processing to appropriately and suitably move such data portions as workload and activity for each such portion may change over time.

Figure 11:
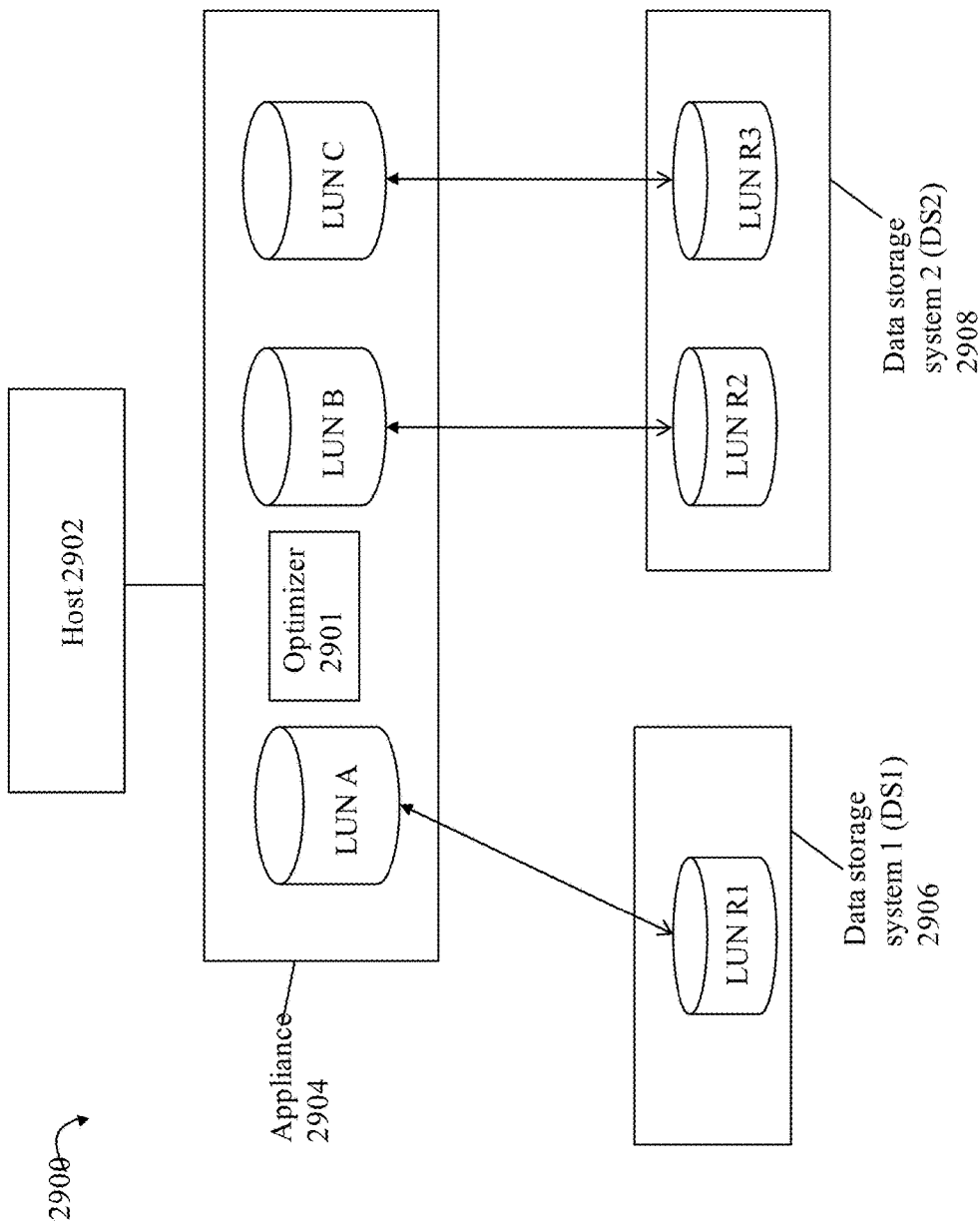

With reference now to FIG. 11, shown is another example of another embodiment that may utilize the techniques herein. The example 2900 includes a host 2902, appliance 2904 and DS1 2906 and DS2 2908. The appliance 2904 may be a data storage virtualization appliance such as an EMC® VPLEX™ appliance which accesses and aggregates storage from multiple data storage systems DS1 and DS2 whereby each such data storage system may be of the same or different types (e.g., same or different manufacturers as well as different array types that may be from a same manufacturer). In this manner, the appliance 2904 may present storage of DS1 and DS2 in an aggregated virtualized environment to the host 2902 and other clients. The host 2902 communicates with the appliance 2904 to access data on any one of the virtualized storage devices LUNs A-C exposed to the client and each such virtualized storage device of the appliance may be mapped to one or more other LUNs R1-R3 of one or more other data storage systems such as DS1 2906 and DS2 2908. To illustrate, the appliance 2904 may expose or present to the host LUNs A-C. As such, the appliance 2904 may want to know information about DS1 2906, DS2 2908 and the underlying PD storage from which LUNs R1, R2, and R3 are provisioned in connection with providing data services, performing optimizations such as data movement as described elsewhere herein, and the like. Such information regarding the configuration and performance classification of LUNs R1, R2 and R3 may or may not be available to the appliance 2904 (e.g. the appliance may not be provided with information regarding the storage tier classification of the underlying PDs from which storage is configured for storing data of LUNs R1, R2, and R3). Since such information may not be provided to the appliance, an embodiment may collect observed performance and workload data directed to DS1 2906 and DS2 2908 to obtain information regarding the DSs 2906, 2908 and the PDs provisioned for LUNs R1-R3 of DS1 and DS2 that may be used in connection with the techniques herein. Techniques herein may be performed by executing code on the appliance 2904 to determine information such as performance classifications or characteristics of underlying PDs providing storage for LUNs R1, R2 and R3. The foregoing information may be used as described elsewhere herein in connection with optimizations whereby an optimizer of the appliance may perform data movement of LUN data of LUNs A-C. For example, the appliance may at a first point in time map LUN A, or a portion thereof, to LUN R1 of DS1 determined to have its data stored on PDs of the EFD storage tier. The PD technology of EFD may be provided regarding LUN R1 of DS1 2906. Alternatively, the PD technology regarding LUN R1 of DS1 2906 may not be provided and the appliance 2904 may determine an average RT for observed I/OS directed to LUN R1 which approximates that of EFDs. Such mapping to LUN R1 may be performed when the host is frequently accessing LUN A's data (e.g., when LUN A, or portion thereof, has a high workload and the optimizer determines to place such a highly active portion of data on the highest EFD storage tier). At a later point in time, assume the workload to LUN A, or the portion thereof, mapped to the LUN R1 of DS1 greatly decreases. The appliance may now determine that LUN A, or the portion thereof, has its data relocated or moved from the EFD storage tier of LUN R1 to LUN R2 of DS2 (whereby LUN R2 is determined to be of a lower performing tier than PDs of LUN R1 (e.g., LUN R2 may be classified as having underlying PDs which are SAS 15K RPM rotational disk drives rather than EFD drives or otherwise approximating average RTs of such lower performing storage media).

What will now be described are techniques that may be used in connection with a storage environment. The storage tiering environment may be a multi-tiered storage environment. Physical devices (PDs) comprising the storage tiers may be included in logical groupings referred to as pools or storage pools (SPs). The storage tiers, and also the SPs, may be classified based on criteria including performance characteristics such as expected average response time (RT) for completing an I/O operation. In this manner, the PDs comprising each of the storage tiers (and thus the SPs comprising those tier) may be categorized without requiring knowledge of the underlying storage technology, such as SSD, a particular type of SSD such as MLC, SLC and the like) or a particular type of rotating disk drive (e.g., such as SATA 7.2K RPM, FC or SAS 10K RPM, etc. by a particular vendor). It should be noted that in some embodiments, the storage tiers and associated SPs may include such PD characteristics related to the underlying hardware technology in combination with other performance characteristics including expected average RT. In this manner, storage tiers and SPs may be classified using criteria including the expected average RT, alone or possibly in combination with, other criteria. For example, it may be the case that knowledge regarding the underlying hardware and storage technology of the PDs is unknown, unavailable, or otherwise incomplete so that classification of storage tiers based on such information is not possible. For example, the PDs may be stored on an external data storage system and a second data storage system may be managing such PDs such as in performing data movement optimizations. The second data storage system may not have knowledge regarding the underlying hardware and storage technology of the PDs it is managing. The second data storage system may, however, be able to obtain information regarding performance of such external PDs in terms of expected average RT. For example, the second data storage system may obtain such estimates based on observed measurements obtained in connection with actually sending I/Os to the external data storage system, estimates obtained through modeling, user input, and the like. Additionally, it may be the case that knowledge regarding the underlying hardware and storage technology of the PDs is known. However, even in such cases, actual expected performance may still vary, for example, depending on the particular vendor and possibly other factors. In such cases, classifying storage tiers based on expected average RT may prove more effective, efficient and for better optimization of resource usage.

Additionally, techniques herein provide for modeling, suggesting and/or performing data movements in accordance with criteria including performance goals or targets customized for particular applications and SPs. Performance criteria for an SP may vary. For example, SP performance goals may be based on whether a customer wants a system, or particular SP comprising PDs of one or more storage tiers, optimized to be faster (e.g., deliver lower response time) or cheaper (e.g., deliver more I/Os at a higher average response time). Performance criteria for an SP may also include an RT range defining a window of time or band within which the expected RT lies. The average RT may be with respect to all 100% of I/Os, or some percentage less than 100% of all I/Os, and the RT range may define an acceptable RT range. In this manner, the average RT may be used as an idealized performance target or goal and the RT range may provide some variation and flexibility, such as, in order to also maintain performance goals of other SPs and applications. Performance goals for an SP may also be expressed in other terms using the expected average RT. SP performance goals may specify that a certain percentage of all I/Os should complete within a certain amount of time. For example, SP performance goals may specify that 60% of all I/Os directed to this SP should have an average RT less than 4 milliseconds (ms) where the foregoing average RT may be specified as the RT objective included in the performance goals for the SP. In a similar manner, a percentage range may be specified. For example, SP performance goals may specify that 60% of all I/Os directed to this SP should have an average RT less than 4 ms with a target percentage range of 50-70%. It should be noted that the SP's average RT (or RT objective) may reflect the average expected RT of the SP based on expected performance capabilities. In this manner, the average RT (also referred to in following paragraphs as an RT objective) included in the performance criteria of an SP may denote performance criteria used to classify the SP and its underlying PDs into different storage tiers. For example, a storage tier may be defined to include those SPs, and underlying PDs, having an expected average RT (as included in the SP performance criteria), of N ms, a range of N-M ms, and the like. Multiple tiers may be so defined based on different expected average RTs, RT ranges, and the like.

Application of an optimization goal, such as "faster" or "cheaper", may be realized by changing the target % range that the system will target. For example, if SP performance goals include an RT objective (or target response time) of 4 ms with a target percentage range of 50-70% as noted above, a goal to be faster would demand a higher fraction of IO under the target response time of 4 ms, such as 90-95% for example. A goal to be cheaper may relax that criteria such as by decreasing the current target percentage range of 50-70% to, for example 30-40% so as to allow the PD to deliver more IO but at a higher overall average target response time. This is based on the understanding of the performance criteria of a PD where the relationship between IOPS and response time is that response time increases exponentially as a function of IOPS. In this manner, an embodiment may provide a user interface where current settings for an SP may be displayed such as SP performance goals including an RT objective (or target response time) of 4 ms with a target percentage range of 50-70%. A user may be allowed to specify whether to have the SP's performance goals modified in accordance with a selection of faster or cheaper. If the user selects faster, the SP performance goal target percentage range may be modified from 50-70% to 90-95%. If the user selects cheaper, the SP performance goal target percentage range may be modified from 50-70% to 30-40%.

Performance criteria for each application, or logical grouping of applications based on the underlying logical devices commonly used, may vary. As described herein, an SG may refer to logical devices used by a single application or such a single logical grouping. Performance criteria for each SG may be vary with each application and may be based on the particular customized performance expectations or requirements of each application. In this manner, performance criteria for each SG may affect selection of which SPs, and underlying PDs, are used to store data of the application (e.g., which SPs store data of logical devices used by the particular application). Application or SG performance criteria may include an expected average RT (also referred to herein as an RT objective). The SG performance criteria may include performance targets or goals similar in respects to those as described for the SPs. For example, an average RT may be specified as the RT objective indicating an average expected RT for I/Os directed to the particular SG. Additionally, the SG or application performance criteria may include an RT range or may include a percentage range such as that noted above. For example, performance criteria for an application (and thus its SG) may be obtained from a service level agreement or objective whereby a service provider who owns or manages the data storage system is providing services to a third party using the application and the service provider has agreed to deliver a particular level of performance to the third party for a price included in a service agreement.

In accordance with techniques herein in deciding what storage resources, such as SPs or PDs, are to be used by an application, the resources may be generally viewed as a supply and the applications, or more generally consumers of the resources, may be viewed as a demand for the supply. The supply side may be controlled to deliver a scalable number of IOPS (I/Os per second or I/O rate) and have a certain storage capacity (e.g., such as in terms of bytes, GBs, and the like), optimized for a particular RT. The customer may control the performance goals of the SPs such as by varying the RT range or percentage range and/or expected average RT. It should be noted, however, that the customer should select an expected average RT and other performance criteria for a storage tier that is realistic and within the capabilities of the actual underlying PDs. If a customer makes an unrealistic selection such as for the average RT, the system may not be able to satisfy SP performance goals. A system may detect such conditions, such as when all SPs are always looking to move data to a higher performing tier to obtain SP-specific performance goals or targets. An embodiment may also provide for having the system automatically configure and specify values for the SP performance criteria. In some embodiments, an SP may include PDs of all the same underlying physical storage technology or may alternatively include PDs of more than a single technology. It should also be noted that an embodiment may or may not form SPs. For example, consider an embodiment forming SPs where each SP may include PDs of a single tier. Such an embodiment may form multiple SPs each including PDs of the same single tier. Alternatively, in a simple implementation, an embodiment may include a single SP of all PDs of a single tier. In this case, description herein with respect to an SP may be applied to each tier or at the tier level.

The demand may be managed per SG providing a relative priority based scheme since a first SG having a performance goal with a lower RT than a second SG will have a higher priority than the first SG and associated application(s) storing data and directing I/Os to devices of the first SG. In this manner, SG performance goals specify a relative priority for the different SGs and applications in terms of obtaining the higher/highest-performing SPs and PDs being managed on the supply side using techniques herein. A system using techniques herein may stabilize based on the overall load while also keeping the tiers (e.g., SPs and PDs) in their ideal RT range and providing the SGs with the best possible relative performance that the hardware is capable of. In one embodiment, the logical devices to which I/Os of an application are directed may be thin or virtually provisioned logical devices as described elsewhere herein. However, it will be appreciated by those skilled in the art that techniques herein may be used with other logical device types to which application I/O is directed.

In one embodiment, the PDs, and associated SPs, may be classified into a number of distinct tiers, such as 16 distinct tiers, based on the expected average RT specified as the RT objective. SPs may transition from states of being stable, accepting load or reducing load. As described elsewhere herein, the swap state may be characterized as a special state where there is an SP capacity violation. Such states of the SPs and storage tiers may be based on the expectations of the customer. The performance goals or targets for each SP may also be referred to as a Quality of Service (QOS) Target including the mean or average RT expected from the underlying PDs comprising the SP with respect to I/Os directed to such SP. For example, the average RT or RT objective included in performance goals or targets for an SP may be in the range of 1 ms to 20 ms. Additionally SP performance goals may include a percentage of I/Os expected to have an observed RT less than the RT objective, and a QOS Target Range specified in terms of a percentage as noted above whereby the percentage may represent the stable range of the underlying PDs in terms of the distribution of response times. For example, a QOS Target for one SP may be 90% at 2 ms, 85% at 8 ms, and the like. The percentage range (QOS Target Range) may represent a range of percentages within which the actual observed percentage of I/Os having an observed RT less than the RT objective may vary. For example, performance goals for an SP may be 75% of I/Os having an observed RT less than an RT objective=4 ms and the percentage range maybe 70-80%. Alternatively, an embodiment may specify performance goals with an expected average RT and an RT range (e.g., RT objective=4 ms with an RT range of 3.5 ms to 4.5 ms).

In one embodiment, the expected average RT for an SP may be configured and automatically determined by the system, such as through testing and obtaining an average observed RT for I/Os directed to the SP. The customer, however, may be provided with an option to affect the percentage of the SP performance goals. For example, a customer may be allowed to select a particular percentage (and optionally a percentage range) denoting a percentage of I/Os which are expected to have an observed RT that is less than the average RT of the SP's performance goals. The customer may be provided with different options, such as faster or cheaper, which are associated with or mapped to particular percentages and/or percentage ranges. For example, an embodiment may provide a customer with a first option for an SP of faster which is mapped to 95%, and a second option of cheaper which is mapped to 60% (each percentage representing the percentage of I/Os directed to the SP excepted to have an RT less than the average RT included in the SP's performance goals).

As described in more detail below, an embodiment in accordance with techniques herein may maintain a histogram of RTs for each SP. The histogram may be converted into a cumulative distribution function (CDF). The slope of the CDF may indicate how much variation there is in the population and correspond to a wider QOS Target Range %. During each sample period, such as at each 10 minute or other time interval, information may be collected for each SP for an RT histogram instance, along with other data, such as total number of reads, total number of writes, total amount of data written and/or read, based on accumulated data for the time period. The accumulated information for each SP over multiple sampling periods may be included in a QOS matrix described in more detail herein. The QOS matrix may be used, for example, to model expected average RT performance for a proposed data movement, to map or convert between RT ranges and corresponding workloads (e.g., IOPS (I/Os per second) or number of I/Os), and the like. In a similar manner as described for SPs, data may be collected and maintained for each SG and used in connection with modeling data movements and assessing impact of such proposed data movements to determine whether SG performance goals are met, or below specified SG performance levels, or above specified SG performance goals.

A state machine may be implemented assigning a state to each SP with a goal to reduce load, increase load, or remain stable. Processing may be performed to distribute data portions from the SGs under management to the various SPs based on the current state of each SP. As described herein, an embodiment may maintain three (3) queues of data portions per SP used by each SG (e.g., for each SP from which a storage allocation is made for the SG whereby data portions of the SG are stored on PDs of such an SP). When an SP is in a mode to accept load or reduce load, data portions may be selected from appropriate queues to satisfy the SG performance goals. In a similar manner, states may be assigned to SGs. The SG may be processed in manner similar to that as an SP. For example, processing may be performed to increase an SG's performance (e.g., reduce observed average RT for I/Os directed to the SG) when the observed average RT for the SG is below the RT average and/or RT range specified for the SG performance goals or targets. In this manner the SG may attempt to be as greedy as needed to acquire the highest performing storage in an increase load mode. An embodiment, however may quickly detect an imbalance if all SG are attempting to acquire higher performing storage thereby not meeting their SG-specific performance goals and while all SPs are otherwise in the stable range meeting their SP-specific performance goals. In other words, the performance expectation or demands of the SGs and applications may be beyond the reasonable capabilities of the current PD resources. It may be that, for example, the customer has set unrealistic expectations expressed in terms of RT objectives for the applications' performance goals based on the current PD resources of the system. In the event that the customer sets unrealistic expectations given the hardware configuration, the system may report the expected target range (e.g. such as an expected percentage range denoting the percentage of I/Os expected to have an RT less than a specified RT objective) that it can deliver. For example, the customer may choose to set an RT objective of 2 ms and a target range of 90-95% for an application or SG, but such performance goals may not be achievable without any high performance PD capable of delivering that response time. In this case the system may detect that such performance goals may not be achieved for the particular application given the current PDs on the data storage system and may alternatively provide the customer with an adjusted decreased percentage rage range that the customer may expect regarding SG performance. An example of this would be the system responding with an alternative suggested target percentage range of 30-50%, by using its knowledge of the hardware capabilities and the anticipated workload.

In one aspect, techniques herein match SG load with SP potential to provide the lowest possible I/O response times. Processing may examine the state of all SPs and, for example, from the lowest performing SP (where performance is determined based on the expected RT in the SP performance goals), attempting to move the SP into the stable state (e.g., meeting SP-specific performance goals). Each SP may be assigned a state and a budget of movements. When processing is completed to perform data movements in accordance with the budget, re-evaluation may be performed by observing the actual resulting data storage system performance, achieved as a result of the data movements along with any other changing data storage system workload. In this manner, a feedback loop may be introduced in an ongoing manner in the assessment and reassessment of data storage system, SG and SP performance. Thus, using techniques herein, an embodiment may allow a customer to detect if the data storage system is stable meeting performance goals of SPs and SGs. An embodiment may monitor the foregoing and may trigger alerts or increase the QOS Target range (e.g., percentages of the SP performance criteria) to adapt. An embodiment may set boundaries for how much the system will adapt dynamically and automatically (e.g., how much of an adjustment to the SP performance goals expressed in terms of percentages, percentage range, RTs, and RT range) before triggering user intervention. In this manner, an embodiment may utilize techniques herein which may be characterized as adaptive to provide the highest number of IOPS with lowest possible response times while also operating within customer-specified SG or application performance goals and SP-specific performance goals. In one embodiment, the performance goals or targets of an SP may include a percentage range or RT range as described herein. Such a range may denote an acceptable variation or deviation with respect to the average RT of the SP performance goals.

Figure 12:
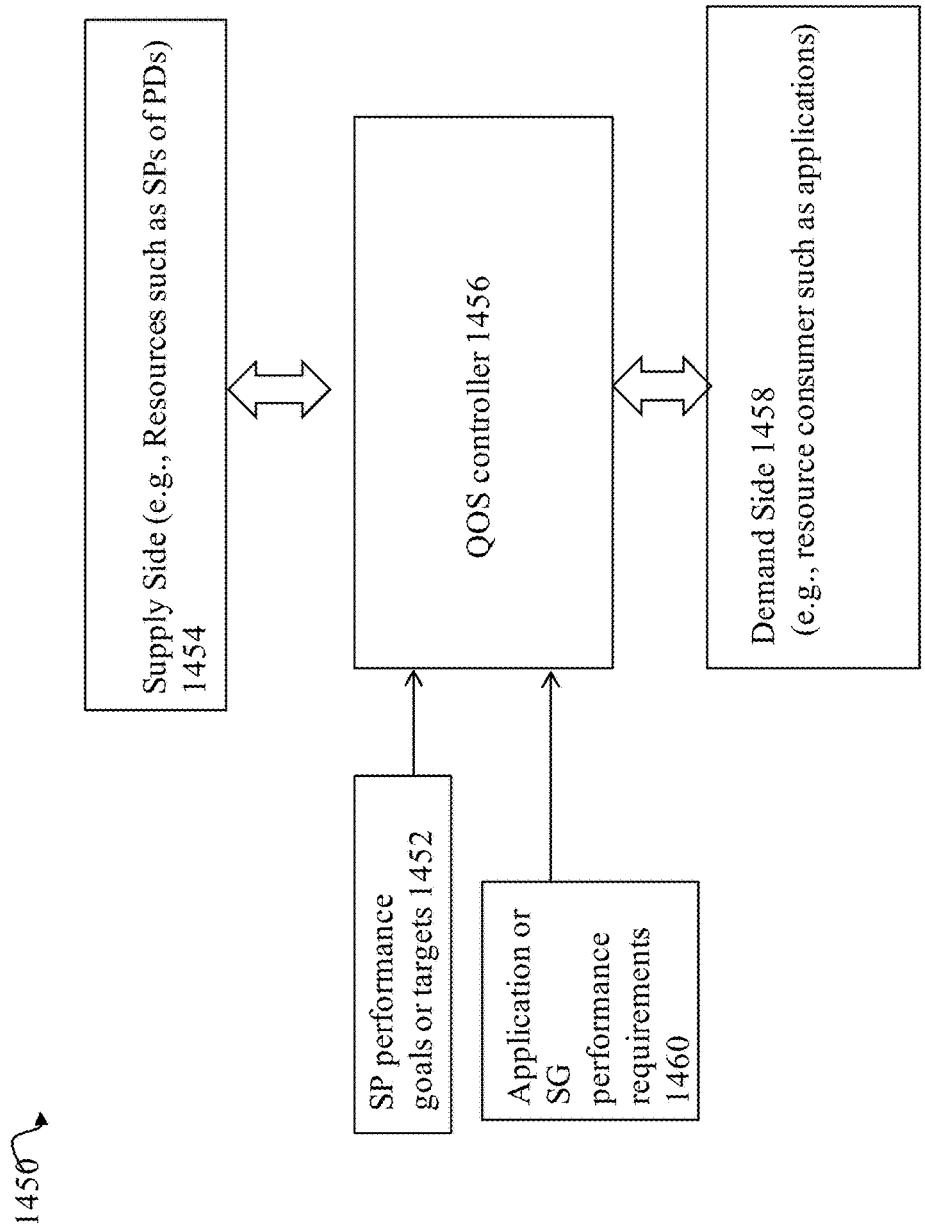
FIG. 12 is an example illustrating a QOS (quality of service) controller and other components that may be used in connection with techniques herein.

Referring to FIG. 12, shown is an example illustrating a QOS controller and other components and data that may be included and used in an embodiment in accordance with techniques herein. The example 1450 includes SP performance goals or targets 1452 which are specified for the storage resources of the supply side 1454. As noted above, the supply side 1454 may include the SPs or PDs in a data storage system under management using techniques herein. The SP performance goals or targets may be provided as an input to the QOS controller 1456. The demand side 1458 may include consumers of resources of the supply side 1454. As noted above, the demand side 1458 may include applications storing their data on PDs of a data storage system where such PDs are included in the supply side 1454. Application or SG performance requirements 1460 may be specified for the applications included in the demand side 1458. The QOS controller 1456 performs processing as described herein to attempt to best meet the demands of the demand side 1458 of the resources included in the supply side 1454 in accordance with the application or SG performance requirements 1460 and the SP performance goals or targets 1452.

It should be noted that the techniques herein are described with respect to a particular type of supply and demand such as, respectively, PDs and applications. However, techniques herein may be more generally applicable for use with other resources and other consumers of those resources that may be included in a data storage system or other system under management using techniques herein.

As noted above, an RT objective may be included in the performance goals or targets defined for each SP or pool and also each SG. The RT objective may represent the mean or average RT expected. Thus, the RT objective for an SP represents the average expected RT for I/Os directed to the SP, and the RT objective for an SG represents the average expected RT for I/Os directed to the SG. Further, the RT objective for the SP may be used to classify the SP and its underlying PDs in accordance with a tiering classification as described herein representing the expected average RT based on the underlying performance capabilities of the physical storage media. The RT objective for the SG or application may imply a relative priority with respect to other RT objectives for other SGs or applications.

Figure 13:
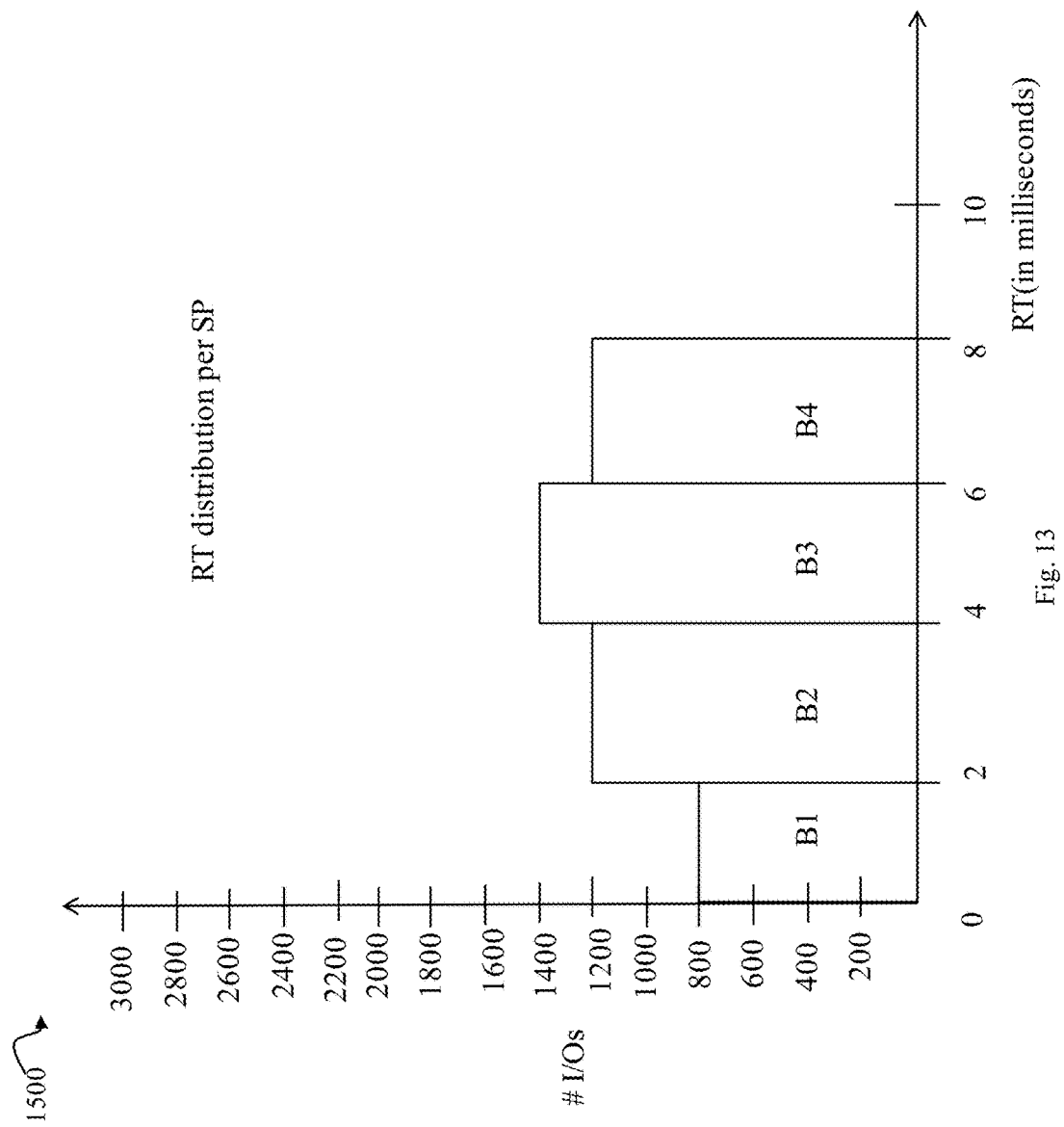
FIG. 13 is an example of a response time distribution or histogram that may be used in connection with techniques herein.

Referring to FIG. 13, shown is an example of an RT distribution that may be obtained for each SP or pool based on observed RTs for I/Os directed to the SP. The graph of the example 1500 indicates a number of I/Os observed during an observation time period on the Y axis and the RT expressed in ms on the X axis. The graph of 1500 is a histogram indicating a frequency or number of I/Os observed during an observation time period having an RT that falls within each of the indicated RT bins B1-B4. Each RT bin on the X axis denotes an RT range. For example bin B1 denotes an RT less than or equal to 2 ms, B2 denotes an RT>2 ms and less than or equal to 4 ms, B3 denotes an RT>4 ms and less than or equal to 6 ms, and B4 denotes an RT>6 ms and less than or equal to 8 ms. If an I/O has an observed RT of 1.5 ms, the I/O falls within B1 and that I/O is counted in the total I/Os of 800 denoted by the frequency on the Y axis for RT bin B1. The example 1500 illustrates information that may be collected for each SP and also each SG during each time sampling interval and also accumulated in an ongoing manner and stored as an entry in the QOS matrices as described elsewhere herein.

For each SP using the SP's RT distribution as illustrated in FIG. 13, the number or percentage of total I/Os having an observed RT less than the RT objective for the SP may be determined. This percentage may be determined by adding the total number of I/Os in each RT bin where the RT bins added have an RT that is less than the RT objective for the SP. For example, if an SP has an RT distribution as in FIG. 13 and the SP has an RT objective of less than 4 ms, then the total number of I/Os having an observed RT that is less than 4 ms is 2000 I/Os, the sum of I/Os in bins B1 (e.g., 800 I/Os) and B2 (e.g., 1200 I/Os). In this manner, the RT distribution may be used to determine the number of I/Os which have an observed RT within the RT objective for the SP. If the total number of I/Os observed during the observation period is 4600 as denoted by the RT distribution of FIG. 13, then the percentage of I/Os meeting the RT objective for the SP may be 2000/4600 which is approximately 43%. It should be noted that the total number of I/Os representing the 100% level is the total number of I/Os in all the RT bins B1-B4 (e.g. B1 includes 800 I/Os. B2 and B4 each includes 1200 I/Os and B3 includes 1400 I/Os).

Figure 14:
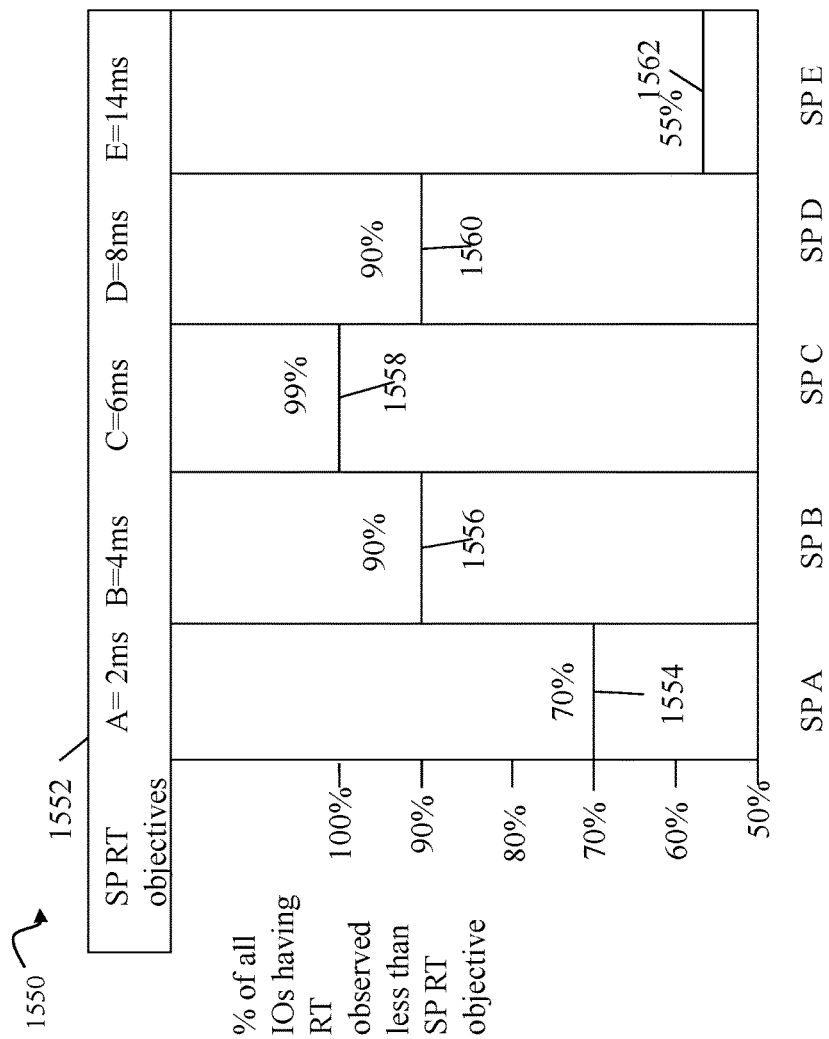
FIG. 14 is an example illustrating the number of observed I/Os having an observed RT meeting the RT objective for the different SPs in an embodiment in accordance with techniques herein.

Consider an example in which there are 5 SPs A, B, C, D and E. An RT distribution similar to that as described above in FIG. 13 may be determined for each of the 5 SPs for an observation time period. Each of the 5 SPs may have different RT objectives for which the percentage of observed I/Os having an observed RT within or meeting the RT objective may be determined. This is illustrated in FIG. 14. It should be noted that the RT objective may be defined in terms of a range with respect to a particular RT.

Referring to FIG. 14, shown is an example illustrating the number of observed I/Os having an observed RT meeting the RT objective for the different SPs in an embodiment in accordance with techniques herein. The example 1550 may also be referred to herein as the SP or pool CDF (cumulative distribution function) denoting the percentage of observed I/Os in each pool meeting SP-specific RT objectives. The example 1550 denotes the different SP RT objectives in 1552 where SPs A, B, C, D and E, respectively, have RT objectives of 2 ms, 4 ms, 6 ms, 8 ms, and 14 ms. Also illustrated, the SPs A, B, C, D, and E, respectively, have percentages of 70 (1554), 90 (1556), 99 (1558), 90 (1560) and 55 (1562) where each of the percentages denote a percentage of all I/Os directed to that SP that have an observed RT less than the SP-specific RT objective denoted in 1552 (e.g., at or below the expected average RT denoted by the SP's RT objective).

Based on the RT distribution determined for each SP in a manner similar to that as described in connection with FIG. 13, the CDF (cumulative distribution function) for each SP may be determined. For a large number of I/Os and as the RT bin size is further decreased, the histogram represented by FIG. 13 may approximate that of a continuous smoothed curve corresponding to the PDF or probability density function. As known in the art, a CDF generally describes the probability that a variable X with a given probability distribution will be found at a value that is less than or equal to "x". In this case, the RT may be the variable X. The CDF for an SP may represent the cumulative response time distribution for the SP.

More formally, the probability density function (PDF) for a continuous random variable X having a value between any two numbers a and b may be expressed as:

$$P(a \le X \le b) = \int_a^b f(x)dx \qquad \text{EQUATION A1}$$

where the probability that X takes on a value in the interval [a; b] is the area above this interval and under the graph of the density function. The graph of f(x) is often referred to as the density curve. The PDF is a function that describes the relative likelihood for this random variable to take on a given value. The probability for the random variable to fall within a particular region is given by the integral of this variable's density over the region. The probability density function is nonnegative everywhere, and its integral over the entire space is equal to one. The CDF of a variable X, such as the RT, may be defined in terms of its PDF as:

$$F(x) = \int_{-\infty}^{x} f(t)dt \qquad \text{EQUATION A2}$$

EQUATION A2 denotes that the CDF representing the cumulative RT distribution for an SP may be determined as the sum of the area under the curve of the PDF for the SP.

Figure 15:
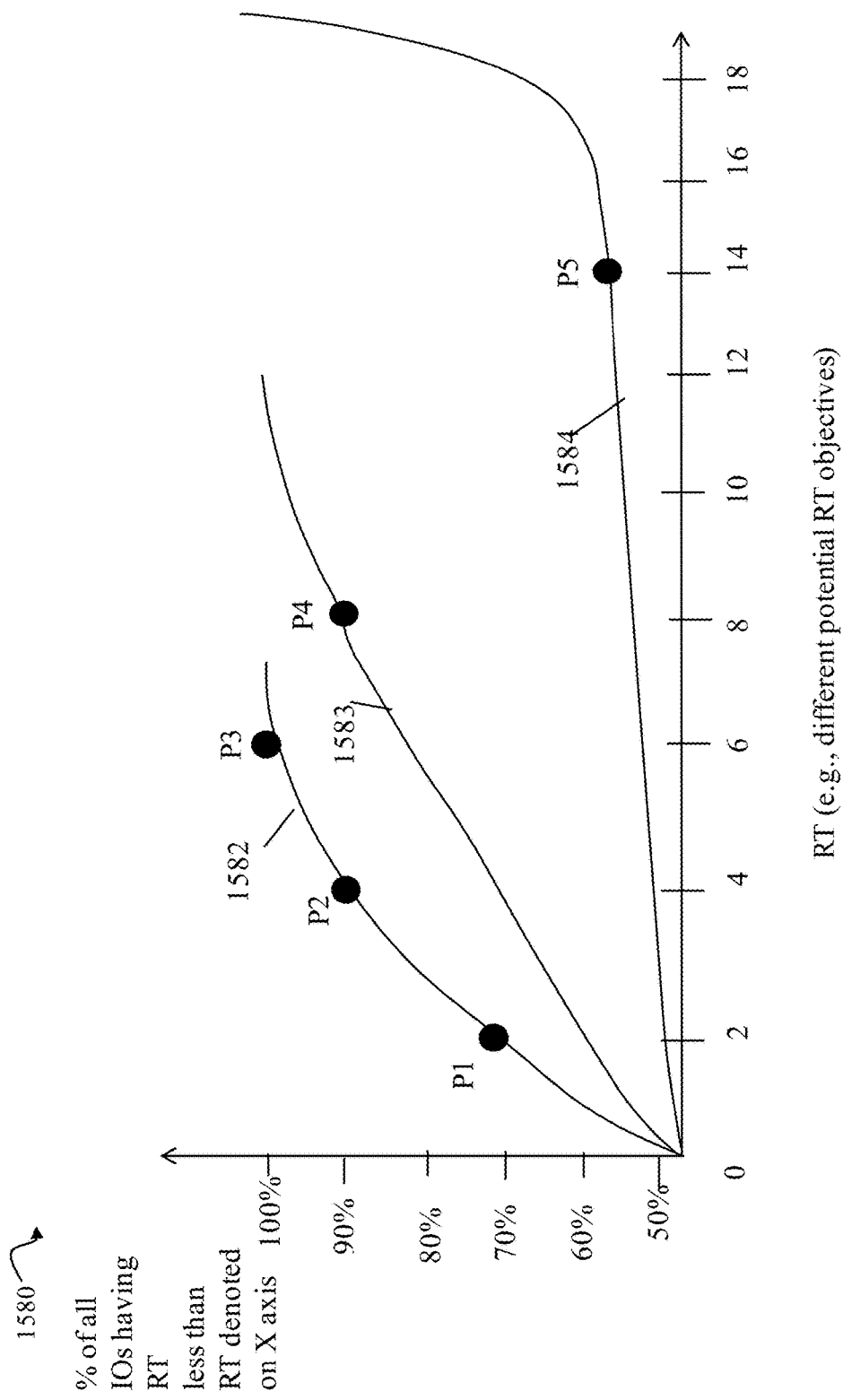
FIG. 15 is an example of cumulative distribution functions that may be used in an embodiment in accordance with techniques herein.

Referring to FIG. 15, shown is a graph 1580 illustrating exemplary CDFs for each of the different SPs denoting the percentage of I/Os having an observed RT less than that as denoted on the X axis. Curve 1582 may represent the RT CDF for SPs A, B and C. Curve 1583 may represent the RT CDF for SP D. Curve 1584 may represent the RT CDF for SP E. In this manner, the CDFs for each of the SPs may be used to determine the particular percentage of I/Os having an observed RT less than an RT objective. In particular, the RT objective may correspond to one of the RT values on the X axis and the corresponding Y coordinate percentage may be determined from the SP's CDF curve. This particular point on the CDF curve of each SP may be represented as in FIG. 14. Referring to FIG. 15, points P1, P2, P3, P4 and P5 represent points used in determining the I/O percentage, respectively, for SPs A, B, C, D and E, for each of the SP-specific RT objectives as illustrated in FIG. 14. For example, point P1 represents that for SP A 70% of observed I/Os have an RT less than the RT objective=2 ms; point P2 represents that for SP B 90% of observed I/Os have an RT less than the RT objective=4 ms; point P3 represents that for SP C 99% of observed I/Os have an RT less than the RT objective of 6 ms; point P4 represents that for SP D 90% of observed I/Os have an RT less than the RT objective of 8 ms; and point P5 represents that for SP E 55% of observed I/Os have an RT less than the RT objective of 14 ms.

In an embodiment in accordance with techniques herein, the RT distribution of FIG. 13 may be determined for each SP. From the RT distribution of FIG. 13 determined for each SP, a CDF or cumulative RT distribution for the SP may be determined as illustrated in FIG. 15 denoting, on the Y axis, a percentage of I/Os have an observed RT less than each particular RT denoted on the X axis. From the curve representing the cumulative RT distribution for each SP, one point on the curve may be selected having an X coordinate equal to that of the RT objective of the SP. The Y coordinate of the selected point may be used to determine or assess a state of the SP whereby the state represents how well the SP is meeting QOS performance targets for the SP where the QOS performance target may be expressed in terms of the RT objective and a percentage, or range of percentages, denoting a percentage of all observed I/Os have an observed RT less than the RT objective. If the observed percentage as determined from the Y coordinate of the curve point is within the percentage range specified in the QOS performance target, then the SP may be determined as meeting its QOS performance target. Otherwise, the SP may be determined as generally not meeting its QOS performance target.

As described herein, in one embodiment each SP may be assigned a state of stable, add load or reduce load in accordance with the SP's QOS performance target. If the SP is meeting its QOS performance target, than the SP is assigned the state of stable. If the SP is exceeding or performing better than its QOS performance target, the SP is assigned the state of add load meaning that the SP is able to accept or take on additional workload. If the SPs is below or not meeting its QOS performance target, the SP may be assigned a state of reduce load meaning that workload should be removed or moved from the SP. This is described in more detail below.

Each SP may have a QOS performance target (e.g., also referred to herein as performance goal or target), defined in terms of a RT objective, a target percentage range denoting a target percentage of I/Os having an RT less than the RT objective, and a percentage (falling within the foregoing target percentage range). For example, SP A may have QOS performance targets or goals specifying that 70% of I/Os directed to SP A are expected to have an average RT of less than 2 ms (e.g. RT objective=2 ms). The performance goals for SP A may further include a target percentage range of 60-80% denoting that 60-80% of all I/Os have an RT less than 2 ms. In this manner the QOS targets may identify a performance target expressed in terms of RT objective, a percentage of I/Os having an observed RT at or below the RT objective (e.g., expected average RT), and may also identify a range of such percentages. If an SP is within or currently meeting its QOS performance target, the SP may be assigned a state of stable. Let SP B have QOS performance targets of 4 ms RT for 60-70% of I/Os and let SP C have QOS performance targets of 6 ms for 60-70% of I/Os. Based on the foregoing QOS performance target ranges, SP A may be characterized as stable (within or meeting its performance goals) and for SP B and C, both SP B and SP C may increase load or take on additional workload since both SPs are performing better than expected based on SP-specified QOS performance targets. For example, with reference to FIG. 14, SP B has 90% of its I/Os meeting the RT objective of less than 4 ms (e.g., 90% is higher than the QOS performance I/O percentage range of 60-70%), and SP C has 99% of its I/Os meeting the RT objective of less than 6 ms (e.g., 99% is higher than the QOS performance I/O percentage range of 60-70%). Thus, SP B and C may be assigned a state of accept or add load. If, for example, SP B had a QOS performance target of 4 ms RT for 94-98% of its I/Os, then SP B would be assigned the state of reduce or remove workload since SP B would not be meeting its current QOS performance target (e.g., observed 90% of I/Os having an RT less than the RT objective of 4 ms is less than the RT performance target range of 94%-98%).

For purposes of illustration, assume the following QOS performance targets for each of the SPs A-E:

| SP | QOS performance target |
|---|---|
| A | 2 ms RT @ 60-80% |
| B | 4 ms RT @ 60-70% |
| C | 6 ms RT @ 60-70% |
| D | 8 ms RT @ 60-70% |
| E | 14 ms RT @ 60-70% |

It should be noted that different percentage ranges may be used for each of the SPs depending on the performance goals of each SP. Based on these QOS performance targets and the observed actual performance as in connection with FIG. 14, the SPs may be assigned the following states:

| SP | state |
|---|---|
| A | stable |
| B | + (add load) |
| C | + (add load) |
| D | + (add load) |
| E | − (decrease load) |

As noted above, there may be a need to reduce workload of SP E thereby increasing performance for SP E. Accordingly, some of SP E's workload (e.g., in terms of a number of I/Os, IOPS or I/Os per second) may be moved to one or more of the other SPs which are denoted as add load or being able to accept load and still meet the SP-specific QOS performance target.

It should be noted that performance analysis as just described may be based on the per-SP or per pool level QOS performance targets. Each SP may be characterized based on its QOS performance targets as a resource providing a number of I/Os at a particular RT. Collectively, the SPs of PDs may be viewed as resources of the data storage system providing a supply.

As described herein, a state machine may control and assign a state for each SP. As also described herein, a user may be able to set the performance criteria for the SP including the RT objective, percentage of I/Os expected to have an observed RT below the RT objective, and/or the associated percentage range. As also mentioned herein, SP performance goals may alternatively be specified in terms of RT objective and associated RT range where the RT objective represents the average RT objective of all I/Os directed to the SP (or some percentage thereof) and the RT range represents a range of RTs within which the RT objective falls. Such SP performance goals may be set by the user or automatically configured in an embodiment. For example, the RT objective and percentage of I/Os expected to have an RT less than the RT objective for the SP may be specified. The user may be able to configure an associated range either in terms of the RT range or percentage range. The SP performance goals, as input by the user or otherwise which may be determined automatically by the system, may be determined, for example, through automated testing and observing RTs over an observation period. Additionally, values such as the RT objective or percentage(s) specified for the SP's performance goals may be adjusted automatically over time as additional I/O results are observed over time.

Once the performance goals or targets for the SP are specified, the SP may be evaluated for its total available capacity and SP performance targets. The state of an SP may be set to one of the 3 values noted above. Additionally, the SP state machine itself may be characterized as being a particular model of operation that will now be described. A first mode of initialize denotes that the SP state machine is initializing. Part of this initialization process may include, for example, reading any available configuration information about the SP. The SP state machine may also be in a second mode of adapt. When in this mode, each SP's performance goals or targets are examined to determine if the SP needs to increase or decrease workload based on SP's performance goals. If so, the SP may be assigned a budget of IOPS or number of I/Os to move incrementally to or from the SP. This budget may be based on the SP performance goals and additionally other factors that may limit the amount of change in a direction toward achieving the SP performance goals. The upper limit of the IOPS or I/Os that may be moved to or from the SP may be based on the SP performance goals and the performance prediction from the QOS Matrix for the SP. This is used to determine where the SP may operate in terms of load for given SP performance goals. Once the available workload capacity of the SP (e.g., such as expressed in a number of I/Os or IOPS) is determined, the allocation capacity is considered. Such allocation capacity may be defined in accordance with a policy. If within capacity compliance, a budget of GB of storage is also calculated. If the SP is out of compliance with respect to a size denoting the amount of physical storage that may be allocated for the SP, an indication is set to ignore the IOPS budget and force movement of workload out of the SP with the goal of achieving the capacity limit or maximum size limitation of the SP. The SP state machine may then transition to a move state with a goal specified for the SP in terms of IOPS or number of I/Os and GB. When the SP state machine is in the move state with respect to processing for a particular SP, the state machine is in a state where it may move data portions into or out of the SP. It will remain in the move state for the particular SP while waiting for an SG to consume from the SPs budget of movements. The SP state machine may timeout automatically, for example, after 30 minutes or some other suitable time period in order to ensure that the current budget and associated SP state do not become outdated due to real-time changes in the system. As noted above, the SP may be assigned one of three states—

SP State=Add load: SP has a budget of +N GB and +Y IOPS that may be added to it.

SP State=Reduce load: SP has a budget of −N GB and −Y IOPS to reduce. The IOPS budget may be ignored if the SP is out of capacity compliance for the SG. In this case, the primary criteria for determining which data portions to move with respect to the SP may be with respect to not violating the storage capacity limit. The −N implies that the SP is in violation of its storage capacity limit and needs to reduce its size by the amount of N in order to be within the SP's specified capacity storage limit.

SP state=stable: SP is within its specified performance goals and no movement of data portions is needed. In one embodiment, when in this state, the SP may still be in violation of an SP storage capacity limit even though the SP's performance goals are met. In this case, an embodiment may perform movement of data portions out of the SP to correct for any SP capacity limit violation. Assuming any capacity violations are the primary criteria for determining which data portions to move with respect to the SP, data movement candidates may be considered which first result in reducing the SP capacity or size without further causing the SP to move out of its performance goals. For example, movement of idle data portions of the SP having no workload may be first considered prior to moving data portions having any workload. Any data portions considered for data movement to correct a capacity limit violation may also preferably not violate the performance goals of the SP.

It should be noted that capacity storage limits that may be specified for an SP are described in more detail below.

What will now be described is the demand side or consumers of the resources provided by the supply side. The demand side may include applications having data stored on the data storage system. For example, application 1 (app1) may be an SQL server application storing its data on the data storage system. Application 2 (app 2) may be an email server application storing its data on the data storage system. Each of the applications may have its data stored on logical devices of a different SG. In this manner, an SG may represent the data stored on the data storage system for a single application although an SG may correspond to one or more other consumers or clients of the data storage system. Each application, and hence each SG, may have different QOS performance targets. The QOS target of an application or SG may also include an RT objective. The QOS performance target for an SG may also include a target range of percentages denoting a percentage range of I/Os having an observed RT less than the RT objective.

In a manner similar to that as described above for each SP, processing may be performed for each SG. A state machine may be used to control SG state and performance similar to that as described above for SPs with the difference that the states are SG-specific states denoting whether the SG is stable (e.g., meeting its performance goals), wants to increase performance thereby in a state which wants to acquire higher performing storage or SPs (e.g., wants to move one or more of its data portions currently stored in a first SP having a first RT objective to a second SP having a higher performance as denoted by the second SP having a second RT objective lower than the first RT objective), or wants to acquire lower performing storage or SPs (e.g., wants to move one or more of its data portions currently stored in a first SP having a first RT objective to a second SP having a lower performance as denoted by the second SP having a second RT objective higher than the first RT objective). Additionally, an RT distribution as in FIG. 13 may be determined for each SG. The RT distribution for each SG may be converted into a CDF for the RT (e.g., cumulative RT distribution) as in FIG. 15 for each SG. For each SG, the QOS performance targets may be specified in terms of meeting a particular RT range with respect to an RT objective (e.g. RT objective+/−some time interval or time window), or may be specified in equivalent terms with respect to a percentage and also percentage range (having range limits of an upper % and lower %) where each of the foregoing percentages represents a particular percentage of I/Os having an RT less than the RT objective as described above in connection with SPs. For example, assume that an SG has a CDF as illustrated by one of the curves such as 1582 in FIG. 15 generated from observed I/Os. The SG performance target may be specified in terms of a percentage range having endpoints of first percentage and second percentage (e.g., 60-70% as above) for a given RT objective. As noted above, the curve 1582 as observed for an SG may be used to locate the point on the curve having an X coordinate equal to the RT objective. The Y coordinate of the located point on the curve may be obtained and used as the observed % of I/Os having an RT less than the RT objective as denoted by the X coordinate. If the Y coordinate value is within the percentage range, then the SG's QOS performance target is determined as being met. Otherwise, the QOS performance target is determined as not being met whereby observed performance may be deemed higher or lower than the QOS performance target (depending on whether the actual observed percentage is higher or lower than the target percentage range of the QOS performance target as described elsewhere herein).

Rather than specify performance goals or targets for an SG or an SP using an RT objective, percentage, and percentage range, the QOS performance target may be specified using an RT objective (which represents the expected average RT as described elsewhere herein), and an RT target range (e.g., with respect to the RT objective such as RT objective+/−time window). The RT target range may specify a range of RT values where the observed average RT across all I/Os observed is expected to be within the RT target range. In this case, the average observed RT for an SG or SP may be used rather than the observed percentage of I/Os having an RT less than the RT objective. A determination of whether the SP or SG is meeting its QOS performance target may be performed by determining whether the observed average RT is within the RT target range. If the observed RT is higher than the maximum bound of the RT target range, then the current RT performance is worse than that as denoted by the RT target range. If the observed RT is higher than the lower bound of the RT target range, then the current RT performance is better than that as denoted by the RT target range.

In connection with the QOS performance target, a percentage range (denoting percentage bounds regarding percentage of I/Os having an RT less than the RT objective) may be mapped or translated to a corresponding RT range using information of the CDF as in FIG. 15. For a percentage range having an upper bound % and a lower bound %, an average RT at both the upper bound % and lower bound % may be determined. For example, if the percentage range is 70%-90%, a first average RT at 70% may be determined with respect to the 70% of all I/Os have an RT less than the RT objective. Similarly, a second average RT at 90% may be determined with respect to the 90% of all I/Os have an RT less than the RT objective. The first and second average RTs may denote the corresponding RT range.

For purposes of illustration in following paragraphs, the SG and SP performance goals may be specified in terms of an RT range. If the performance goals are expressed in terms of percentages or percentage ranges (e.g. where each percentage denotes a percentage of I/Os expected to have an observed RT less than the RT objective), the percentage(s) may be converted to RT values as described.

Figure 16:
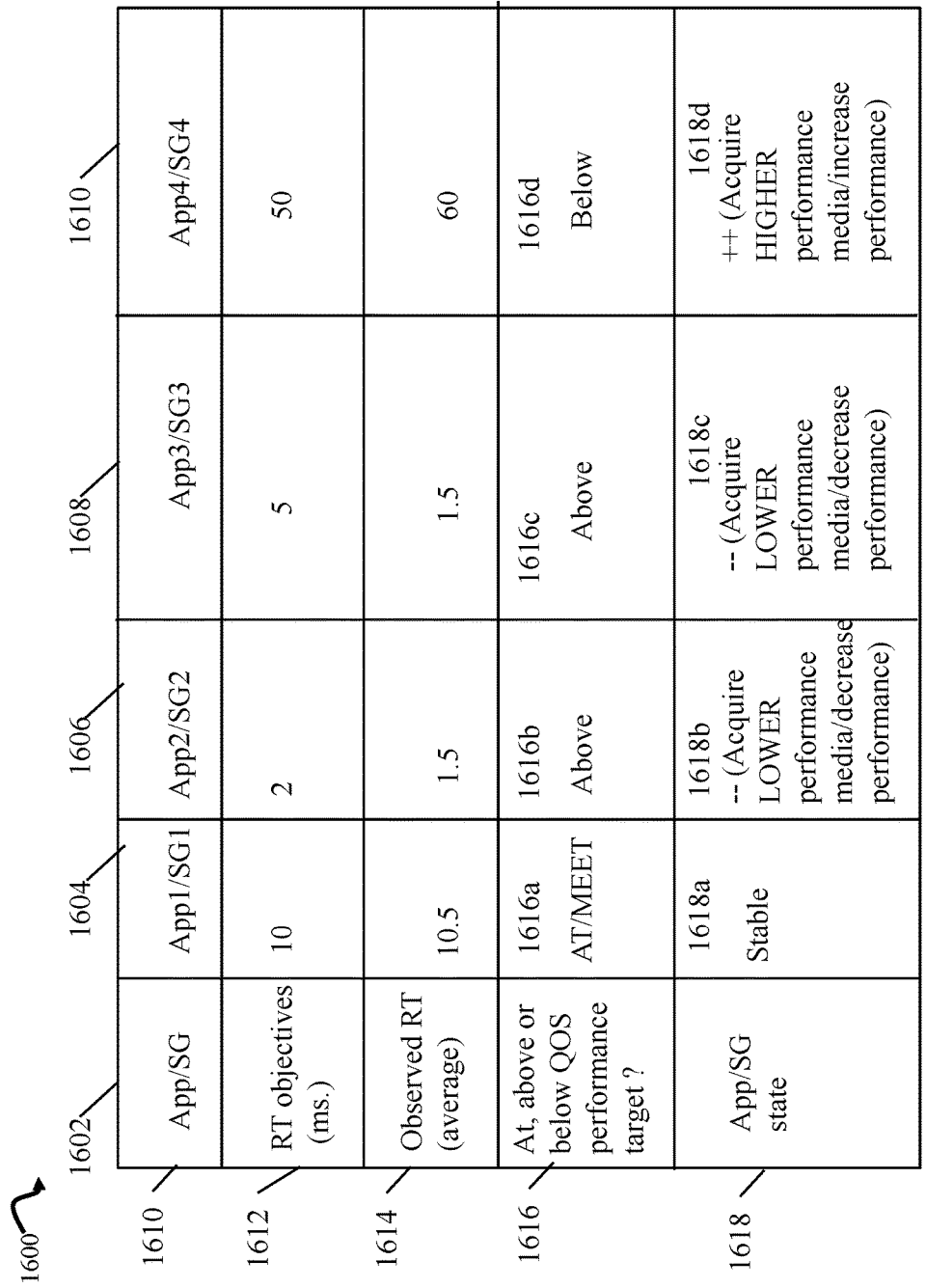
FIG. 16 is an example of information that may be specified for different applications for use in an embodiment in accordance with techniques herein.

Referring to FIG. 16, shown is an example of different SGs and associated RT objectives included in the QOS performance targets in an embodiment in accordance with techniques herein. The example 1600 illustrates information for 4 different applications and SGs (storage groups). The table includes the following rows: 1610 identifying the different applications (storage groups), 1612 identifying the RT objectives for the applications, 1614 identifying the observed average RT for I/Os directed to the applications, 1616 denoting whether the current observed RT is at, above or below the RT objective performance target (as in row 1612), and 1618 identifying an application or SG state determined in accordance with the QOS performance targets and observed RT for the applications. It should be noted that information in rows 1612 and 1614 is in ms. Each application/SG in row 1610 has a corresponding column 1602 of its information in the table. Column 1604 indicates that app1/SG1 has an RT objective of 10 ms and an observed average RT of 10.5 ms. As noted above, an embodiment may define a QOS target in terms of an RT range with respect to the RT objective such as by using a time interval or a time window with respect to the RT objective so that if the observed RT is within the RT range of: RT objective+/−time interval, the RT performance target as included in the SG's QOS performance target may be characterized as being met. In this example, assume that the observed RT of 10.5 ms for app1/SG1 is within this RT performance target range thereby meeting the RT performance goals as denoted by 1616a.

A state may be assigned to each SG in accordance with whether the observed RT meets the SG's RT performance target (e.g., stable state), is below the SG's RT performance target (e.g., need to increase performance/decrease observed RT by acquiring higher performance media/moving workload to a higher performance media), or is above the SG's RT performance target (e.g., need to decrease performance/increase observed RT by acquiring lower performance media/moving workload to a lower performance media). In this example, SG1 is assigned the state of stable as denoted by 1618a.

Column 1606 indicates that app2/SG2 has an RT objective of 2 ms and an observed average RT of 1.5 ms. In this example, assume that the observed RT of 1.5 ms for app2 is outside of the SG's QOS performance target range specified with respect to the RT objective (e.g., RT objective+/−window or time interval) thereby indicating that the observed average RT is above the RT performance target as denoted by 1616b. Based on 1616b, SG2 may be assigned a state 1618b to acquire lower performance media and decrease performance/increase RT in order to bring the observed RT into line with the RT performance target (e.g., achieve the QOS performance target).

Column 1608 indicates that app3/SG3 has an RT objective of 5 ms and an observed average RT of 1.5 ms. In this example, assume that the observed RT of 1.5 ms for app3 is outside of the SG's QOS performance target range specified with respect to the RT objective (e.g., RT objective+/−window or time interval) thereby indicating that the observed average RT is above the RT performance target as denoted by 1616c. Based on 1616c, SG3 may be assigned a state 1618c to acquire lower performance media and decrease performance/increase observed RT in order to bring the observed RT into line with the RT performance target (e.g., achieve the QOS performance target).

Column 1610 indicates that app4/SG4 has an RT objective of 50 ms and an observed average RT of 60 ms. In this example, assume that the observed RT of 60 ms for app4 is outside of the SG's QOS performance target range specified with respect to the RT objective (e.g., RT objective+/−window or time interval) thereby indicating that the observed average RT is below the RT performance target as denoted by 1616d. Based on 1616d, SG4 may be assigned a state 1618d to acquire higher performance media and increase performance/decrease observed RT in order to bring the observed RT into line with the RT performance target (e.g., achieve the QOS performance target).

In connection with the SP or supply of resources as described herein, an SP may have a capacity limit or target identifying an upper bound or maximum size for the SP. However, an SG may not have such a capacity limit. Thus an SP may have performance goals or targets and also a storage capacity limitation representing the total capacity or size of the SP (e.g. in terms of consumed, allocated or used physical storage). The customer may specify a capacity limit for an SP, such as 500 GB, denoting a maximum or upper limit to the size of the SP. It should be noted that an embodiment may not enforce the capacity limit for the SP as a hard limit and may define a capacity range with respect to the capacity limit whereby the maximum capacity of the SP may be within the capacity range. For example assuming a 500 GB capacity limit, the capacity range may be determined as 500 GB+/−some threshold amount of storage such as in terms of GBs or other size units of storage. In this manner the capacity range may denote a range within which the size or capacity of the SG falls. It should be noted that the performance target for an SP and an SG as a target range specifies upper and lower bounds whereby adjustments may be made to move workload with the goal of maintaining the resulting performance within the performance target range. However, it is not required that the used capacity of an SP be within the capacity range. Rather, the total used storage capacity of the SP may lie within the capacity range and may also be less than the lower bound of this range. For purposes of simplicity, following examples and discussions refer to the capacity limit as a single value although an embodiment may use a capacity range as just described.

In connection with techniques herein, if the performance goals or targets for the SP are expressed in terms of a percentage range denoting a range of percentages of I/Os having an observed RT less than the RT objective, then the percentage range may be first converted or translated to an equivalent RT range so that processing from here may proceed with a QOS performance target in terms of an RT range as described elsewhere herein.

Figure 17:
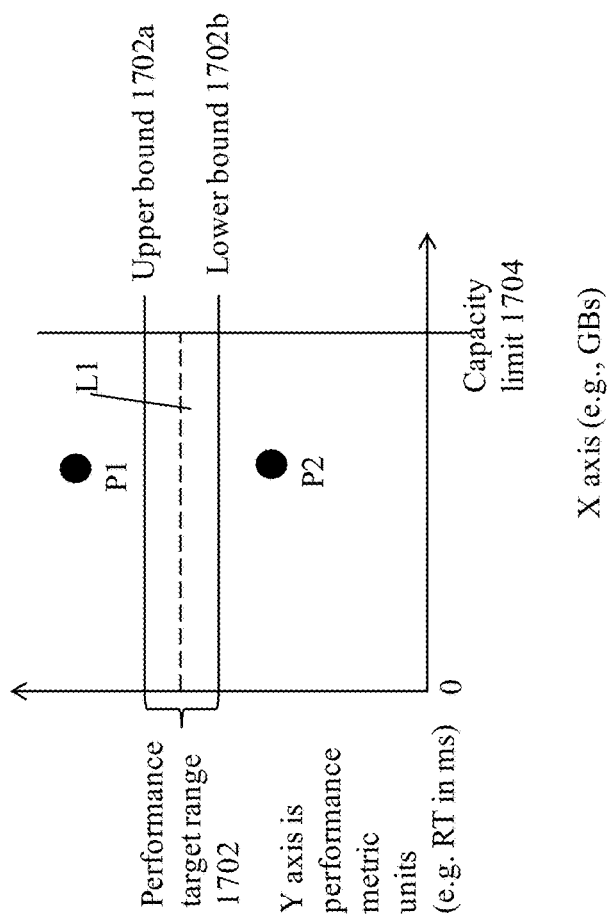
FIG. 17 is an example illustrating a proposed budget as a graphical movement in distance between points.

Referring to FIG. 17, shown is an example illustrating a point on a graph that may represent the current state of a single SP based on the SP's performance goals or targets and capacity limit. The graph has a Y axis with units in terms of the particular performance metric of the performance target. For example, if the performance target for the SP is in terms of RT, the Y axis may be in ms. The performance target range 1702 may represent the QOS performance target range as an RT range having an upper bound 1702a and a lower bound 1702b. The X axis may be in storage units such as GBs. The capacity limit 1704 may represent the maximum allowable size or capacity of the SP. A point on the graph of 1700 may represent the current state of the SP. For example, assume the performance target range denotes an RT range. In this case, the X coordinate represents the currently allocated capacity or size of the SP and the Y coordinate may represent the average observed RT for the SP. For example, point P1 may represent the current state of an SP that is less than the defined capacity range for the SP and having an average RT greater than the performance target range 1702. In this case P1 has an RT that is larger than that denoted by the RT range of 1702 thereby indicating that performance needs to increase/the current RT needs to decrease to be within the target range 1702.

Rather than have P1 represent the current state of the SP, let point P2 represent the current state of the SP that is less than the defined capacity range for the SP and having an average RT less than the performance target range 1702. In this case P2 has an RT that is less than that denoted by the RT range of 1702 thereby indicating that performance needs to decrease/the current RT needs to increase to be within the target range 1702.

Using this graphical illustration, adding workload to an SP or removing workload from an SP may be represented by a vector denoting a change in capacity (e.g., GBs) in the X direction (horizontal) and a change in performance (e.g., RT) in the Y direction (vertical) due to the shift or movement in workload (e.g. which may be expressed in terms of IOPS or number of I/Os). In a manner to that as described for SPs, a vector may be used with respect to each SG to represent any required shift in workload and/or capacity for the SG to be in compliance with its performance goals and any capacity restrictions imposed at the SG or application level.

Adding workload W such as associated with moving a data portion or extent of size S to the SP may result in increasing the SP's capacity size by S, increasing the SP workload by W and also decreasing SP performance (e.g. RT) by an amount proportional to the W increase. Similarly, when a data portion having an associated workload W and size S is moved out of an SP, the SP's workload decreases by W, its used capacity decreases by S, and its performance (e.g., RT) increases by an amount proportional to W. In this manner, a budget may be determined with respect to a current point representing the current state of an SP identifying an amount of movement in the X direction and Y direction to result in a point within the area bounded by the performance target range 1702 and the capacity target line 1704. Ideally, the RT midway in the range may be considered when determining the SP budget. Alternatively, an embodiment may consider some other RT of the RT range such as the maximum or upper bound of the RT performance target range 1702 when determining the budget. The budget for the SP may identify an amount of available capacity up to the capacity target and may identify an amount by which the RT may increase or decrease.

Dashed line L1 may represent the ideal RT used for determining the RT portion of the SP budget. For example, if point P1 represents the current state of the SP, the RT portion of the SP budget may be measured as the distance between the Y coordinate of point P1 and the value of the RT (Y coordinate) for line L1. The capacity portion of the SP budget may be measured as the distance between the X coordinate of point P1 and the value of the capacity (X coordinate) for the capacity target line 1704.

A change in RT may be achieved by shifting a corresponding workload in terms of IOs to or from the SP. To determine the amount of workload in terms of I/Os that need to be moved to achieve a resulting change or delta in RT, QOS matrices holding performance information for the SP may be constructed from the observed I/Os directed to the SP. The QOS matrix may represent observed performance data which may represent a performance curve used for modeling SP performance. The QOS matrix for an SP may be based on performance data obtained to date through observing I/Os directed to the SP. A histogram may be constructed as in FIG. 13 for the SP based on observed I/Os at each occurrence of a time period, such as once per hour. The histogram may represent one sampling of data which is incorporated into the QOS matrix at the occurrence of each time period.

The histogram can be used to determine the average RT and total I/Os across all observed I/Os. The integral or sum of all the bins of the histogram represents the total number of I/Os done. The RT average may be derived from the histogram. For example, for illustration assume a simple histogram having only two RT bins representing the total IOs observed during the current sample period. The first RT bin may have an average of 2 ms for 10 IOs and the second bins may have an average RT of 5 ms for 30 IOs. In this case the average RT may be determined as 170 ms/40 IOs=4.25 ms as the RT average.

The QOS matrix may thus become further refined as more data is collected for each SP at each time period occurrence. The QOS matrix may denote an average RT given a particular workload in terms of IOs stored on the amount of physical storage (GB) or capacity used for the SP. In this manner, the QOS matrix may represent information defining a performance curve for the SP based on collected performance data obtained from the histograms at each time period occurrence.

Figure 18:
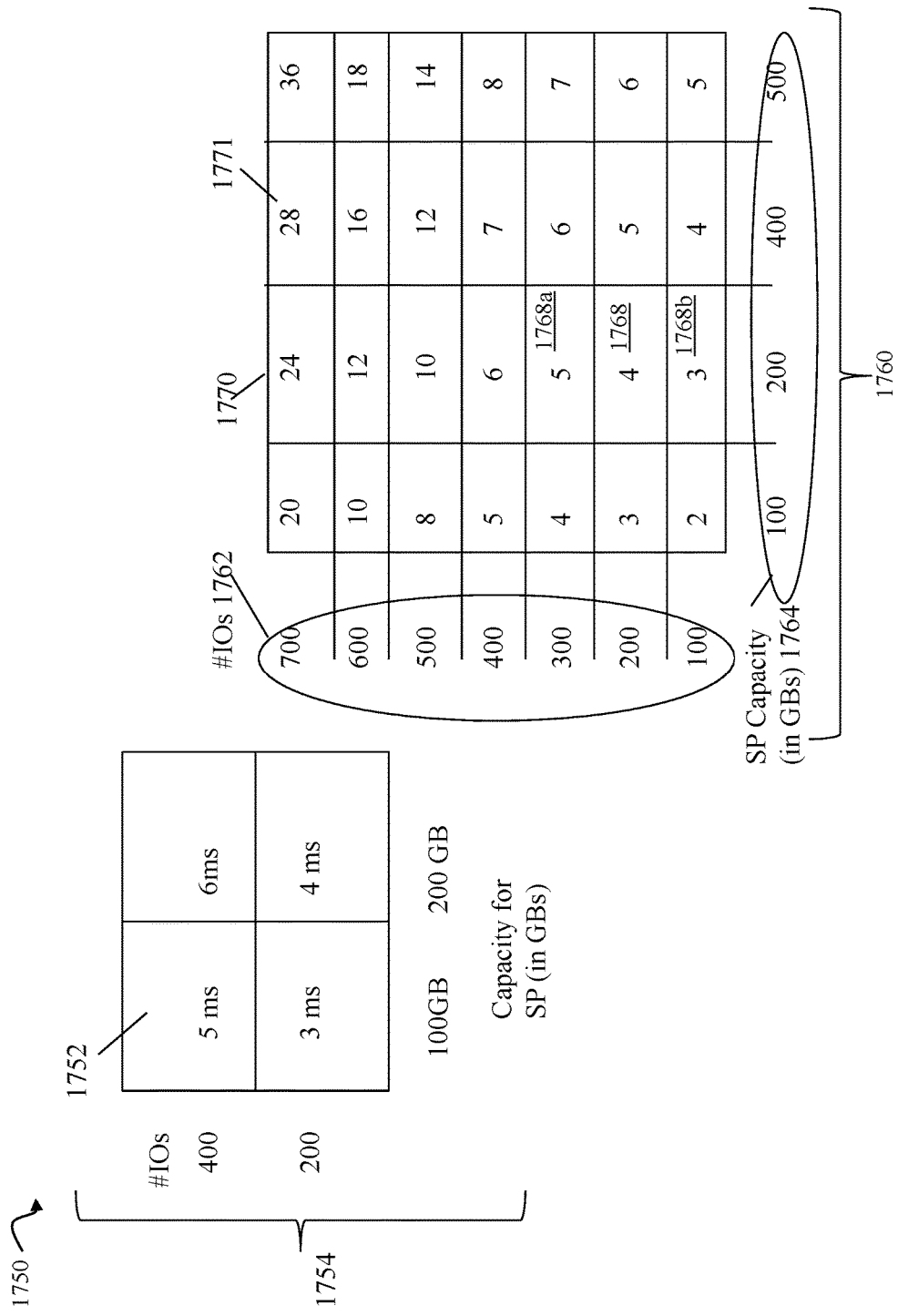
FIG. 18 illustrates information that may be stored in a QOS matrix in an embodiment in accordance with techniques herein.

For example, with reference to 1750 of FIG. 18, element 1754 may represent the information stored in an SP's QOS matrix after 4 sampling time period occurrences. Each cell of the matrix may represent the average RT and total I/Os obtained for one sampling period (e.g., one histogram) and when a number of GBs is used for the SP. For example, 1752 may represent that an average RT of 5 ms is observed for a total number of 400 IOs directed to 100 GBs of stored data.

The QOS matrix or table 1760 of FIG. 18 may represent a further refinement of the QOS matrix for the SP after 28 sampling time period occurrences where 1762 represents the different values for total IOs and 1764 denotes the different SP capacities. As with the information of matrix of 1754, the matrix of 1760 is further refined to include more data points used to form the performance curve for the SP.

An RT range may be mapped to a corresponding number of I/Os or workload range using the QOS matrix. For example with reference to 1760, assume a current SP state of an RT of 4 ms with an SP capacity of 200 GB as represented by 1768. Assume that the RT range is RT objective+/−1 ms denoting an RT range of 3 to 5 ms. The RT range for the 200 GB SP capacity corresponds to the RT range indicated by cells 1768a and 1768b. Using 1760, a corresponding workload range for the foregoing RT range may be determined using cells 1768a-b by looking up the #IOs corresponding to each of the 1768a and 1768b. In this case, 300 IOs corresponds to 1768a and 100 I/Os corresponds to cell 1768b and may be used to translate or map the RT range to a corresponding range expressed in terms of a number of I/Os. In this manner, the budget of an SP may be expressed in terms of IOs and capacity rather than RT and capacity.

Figure 19:
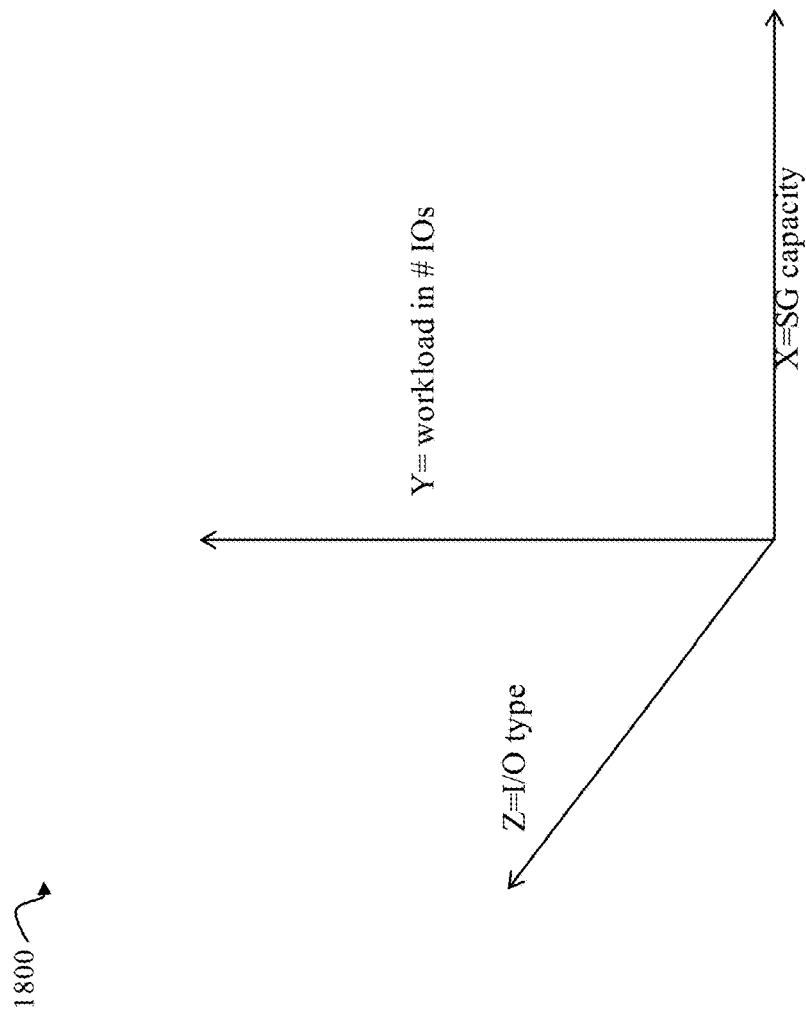
FIG. 19 illustrates a QOS matrix having three dimensions in an embodiment in accordance with techniques herein.

An embodiment in accordance with techniques herein may use a two-dimensional QOS matrix as just described. An embodiment in accordance with techniques herein may also choose to further define a QOS matrix using 3 dimensions as illustrated in FIG. 19. In the example 1800, the 3 dimensional QOS matrix maintained for each SP may have X and Y dimensions as described in FIG. 18. Additionally, the QOS matrix may have a $3^{rd}$ Z dimension denoting an I/O type so that an occurrence such as represented by elements 1754, 1760 of FIG. 18 may be maintained for each of the different I/O types.

In one embodiment, 8 different I/O types may be possible which characterizes the particular I/Os observed of the workload based on the following characteristics: whether the I/Os of the workload are primarily read or write, whether the I/O pattern is random or sequential and whether the I/O sizes are large block or small block.

Figure 20:
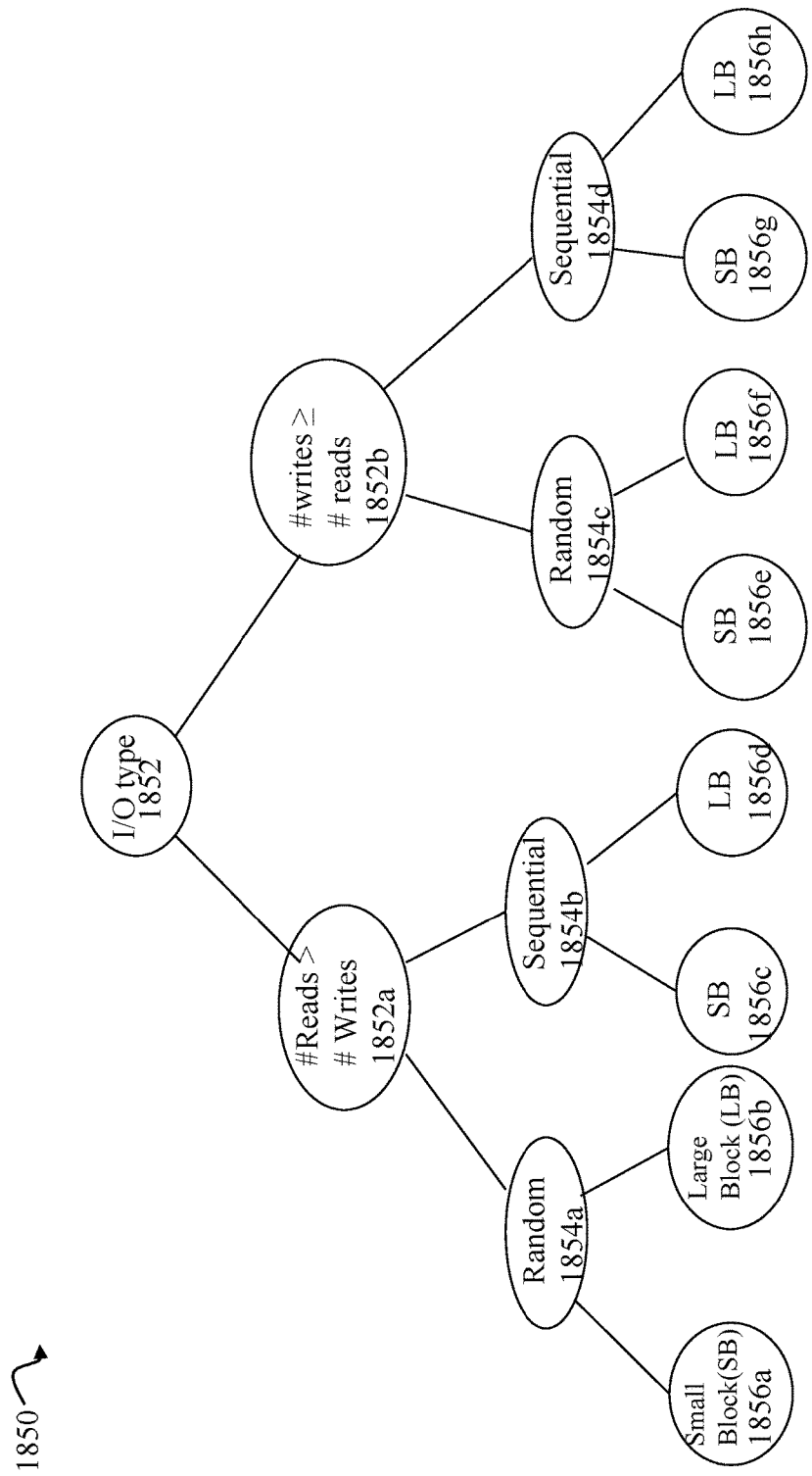
FIGS. 20 and 27 are examples illustrating the different allowable I/O types used to characterize a workload in an embodiment in accordance with techniques herein.

Referring to FIG. 20, shown is an example illustration of the different I/O types that may be determined in an embodiment in accordance with techniques herein. The example 1850 may represent a decision tree with a different characteristic further used to refine the I/O type at each level. For example the root node 1852 may represent the starting point for a number of I/Os representing a workload. As a first step, a determination may be made as to whether the I/Os are primarily reads or writes. Node 1852a may represent a determination that the workload is primarily reads or read heavy and node 1862b may represent a determination that the workload is primarily writes or write heavy. An embodiment may include processing to make this determination, for example, by determining whether the number of reads of the workload is larger than the number of writes of the workload. If so, the workload may be determined as read heavy (node 1852a) and otherwise, the workload may be determined as write heavy (node 1852b). Subsequent steps in the decision tree are made with respect to the particular node 1852a or 1852b selected as a result of the first step or decision.

As a second step, a determination may be made as to whether the workload has an I/O pattern that is primarily (e.g. more than 50%) random or sequential I/Os. As known in the art, different techniques may be used to determine whether I/O patterns are sequential thereby identifying sequential logical accesses to data in sequences of I/Os of the workload. An embodiment may, for example, include processing to determine that the workload is primarily sequential if the number of I/Os included in a sequential I/O pattern are larger than the number of I/Os that are not included in a sequential I/O pattern. The decision tree includes nodes 1854a-b representing this second step in the decision process if the previous decision resulted in selecting node 1852a (e.g., the workload is read heavy). The decision tree includes nodes 1854c-d representing this second step in the decision process if the previous decision resulted in selecting node 1852b (e.g., the workload is write heavy).

As a third step, a determination may be made as to whether the workload is primarily large block or small block size I/Os. For example, an embodiment may define a threshold size of 32 kbytes whereby if the average I/O size of the workload is less than 32 kbytes, the workload may be characterized as small block, otherwise the workload may be characterized as large block I/O size. The decision tree includes nodes 1856a-b representing this third step in the decision process if the previous decision of the second step resulted in selecting node 1854a (e.g., the workload is random). The decision tree includes nodes 1856c-d representing this third step in the decision process if the previous decision resulted in selecting node 1854b (e.g., the workload is sequential). The decision tree includes nodes 1856e-f representing this third step in the decision process if the previous decision of the second step resulted in selecting node 1854c (e.g., the workload is random). The decision tree includes nodes 1856g-h representing this third step in the decision process if the previous decision resulted in selecting node 1854d (e.g., the workload is sequential).

In this manner, a path from the root node 1852 to one of the leaf nodes 1856a-h may denote a particular set of characteristics of one of the 8 I/O types. For example, leaf node 1856a may represent a workload that is primarily random read small block I/Os.

As will be appreciated by those skilled in the art, if the QOS matrix does not include a cell corresponding to a current SP state, interpolation and/or extrapolation may be used to determine a corresponding workload in terms of # IOs. It should also be noted that the particular ordering of steps and associated levels in the decision tree may be generally performed in any order rather than as ordered above.

An embodiment may use different techniques in connection with processing for refining the number of row and/or columns in the matrix. Additionally, it should be noted that an embodiment may include processing to initially populate the QOS matrices for the SPs artificially such as by generating I/Os directed to the SPs rather than relying on actual received host I/Os. In this way, the QOS matrices may have information prior to first performing techniques herein for modeling data movements and movements of associated workloads to and/or from different SPs.

The QOS matrix as illustrated in FIG. 19 having three dimensions may store a RT distribution histogram of the number of I/Os having an RT that fall within particular RT bins where there may be one such histogram maintained for each (x, y, z) cell or set of x, y, z coordinates of the QOS matrix.

It should be noted that an embodiment may maintain sets of data (e.g., RT distribution histograms as in FIG. 13) for each I/O type or possible Z coordinate value. Additionally, an embodiment may maintain another set of data with a general or default I/O type associated with another Z coordinate value. For example, if there are 8 I/O types and thus 8 possible values for the Z coordinate, the default I/O type may be associated with cells of the QOS matrix having Z=9.

A set of performance data obtained for a given sampling period may be classified as one of the 8 I/O types based on the workload observed. The set of performance data may be incorporated into the appropriate cell of the QOS matrix having the matching Z dimension based on this I/O type classification and also incorporated into the appropriate cell having the Z dimension for the default I/O type. In this manner, the default I/O type may be an accumulation or aggregate of all observed data across all other cells of the QOS matrix. In other words, every set of observed workload data may be incorporated into a first cell of the QOS matrix having a Z coordinate based on the default I/O type and also a second cell of the QOS matrix having a Z coordinate based on the I/O type of the workload.

The QOS matrix may be used in a variety of different ways. For example, a workload may be directed to an SP. The workload may be classified into one of the I/O types and may have an associated # of I/Os. The SP may have a current used capacity. A cell of the QOS matrix may be accessed based on the I/O type, # of I/Os of the workload and the capacity of the SP. The information of the selected cell may be used to model the SP performance if the workload is added to the SP. Additionally, there may be instances where a cell is selected for one of the possible I/O types of FIG. 20 and that particular cell of the QOS matrix may have no data or an insufficient amount of data to be used for modeling RT or other purposes as described herein. In this case, the cell corresponding to the default I/O type as the Z dimension may be alternatively used.

The QOS matrix for an SP may be used in connection with mapping or translating an RT range (e.g., that may be included in the QOS performance target information) to a corresponding workload range having a lower bound and an upper bound expressed in terms of number of I/Os as described elsewhere herein. In connection with this usage, the cells of the QOS matrix corresponding to the default I/O type as the Z axis value may be used.

A QOS matrix may also exist for each SG and may be used for modeling the RT of the SG. The QOS matrix of the SG is similar to that as described herein for the SPs. Workload directed to an SG may be incorporated into the appropriate cell of the QOS matrix for the SG in a manner similar to that as described herein for the SP QOS matrix. For a particular SG workload being modeled, an a modeled RT may be determined. A cell of the QOS matrix may be selected having the capacity of the SG used as the X coordinate, and the number of I/Os and I/O of the workload used, respectively, to determine the Y and Z coordinates. The RT histogram of the cell may be used to model the SG RT as follows. The SG RT may be used to determine a first RT prior to modeling expected performance in terms of RT for the workload. The workload is then distributed to the cell and a corresponding expected or modeled RT may be calculated based on this workload distribution. As in connection with SG promotion as described elsewhere herein, if the modeled RT is within the SG's RT performance target or goal, then movement of additional data portions may be stopped.

For each cell of the QOS matrix, the information stored may also include an average observed read RT and average observed write RT.

Based on the foregoing, a budget may be specified for each SP based on the QOS performance target for the SP and the SP's capacity target. The budget for the SP may denote a number of IOs to be moved in or out of the SP and an amount of storage capacity that may be added to the tier (e.g., difference between current SP capacity and the amount indicated by the SP's target capacity). The number of I/Os of the budget may correspond to an amount within the range of I/Os corresponding to the RT range of the SPs QOS performance target as described above. In one embodiment, the number of I/Os may be the number of I/Os corresponding to the midrange RT value with respect to the RT range whereby the number of I/Os may be determined using the appropriate QOS matrix based on the current state of the SP.

A budget for an SP may be determined by first considering a movement in the X or capacity dimension in accordance with the SP's capacity target. For example, with reference back to FIG. 18, table 1760, assume that an SP A1 has a current capacity is 400 GB and the SP A1 has a capacity target of 200 GB thereby specifying a capacity movement of −200 GB for the budget. With reference to table 1760, the column 1771 of table 1760 for the 400 GB capacity may be used for modeling RTs for different I/O workloads for the current state. However, if a proposed movement by the budget is to decrease the SP A1's capacity by −200 GB, then the column 1770 of table 1760 for the 200 GB is now used for modeling RTs for the different workloads. As a second step, the RT range of the QOS performance target may be mapped to RTs in column 1770. For purposes of illustration, assume the RT range specifies 3 ms to 5 ms. For the RT of 3 ms, cell 1768$b$ may be identified and for the RT of 5 ms, cell 1768$a$ may be identified. In this case, the RT desired as an end point used for the second component of the budget may be 4 ms (midway in the RT range) corresponding to cell 1768. Assume we have a current average RT for the SP A1 of 3 ms meaning that the RT may increase from 3 ms (current average RT) to 4 ms (desired RT). In this case, the cell 1768$a$ corresponding to the current RT=3 ms is located and cell 1768 is located corresponding to the desired RT=4 ms. The Y coordinate distance between these two cells (representing points in the modeled performance curve for the SP A1) is determined and represents a difference that is a number of I/Os, +100 I/Os. In other words, assume the first proposed change of the budget is performed to reduce the SP A1's capacity. Given this, the workload may now be increased by 100 IOs. In this manner, the changes proposed for a budget need to be analyzed in sequence since the first change in capacity affects how the RTs subsequently considered in the second step are modeled.

As an example, consider the following budgets specified for each of four SPs where the first row represents the budget for SP A1 noted above:

TABLE 1

| SP | Budget |
| --- | --- |
| SP A1 | −200 GB, +100 IOs |
| SP A2 | +1 terabyte (TB), 0 IOs |
| SP A3 | +500 GB, +100 IOs |
| SP A4 | +200 GB, −100 IOs |

Table 1 indicates that SP A1 needs to reduce its capacity by 200 GB and may take up to 100 IOs, SP A2 may increase its capacity up to another TB and may not take on additional IOs, SP A3 may increase its capacity up to another 500 GB and may take up to an additional 100 IOs, and SP A4 may increase its capacity up to another 200 GB and needs to decrease its I/Os by 100. Each of these budgets may be determined for each of the SPs in a manner similar to that as described above for SP A1. In this manner, a vector expressed as an SP budget may be used to represent the movement in the capacity and workload (number of I/Os) dimension to obtain SP's QOS performance goals and to also not violate the SP's capacity target.

In a manner similar to that as described for SPs, a budget in terms of workload may be determined for each SG. In accordance with an SG's budget and assigned state as described elsewhere herein, workload may be appropriately moved into or out of different SPs (and hence different storage tiers having different performance classifications) to achieve the SG or application's performance goals. If the SG is attempting to increase its performance since it is currently not meeting its performance goals, the SG will attempt to acquire higher performing physical storage (e.g., move some data portions from PDs having first performance to other PDs having higher performance). If the SG is attempting to decrease its performance since it is currently exceeding or performing better than its performance goal, the SG will attempt to acquire lower performing physical storage (e.g., move some data portions from PDs having first performance to other PDs having lower performance). Processing may now be performed to examine the data portions of the SGs which may be moved into or moved out of particular SPs and therefore consume the SP budgets.

Consistent with description elsewhere herein, an embodiment in accordance with techniques herein may include the following processing in connection with modeling or anticipating a future state of the system. Such as described in connection with FIG. 12, an abstract QOS controller may be used by all demand and supply entities in the system. The QOS controller may represent a functional grouping of one or more modules which, for example, collect the performance and workload of all the demand and supply entities such as SPs of PDs and SGs. The QOS controller may perform such processing based on the supply/demand goals and on the observed IO. The processing performed may iterate across all entities and assign various states as described herein for the SGs and SPs. Each demand and supply side entity may then use functionality of the QOS controller to implement the various schemes described herein to increase or decrease load as needed in accordance with the performance goals of the different entities.

An embodiment may track historical data or a transaction log of various system states such as regarding modeling or projected system state as well as actual observed information based on observed I/Os. For example, a record may be included in the transaction log for each observed set of SP data recorded as a histogram for a single sample period whereby this single instance is then accumulated into the appropriate QOS matrix entry for the SP. Various records may be included in the transaction log regarding modeling states and information used for modeling described in more detail below. The transaction log information may be stored in a table including a record or entry for each recorded transaction. In one embodiment, each record of the transaction log may include, for example:

1. Sample Index or timestamp denoting the time at which the transaction occurred.
2. transaction type of SG or SP, respectively, denoting whether this record pertains to an SG or an SP. Note that this may also identify the particular SG or SP instance.
3. Row Type: Type denoting the processing used to generate the data recorded in the transaction record. Row types may include:
   a. Calibration Sample: results from artificial IO denoting that the observed set of sample data is produced as a result of generating I/Os and observing performance such as to initialize the QOS matrix for a particular SP or SG.
   b. Sample: Analysis of the physical components denoting that the observed set of sample data is collected as a result of observing performance in connection with an actual workload of I/Os received from hosts or other clients
   c. Projection: Projected sample for the future. Used to describe transaction entries for modeling system performance described in more detail below.
   d. Projected Delta: Anticipated or modeled IOPS/GB change. Used to describe transaction entries for modeling system performance described in more detail below.
   e. Actual Delta: Derived from current and previous sample. A delta or difference in connection with observed workload and performance data between two collected data samples for an SP or SG.
2. IOPS: Number of IOs. If this record describes a set of sample data such as when the row type is any of calibration sample, sample, or projection, this may represent the total number of I/Os included in the sample. If this record describes a projected delta or actual delta, this field may represent the number of I/Os described by the delta or difference.
3. GB: utilized capacity. If this record describes a set of sample data such as when the row type is any of calibration sample, sample, or projection, this may represent the total amount of GBs consumed for the SP or SG. If this record describes a projected delta or actual delta, this field may represent the increase or decrease in GBs described by the delta or difference.
4. IO Type—This field may denote the I/O type used in identifying the appropriate index in the zth dimension of the QOS matrix.
5. State: increase/decrease IOPS/GB. This field identifies the state of the SG or SP entity described by the transaction record. Possible states are as described elsewhere herein. For example, for an SP, this may indicate whether the SP wants to increase load, reduce load or is stable.
6. Average RT. This field represents the overall average RT. If this record describes a set of sample data such as when the row type is any of calibration sample, sample, or projection, this may represent the average RT across the sample population. If this record describes a projected delta or actual delta, this field may represent the average RT resulting from the projected delta or actual delta.

7. Response Time CDF: This field may include data for a CDF, such as one including a percentage distribution for a number of predefined RT values. If this record describes a set of sample data such as when the row type is any of calibration sample, sample, or projection, this may represent the CDF for the sample. If this record describes a projected delta or actual delta, this field may represent the CDF resulting from the delta or difference.
8. Source and destination SPs. If the record type relates to a modeled data movement, the source and destination SPs may be identified. Otherwise, this field may not be used.

In one embodiment, the QOS controller may be implemented using methods or routines used for modeling to estimate the expected workload in the next N frames. Generally, as described herein, processing is performed regarding the supply side to examine the QOS target within the target range of all the supply side QOS matrices to determine a vector in IOPS and GB for each SP that, if performed, results in the SP meeting its performance goals (e.g., see, for example, FIG. 17 and discussion elsewhere herein that results in the SP being in its ideal performance goal zone). Processing may also include determining whether the net vector sum of all supply side vectors (e.g., for all SPs) is negative thereby indicating that all SPs need to reduce load. In such a case, the supply side may be determined as being in a deadlock state in that currently defined SP performance goals cannot be met. In this case, an adjustment to one or more SP performance goals may be made (manually and/or automatically). The QOS Target Range included in the performance goals for one or more SPs may be adjusted downward or otherwise broadened so as to allow a wider response time range. The system may then again re-evaluate the SPs using the new SP performance goals to determine any updated SP vectors. It should be noted that the foregoing SP vectors are also referred to elsewhere herein as budgets for the SPs to achieve corresponding performance goals and also remove any SP capacity violations. Once an SP vector has been determined for each SP, an entry may be created in the transaction log for each such SP and its associated vector. Consistent with discussion above regarding entries in the transaction log, the information recorded in the transaction log for each SP's vector (to bring the SP into compliance with its associate capacity and performance goals) may include the following information: a timestamp or identifier for the transaction, a type denoting SP, a row type of projected delta, IOPS denoting the increase or decrease in IOPS workload to achieve SP performance goals, GB denoting the increase or decrease in capacity to bring the SP's capacity into compliance with any capacity limits, a state denoting the current SP state (e.g. one of the SP states such as described elsewhere herein), average RT modeled or expected for the SP if the projected delta is performed, and modeled RT CDF of the SP if the projected delta is performed.

In a manner to that as described for SPs, a vector may also be determined for each SG regarding projected changes in workload (IOPS) and capacity that need to take place in order for the SG to be compliant with its performance goals and any capacity limits imposed on the SG level. A record may also similarly be made in the transaction log for each SG based on the SG's vector and associated state. In discussions below, the vectors recorded in the transaction log for the SPs and SGs may be referred to as vector projections.

At this point, the QOS controller then examines the supply side vector projections and the demand side vector projections to determine data movements to model to meet the foregoing vector projections. For each data movement, an entry may also be recorded in the transaction log. In one aspect, each data movement may be characterized as a step toward achieving a larger goal denoted by the supply side and demand side vector projections. There may be multiple such steps or data movements needed to obtain the total increase or decrease with respect to capacity and/or workload (IOPS) to achieve an SP or SG's performance goals. To determine such data movements, an embodiment may include processing that uses a priority scheme. An embodiment of the QOS controller may include processing that uses following priority to assign budgets of movements per SG:
1. Pool or SP Capacity: Look for SPs that are in violation of GB capacity limits. For an SP having a capacity violation, distribute the GB vector that will restore the SP to compliance across the SGs that have capacity in that SP. (e.g., multiple SGs may have storage allocated from a single SP having a capacity violation. Therefore, data portions from such multiple SGs may be moved from the single SP to another SP). SGs may be considered in an ordering in which those SGs also having an SG capacity violation may be considered prior to other SGs not having SG-specific capacity violations (e.g., the idea is to possibly allow a data movement implemented to remove an SP capacity violation to also contribute to removing or reducing an SG capacity violation). Secondly, SGs may be considered which have a performance goal that would require movement off of the SP having the capacity violation. If there are no such SGs (which both contribute to the SP having the SP capacity violation and also have either an SG capacity violation or need to increase SG performance), then the capacity may be partitioned among the SGs so that each SG having storage allocated from the violating SP may have some amount of data relocated to another SP.
2. QOS Target: Look for SPs that have a goal to reduce IOPS load. Previously, processing determined that the vector sum of all SPs was positive, so there is no chance for IOPS to not have a potential destination. Starting with the SP having the highest IOPS violation, identify those one or more SGs contributing to that SP. SGs may be examined in a preference order as described above in connection with the SP capacity correction.
3. SG Capacity: Look for SGs that are in violation of SG capacity constraints that may be specified for each SP or storage tier. Find a target SP to distribute the required IOPS/GB vector that will restore the SG to compliance. Start with the highest performance pool that has a stable or increase GB goal and produce a projected vector to consume the SP's available resources. Consider, for example, an embodiment having two SPs—SP1 and SP2—each including PDs of a different storage tier. For a particular SG, a first capacity limit may be specified denoting a maximum amount of SP1 or a first storage tier that may be allocated for use with storing data portions of the SG. Additionally, a second capacity limit may be specified denoting a maximum amount of SP2 or a second storage tier that may be allocated for use with storage data portions of the SG. An SG-level capacity violation may occur if any one or more of such limits are violated with respect to a particular SG.

4. SG Performance: Look for SGs that are missing their performance objections. SGs may be ranked with respect to performance violations, from highest to lowest, where the SG missing its performance goals by the most is ranked first or highest. For example, consider an SG1 with target RT=2 ms and target percentage of 80% and let SG1 have an observed percentage of 30% (indicating that 30% of observed I/Os directed to SG1 have an RT that is less than 2 ms). SG1 may be given priority over another SG2 with a target of 2 ms at 80% and having an observed percentage of 70% (denoting that 70% of I/Os directed to SG2 have an observed RT of less than 2 ms). In this case, processing may be performed to produce a vector to move one or more data portions of SG1 to a higher performance SP that will result in SG1 increasing the observed percentage of I/Os having an RT less than 2 ms.

5. Compression: Look for idle data in the SG and match to an SP that qualifies for compression. Create GB-only vector for the SP that supports compression. An embodiment may optionally provide for selectively compressing data portions of an SP when such data portions are considered idle or have a minimal level of activity.

It should be noted that an embodiment may include or use any one or more of the foregoing prioritized criteria alone or in combination with any other suitable criteria.

For each data movement determined in accordance with the above-referenced criteria, a record may be recorded in the transaction log having the following: type of SG, a row type of projected delta for a particular SG, identify the change in IOPS and/or GBs by the proposed data movement among SPs of the SG, the source and target or destination SPs for the proposed data movement, the state of the SG after performing the proposed data movement, the average RT expected after performing the proposed data movement, and the CDF of the SG after performing the proposed data movement. In this manner, the transaction log may include information regarding the modeled or proposed data movement and expected performance resulting from modeling such data movement.

In one aspect, the projected vector for each data movement may be characterized as tied to a particular SG queue (e.g., promotion or demotion queue) in that the vector may be used to determine from which queue to select extents from. If the destination SP has a QOS target that is lower (higher performance media) than the source SP, the data portions may be selected form the source SP's promotion queue. If the destination SP has a lower QOS target than the source SP, then data portions may be selected for data movement from the source SP's demotion queue. If the destination SP and source SP have the same QOS target, then data portions may be selected from all 3 queues of the source SP such as in a round robin fashion. This is described in more detail elsewhere herein, for example, such as in connection with FIG. 31. Additionally, the different queues are also described in more detail elsewhere herein.

The end result of the foregoing analysis is a set of delta vector values representing multiple proposed data movements resulting in changes to IOPS and GB to SPs and SGs that are capable of changing during a next projected sample period. The relative changes to the performance can be estimated based on the queues and QOS matrix and the specified relocation rate. The analysis can be extended to apply to further samples in the future by taking the vectors of data movement and applying them as delta IOPS and GB to the projected state of the SG and SP.

As noted above, an embodiment may record an entry in the transaction log for each data movement and an associated delta value. Additionally, a modeled accumulated result may be determined by collectively summing or considering as a single set of data movements all those individual data movements recorded as determined in accordance with the above-mentioned criteria. The modeled accumulated result may be recorded in the transaction log as a set of projected data movements modeled for a projected sample period. In other words, each delta value may be summed for the projected sample interval and the projected IOPS/GB used to insert a new entry into the transaction log for the SG whereby the state, average ms, and response time CDF may be derived from the QOS matrix for the SG. The system may continue to operate in this delta mode where a set of proposed data movements are determined and then the net effect of performing such proposed movements may be simulated such as using vector math. In this manner, an embodiment may determine multiple sets of proposed data movements and generate multiple projected sample frames based on performing such proposed movements. The state machines may iteratively generate multiple project sample frames whereby a first projected or modeled sample frame may be used as a starting point for determining the next second projected or modeled sample frame. The system may project or model performance into the future for as many samples as the SG can provide accurately modeled resulting IOPS/GB estimates. The impact of movement can be accounted for by inserting rows for read IOPS on the source and write IOPS on the target.

It should be noted that at a point in time, a set of proposed data movements may be implemented. The observed or actual performance results achieved as a result of implementing such data movements may be compared to modeled results in order to determine the accuracy of the model predictions. An embodiment may record such actual results in the transaction log, such as denoted by a record with the row type of actual delta described above. If the model predictions are similar to, or within some threshold amount, of the observed performance and capacity results (obtained when the modeled data movements are actually implemented), then the model may be deemed accurate and may be used to predict multiple projected sets of data movements over multiple frames into the future.

In connection with examining the data portions of the SGs which may be moved into or moved out of particular SPs and therefore consume the SP budgets, one feature relates to a first order of queueing that may be maintained per SG per pool or SP.

Figure 21:
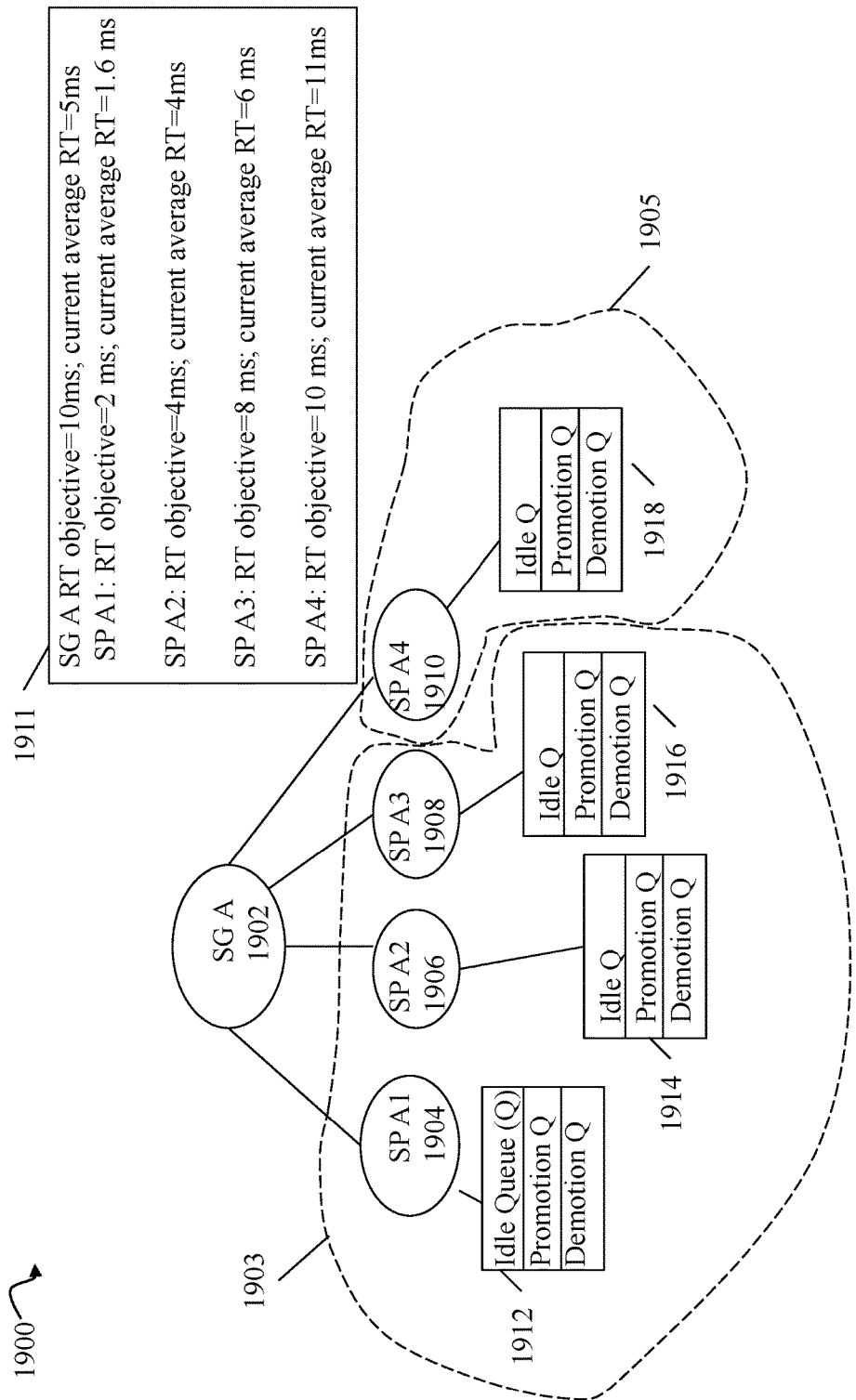
FIG. 21 is an example illustrating queues that may be used in an embodiment in accordance with techniques herein.

Referring to FIG. 21, shown is an example of queues that may be maintained for each SP within each SG. In the example 1900, for each SP per SG, there are 3 queues of data portions maintained for those SPs from which storage is allocated for the SG—a first queue of idle data portions, a second queue of the most active data portions (also referred to as the promotion queue) and a third queue of the least active data portions (also referred to as the demotion queue). The level of activity or busyness may be expressed in terms of a number of I/Os so that the second queue is ranked in terms of a total number of I/Os or I/O rate, from highest to lowest (e.g., with the highest I/O rate being at the top of the list), and the third queue is ranked in terms in number of I/Os or I/O rate, from lowest to highest. A number of data portions N may be included in both the second queue and third queue presenting, respectively, the N busiest data portions and the N least active data portions (other than idle or no activity). Idle data portions may be moved from an SP to increase capacity without modifying current workload. Each such data portion on a queue for a particular SP of an SG includes data portions of the SG which are stored on physical devices of the particular SP.

In the example 1900, 4 SPs 1904, 1906, 1908 and 1910 are illustrated each having a set of the above-mentioned 3 queues, respectively, 1912, 1914, 1916 and 1918. Element 1911 may represent current information about the SPs 1904, 1906, 1908 and 1910 and SG A1902 in used connection with following paragraphs.

In connection with evaluating and modeling data movements, an embodiment may include processing that considers criteria as described above in the following order: first consider SP capacity goals to achieve capacity targets, second consider SP performance goals to achieve SP performance targets, third consider SG capacity limits, fourth consider SG promotion (e.g., reduce SG RT and increase SG performance), fifth consider SG demotion (e.g., increase SG RT and reduce SG performance), and sixth consider data movements to an SP for which compression may be performed. Processing is described in more detail regarding the first, second, fourth and fifth such criteria below.

What will now be described is processing that may be performed in accordance with the first criteria of SP capacity limit. Using the SP budgets as in Table 1 above, it may be determined that SP A1 needs to have its capacity reduced. It may be preferred that SP A1's capacity be reduced without reducing overall performance such as by moving idle data portions from SP A1 to another SP such as moving idle data portions from SP A1 as included in SP A1's idle queue. It should be noted that if there are an insufficient number of idle data portions in SP A1 to move out of SP A1, then the data portions having the least activity may be considered in the order as in the third queue (e.g., demotion queue). A number of data portions may be identified to be removed from SP A1 and the data portions may be moved to another SP having available capacity. Such data portions may be moved to any of SP A2, SP A3 and/or SP A4. As each data portion is moved into another target SP, the resulting target SP's RT and capacity may be modeled using the QOS matrix for the target SP. Additionally, the donating SP, SP A1, may also have its performance and capacity modeled as a result of performing the proposed data movement. Such data movements to target SPs are subject to keeping within the target SP's QOS RT performance target and capacity target. It should be noted that SP A2 may be selected as a target SP for the data portion prior to SP A3 or SP A4 since SP A2 benefits most by adding data portions that add capacity without adding workload since SP A2's workload budget is 0.

Identifying data portions to remove from a first SP exceeding its capacity target and moving such data portions to a target SP may be performed until the first SP no longer exceeds its capacity target.

In connection with moving idle data portions to a target SP, if there are multiple candidate target SPs having available capacity and able to accept load (and stay within capacity and performance goals or targets), an SP may be selected having the lowest performance or highest RT objective.

In connection with this criteria and other described herein, an embodiment may include processing that chooses not to move the entire amount of the budget for SP A1 in connection with modeling since actual system conditions may change. For example, an embodiment may model and perform data movements based on ½ of SP A1's capacity budget or −100 GBs.

Acquisition of high performance resources (higher expected RT objectives) may be driven by the SG or application's performance targets and may drive promotion of data portions. In the embodiment described herein, an SP may include PDs characterized in terms of expected response time objectives (RTOs). The SP may drive demotion.

Generally, an embodiment may include processing for idle data optimization to move all idle data portions on the idle queues of all SPs to the lowest performing SP having available capacity and able to accept load (and stay within capacity and performance goals or targets). An embodiment may include processing that specifies a performance threshold so that idle data portions may be moved to any target SP having an RT objective above this performance threshold.

Generally, in connection with removing an SP's capacity violation whereby the SP's current capacity exceeds a capacity limit, data portions may be removed from the SP which are included on the SP's idle queue. Additionally, data portions moved from the SP may be selected from the SP's promotion queue and/or demotion queue and moved to any higher performing SP (e.g., considering all SPs across all SGs or without consideration of SG). Data portions moved from the SP may be selected from the SP's promotion queue and/or demotion queue and moved to any lower performing SP (e.g., considering all SPs across all SGs or without consideration of SG).

What will now be described is processing that may be performed in accordance with the second criteria of SP performance goals. As the second criteria, the SP performance goals may be evaluated to determine which SP needs to have I/Os moved into (e.g., SP state of add load) or out (e.g., SP state of reduce load) of an SP based on the workload budgets. Although the budgets may be updated based on any moves performed based on the first criteria, for illustration assume the SP budgets are as in Table 1 above. In this case, it may be determined that SP A1, A3 and A4 have SP budgets. SP A1 cannot have data moved into it since such a movement would violate its capacity target (SP A1 has a capacity budget of −200 GB). In this case, SP A3 and SP A4 may be identified.

Generally, in connection with meeting an SP's performance goals where the SP state is to remove or reduce load, data portions moved from the SP may be selected from the SP's promotion queue and/or demotion queue and moved to either any higher performing SP or any lower performing SP. (e.g., considering all SPs across all SGs or without consideration of SG). Similarly, when the SP state is to add load, data portions may be moved into the SP from any other SP's promotion and/or demotion queue (e.g., considering all SPs as possible source SPs without consideration of SG).

What will now be described is processing that may be performed in accordance with the fourth criteria of SG or application promotion to attempt to increase an SG's current performance. At this point it may be determined which SG is not meeting its performance target whereby the SG observed average RT>SG RT objective indicating that performance needs to be increased (e.g., SG observed RT reduced).

Figure 22:
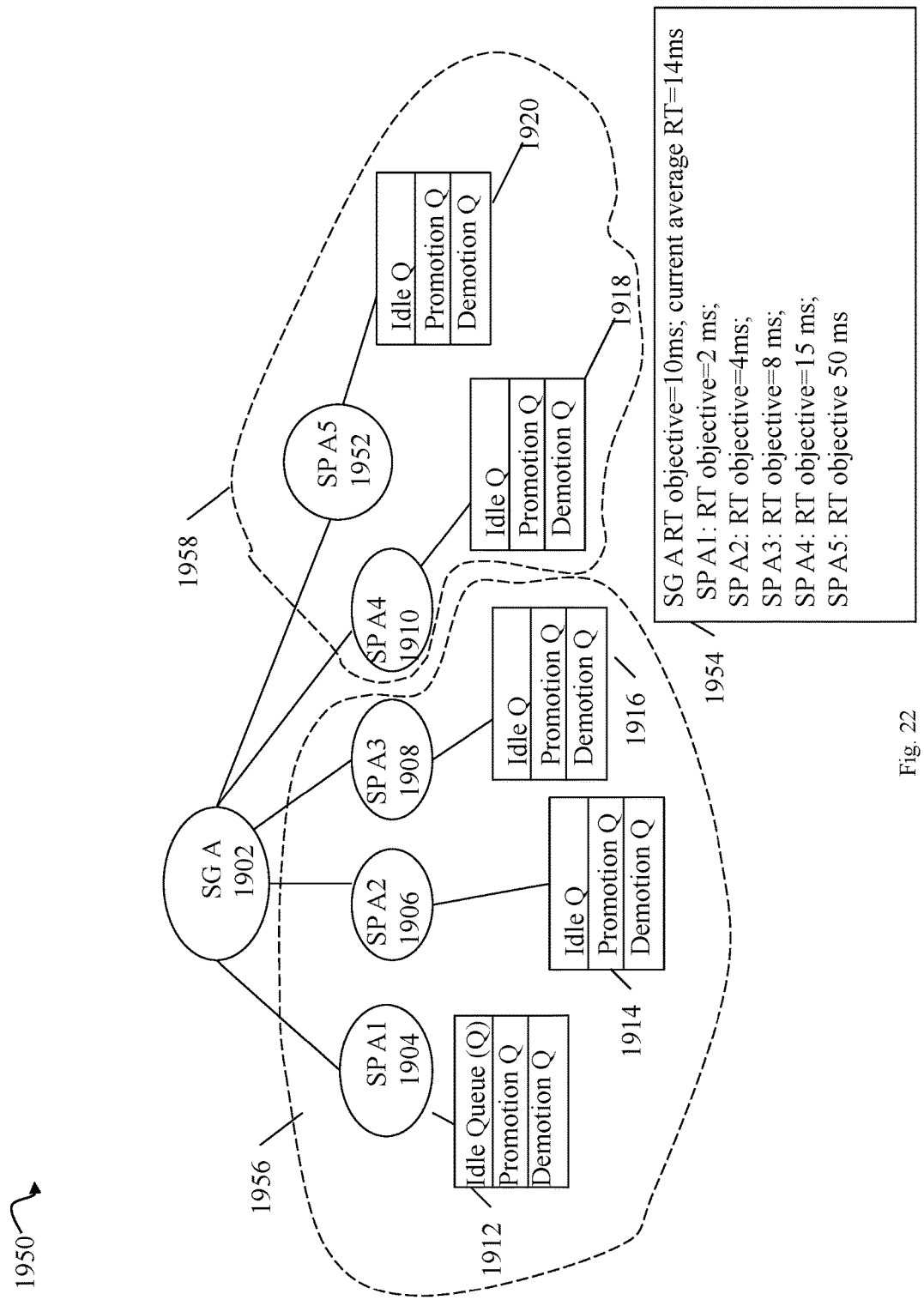
FIG. 22 is another example illustrating queues that may be used in an embodiment in accordance with techniques herein.

With reference to FIG. 22, consider a modified version of the example of FIG. 21. The elements of FIG. 22 are similarly numbered to that as in FIG. 21. Additionally, the example 1950 includes a fifth SP A5 denoted by node 1952 having a set of SP queues 1920 similar to the other sets of SP queues 1912, 1914, 1916 and 1918. For this example, let the SG have an RT objective and average RT as in 1954, and let the SPs have RT objectives as in 1954. Assume an SG A has an RT objective=10 ms and the current average RT=14 ms. For the SG A, performance needs to increase since the current RT is more than the RT objective.

A pivot point is determined based on the RT objective of the SG. The RT used as the pivot point may be used to partition the SPs into a first portion 1958 identifying candidate SPs from which workload will removed (donate workload) and a second portion 1956 identifying candidate SPs to which the workload will be moved (receive workload). The SG RT objective of 10 is used to partition the SPs into the first portion 1958 including those SPs with an RT objective that is greater than the SG RT objective and a second portion 1956 of SGs having an RT objective that is equal to or less than the SG RT objective. In this example, the second portion 1956 may include SP A1 1904, SP A2 1906 and SP A3 1908 and the first portion 1958 may include SP A4 1910 and SP A5 1952. A combined aggregated list is formed from the promotion queues for all the SPs in the first portion which can donate load (e.g., has SP state of reduce load) as may be indicated by any updated SP budgets.

The combined list may be sorted or ranked in terms of decreasing activity such as in terms of decreasing number of I/Os or IOPS (e.g. I/O rate) for each of the data portions. Data portions identified in the combined list may be considered for data movement to a target SP based on the sorted decreasing activity level.

A target SP which can accept workload (e.g., based on SP budgets, has SP state of add load) may be selected from the second portion. If there are multiple candidate target SPs in the second portion, the SP of the second portion having the lowest RT (e.g., highest performing SP of the second portion) may be selected.

When a data portion is moved from a source SP to a target SP, the average observed RTs of the SPs are used to model the proposed movement of the SG. The QOS matrix of the SG may be modified to redistribute the workload to the target SP and then the expected RT may be modeled and compared to the RT objective of the SG to determine whether the RT modeled is within the RT performance target. If not, additional data portions may be promoted. The promotion of data portions may generally continue until the SG meets its RT objective (as noted above), or there is no qualifying target SP, or the promotion candidate data portions are exhausted.

In one embodiment in connection with the fourth performance criteria to increase an SG's performance, overall processing may locate the highest performing SP that has an available budget for data movement. This may be the target SP. Once the target SP is determined, processing may then determine one or more data portions that can be promoted to that tier. An embodiment may build a source mask of SPs, or possible source SPs, that movements are allowed to come from and then compare the SG's promotion queues for those possible source SPs in order of decreasing performance. If the SG has allocations on a higher performing SP than the target SP, those SPs are masked out in the source mask, preventing the allocations from moving to a lower performing tier. Once the higher performing SPs are masked off, processing may be performed that determines the largest extent left in the remaining promotion queues and model movement of this data portion into the specified target SP. The capacity of the data portion just moved may be subtracted from the target SP's budget. The SG's projected RT may be modeled using the QOS matrix for the SG. It should be noted that such modeling may be performed, for example, if multiple data movements to improve the SG performance are being selected as suggestions for data movements provided to the data storage optimizer which would then actually implement such data movements. Assuming the SG's performance goals are not met and there are suitable data portions, suitable source and target SPs having available budget, the foregoing may be repeated. In this manner, the extents of the SG may be processed in sequential order ranked from the busiest or most active to idle.

As an alternative to ranking the data portions or extents in order of decreasing activity level, other criteria may be used to rank the combined list. For example, for each data portion in the combined list, a product may be determined that is the workload of the data portion in terms of number of I/Os or I/O rate (e.g. I/Os per second) multiplied by the SP's current average observed RT. If the workload is a number of I/Os, the corresponding I/O rate such as I/Os per second may be determined and multiplied by the SP's current observed RT. The combined list may then be sorted or ranked in terms of decreasing product values for each of the data portions. Data portions identified in the combined list are considered for data movement to a target SP based on the sorted decreasing product values.

What will now be described is processing that may be performed in accordance with the fifth criteria of SG or application demotion. Processing may be performed to determine which SG is not meeting its performance goal whereby the SG observed average RT<SG RT objective indicating that performance needs to be decreased (e.g., SG observed RT increased). With reference to FIG. 21, assume that the SGs and SPs have observed RTs and RT objectives as in 1911. Assume SG A has an RT objective=10 ms and the current average RT=5 ms. For the SG A, performance needs to decrease since the current RT is less than the RT objective.

A pivot point is determined based on the RT objective of the SG. The pivot point RT may be used to partition the SPs into a first portion identifying candidate SPs from which workload will be removed (donate workload) and a second portion identifying candidate SPs to which the workload will be added (receive workload). The SG RT objective of 10 ms is used to partition the SPs into a first portion including those SPs with an RT objective that is less than the SG RT objective and a second portion of SGs having an RTO that is equal to or greater than the SG RT objective. In this example, the first portion 1903 may include SP A1 1904, SP A2 1906 and SP A3 1908 and the second portion 1905 may include SP A4 1910. A combined aggregated list is formed from the demotion queues for all the SPs in the first portion which can donate load as may be indicated by any updated SP budgets and associated SP state (e.g., reduce or remove load). The combined list is sorted or ranked in increasing activity (e.g., increasing # I/Os). Data portions identified in the combined list are considered for data movement to a target SP based on the sorted increasing activity.

A target SP which can accept workload (e.g., based on SP budgets and SP state) may be selected from the second portion. If there are multiple candidate target SPs in the second portion, the SP of the second portion having the highest RT (e.g., lowest performing SP of the second portion) may be selected.

When a data portion is moved from a source SP to a target SP, the average observed RTs of the SPs are used to model the proposed movement of the SG. The QOS matrix of the SG may be modified to redistribute the workload to the target SP and then the expected RT may be modeled and compared to the RT objective of the SG to determine whether the RT modeled is within the RT performance target. If not, additional data movements may be performed.

What will now be described are flowcharts summarizing processing described above where such processing may be performed in an embodiment.

Figure 23:
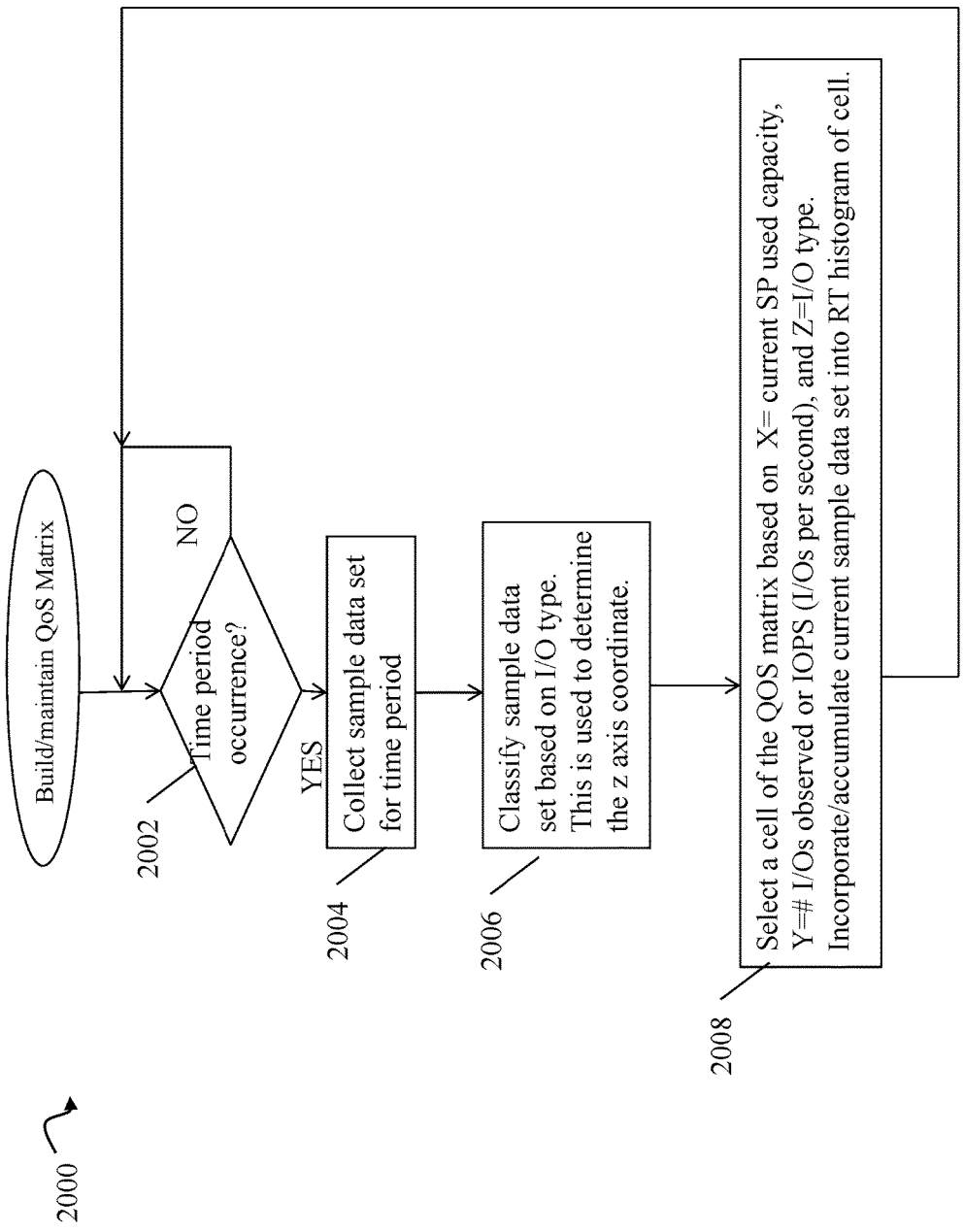
FIGS. 23-26 are flowcharts of processing steps that may be performed in an embodiment in accordance with techniques herein.

Referring to FIG. 23, shown is a flowchart 2000 of processing steps that may be performed to build and maintain a QOS matrix in an embodiment in accordance with techniques herein. As described herein, a QOS matrix may be maintained for each SP and also for each SG. At step 2002, a determination may be made as to whether a time period or interval has occurred. If not, control remains at step 2002 until the next such occurrence. At step 2004, a sample data set is collected for the time period. The sample data set may include gathering observed data collected during the time period into an RT histogram as in FIG. 13 along with other counters such as total number of reads, total number of writes and total amount of data transferred. At step 2006, the sample data set may be classified based on one of multiple predefined I/O types. The determined I/O type may correspond to a particular index value for the Z axis coordinate of the QOS matrix. In step 2008, a cell of the QOS matrix is selected based on X coordinate=current SP used capacity, Y coordinate=# I/Os observed or IOPS I/Os per second, and Z coordinate=I/O type. Step 2008 includes incorporating or accumulating the current sample data set into the RT histogram of the selected QOS matrix cell. Control proceeds to step 2002 to wait for the next time period occurrence.

Figure 24:
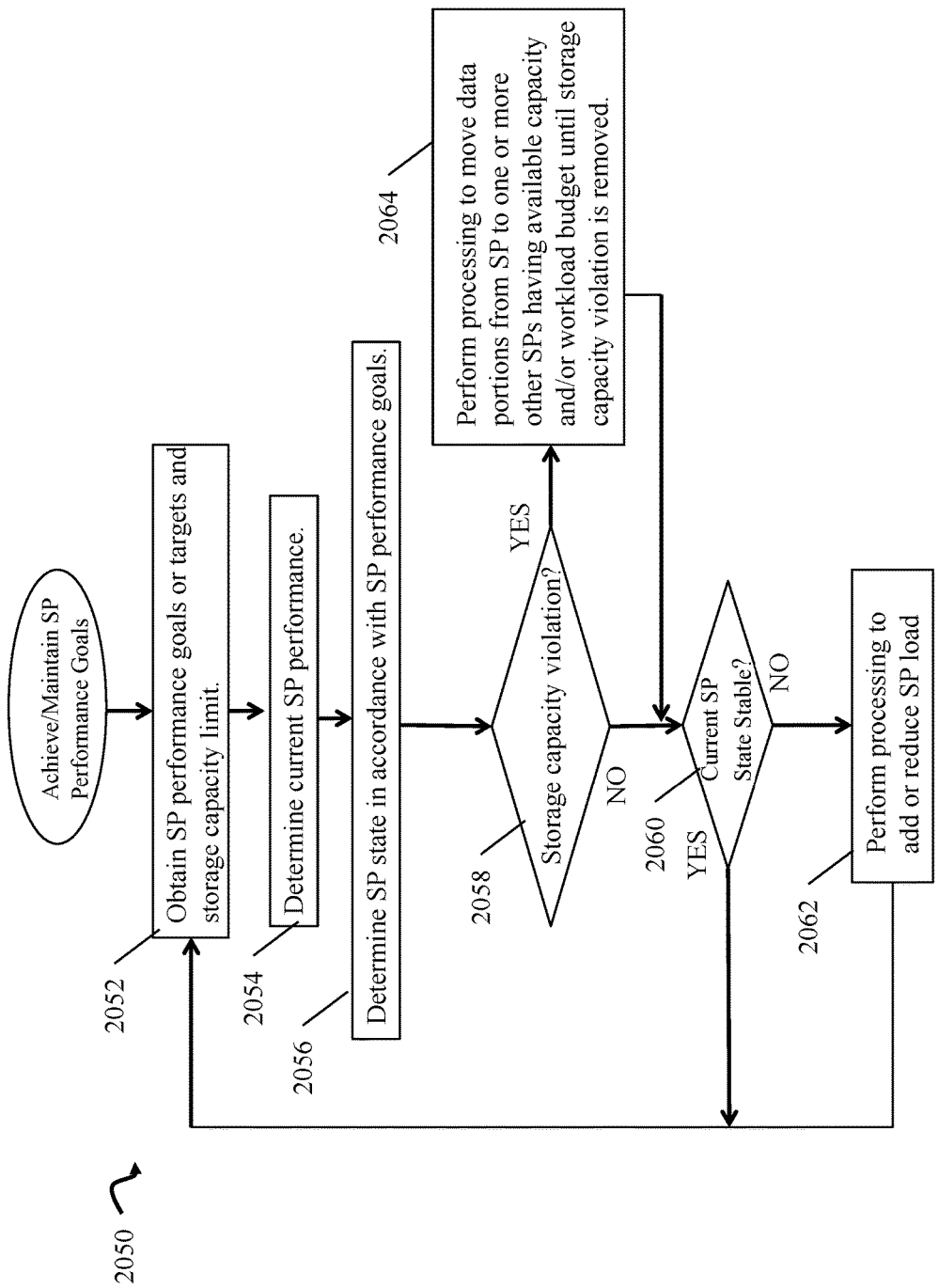

Referring to FIG. 24, shown is a flowchart 2050 of processing steps that may be performed in an embodiment in connection with achieving and maintaining SP performance goals in an embodiment in accordance with techniques herein. At step 2052, the SP performance goals or targets and storage capacity limit for the SP may be obtained. At step 2054, the current SP performance may be determined. Step 2054 may include, for example, obtaining and analyzing a next set of performance data such as used in forming a new instance of a histogram of FIG. 13. At step 2056, the SP state may be determined in accordance with its performance goals. At step 2058, a determination may be made as to whether the SP's storage capacity limit is violated. If so, control proceeds to step 2064 to perform processing to move data portions from the current SP to one or more other SPs having available storage capacity budget and available workload budget as may be needed depending on the workload, if any, of the data portions moved from the current source SP to one or more target SPs. In other words, such data movements from the source SP should be within the available capacity and workload budgets of the other target SPs and should not violate any capacity limits and performance goals of the target SPs. It should be noted that if the number of data movements that can be performed without violating the capacity limits and/or performance goals of all other SPs is insufficient to remove the capacity violation of the current SP, an embodiment may choose to possibly perform data movements which do not violate capacity limits but may violate the performance goals of the other SPs (assuming the capacity limits have higher priority of enforcement than SP performance goals). If the number of data movements determined is still insufficient to remove the capacity violation of the current SP, an embodiment may include processing that performs some other suitable action (e.g., generate an alert or notification to the storage administrator or other user). Assuming that the capacity violation is removed through a sufficient number of data movements, processing may proceed from step 2064 to step 2060. If step 2058 evaluates to no, control proceeds directly to step 2060. In step 2060, a determination is made as to whether the current SP state is stable. If step 2060 evaluates to yes, control proceeds back to step 2052. Otherwise, control proceeds to step 2062 to perform processing as described herein to add or reduce the current SP's load in accordance with the current SP's state of add load or reduce load. As described herein, step 2062 processing may include assessing suitable data portions to move to and/or from the current SP to one or more other SPs in accordance with performance goals and associated budgets of the current SP and the one or more other SPs.

By repeating processing of the flowchart 2050, a feedback loop for reassessing SP performance based on the processing performed in steps 2062 and/or 2064 may be performed prior to performing subsequent data movements. The processing of 2050 may be performed with respect to each SP. In one embodiment, the SP's may be processed in accordance with flowchart 2050 in any order.

Consistent with description elsewhere herein, steps 2062 and 2064 may include determining one or more proposed data movements, modeling the resulting performance and capacity of the affected SGs and SPs, and then actually implementing such data movements.

Figure 25:
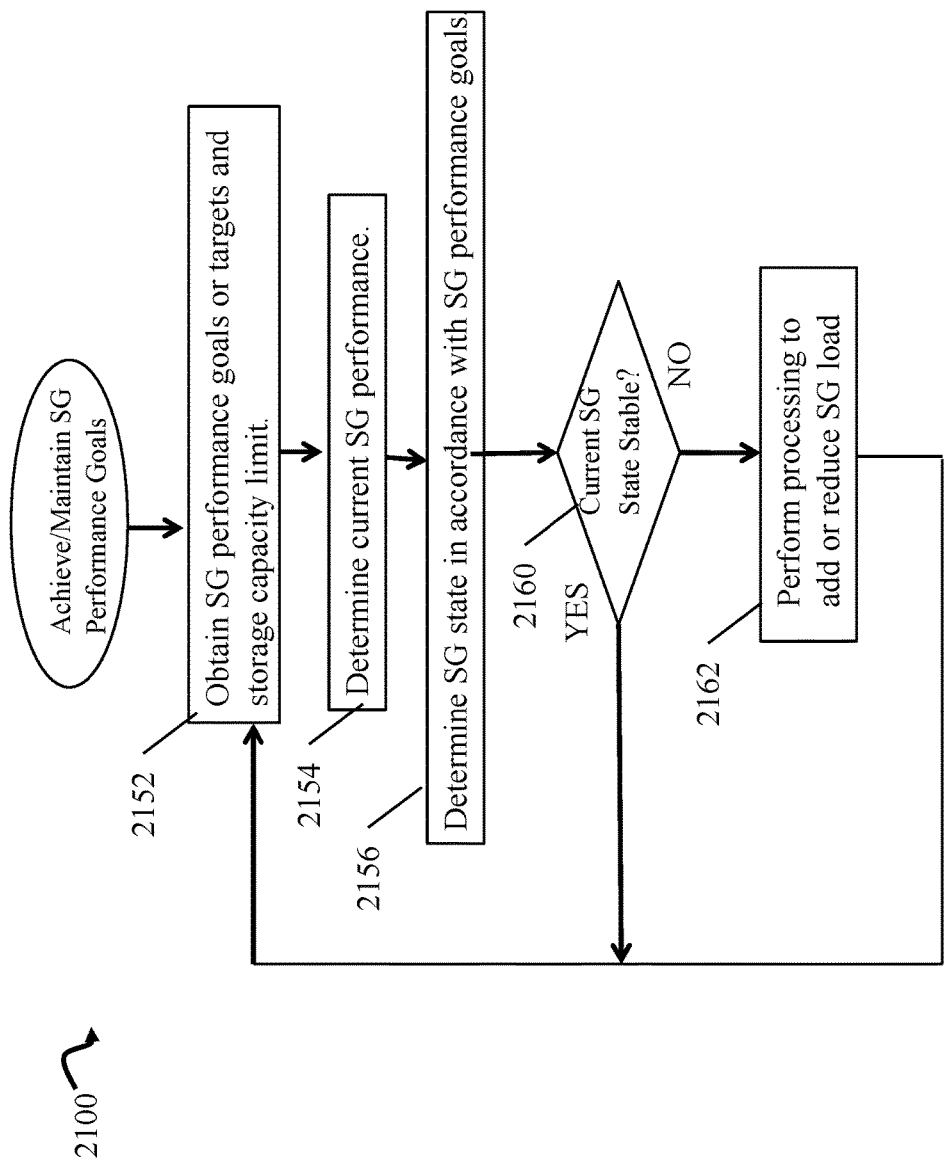

Referring to FIG. 25, shown is a flowchart 2100 of processing steps that may be performed in an embodiment in connection with achieving and maintaining SG performance goals in an embodiment in accordance with techniques herein. The steps 2152, 2154, 2156, 2160, and 2162 of FIG. 25 are respectively similar to steps 2052, 2054, 2056, 2060, and 2062 of FIG. 24 with the difference that those of FIG. 24 are with respect to an SP and those of FIG. 25 are with respect to an SG. By repeating processing of the flowchart 2100, a feedback loop for reassessing SG performance based on the processing performed in steps 2162 may be performed prior to performing subsequent data movements. The processing of flowchart 2100 may be performed with respect to each SG. In one embodiment, the SG's may be processed in accordance with flowchart 2100 in any order.

It should be noted that an embodiment may perform include processing as described in connection with FIGS. 24 and 25 in accordance with prioritized criteria such as mentioned above in connection with determining a set of proposed data movements.

It should be noted that if all SPs are in a state of needing to reduce load, processing may be performed to make a decision with regard to whether or not the QOS controller will continue to operate with current settings or otherwise make possible adjustments. For example, one option is to adjust the QOS performance goals such as the target performance range included in one or more SP performance goals. For example, the QOS target for an SP may include an RT objective and a single percentage or a percentage range, or an RT range. One option is to adjust the RT objective (perhaps this was incorrectly specified). Another option is to make an adjustment to the SP performance goals by lowering the range of one or more SP's performance goals. Adjusting the range (e.g., percentage range or RT range) is akin to forcing the media into a cheaper mode, where we are able to consider that the underlying mean response time of the media has some variation that cannot be controlled. Therefore if it is determined that a workload cannot change, then the performance expectations of the media may be adjusted downwards by accordingly adjusting the expected percentage of I/Os to have an observed RT less than the RT objective downwards (or similarly adjusting the expected average RT and associated observed RT range for I/Os to be adjusted downwards). Another adjustment that can be made is to the SG performance goals such as by similarly adjusting downwards the RT objective and/or RT range for one or more SG performance goals. An embodiment may determine whether the cumulative response time distribution for all SPs being managed is within a stable range (as may be expressed using the percentage range for an SP) while also satisfying the performance goals of the current applications or SGs. An SP may be determined as stable, for example, if the standard deviation for the SP with respect to the average RT for the SP is determined to be within an acceptable range. Furthermore, standard deviation may be determined for each individual RT bin for a given SP to determine whether particular observed RT ranges have acceptable standard deviation with respect to the average RT of the bin.

The standard deviation of an RT bin may be used in connection with determining performance goals such as the target performance range for an SP whose performance characterization and capabilities are unknown other than through observing performance results. In this case, if there is an external storage tier of PDs/SPs with unknown performance, an embodiment may include processing to calibrate or estimate such performance. In connection with calibration, processing may be performed to issue I/Os having predetermined characteristics to populate particular cells of the SP's QOS matrix. For example, an embodiment may generate I/Os of desired I/O types, resulting in a particular total SP capacity, where such I/Os represent a desired workload as may be determined in accordance with the various IOPS, GB and IO type dimensions of the QOS matrix to determine the performance goals (e.g., RT objective and target percentage range) for the SP. Processing may include sending artificial calibration workload to populate cells of the QOS matrix. For example, processing may send N IOPS and then vary the SG affected in order to determine the performance as a function of capacity. Processing may then be similarly performed but along the IOPS axis whereby the number of IOPS is increased while holding the GB range constant. The level or rate at which the IOPS are issued may be scaled in a logarithmic or linear fashion and may stop scaling up when threshold conditions are met. For example, such conditions may indicate to stop scaling the IO rate when the difference in response time >100% between 2 samples at two consecutive I/O rates. The QOS target or performance goals for the SP may be set at the end of the calibration by calculating the average and standard deviation of all the response time buckets, from the historical data that was captured during the calibration phase. For example, the QOS target may be set based on the response time bucket or bin denoting a RT where at least 90% of all observed I/Os have an RT less than the average RT denoted by the bin and where all I/Os included in the bin have an observed RT that is within three standard deviations from the average RT of the entire observed population. This results in the RT objective being set at the level the media is consistently delivering IO response times. With reference back to FIG. 23, this calibration may be performed, for example, as a step between 2008 and the return to 2002 such as when a first set of observed sample data is obtained for an SP. Before the SP can be added for use with techniques herein, if the SP's performance is unknown, processing may be performed to determine the performance capabilities of the PDs underlying the SP.

Figure 26:
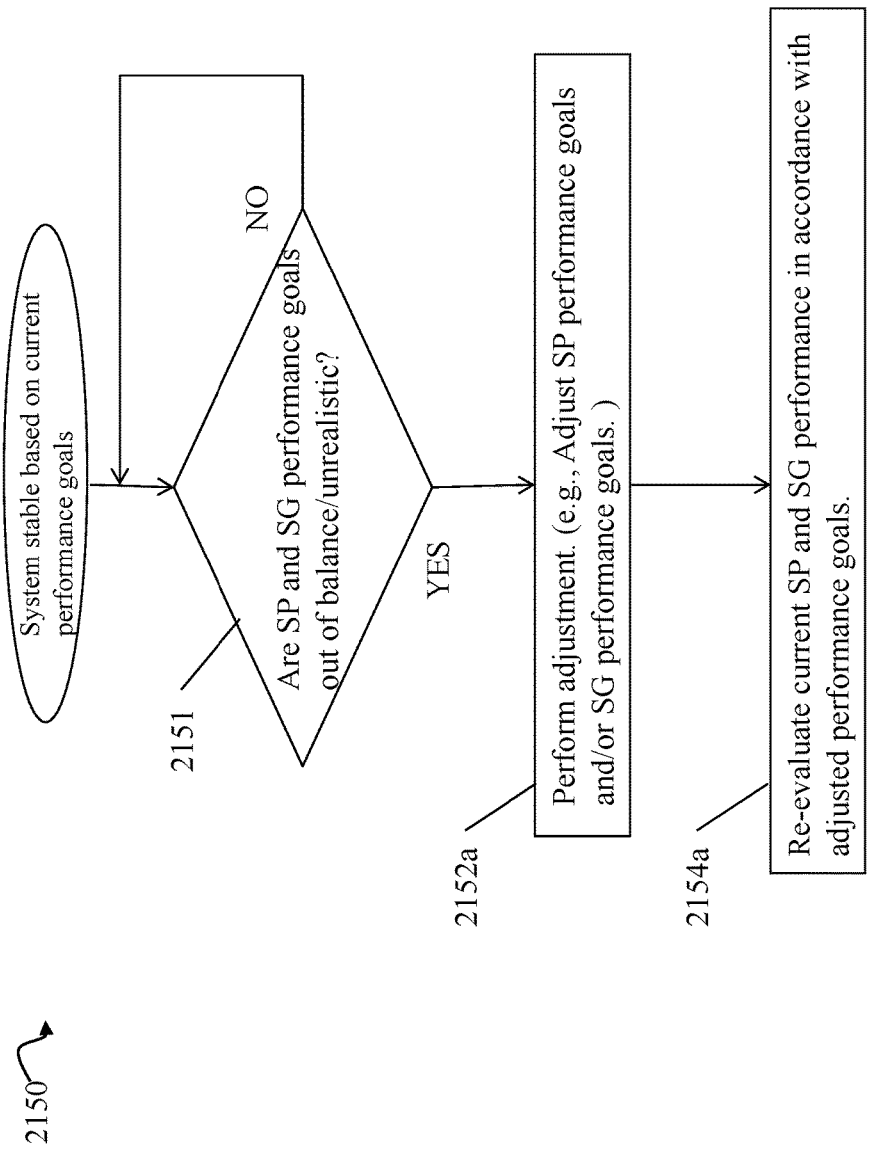

Referring to FIG. 26, shown is a flowchart 2150 of processing steps that may be performed in an embodiment in connection with techniques herein. The flowchart 2150 summarizes processing just described regarding whether the system can achieve a state of stability based on the currently specified performance goals of both the supply (e.g., SPs or tiers of PDs) and demand (e.g., applications or SGs that consume the physical storage). At step 2151, a determination is made as to whether the SP and SG performance goals are out of balance or unrealistic. Some ways in which this may be determined are noted above such as if all SPs are in a state of reduce load for some period of time or otherwise achieve this state at a level of frequency greater than some specified threshold (e.g., more than a threshold number of times within some time period). If step 2151 evaluates to no, control remains at step 2151. If step 2151 evaluates to yes, control proceeds to step 2152a to perform an adjustment as described above to the performance goals of one or more SPs and/or one or more SGs. At step 2154a, re-evaluation of the current SP and SG performance is performed in accordance with the adjusted performance goals. Step 2154a may trigger processing described, for example, such as in connection with FIGS. 31 and 32.

In connection with SPs managed using techniques herein where such PDs are stored on external data storage systems and the underlying PD or drive technology is unknown, or more generally, the performance classification in terms of expected performance such as average RT used as the RT objective is unknown, testing may be performed to select and tune such values for the SP's performance goals.

What will now be described may be characterized as support for diverse media support whereby additional criteria may be introduced to further fine tune the I/O or workload that is divided among the SPs and thus the different tiers. Not all storage media is created the same. There are different technologies of data storage media that can be manufactured with and there are tradeoffs that have to be made in terms of price and performance when performing data movements. Techniques herein may be used to leverage the strengths of a particular media type and marginalize its weaknesses. To accomplish this, a determination may be made regarding what are the strengths and weaknesses of a given media and how it may be exploited to achieve a particular goal such as performance goals of SPs and SGs. In this manner, processing may be performed to determine what data portions to move into a target SP in accordance with the I/O type of the data portion workload and one or more I/O types identified as preferred for data portions moved into the SP. Similarly, processing may be performed to determine what data portions to move out of a source SP in accordance with the I/O type of the data portion workload preferred for data portions that are moved out of the SP to another SP. For example, it may be preferred to select data portions for movement out of a source SP whereby such data portions are not preferred for the source SP because they do not have an I/O type or classification for which the PDs of the source SP provide the best performance (relative to other preferred I/O types or classifications).

Generally, such processing may determine which one or more possible I/O types that a given media type is "good" at providing the best performance. A match may then be made between the data portion I/O type and an SP good or preferred for handling I/Os of the data portion's I/O type. When data portions need to move into the SP, processing may be performed to prefer movement into the SP of those data portions which have an I/O type that best matches one of the preferred I/O types of the SP (tier) at a given ratio. As applications attempt to add or move data portions into an SP, preference for data movement may be given to the data portions having one of the preferred I/O types specified for the particular target SP over other data portions not having one of the preferred I/O types specified for the particular target SP. For example, assume there are 10 data portions and 3 of the data portions have an I/O type or classification of read heavy, small block and 7 of the data portions are write heavy, large block. On flash or SSD tier, the 3 read heavy data portions may be ranked higher or preferred over the 7 write heavy large block data portions for data movement into the SSD tier such as due to write amplification and the fact that flash-based storage wears out more quickly when performing writes as opposed to reads. As will be described below, when projecting performance of the SP, the SP may bias selection of data portions which are moved into and/or out of the SP based on whether the I/O type characterizing the workload of the data portion matches a preferred I/O type(s) specified for the SP as described above. The above-mentioned criteria of I/O type assigned to each data portion based on the data portion's workload may be used as additional criteria to further partition or classify data portions on each of the promotion queues and the demotion queues.

In connection with moving a group of candidate data portions to the target SP having a set of one or more preferred I/O types, data portions moved to the target SP from the promotion queue and/or demotion queue may be preferred based on whether each of the data portions has an I/O type matching one of the preferred I/O types of the first set for the target SP. For example, the target SP may specify as a preferred I/O type one or more I/O types for which PDs of the SP are expected to provide the highest or best performance for the given workload of the data portion. For example, as a first option, an embodiment may examine the QOS matrix to determine which I/O type (s) will result in the best modeled RTs for an added workload of a particular I/O type. This first option may be used for example, where the underlying PD technology of the different SPs is unknown. As another alternative, if the underlying PD technology is known, an embodiment may provide an inherent ranking or selection of preferred I/O types for an SP based on the underlying PD technology (e.g., SSD, non-SSD, particular type of rotating PD interface (e.g., SAS, FC, SATA), one or more other PD performance characteristics (e.g., rotation speed of PDs such as 10K RPM or 15 K RPM), and the like) expected to provide a best RT for the particular I/O type. Additionally, the criteria used to rank or select preferred I/O types for an SP may depend on other PD characteristics such as whether particular I/O types adversely impact other aspects besides performance. For example, as known in the art, flash-based PDs have a life expectancy determined in accordance with the number of writes. In this manner, depending on the age of the flash-based media in terms of prior usage, a bias may be further introduced to limit the number of data portions selected for movement into an SP having flash-based PDs if the data portions have an I/O type which is write heavy.

In a similar manner, preferred I/O types or ranking of I/O types specified for an SP may also identify those one or more I/O types that are least preferred for inclusion in a particular SP. The one or more I/O types identified as least preferred for an SP may be used to identify data portions which are preferred candidates for movement out of the SP to another SP. For example, write heavy workload data portions may not be preferred for flash-based SPs and data portions currently stored on an SP having PDs which are flash-based or SSDs may be selected for movement out of the SP prior to other data portions having read heavy workload.

Figure 27:
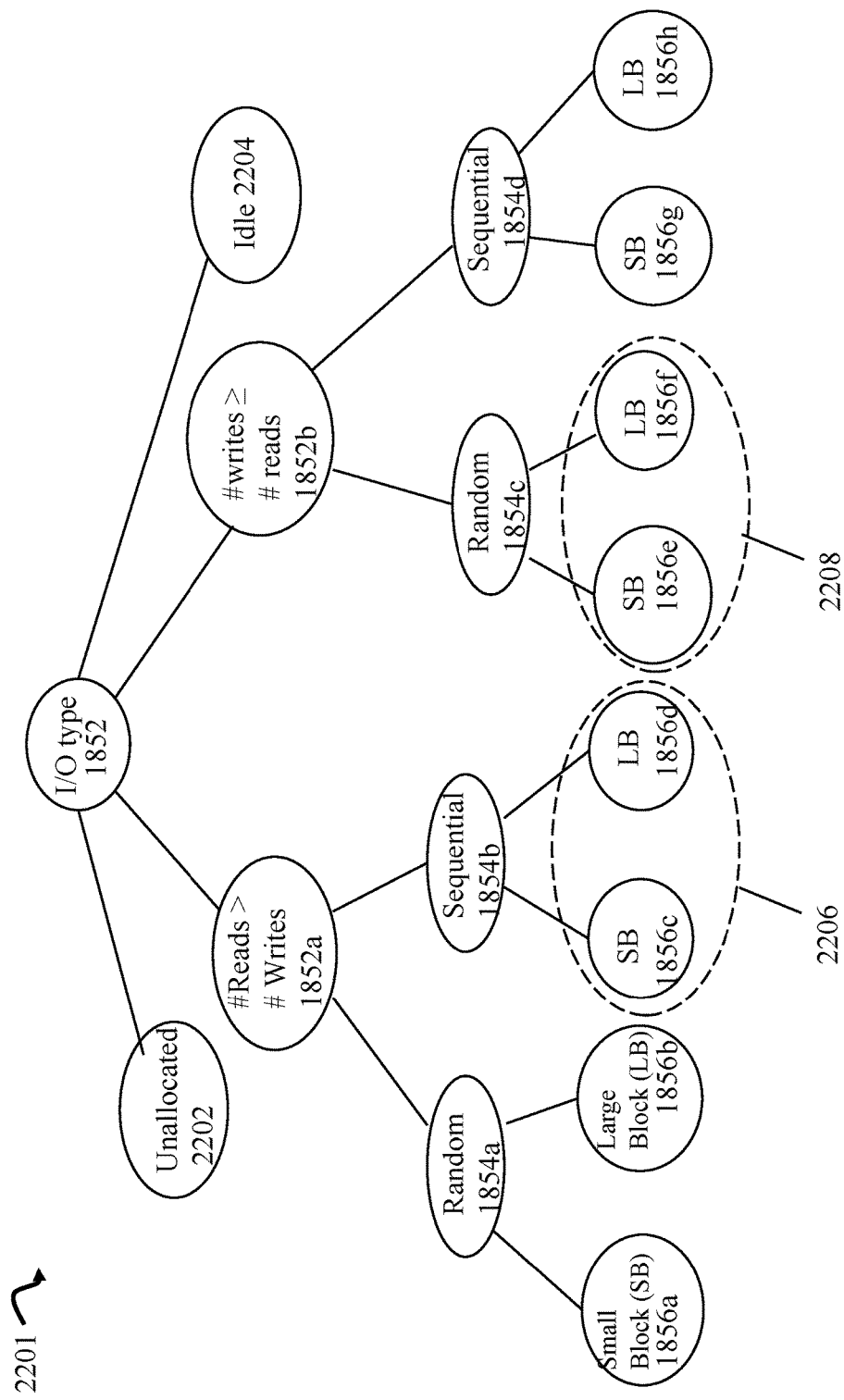

Referring to FIG. 27, shown is an example of different I/O types that may be used in connection with techniques herein when assigning an I/O type to a data portion based on its workload for use with second order queuing. The example 2201 includes the I/O types previously described in connection with the example 1850 (FIG. 20). Additionally, a data portion may be assigned an I/O type of idle as denoted by 2204 or unallocated as denoted by 2202. A data portion corresponding to a logical device of an SG may represent a range of the logical device's logical address space. For virtually provisioned or thin devices, the data portion may be unallocated thereby corresponding to a range of the logical device's logical address space that is currently unallocated or not associated with any allocated physical storage. A data portion that is idle has no workload or zero I/Os observed within a defined time period. In one embodiment, the I/O types of 1856c-d may be combined into a single instance (as represented by 2206) so that a single Z coordinate value may represent cells of the QOS matrix for such I/O types in combination. Similarly, the I/O types of 1856 e-f may be combined into a single instance (as represented by 2208) so that a single Z coordinate value may represent cells of the QOS matrix for such I/O types in combination.

As described elsewhere herein, in accordance with description for the example 1850 (FIG. 20), a data portion may fall into only one of the I/O types at a point in time based on the data portion's workload (e.g., all I/O types are mutually exclusive in that a single data portion at a point in time may not be classified as falling into more than one I/O type).

An embodiment may use a QOS matrix having 3 dimensions where the Z axis may have a value that is in the inclusive range of 1 . . . 6, corresponding respectively, to the I/O types 1856a 1856b, 2206, 2208, 1856g and 1856h, as described above with the exclusion of Idle and unallocated since there is no workload for such data portions and thus no performance data stored. Additionally, the Z axis may have another value of 7 corresponding to the default I/O type as described herein.

In this manner, consider determining which one or more I/O types are preferred for a particular SP. For an SP having a current capacity C1 in GBs (X dimension) and a current workload W1 in number of I/Os or I/Os per second (Y dimension), the resulting RT performance of increasing the workload by an amount of a data portion's workload W2 and size S1 may be modeled for all the I/O types using the 6 cells of the SP's QOS matrix having X=C1+S1 and Y=W2+W2 and comparing the resulting RT determined using each of the 6 cells. Each of the 6 cells of the SP's QOS matrix used has an associated I/O type and modeled resulting RT. The possible 6 resulting modeled RTs may be ranked in terms of increasing performance or decreasing RT and the I/O type associated with the highest ranked RT in terms of performance may be selected as preferred for data portions moved into or stored in the SP. More generally, the resulting RT ranking from best performance to lowest performance indicates a ranking of the associated I/O types in terms of preference for data movement into the SP. The I/O type associated with the lowest ranked RT in terms of performance may be selected as the least preferred for data movement into the SP or the most preferred for data movement out of the SP. In other words, when looking at which particular data portions of an SP may be candidates for movement OUT of the SP, data portions having the I/O type associated with the lowest ranked performance (e.g., highest resulting modeled RT) may be selected. Similarly, when looking at which particular data portions of an SP may be candidates for movement INTO the SP, data portions having the I/O type associated with the highest ranked performance (e.g., lowest resulting modeled RT) may be selected.

Alternatively, an embodiment may include processing to qualify the underlying PDs for the SPs and determine offline a ranking of I/O types from highest performance to lowest performance expected. The ranking may be based on some observations during a qualification period. For example, an embodiment may determine a first set of one or more I/O types for each SP that are preferred for storing on PDs of the SP, and a second set of one or more I/O types for each SP that are least preferred of all possible I/O types for storing on PDs of the SP. The first set may identify I/O types preferred for data portions that are candidates for movement into the SP. The second set may identify I/O types that are preferred for data portions that are candidates for movement OUT of the SP. The ranking of I/O types of the first and second sets may be static or predetermined, or may further adapt over time based on observed performance such as automatically using the QOS matrix as refined over time.

It should be noted that an embodiment may also consider other criteria besides performance when determining the ranking of I/O types or when determining which one or more I/O types are preferred for data portions that are candidates for movement OUT of the SP and which one or more I/O types are preferred for data portions that are candidates for movement INTO the SP. For example, an embodiment may consider whether the I/O type is read heavy or write heavy when relevant to a particular SP's I/O type ranking (if the underlying PD technology is SSD or not).

In this alternative embodiment, a table such as illustrated in FIG. 28 may be provided as an initial ranking of I/O types. The example 2200 includes a table with I/O types 2221 and some underlying PD media or technology type 2210 that may be used in an embodiment. Each entry in the table of 2200 indicates, for the particular I/O type, a ranking or grade for each possible media type where the grade is one of those indicated in 2212. Specifically, each entry in the table 2200 is assigned one of the following: X denoting that the media type is bad or not preferred for storing or movement of a data portion having the associated I/O type into the SP, G denoting that the media type is good or preferred for storing or movement of a data portion having the associated I/O type into the SP, and D denoting don't care. In connection with the above, those cells associated with the I/O type X may represent the I/O type preferred for data portion candidates for movement out of the SP. Those cells associated with the I/O type G may represent the I/O type preferred for data portion candidates for movement into the SP. It should be noted that the example 2200 may be based on expected RT performance and also other criteria for the MLC SSD-based storage since such physical storage wears out based on write usage. In this way, the I/O rankings for MLS may prefer to include data portions with read heavy workload and may prefer least to include data portions with write heavy workload.

An embodiment may also interpret the information of table 2200 in a different way to identify one or more I/O types as preferred for data movement into and/or out of the SP. For a given I/O type identified by one of the columns of I/O type 2221, an embodiment may identify a ranked list of one or more preferred media types or PD technology types as those one or more media types 2210 which do not include an X in the entry. The media types which do not include an X entry may be further ranked with all media types having a G ranked higher than entries have a D. The foregoing ranking may denote a preference ranking of data portions to be included or moved to the SP. Any entries for a given I/O type having an X entry may be preferred for data movement out of the SP. For example, the following are ranked preferences, from highest to lowest, for each I/O type regarding which media type is preferred for storing a data portion of the I/O type (e.g., a ranking of preference for data movement into the an SP having the particular media type):

| I/O type | List of preferred media type(s) for storing data portions of this I/O type |
|---|---|
| Read Random Large (RRL): | SLC (G), MLC (G), FC 15K RPM (G) |
| Write random small (WRS): | SLC (G), 15K RPM (D) |
| Write random large (WRL): | SLC (G), 15K RPM (G) |
| Read sequential large (RSL) and small (RSS): | 7.2K RPM (G), SLC (D), MLC (D), 15K RPM (D) |
| Write sequential large (WSL) and small (WSS): | 7.2K RPM (D), SLC (D), 15K RPM (D) |
| Idle: | 7.2K RPM (D), SLC (D), MLC (D), 15K RPM (D) |

In connection with the above lists for each I/O type, I/O types may be ranked first based on the G and D rating, G being ranked higher than D. Further, if multiple media types have a same ranking of D or G, the multiple media types may further be ranked based on secondary criteria in terms of expected RT performance, from highest to lowest. Such expected RT performance may be based on the RT objective associated with an SP as well as general knowledge of expected performance of: MLC and SLC (same performance expected), 15K RPM and 7.2K RPM further ranked based on secondary criteria.

In this example 2200, the underlying PD technology or media type may be known. However, it should be noted that more generally the information of 2200 may be comprised based on each SP or storage tier rather than media type in 2210 (such as where the media type is unknown) and a determination of whether an SP or storage tier is preferred for one or more I/O types may be based on an assessment of information of the QOS matrix identifying which I/O types generally provide the best relative RT for each of the different allowable I/O types 2221.

Figure 29:
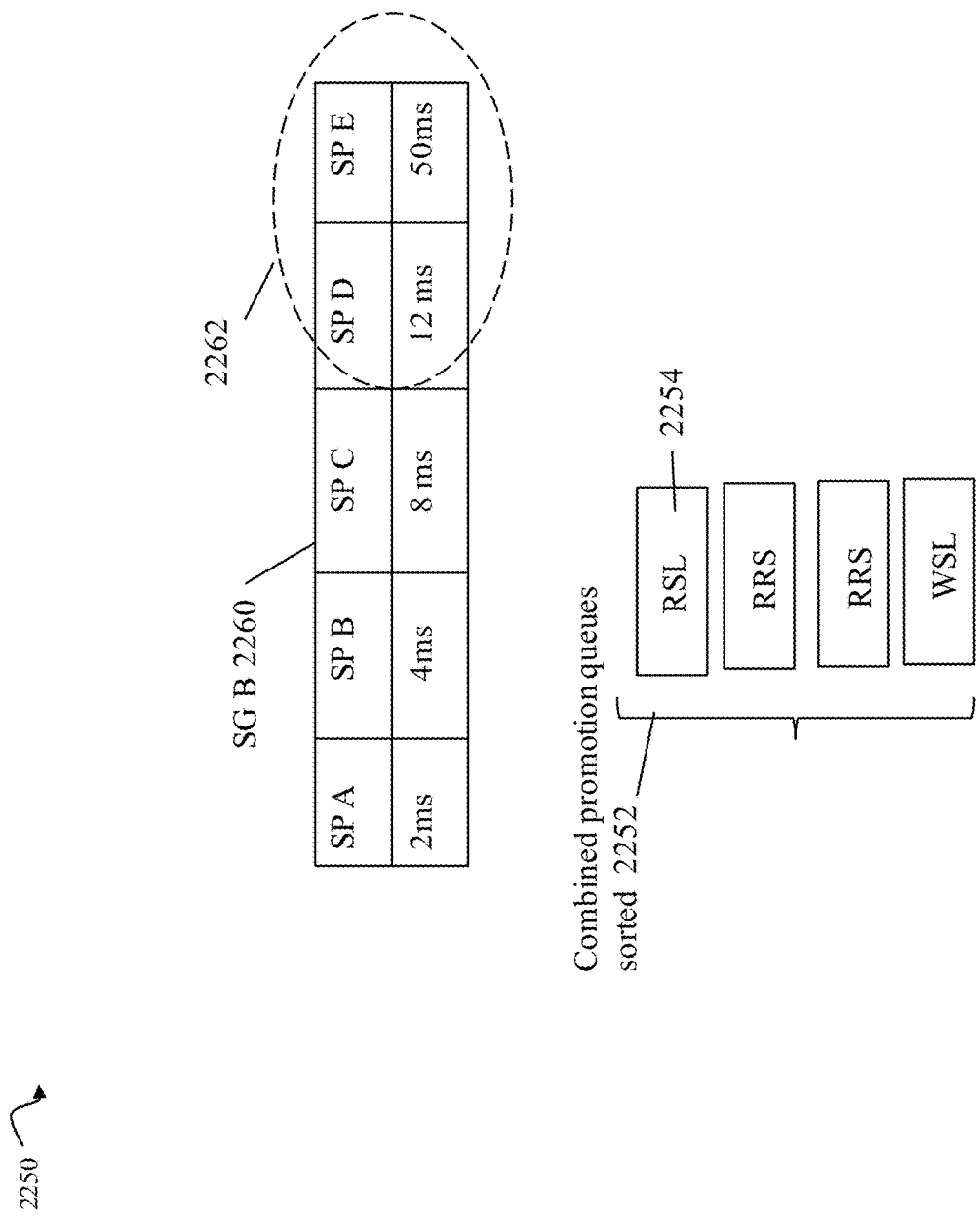
FIGS. 29 and 30 are examples illustrating use of I/O type in performing data movements in an embodiment in accordance with techniques herein.

Referring to FIG. 29, shown is an example illustrating use of I/O type in connection with using the promotion queues of an SG when the SG wants to acquire higher performance media to increase its performance such as described above in connection with FIG. 22. The example 2250 includes a set of SPs in 2260 having storage allocated therefrom for storing data portions of SG B. In 2260, there are 5 SPs denoted SP A-E and associated RT objectives as follows: SP A has a 2 ms RT objective, SP B has a 4 ms RT objective, SP C has an 8 ms RT objective, SP D has a 12 ms RT objective and SP E has a 50 ms RT objective.

The SG B may have an RT objective of 10 ms and a current observed average RT of 50 ms therefore the SG B wants to increase its performance. With 10 ms as the pivot point (the current SG RT objective), SPs D and E are selected as SPs having RT objectives higher than the pivot point. Thus, data portions from such SPs D and E may be considered as candidates for data movement from their current SP of D or E to another target SP that is any of SP A, B or C. Element 2252 may represent the combined or aggregate promotion queues of data portions for SPs D and E which are sorted in 2252 based on decreasing order of each data portion's IOPS or number of I/Os multiplied by the SP average observed RT. Thus, element 2254 represents the entry in the sorted list having the maximum such product of all entries on the list 2252. When selecting a target SP to move data portion 2254, the data portion's I/O type of RSL is considered. A comparison is made between the data portion's I/O type and the one or more preferred I/O types indicated for each SP that has available budget (in terms of I/Os or IOPS and also capacity). If such an SP has a preferred I/O type matching the I/O type of the data portion, that SP may be selected as the target SP over another SP that does not have a preferred I/O type that matches the data portion's I/O type. If there is no such SP having a preferred I/O type matching the I/O type of the data portion, then processing may proceed to the next entry in the list 2252. In this manner, the matching criteria may require that there be a match between the data portion's I/O type and the I/O type of the SP preferred for receiving a data portion.

An embodiment may further bias or weight selection of data portions for data movement to a higher performing media using different matching criteria. For example, an embodiment may specify a weighting of X:Y where X data portions may be selected from the sorted list 2252 using first criteria as described above requiring that there be a match between the data portion's I/O type and the I/O type of the SP preferred for receiving a data portion (e.g., target SP having a G rating for the I/O type matched such as indicated in FIG. 28), and the next Y data portions may be selected from the sorted list 2252 using second criteria requiring that the data portions have the highest product value of all data portions on the list 2252. The foregoing product value may be as described above which is the data portion's workload (e.g., IOPS or number of I/Os) multiplied by the SP average observed RT (where the RT used is of the source SP currently including the data portion being assessed). For example, an embodiment may select as a bias or weighting 2:1 or 10:1.

As noted above, to optimize for workload, an embodiment needs to determine what a given media type is good at. In one embodiment, the Z axis of the QOS Matrix may be sorted according to the lowest read response time and the each media type may be rated according to the read performance at the 8 different IO types. This ranking can be static based on some observations during drive qualification or can adapt over time based on the observed performance, or a combination of both. Similar processing may be performed regarding write response time. Either using the foregoing or some other technique for determining what one or more I/O types a given media type is good at, workload having a matching I/O type may be biased towards the media type. To accomplish this, the data portions for a given application may be divided based on the media they are located on and the IO type they represent. Data portions may be moved between media types in order to realize the performance goals for that media.

During a given sample interval the data portions are sorted according to the load they are driving to each media type. A pool of media will be given a performance goal based on expected read response time and will allow data to move in when below that expectation and force data out when above that expected response time. When data is being selected for movement into a media type, there is a sorted list of data portions that are possible movement candidates. The data portions selected for data movement will be biased based on the IO type using a ratio that is setup. The ratio may be based on the configuration and adapted over time based on the observed load.

The amount of bias may be based on the number of media types in the system. The more media types, the more each can be biased towards the ideal IO Types, since there will be other candidates to handle the less than ideal load. Generally, there may be one or more preferred I/O types for a particular SP or storage tier. The level of bias may be a function of the current load on the system as well as some margin for absorbing future load.

Figure 30:
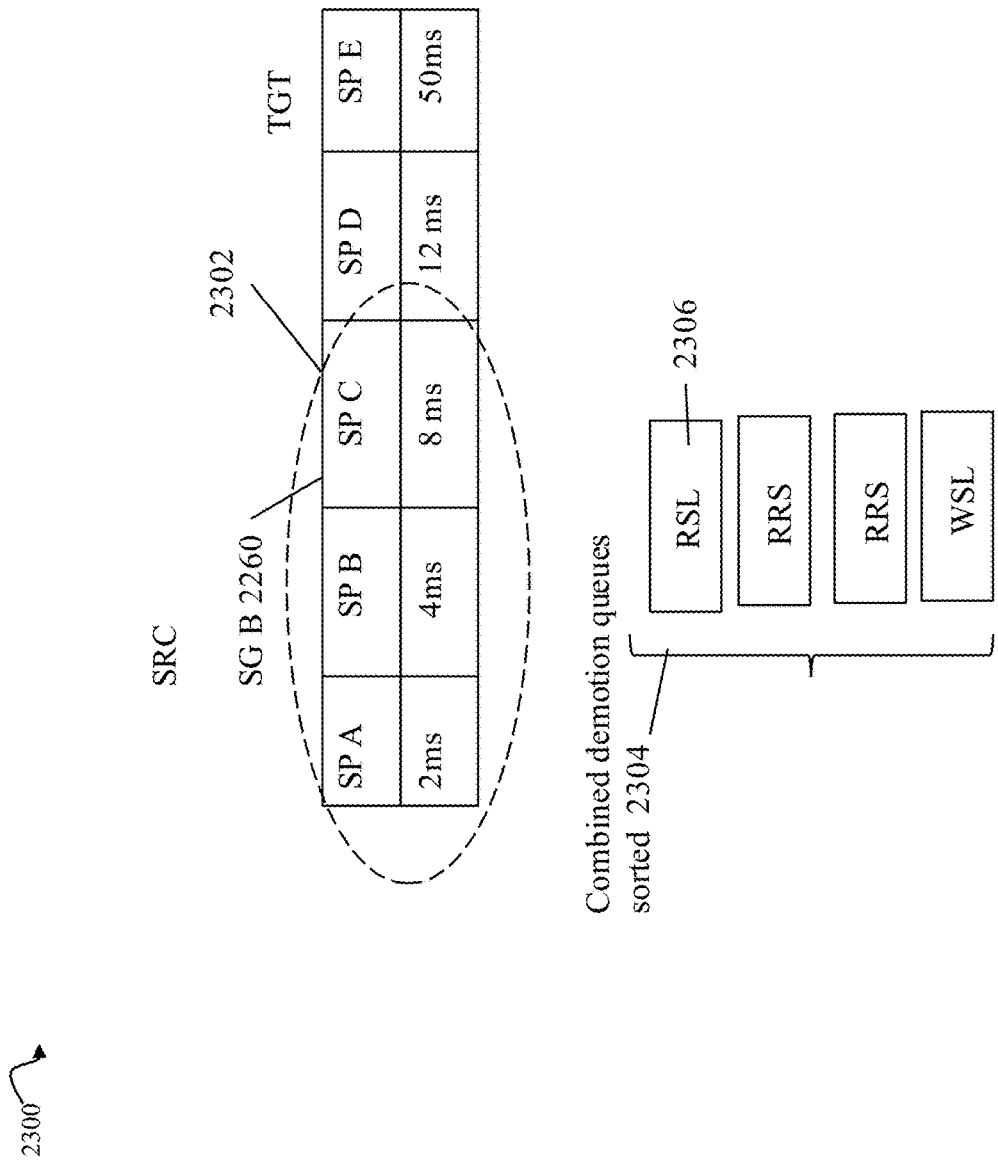

Referring to FIG. 30, shown is an example illustrating use of I/O type in connection with using the promotion queues of an SG when the SG wants to acquire lower performance media to decrease its performance such as described above. The example 2300 may include the same SPs and associated RT objectives in 2260 as in the example 2250. In this case, let SG B have an RT objective of 10 ms and an actual observed average RT of 4 ms. Consistent with description above, the pivot RT of 10 ms is used and workload may be removed from the source SPs, SPs A-C 2302, to any target SP, which can be SP D or SP E. Element 2304 may represent the combined demotion queues of SPs A-C sorted based on increasing order of workload or activity of the data portions. The data portion(s) of 2304 selected for data movement from a current SP to another SP (either SP D or E in this case) is based on whether the data portion has an I/O type which is indicated as preferred for data movement out of the current SP (e.g., a data portion stored in an SP where there is a match between the data portion's I/O type and the I/O type for the SP indicated as preferred for data movement (e.g., the SP has an X rating for the data portion's I/O type as in FIG. 28).

The target SP to which the selected data portion may be moved must have available budget and also the target SP's preferred I/O type should match the I/O type of the data portion (e.g., target SP having a G rating for the I/O type of the data portion to be moved as illustrated in FIG. 28).

Rather than consider data portions as ordered in the list 2304 and select for data movement a data portion of a current SP having an I/O type which matches the least preferred I/O type for the current SP (e.g., data portion's I/O type has an X rating for the current SP), an embodiment may rather just select the first entry or highest ranked data portion from 2304 and proceed to determine which of the possible target SPs D and E, if any has a G rating (preferred rating) matching the I/O type of the data portion.

When performing processing as described herein to reduce an SP's capacity due to an SP capacity violation or adjust (increase or decrease) an SP's workload to meet SP performance goals, I/O types of the data portions and SPs may be similarly considered and biasing using a ratio of different criteria may also be used. Generally, suitable data portions may be selected from a source SP for movement into a target SP based on the I/O type of the data portion, I/O type preferred for data portions moved out of the source SP, and I/O type preferred for data portions moved into the target SP. Biasing using a ratio or weighting (of different criteria to perform X number of movements using the I/O type matching between data portions and SP I/O type preferences and Y movements without using the I/O type matching criteria between data portions and SP I/O type preferences) may be used in connection with reducing an SP's capacity due to an SP capacity violation or adjusting (increase or decrease) an SP's workload to meet its performance goals.

Referring to FIG. 31, shown is a table summarizing what SPs may be considered as sources (S) and targets (T) in connection with data movements in an embodiment in accordance with techniques herein. The table of 2350 is based on an example as described in connection with the SPs A-E 2352 having corresponding RT objectives as denoted in 2354 consistent with description of FIG. 30. Additionally, assume SP C has a capacity limit violation and also that SP C's performance goals are not being met. As indicated by

2356, to correct the capacity limit violation, data portions may be moved from SP C to any of the other SPs as denoted by the T entries where such target (T) SPs have available capacity and workload budget. As indicated by 2358, to bring SP C's current performance into compliance with its performance goals, data portions may be moved from SP C to any of the other SPs as denoted by the T entries where such target (T) SPs have available capacity and workload budget.

Referring back to FIG. 29, FIG. 29 illustrated SG promotion where the SG wants to increase its performance and acquire higher performing media. Consistent with that as described in connection with FIG. 29 to illustrate which SPs may be sources (S) from which data portions are moved to SP targets (T), element 2360 of FIG. 31 represents that SP D and SP E may be source SPs from which data portions may be moved out of to one of 3 possible target SPs—SP A, B or C.

Referring back to FIG. 30, illustrated is SG demotion where the SG wants to decrease its performance and acquire lower performing media. Consistent with that as described in connection with FIG. 30 to illustrate which SPs may be sources (S) from which data portions are moved to SP targets (T), element 2362 of FIG. 31 represents that SPs A, B and C may be source SPs from which data portions may be moved out of to one of 2 possible target SPs—SP D or E.

With reference back to FIG. 12, description elsewhere herein refers to expected RT with respect to the supply side 1454 or resources, such as SPs of PDs. In connection with following description, such an expected RT with respect to SPs of PDs, or more generally supply side resources 1454, may also be referred to herein as a service level expectation (SLE).

Similarly, with reference back to FIG. 12, description elsewhere herein refers to expected level of service, such as a response time objective (RTO) with respect to the demand side 1458 or resource consumers, such as SGs of the applications. In connection with following description such an expected RTO with respect to SGs, or more generally consumers of resources on the demand size 1458, may also be referred to herein as a service level objective (SLO).

In an embodiment in accordance with techniques herein, different media types or technologies (e.g., flash or EFD, SAS or other 15K RPM rotating disk drive, SAS or other 10K RPM rotating disk drive) that are known may have an associated SLE denoting an expected level of performance for I/Os directed to PDs of a particular media type or technology. For example, as described herein, the SLE for an SLE class and its one or more media types may be an expected RT for I/Os directed to PDs of this particular SLE class. In this manner, one characteristic associated with a storage tier may be an SLE of the underlying physical storage devices. If two media types or technologies have the same SLE, they may both be included in the same SLE classification. Additionally, for PDs of the external data storage system whose media type and expected level of performance are unknown, performance information may be collected for the PDs using techniques herein where such information is used to establish an SLE for the PDs of the external data storage system.

In an embodiment in accordance with techniques herein, an SLO may be specified for one or more logical devices of a customer or tenant having data stored on the data storage system. In one embodiment in accordance with techniques herein, the data storage system may provide a multi-tenant (MT) environment whereby multiple tenants, or customers, store their data on the data storage system. In such an exemplary MT environment, a different service level objective or SLO may be specified for each tenant that defines a guaranteed performance level or performance goal for the tenant. For example, an SLO may be related to a guaranteed level of performance with respect to I/O operations serviced at the data storage system for the tenant. In this case, the SLO specified for the tenant may be expressed in terms of one or more metrics, such as based on response time (RT). For example, the SLO specified for the tenant may include an average response time (RT) with respect to I/Os issued by the tenant. To further illustrate, an SLO may specify an average RT of 3 ms for the tenant whereby the tenant is guaranteed to have an average RT of 3 ms for each LUN storing the tenant's data. The tenant may also be referred to as a customer or consumer of the data storage system having its data stored on the data storage system. A single tenant or customer may be, for example, one or more applications executing on a host. A single host may have one or more tenants or customers where each of the tenants or customers includes one or more applications. For simplicity of illustration, following examples may refer to a single application on a host as a tenant or customer for which an SLO is specified where the SLO may be applied to each LUN used by the application. However, it will be appreciated by those skilled in the art that an SLO, such as RT, specified for a single tenant or customer may be applied in the aggregate with respect to multiple applications and associated LUNs of the single tenant or customer.

The SLO may include an RT denoting a guaranteed level of performance as measured on the data storage system where the RT denotes an average RT per LUN. For example, the SLO may specify an RT for an application's LUNs. The application may be a database application and the SLO may specify a RT to be guaranteed for each of the LUNs used the application. The SLO may be met or maintained if the observed average RT over some time period is less than (or equal to or less than) the RTO of the SLO for each individual logical device (e.g., LUN that is a thin device, thick device or regular LUN, etc.) of the customer. The observed average RT may be determined with respect to front end or host I/O operations directed to the logical device.

The SLO may be associated with a general level of service purchased by the customer. For example, in one embodiment, a data storage customer or tenant may purchase one of five defined performance level plans: diamond, platinum, gold, silver and bronze. The foregoing listing may denote an order from highest to lowest service plan level. In such an embodiment the highest ranked service plan level of diamond may have the most stringent or highest performance objective of all service plans. In contrast, the lowest ranked service plan level of bronze may have the lowest performance objective of all service plans. For example, the diamond service plan may have an SLO that is an average RT=2 ms with respect to all I/Os of all LUNs of the customer, and the bronze service plan may have an SLO that at is an average RT=15 ms with respect to all I/Os of all LUNs or other logical devices of the customer. It should be noted that generally an embodiment may include any number of service levels and plans.

In one embodiment in accordance with techniques herein as described in more detail below, the SLO associated with a thin or virtually provisioned logical device may be used to select the physical storage location for the first or initial storage allocation. As described herein, a portion of physical storage for a thin device portion, such as a chunk, may be allocated upon the first or initial write to a logical address associated with that chunk of the thin device's logical address space. Thus, a specified SLO for a thin device may be used to select a storage tier for initial physical storage allocation to store write data for the thin device. As described herein, each storage tier may have physical storage devices of a particular media type. Additionally, in an embodiment in accordance with techniques herein, each storage tier may include such physical storage devices of a media type or technology (e.g., EFD, 10K RPM, 15K RPM, 7.2K RPM) configured in a RAID group having an associated RAID protection type or level and configuration. Thus, physical storage location (of a storage tier) such as may be allocated in a multi-tiered storage environment may be characterized as having a first dimension denoting the media type or technology of the PDs in the storage tier and a second dimension denoting the RAID type or level (e.g., RAID-1, RAID-5, RAID-6) and configuration (e.g., of the RAID group such as RAID-5 with 3×1 (3 data drives and 1 parity drive) or 7×1 (7 data drives and 1 parity drive).

As an example of an embodiment illustrating techniques herein, consider an embodiment which supports RAID-1, RAID-5 (3×1), and RAID-6 groups and where the PDs in a configured RAID group may include PDs of any of the following media types or technologies: EFD, 15K RPM rotating disk drives 10K RPM rotating disk drives, and 7.2 K RPM rotating disk drives. In such an embodiment, each of the possible 4 media types may have an associated expected level of performance such as expected average RT (e.g., that may be determined based on modeling, performance testing, specifications provided by manufacturer or provider of PDs of different RPMs, and the like). The foregoing 4 media types or technologies may have an associated performance ranking, from highest performance ranking to lowest performance ranking, of EFD, 15K RPM, 10K RPM, 7.2K RPM. Additionally the following may be expected average RTs for each of the media types: EFD=2 ms RT, 15K RPM=8-12 ms RT, 10K RPM=12-15 ms RT, and 7.2K RPM 20+ms RT. Additionally, each of the possible RAID group types and configurations may have an associated ranking, from lowest write penalty cost to highest write penalty cost, of RAID-1, RAID-5 3×1, and RAID-6.

In connection with techniques herein, when initially allocating physical storage for a thin device chunk responsive to a first write to a logical address in that thin device chunk, physical storage may be allocated from a storage tier having an associated media type or technology with an expected level of performance that most closely matches an SLO specified for the thin device. For example, consider a data storage system for which a customer may purchase one of the following service plan levels: diamond, platinum, gold, silver and bronze, as described elsewhere herein. A first customer may purchase the diamond service plan level with an SLO that is an RTO of 2 ms. and the first customer may have an application storing its data on a thin device. When allocating storage responsive to a first write to a logical address of the thin device, physical storage may be allocated from a storage tier having physical storage devices of a media type with an expected RT that is closest to the RTO=2 ms of the SLO for the first customer. Thus storage may be allocated from a storage tier including EFDs (EFD expected RT=2 ms and customer's SLO=2 ms). In an embodiment in which there are multiple RAID group types and configurations of EFDs, selection may be made based on a further ranking of all such EFD configured RAID groups. The ranking of the EFD RAID groups may be based on write penalty, from lowest to highest write penalty. For example, assume there are 3 RAID groups of EFDs ranked from lowest to highest write penalty as follows: a RAID-1 group of EFDs, a RAID-5 group of EFDs and a RAID-6 group of EFDs. Selection of a RAID group for storage allocation for a first write to a logical address of a thin device may be made for the first customer having the diamond service plan from a RAID group of EFDs having available physical storage with the least write penalty. For example, storage may be allocated from the RAID-1 EFD group if it has available capacity. If there is no available capacity in the RAID-1 EFD group (or if there is no RAID-1 EFD group), storage may be allocated from the RAID-5 EFD group if it has available capacity. If there is no available capacity in the RAID-5 EFD group (or if there is no RAID-5 EFD group), storage may be allocated from the RAID-6 EFD group if it has available capacity. If there is no available capacity in the RAID-6 EFD group (or if there is no RAID-6 EFD group), storage may be allocated using another default technique such as described below. In this manner, an embodiment in accordance with techniques herein may allocate new storage in response to a first write to a thin device logical address where the new storage allocation is made from a PD selected in accordance with the SLO associated with the thin device. In such an embodiment, the PD may be of a particular media type or technology having an expected performance, such as RT, that is a closest match of all available media types in the system to the SLO of the thin device. In a similar manner, storage may be allocated for a thin device having an SLO as may be specified based on any one of the different service plan levels in an embodiment in accordance with techniques herein.

Figure 32:
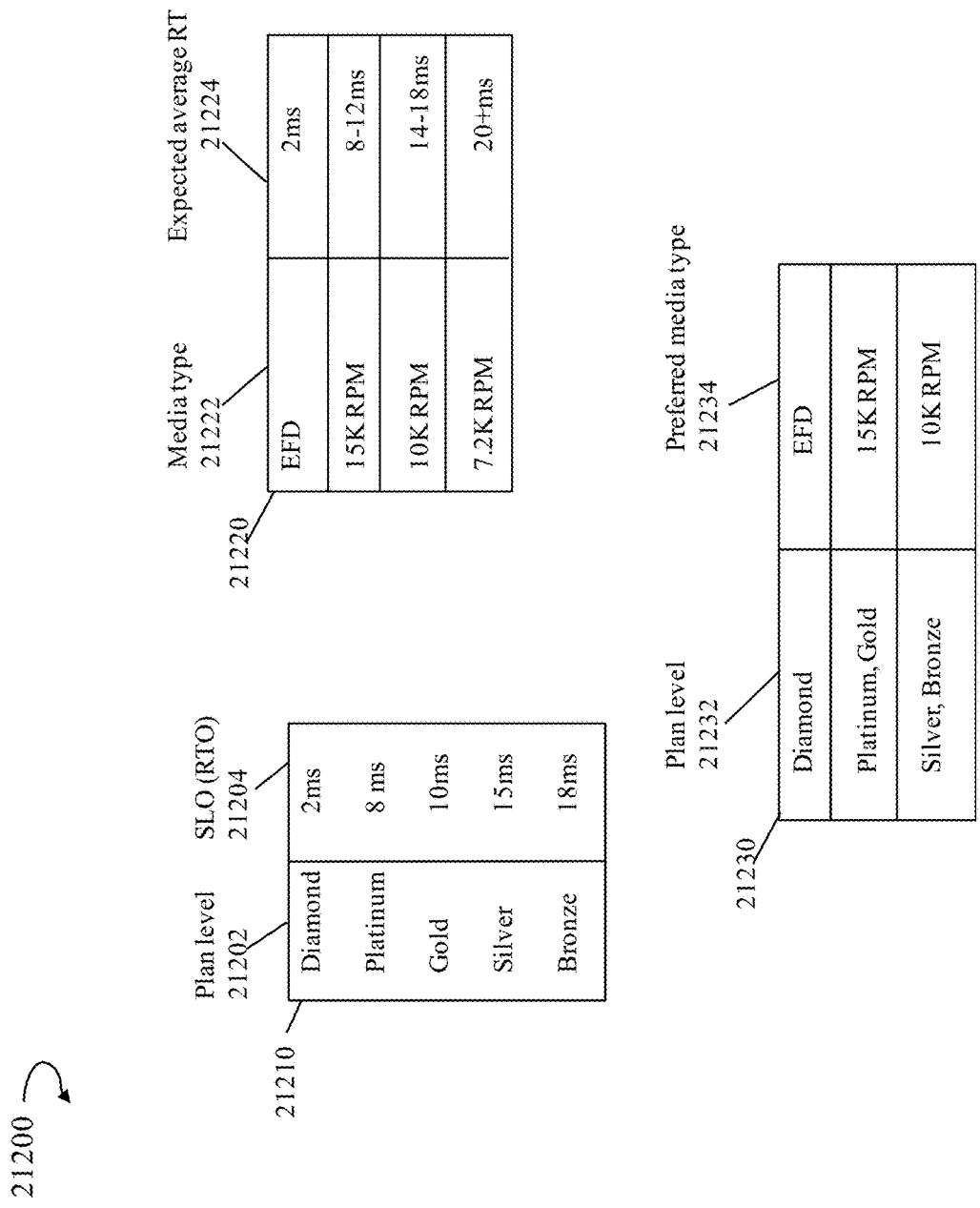
FIG. 32 is an example illustrating service level objectives and media types that may be used in an embodiment in accordance with techniques herein.

Referring to FIG. 32, shown is an example of tables including service plan levels, SLOs and preferred media types that may be used in an embodiment in accordance with techniques herein. In the example 21200, table 21210 may specify service plan levels 21202 and associated SLOs 21204 that may be used in an embodiment in accordance with techniques herein. The table 21210 summarizes the 5 different service plan levels described above from which a customer may select in connection with specifying a service level agreement, for example, with a provider providing data storage in a data storage system. In the table 21210, the diamond service plan has an associated SLO as an RTO of 2 ms for each LUN of the customer, the platinum service plan has an associated SLO as an RTO of 8 ms for each LUN of the customer, the gold service plan has an associated SLO as an RTO of 10 ms for each LUN of the customer, the silver service plan has an associated SLO as an RTO of 15 ms for each LUN of the customer, and the bronze service plan has an associated SLO as an RTO of 18 ms for each LUN of the customer. It should be noted that the SLO RTO specified in table 21210 may refer to an average RT for a host I/O.

Table 21220 summarizes expected performance in terms of average RT 21224 for an I/O directed to a PD for the particular media types 21222. Thus, table 21220 generally lists average RTs with respect to backend physical device I/O operations. For example, table 21220 indicates an average RT of 2 ms for I/Os directed to an EFD, an average RT in the range of 8-12 ms for a 15K RPM rotating disk drive, an average RT in the range of 14-18 ms for a 10K RPM rotating disk drive and an average RT of 20 ms or more for a 7.2K RPM rotating disk drive.

Table 21230 lists the plan levels 21232 and the preferred media types 21234 based on the tables 21210 and 21220. The diamond plan has an RTO of 2 ms as in table 21210 which maps to EFD indicated in table 21220 which has a matching RT of 2 ms. The platinum plan has an RTO of 8 ms as in table 21210 which maps to a 15K RPM drive indicated in table 21220 which has a matching RT in the range of 8-12 ms. The gold plan has an RTO of 10 ms as in table 21210 which maps to a 15K RPM drive indicated in table 21220 which has a matching RT in the range of 8-12 ms. The silver plan has an RTO of 15 ms as in table 21210 which maps to a 10K RPM drive indicated in table 21220 which has a matching RT in the range of 14-18 ms. The bronze plan has an RTO of 18 ms as in table 21210 which maps to a 10K RPM drive indicated in table 21220 which has a matching RT in the range of 14-18 ms.

The foregoing table 21230 may indicate a preferred media type selected for the initial allocation of storage of a thin device chunk in response to a first write to a logical address of the thin device chunk. In an embodiment in which there are multiple RAID group types or protection levels (and associated configurations) for the single preferred media type, one of the multiple RAID group types and associated configuration is selected based on a ranking of such RAID group types from lowest or minimum write penalty (per host I/O) to maximum write penalty (per host I/O), as described above. For example, if there are 3 RAID types or levels as described above for a single media type, the storage may be allocated from one of a RAID-1 group, a RAID-5 group or a RAID-6 group. The foregoing ordering also lists the RAID group type ranking, from minimum to maximum, in terms of write penalty of a single host I/O associated with each type. Thus, the physical storage may be allocated from the RAID group having the RAID type or level and associated configuration which has available storage and the least write penalty.

Criteria for determining a best match between a thin device SLO and one of the media types may vary. For example, one embodiment may select the media type having an expected level of performance, such as expected average RT for I/Os, that is closest to the SLO RT but not less than the SLO RT.

In the event that there is no available storage for allocation based on the preferred media type determined based on SLO, a default technique may be used to select a storage tier from which to allocate the storage for the newly allocated thin device chunk. In one embodiment in accordance with techniques herein, selection may be made from a storage tier based on a predefined ranking determined in accordance with media type or technology and RAID type or protection level such as illustrated in FIG. 33.

Referring to FIG. 33, shown is a table 21300 representing the default allocation ranking preference or ordering from most to least preferred when allocating storage for a first write to a thin device. The ranking may be based on factors including RAID type and configuration and media type or technology. Media type or technology may consider the underlying physical storage media characteristics and expected performance capabilities of such a PD based on, for example, whether the PD is a rotating disk drive or solid state storage, if the PD is a rotating drive, what is the RPM, and the like. Additionally, the foregoing ranking takes into consideration the RAID type and configuration ranking described above based on host I/O write penalties of the different RAID types and configurations. The ranking in table 21300 may take into account factors including physical device performance capability that may vary with media type, RAID type and configuration write penalty, cost per unit of storage (e.g. cost per GB), amount or storage capacity of different media types in the system, and any media wear out. For example, flash-based media experiences wear out based on the number of writes performed. Within a lifetime or usage period, the amount of writes that each type of flash, such as MLC or SLC, may be expected to successfully sustain varies. For example, with SLC, one bit of information or data is stored per cell and may be the simplest of all flash types. Due to having only one bit per cell, it may therefore be the longest lasting of the flash types in an embodiment in accordance with techniques herein. In contrast, for example, with MLC, multiple bits of information are stored per cell and wear rate during write operations is greater than with SLC. Thus, during a usage or lifetime period, an SLC device is expected to be able to have a larger number of allowable writes than an MLC device. In this manner, the SLC device may be characterized as a type of flash having a higher write endurance than the MLC device. Furthermore, the SLC device may be generally included in first write endurance classification associated with a first level of write endurance and the MLC device may be generally included in a second write endurance classification associated with a second different level of write endurance. Thus, EFD is a media type that experiences wear out based on the amount of writes to that particular EFD. In this manner, an embodiment in accordance with techniques may consider write endurance or wear out as a factor when determining the ranking of table 21300.

In one embodiment in accordance with techniques herein, the media types may include flash/EFD, 15K RPM rotating disk drives, 10K RPM rotating disk drives and 7.2 K RPM rotating disk drives. Additionally, the embodiment may include RAID type and configurations of RAID-1, RAID-5, and RAID-6. In table 21300 for such an embodiment, column 21302 lists the different media types and columns 21304, 21306 and 21308 list the 3 different RAID types and configurations. Thus table 21300 has 12 cells or entries each denoting a different combination of media type and RAID type and configuration. The ranking for the 12 entries denoting the different possible combinations of media type and RAID type and configuration may be from 1 to 12 with 1 being the highest ranked or most preferred storage tier from which to initially allocate storage for the thin device chunk, and 12 being the lowest ranked or least preferred storage tier from which to initially allocate storage for the thin device chunk.

Due to factors such as wear out and cost/GB of EFD (e.g., media type), it may be desirable to establish a default ranking as in table 21300 in which EFD is ranked below other media types such as one or more fast rotating disk drive media types of 15K and 10K RPM. Additionally, it may be desirable to have the default ranking consider as primary criteria the media type characteristics (e.g., performance, wear out, cost/GB) and as secondary criterion the write performance penalty associated with different RAID types and configurations. Thus, the ranking may use the write performance penalty to rank different RAID types and configurations of the same media type. The default ranking may also place one or more of the slowest performance capability media types, such as 7.2K RPM, in the last or lowest positions in the ranking.

Based on the foregoing, table 21300 lists an example of a default ranking for allocation based on a combination of media type and RAID type and configuration as follows, from highest rank to lowest rank: $1^{st}$ is 15K RPM RAID-1, $2^{nd}$ is 10K RPM, RAID-1, $3^{rd}$ is EFD RAID-1, $4^{th}$ is 15K RPM RAID-5, $5^{th}$ is 10K RPM, RAID-5, $6^{th}$ is EFD RAID-5, $7^{th}$ is 15K RPM RAID-6, $8^{th}$ is 10K RPM RAID-6, $9^{th}$ is EFD RAID-6, $10^{th}$ is 7.2K RPM RAID-1, $11^{th}$ is 7.2K RPM RAID-5 and $12^{th}$ is 7.2K RPM RAID-6.

The ranking table in 21300 may be used by default when there is no SLO associated with a thin LUN when initially allocating storage for a thin LUN chunk responsive to a first write to a logical address of the chunk, or when there is no physical storage available in a storage tier including PDs of the preferred media type having an expected performance that most closely matches the SLO for the thin LUN.

Thus, responsive to first write to a thin LUN chunk, physical storage is allocated for the chunk. In an embodiment in accordance with techniques herein, techniques as described in connection with FIG. 32 may first be performed to allocate storage from a tier including PDs of the preferred media type for the thin LUN if the thin LUN has an associated SLO such as an RTO. If the thin LUN does not have an associated SLO or otherwise if there is no available storage capacity on a PD of the preferred media type for the thin LUN, a default technique may be used, such as allocation from a storage tier based on the default ranking of table 21300.

When allocating storage for first storing data of a first write to a thin LUN chunk using the default ranking of table 21300, storage may be allocated from the tier which matches the highest ranking and which has available storage capacity for allocation. An embodiment may establish allocation limits based on various allocation policies and any allocation may be in accordance with any existing allocation limits. For example, an embodiment may want to keep a minimum threshold percentage or amount of unused storage capacity of one or more media types so that no further storage may be allocated from a media type once that threshold is reached. In this case, when selecting a storage tier for allocation based on either the preferred media type determined using a thin LUN SLO or otherwise using the default table 21300, if a first storage tier of a first media type is at an associated allocation limit, storage may be allocated from a different tier having a different media type. Using the table 21300, storage may be allocated from the tier having available storage capacity and which has the highest ranking in table 21300 based on the combination of media type and RAID type and configuration.

Once storage has been allocated for a chunk of a thin LUN, processing may be performed to gather performance data about the chunk such as related to I/O workload directed to the chunk. In one embodiment as described herein, statistics such as related to I/O workload may be collected per extent based on all the I/O workload of all chunks in that extent. Alternatively, an embodiment may store I/O workload information at smaller or finer levels of granularity such as per subextent, per chunk, or some other level of suitable granularity.

For purposes of illustration, following paragraphs may refer to one embodiment in accordance with techniques herein where I/O workload information is collected per extent, storage for thin LUNs is allocated per chunk and data movement optimizations may move data portions the size of a single subextent or per chunk between storage tiers.

Thus, although workload information is tracked at the extent level for each TD extent, more specifically, an embodiment in accordance with techniques herein may track workload information at the extent level for the particular chunks of each TD extent having storage allocated in that extent.

Consider the following to illustrate. For example, consider a first thin device TD1 with a first logical address space where storage is allocated for a first chunk C1 in a first extent E1 of TD1 where E1 has a corresponding first logical address subrange of TD1's first logical address space. C1 may also correspond to a second subrange of logical address(es) within the first logical address subrange. Data for C1 may be stored on a first physical storage portion of a PD where the first physical storage portion is mapped to the second subrange of logical address(es) for C1 of TD1 (e.g., such as via an allocation map as described above and illustrated in FIG. 8B). Assume, currently, that C1 is the only chunk of E1 for which physical storage has been allocated (e.g., storage has not been allocated for any other chunk in E1 of TD1's logical address space so that no other chunk in E1 is mapped to physical storage per TD1's allocation map). In this case, the workload information tracked for E1 of TD1 includes only information for C1. At a later point in time, assume a second chunk C2 within E1 of TD1 has physical storage allocated so that both C1 and C2 of E1 of TD1 now have physical storage allocated. Subsequent to this later point in time, the workload information for E1 of TD1 may reflect I/Os directed collectively to both C1 and C2.

Thus, an embodiment may track the I/O workload at an extent-level/per extent where each such extent corresponds to a subrange of logical address space of a single TD (thin device) based on I/Os that are directed to any logical address in the logical address subrange for that extent.

For a thin LUN chunk, subsequent to the initial allocation of storage and placement of write data in the initially allocated physical storage, processing may be performed in an ongoing manner to periodically assess whether there is a need to relocate or move data portions among storage tiers having different PDs of different media types and associated RAID types and configurations. In one embodiment in accordance with techniques herein, the assessment or determination as to whether a data portion currently stored on a PD of a storage tier should be relocated may be made based on one or more movement criteria including a RAID type and configuration of the storage tier where the data portion is currently stored, a media type of the PDs of the storage tier where the data portion is currently stored, and current I/O workload characteristics of the data portion. The I/O workload characteristics may include a write probability and a current I/O workload density such as based on I/O volume or quantity (e.g., number of I/Os directed to a data portion) per unit of storage (e.g., per GB), or based on I/O throughput or I/O rate such as I/Os per second (IOPS) per unit of storage (e.g., per GB).

As described herein, in one embodiment, the statistics of write probability and I/O workload density characterizing the I/O workload may be collected per extent. In a single extent of a thin LUN, not all chunks in the extent may be currently allocated. In such an embodiment, the I/O workload density for the extent may be a ratio of the IOPS directed to any logical address in the extent to the size or storage capacity of the allocated chunks. More formally, I/O workload density, also referred to herein as I/O density, for an extent based on IOPS may be represented as:

$$\text{I/O density} = \text{IOPS/total capacity of allocated chunks} \quad \text{EQUATION 1}$$

wherein

I/O density is the calculated I/O workload density for the extent;

IOPS represents the I/O rate, such as I/Os per second, directed to any logical address of thin device range associated with the extent; and total capacity of allocated chunks represents the size or total amount of allocated storage for allocated chunks in the extent. For example, if the extent includes N chunks and only 2 are allocated, the total capacity of allocated chunks may be expressed as the mathematical product of 2*size of one chunk.

Since the size of read and write I/Os may vary, the write probability may account for both the number or rate of reads and writes as well as the average size of read I/Os and average size of write I/Os. The write probability for a data portion, such as an extent, is the probability of doing a write based on the following for host or front end I/Os:

$$\text{Write probability} = \frac{\text{Total data written}}{(\text{Total data read} + \text{Total data written})} \quad \text{EQUATION 2}$$

where

Total data written is the total quantity or amount of data written; and

Total data read is the total quantity or amount of data written.

The write probability determined using EQUATION 2 is a value between 0 and 100%, inclusively.

The Total data written may be calculated as in EQUATION 3 below:

Total data written=write rate (e.g., write I/Os per second)*average size of write The Total data read may be calculated as in EQUATION 4 below:

Total data read=read rate (e.g., read I/Os per second) *average size of read

In one embodiment, for an extent having one or more chunks of storage thereof allocated, processing may be performed to select a preferred media type for the extent based on the extent's I/O density such as may be determined using EQUATION 1. For the extent, a selection of a preferred RAID type and configuration may be made from those currently configured in an embodiment based on the extent's write density as may be determined using EQUATION 2. A preferred storage tier may be determined as one having PDs of the preferred media type and one having a preferred RAID type and configuration. Further processing may then be performed to move one or more chunks of the extent to the preferred storage tier (if such one or more chunks are not already in PDs of the preferred storage tier). This is described in more detail below.

Generally, the higher performance media types may be preferred for storing data having the highest I/O workload such as may be expressed as having the highest I/O density in an embodiment in accordance with techniques herein. As an alternative, an embodiment may use I/O rate for a data portion, such as an extent, to denote the workload directed to the data portion. As yet another alternative, an embodiment may use another suitable metric to denote the I/O workload of a data portion, such as an extent. Thus, for example, consider an embodiment as described above with 4 media types as in FIG. 33 having an associated performance ranking from highest to lowest of EFD, 15 RPM K, 10K RPM and 7.2K RPM. Data portions may be preferred for different media types depending on the I/O workload of each of the different data portions, such as each extent. The data portions having the highest I/O workload ("hottest") of all existing data portions may be stored in the highest performance media type such as EFD. Data portions having lower I/O workloads may accordingly be preferred for lower ranked performance storage. In an embodiment using the I/O density as in EQUATION 1, those data portions having the highest I/O density may be preferred for the highest performance ranked media type.

Furthermore, different RAID type and configurations may be preferred for different read/write mixtures or, more generally, depending on whether the data portion has a read heavy I/O workload (e.g., more reads than writes) or write heavy I/O workload (e.g., more writes than reads). RAID-1 groups may be preferred for write heavy workload, and RAID-6 groups may be preferred for read heavy workloads based on the relative write performance penalties as described elsewhere herein for different RAID types and configurations. In one embodiment in accordance with techniques herein, determining whether workload of a data portion, such as an extent, is write heavy may use the write probability as may be determined using EQUATION 2 above. In other words, the higher the write probability of an extent as may be determined using EQUATION 2, the greater the write workload or higher the mixture of writes vs. reads for the extent. Thus, in an embodiment in accordance with techniques herein, a preferred RAID type and configuration for a data portion, such as an extent, may be determined based on the write probability of the data portion. Data portions having the highest write probability may be stored in storage tiers having a RAID-1 type and configuration. In contrast, data portions having the lowest write probability (thereby indicating the data portions as the most read heavy) may be stored in storage tiers having a RAID-6 type and configuration.

Figure 34:
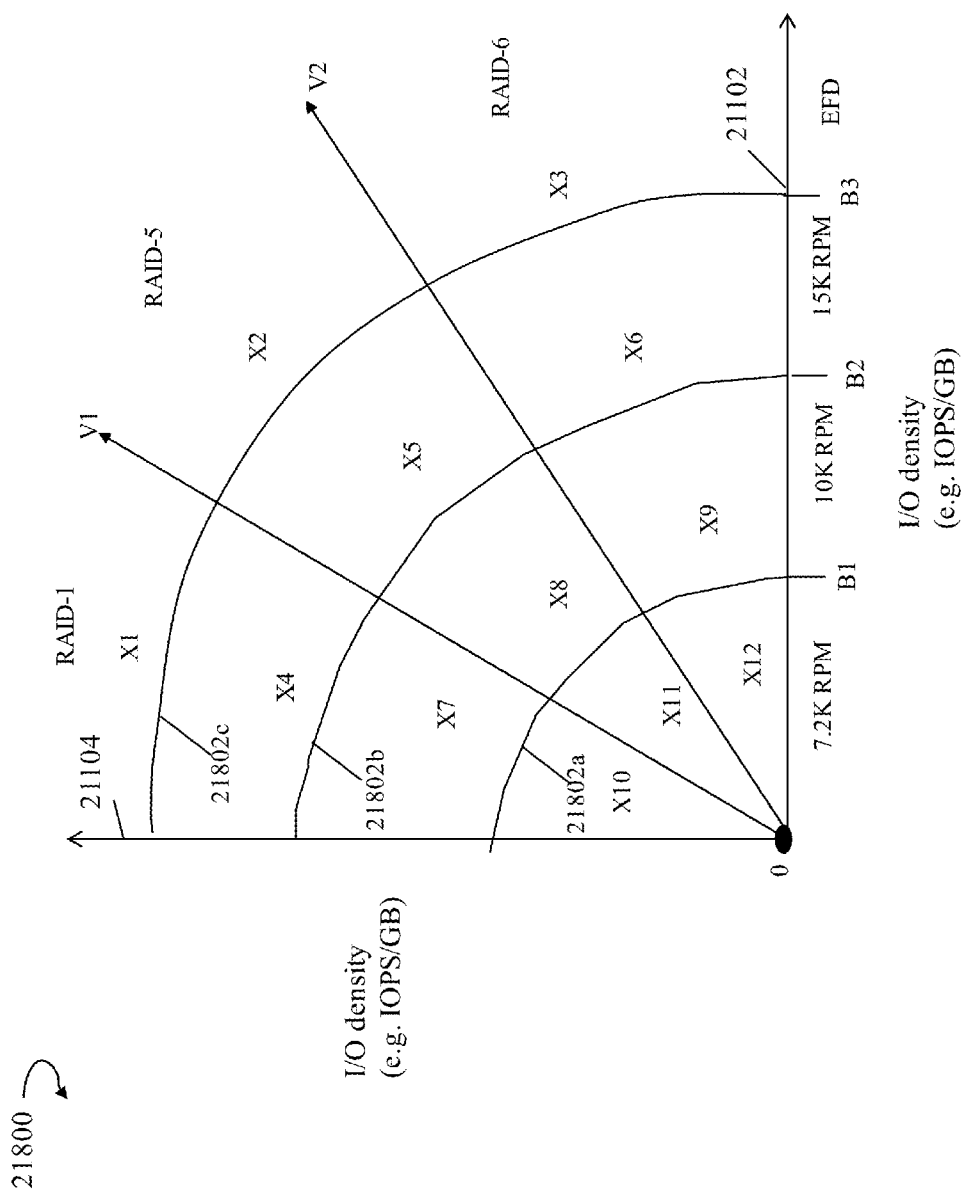
FIGS. 34 and 35 are examples illustrating selecting a particular RAID level and media type based on I/O density and write probability that may be used in an embodiment in accordance with techniques herein.

Referring to FIG. 34, shown is an example illustrating I/O workload characteristics of varying values of I/O density and write probability which may be preferred for different storage tiers having PDs of a particular media type configured into RAID group(s) having a particular RAID-type and configuration. An I/O workload may have a write probability that ranges from all writes or write probability of 100% to all reads or read probability of 100%. The quarter pie graph of 21800 is generally divided into 3 "pie slice" partitions based on radial lines V1 and V2 drawn from the center point 0. In this example, there are 3 RAID group types and configurations so the graph 21800 may be divided into 3 partitions for the number of RAID group types and configurations. In one embodiment, these 3 partitions may be approximately equal each denoting approximately a same amount or portion size of the write probability range 0-100%. In one embodiment, the partition associated with RAID-1 is denoted by portions X1, X4, X7 and X10, the partition associated with RAID-5 is denoted by portions X2, X5, X8 and X11 and the partition associated with RAID-6 is denoted by X3, X6, X9 and X12. Generally, the graph may be divided into N partitions where N denotes the number of different RAID types and configurations in an embodiment.

Additionally, the quarter pie graph is generally divided into 4 arc partitions or circumferential bands partitioned by arcs B1 21802a, B2 21802b and B3 21802c. In this example, there are 4 media types so the graph 21800 may be divided into 4 arc partitions based on arcs B1, B2, and B3. Generally, the graph may be divided into M arc partitions where M denotes the number of different media types in an embodiment. In one embodiment, the arc partition associated with 7.2K RPM is denoted by portions X10, X11 and X12, the arc partition associated with 10K RPM is denoted by portions X7, X8 and X9, the arc partition associated with 15K RPM is denoted by portions X4, X5 and X6, and the arc partition associated with EFD is denoted by X1, X2 and X3.

Each of the arcs or curves 21802a-c may generally represent read write mixtures or read/write ratios of I/O workloads ranging from a first mixture or ratio denoted by 21102 to a second mixture or ratio denoting by 21104. In an embodiment described herein using the write probability metric of EQUATION 2, each of the arcs or curves 21802a-c may represent write probabilities of I/O workloads ranging from a 0% write probability (e.g., all read workload) denoted by 21102 to a 100% write probability (e.g., all writes workload) denoted by 21104. As illustrated, each point at which the X axis 21102 intersects one of the curves 21802a-c may denote a point on the intersecting curve for 0% write probability. Each point at which the Y axis 21104 intersects one of the curves 21802a-c may denote a point on the intersecting curve for 100% write probability. Points on the curves 21802a-c between 21102 and 21104 may represent a write probability of a workload between 0 and 100%. In one embodiment, line V2 may denote approximately 33% write probability and line V1 may denote approximately 67% write probability. It should be noted that the particular boundaries or partitioning of the full range of write probabilities among the three pie slice partitions associated with the three RAID types of RAID-1, RAID-5 and RAID-6 may vary with embodiment. For example, some embodiments may overlap the write probability boundaries associated with two or more adjacently ranked RAID groups. As illustrated, the highest write probability space (X1, X4, X7 and X10) is mapped to the RAID-1 type and the lowest write probability space (X3, X6, X9 and X12) is mapped to the RAID-6 type. Additionally, although the example 21800 shows the range of write probabilities as being partitioned in approximately equal parts or pie slices between the different RAID types and configurations, an embodiment may map any suitable portion of the range of write probabilities to each RAID type and configuration.

Generally, movement along a radial line drawn from point 0 may denote an I/O density. As the I/O density increases, the distance from the point 0 increases. In one embodiment, the radial distance of a line drawn from the center point 0 may be associated with a range of I/O densities. Each such radial line drawn from the center point 0, such as V1, V2, 21102 and 21104, may be divided into subranges where each subrange of I/O densities may be mapped or associated with a particular preferred media type. For example, I/O densities in the subrange from 0-B1 may be preferred for 7.2K RPM, I/O densities in the subrange B1-B2 may be preferred for 10K RPM, I/O densities in the subrange B2-B3 may be preferred for 15K RPM, and I/O densities greater than B3 may be preferred for EFD. Values selected for B1, B2 and B3 may generally be any suitable boundary values. In one embodiment in accordance with techniques herein, the I/O density range may be divided into 4 non-overlapping contiguous subranges which may or may not be the same size. The size of each subrange may vary, for example, with the storage capacity of each media type.

In some embodiments in accordance with techniques herein, the representation of graph 21800 may logically represent a preferred matching of I/O workload characteristics based on write probability and I/O density (e.g., based on the amount, volume or rate of I/Os) to storage tier characteristics of media type and RAID type and configuration. Such a representation of graph 21800 is consistent with description elsewhere herein based on order of priority, preference, or bias for storing data having an I/O workload that is predominantly reads (e.g., low write probability) in RAID-6 groups and predominantly writes (e.g., high write probability) in RAID-1 groups. Similarly, the representation of graph 21800 indicates the priority, preference or bias of storing data with a large or heavy I/O workload (e.g., high I/O density) in higher performance media types and a low I/O workload (e.g., low I/O density) in lower performance media types. In such an embodiment, those data portions having the highest write probability may be stored in those storage tiers preferred or most suitable for writes such as those having RAID-1 configuration, and those data portions having the lowest write probability may be stored in those storage tiers preferred or most suitable for reads such as those having RAID-6 configuration. In such an embodiment, those data portions having the highest or heaviest I/O workload may be stored in those storage tiers preferred or most suitable for a heavy workload such as those having EFD media type, and those data portions having the lowest I/O workload may be stored in those storage tiers preferred or most suitable for a low workload such as those having the 7.2K RPM media type.

The example graph 21800 represents a partitioning of the vector space denoted by the combination of I/O density values and write probability values into 12 partitions. Each of the 12 partitions represents one of the twelve possible combinations of media type and RAID type and configuration in an embodiment. Each of the 12 partitions may be associated with a particular subrange of possible I/O density values and a particular subrange of write probability values used to identify I/O workload characteristics of data portions preferred for the particular combination of media type and RAID type of that partition.

Based on the representation of FIG. 34, a preferred media type and preferred RAID type and configuration may be determined for a data portion having an I/O density and a write probability. For example, if a data portion, such as an extent, has a write probability of 100% and a write density greater than that as denoted by B3, a first storage tier configured using RAID-1 and EFD may be determined as preferred for that data portion. If the data portion is an extent, processing may then include moving one or more chunks of the extent to the first storage tier having EFD PDs configured into RAID-1 groups. In contrast, if a data portion, such as an extent, has a write probability of 10% and a write density greater than that as denoted by B3, a second storage tier configured using RAID-6 and EFD may be determined as preferred for that data portion. If the data portion is an extent, processing may then include moving one or more chunks of the extent to the second storage tier having EFD PDs configured into RAID-6 groups.

Figure 35:
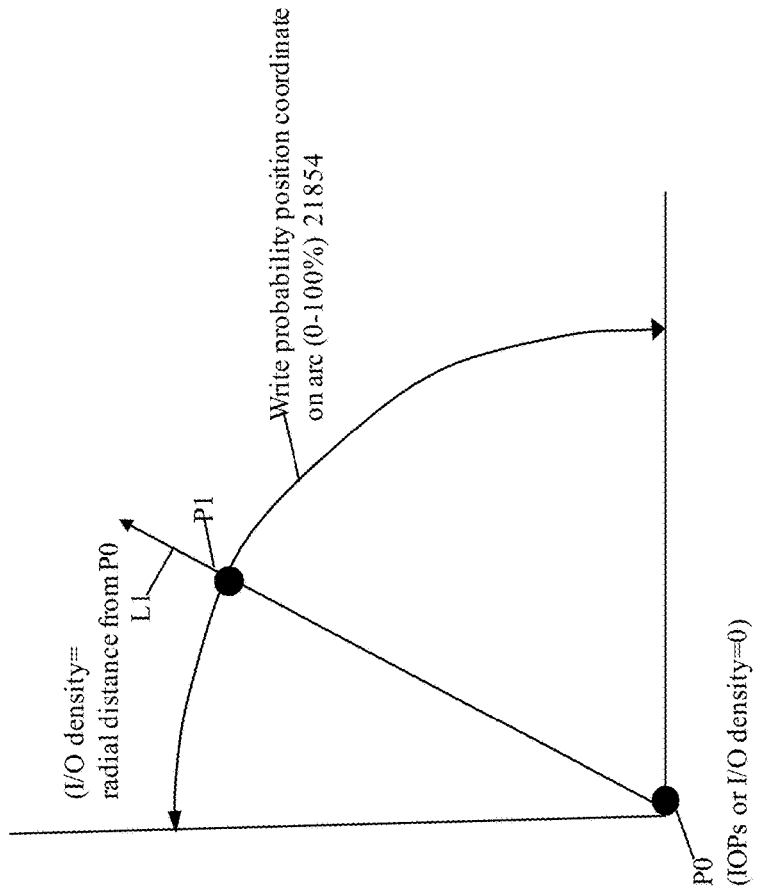

Referring to FIG. 35 shown is an example 21850 illustrating how each data portion having an associated write probability and I/O density may be represented by a point in the quarter pie graph. The example 21850 may denote the same quarter pie graph as in FIG. 34 with the particular boundaries omitted for simplicity. For a data portion, the write probability may denote a first position or coordinate on an arc such as 21854, and the I/O density may denote a radial distance from the point P0, such as on Line L1, used as a second position or coordinate. For example, P1 may denote a point for such a data portion whereby P1 may have associated coordinate values that fall into subranges (e.g., mapped to) of one of the 12 portions denoted as X1 to X12 identifying preferred media type and RAID type and configuration for the data portion.

What will now be described are flowcharts summarizing processing steps described above that may be performed in an embodiment in accordance with techniques herein.

Figure 36:
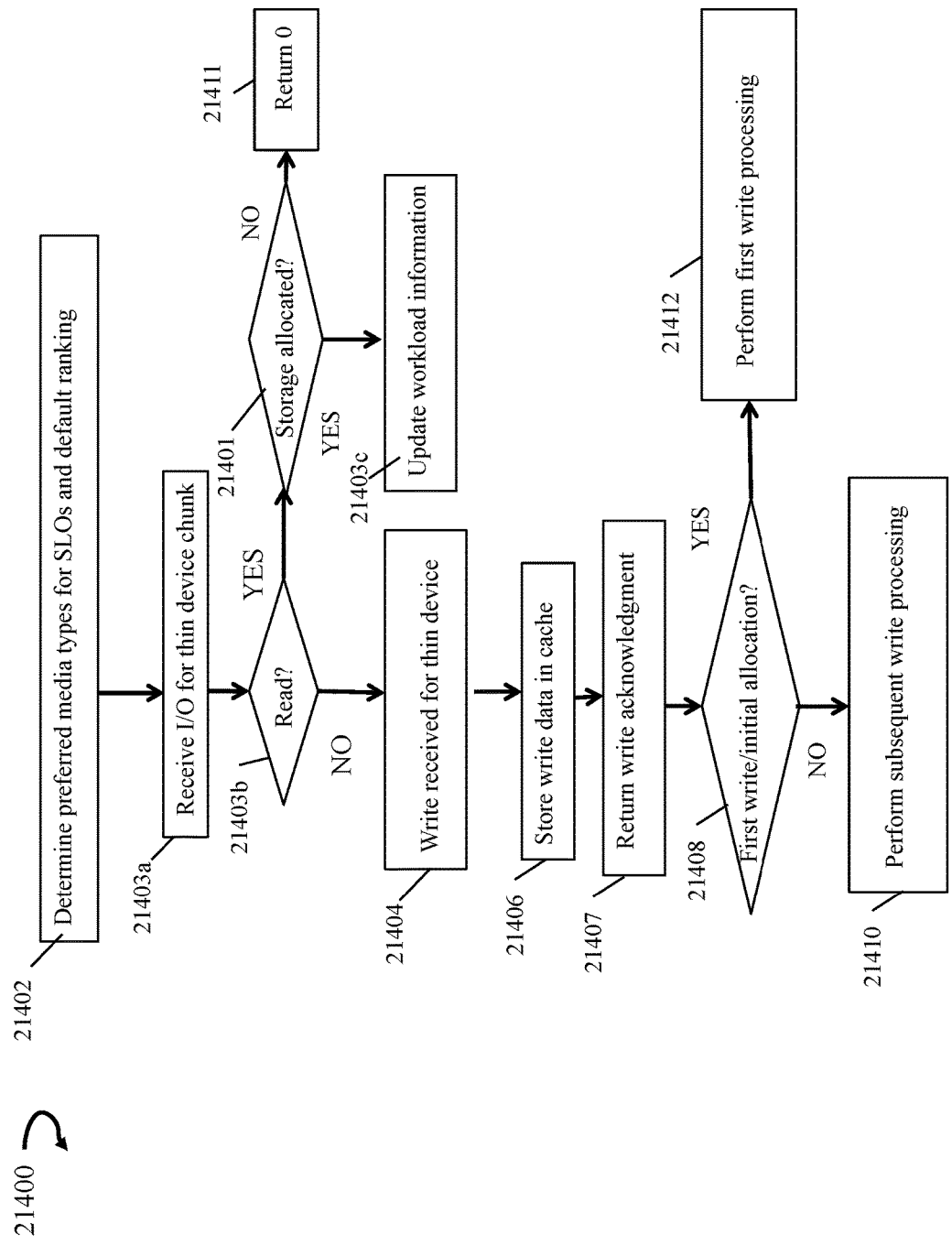
FIG. 36 is a flowchart of processing steps that may be performed in connection with I/O processing in an embodiment in accordance with techniques herein.

Referring to FIG. 36, shown is a first flowchart of processing steps that may be performed in an embodiment in accordance with techniques herein. The flowchart 21400 includes step 21402 where preferred media types for the different SLOs are determined such as described in connection with FIG. 33. Additionally, for each such preferred media type as may be used in connection with initial storage allocation for thin device chunk, a relative ranking of RAID types and configurations may be established ranking the RAID types from least write penalty to highest write penalty.

For example, one ranking may be RAID-1 (least write penalty), RAID-5 and RAID-6 (highest write penalty). Additionally, step 21402 may include determining a default allocation ranking for possible combinations of media type and RAID type and configuration such as, for example, the ranking described in connection with FIG. 33. At step 21403*a*, an I/O operation directed to a chunk of a thin device may be received. At step 21403*b*, a determination is made as to whether the I/O is a read operation. If step 21403*b* determines the I/O operation is a read, control proceeds to step 21401 where a determination is made as to whether storage is currently allocated or mapped to the chunk to which the read is directed. If step 21401 evaluates to no, control proceeds to step 21411. In step 21411, one embodiment in accordance with techniques herein may return a zero (0) denoting that no storage is currently allocated. As described herein, storage may be allocated for a chunk the first time there is a write to a logical address associated with the chunk. In this case where step 21411 is performed, there has been a read to a logical address prior to storage being allocated for the logical address. Thus, step 21411 returns a zero to denote this condition. If step 21401 evaluates to yes, control proceeds to step 21403*c* where workload information for the extent including the chunk is updated. If step 21403*b* evaluates to no, control proceeds to step 21404 where it is determined that the I/O is a write received for a thin device. At step 21406, the write data is stored in cache and an acknowledgement regarding the successful completion of the write may be returned in step 21407. In step 21408, a determination is made as to whether this write operation is the first write to the chunk whereby no physical storage is currently mapped to the logical addresses of the thin device's address space corresponding to the chunk. If step 21408 evaluates to yes indicating this is the first write to the chunk, first write processing is performed in step 21412. If step 21408 evaluates to no, subsequent write processing is performed in step 21410.

Figure 37:
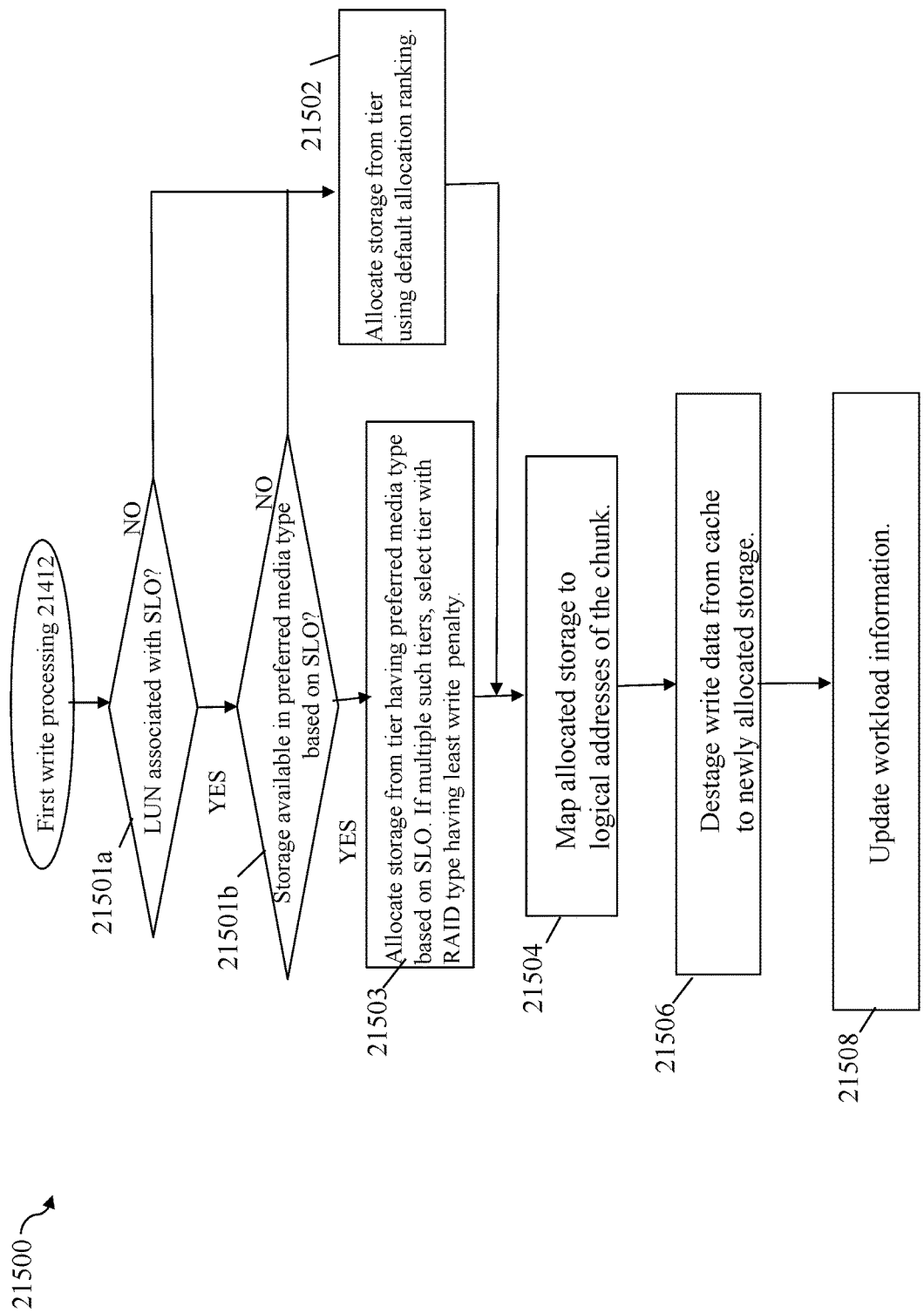
FIG. 37 is a flowchart of additional processing steps that may be performed in connection with first write processing from FIG. 36 in an embodiment in accordance with techniques herein.

Referring to FIG. 37, shown is a second flowchart of processing steps that may be performed in an embodiment in accordance with techniques herein. The flowchart 21500 provides additional details regarding step 21412. At step 21501*a*, a determination is made as to whether the thin device LUN to which the write is directed is associated with an SLO, such as an RTO. If step 21501*a* evaluates to no, control proceeds to step 21502 where storage for the chunk may be allocated from a storage tier having characteristics based on the default allocation ranking such as, for example, based on the ranking of FIG. 33. From step 21502, control proceeds to step 21504.

If step 21501*a* evaluates to yes, control proceeds to step 21501*b* where a determination is made as to whether there is storage available in a tier having the preferred media type for the LUN based on the SLO. If step 21501*b* evaluates to no, control proceeds to step 21502. If step 21501*b* evaluates to yes, control proceeds to step 21503 to allocate storage from a tier having the preferred media type determined based on the SLO for the LUN. If there are multiple tiers having PDs of the preferred media type, one of the multiple tiers is selected with the RAID type and configuration having the least write penalty of all such multiple tiers.

At step 21504, the allocated storage is mapped to the logical addresses of the chunk. At step 21506, the write data is destaged from cache to the newly allocated storage (as allocated in step 21504). At step 21508, workload information for the extent including the chunk is updated to reflect the write operation just received.

Figure 38:
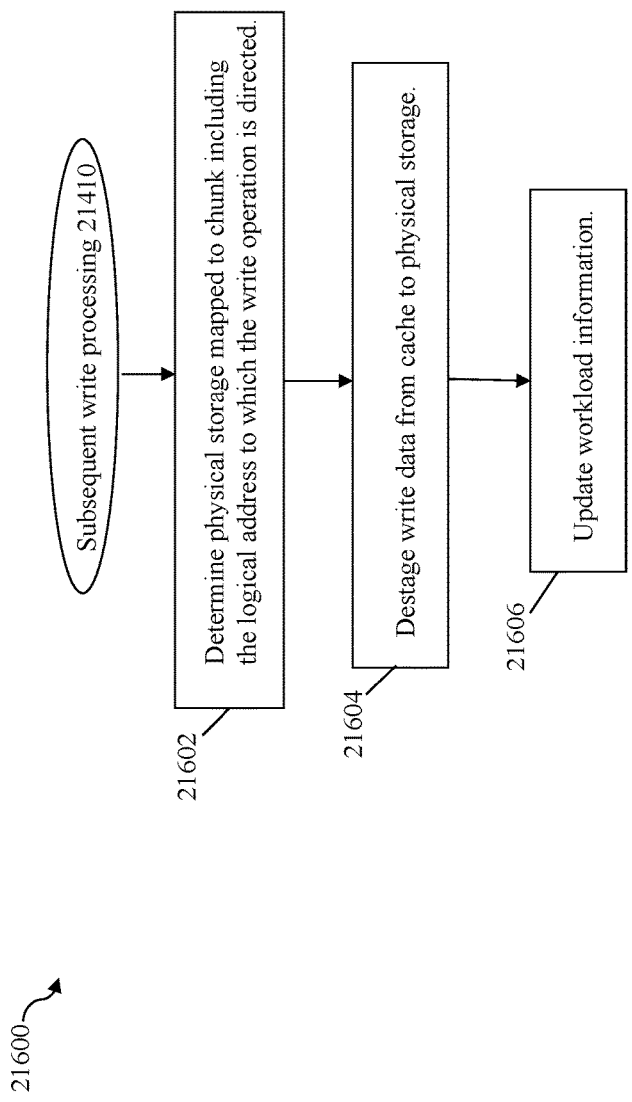
FIG. 38 is a flowchart of additional processing steps that may be performed in connection with subsequent write processing from FIG. 36 in an embodiment in accordance with techniques herein.

Referring to FIG. 38, shown is a third flowchart of processing steps that may be performed in an embodiment in accordance with techniques herein. The flowchart 21600 provides additional details regarding step 21410. At step 21602, the physical storage location is determined that is mapped to the chunk including the logical address to which the write operation is directed. In step 21604, the write data is destaged from cache to the physical storage location determined in step 21602. At step 21606, I/O workload information for the extent including the logical address to which the write operation is directed (e.g. including the chunk to which write is directed) is updated to reflect the write operation.

Figure 39:
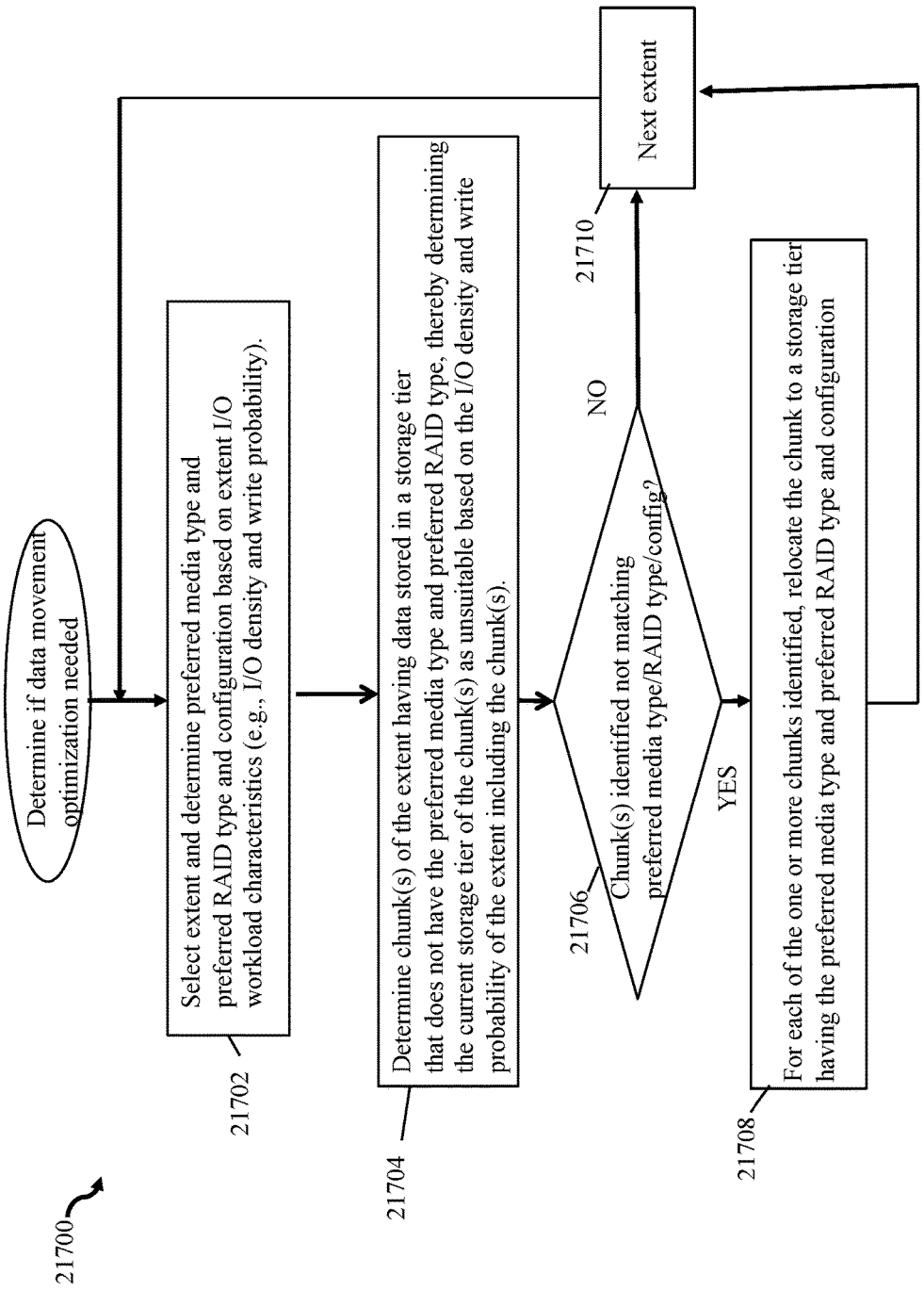
FIG. 39 is a flowchart of processing steps that may be performed to determine if any data movement optimization is needed in an embodiment in accordance with techniques herein.

Referring to FIG. 39, shown is a fourth flowchart of processing steps that may be performed in an embodiment in accordance with techniques herein. The flowchart 21700 may be performed in an ongoing manner such as periodically at predetermined time interval occurrences to evaluate. For example, the flowchart 21700 may be performed to periodically assess data portions, such as extents, and determine if any data movement optimization is needed to relocate data from its current storage tier to another target tier determined as more suitable or preferred based on the write probability and I/O density of the data portion. FIG. 39 processing may also be performed at other time such as, for example, responsive to consuming more than a threshold amount of a particular media type, responsive to a particular SLO for a thin LUN not being met, and the like.

At step 21702, an extent is selected for which processing is to be performed and the preferred media type and preferred RAID type and configuration for the extent may be determined. As described herein, the preferred media type and preferred RAID type and configuration for the extent may be determined based on the I/O density and write probability for the extent such as described in connection with FIG. 34. At step 21704, one or more chunks of the extent having their data stored in a storage tier that does not have the preferred media type and preferred RAID type are determined. Each of the one or more chunks are thereby determined in step 21704 as being stored in a current storage tier that may be characterized as unsuitable or not preferred for the chunk based on the I/O density and write probability of the extent including the chunk. At step 21706, a determination is made as to whether step 21704 identified any chunk(s) currently stored in a storage tier having a media type and RAID type and configuration that does not match those preferred as determined in step 21702. If step 21706 evaluates to no whereby no chunk is identified in step 21704, control proceeds to step 21710 to process and select a next extent in step 21702. If step 21706 evaluates to yes, for each of the one or more chunks identified, processing may be performed to relocate the chunk to a storage tier having the preferred media type and preferred RAID type and configuration. Relocating a chunk from a current to a target storage tier may include allocating storage for the chunk in the target storage tier and mapping the newly allocated storage to the chunk corresponding logical address subrange of the thin LUN including the chunk. From step 21708, control proceeds to step 21710.

It should be noted that the number of chunks moved or relocated as a unit in step 21708 may vary with the level of data movement granularity used in an embodiment. For example, one embodiment in accordance with techniques herein may move a group of chunks as a unit such as in an embodiment having a subextent as the data movement granularity. In another embodiment in accordance with techniques herein, individual or single chunks may be moved or relocated having a chunk as the data movement granularity.

It should also be noted that processing may be performed responsive to consuming more than a threshold amount of capacity of one or more storage tiers having one or more particular characteristics such as a particular RAID-type and/or media type. Such processing may be performed to evict or relocate data portions currently stored therein to make additional storage capacity available in storage tiers of a particular media type and/or particular RAID-type and configuration. Such relocation may consider both RAID type and media type as described above, such as in connection with FIG. 39 processing. As another option, such processing may consider just one of the foregoing when determining what data portions to evict or relocate. For example, one embodiment in accordance with techniques herein may determine that there is an insufficient amount of available storage in storage tiers having RAID-1 configuration. In such an embodiment, selection of data portions for eviction or movement from a RAID-1 tier may be those data portions having a low write probability. Similarly, if it is determined that there is an insufficient amount of available storage in storage tiers having RAID-6 configuration, selection of data portions for eviction or movement from a RAID-6 tier may be those data portions having a high write probability (e.g., more suited for RAID-1). The target storage tier to which such evicted data portions may be moved may have a media type that is the same or higher in the performance ranking of media types.

Figure 40:
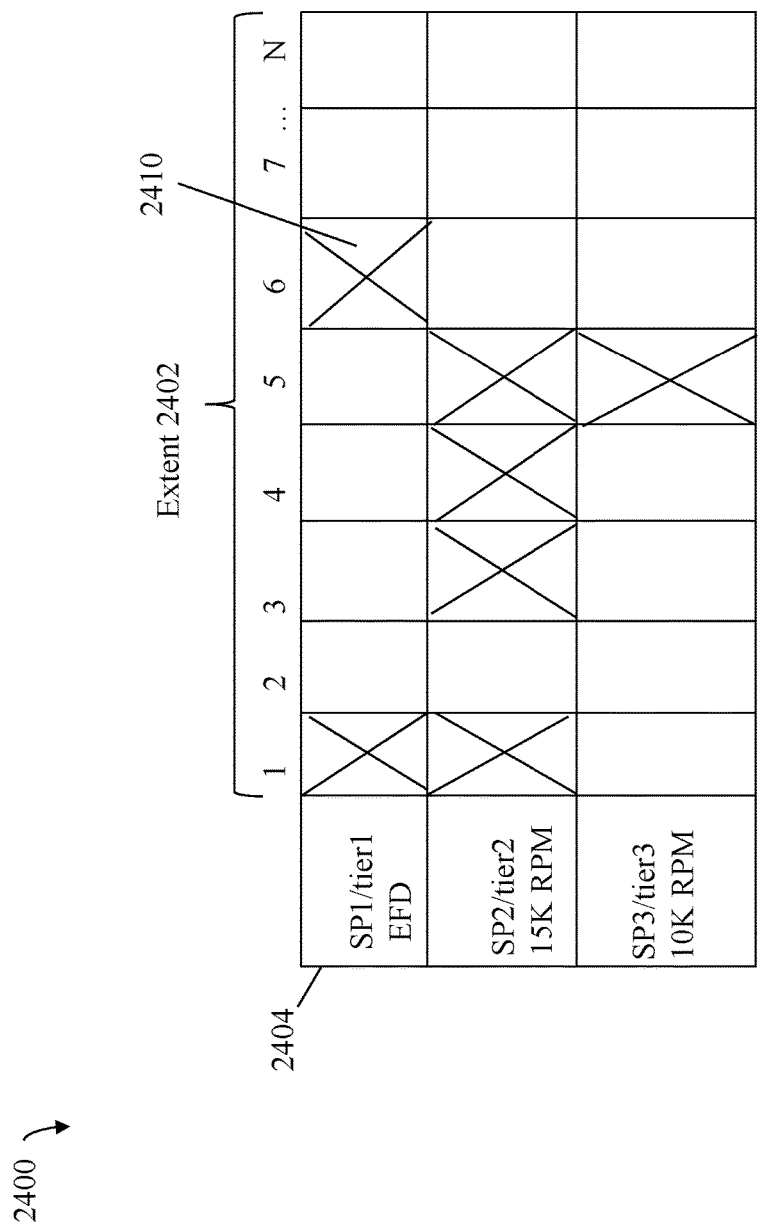
FIG. 40 illustrates I/O statistics that may be collected and tracked for extents in an embodiment in accordance with techniques herein.

Referring to FIG. 40, shown is an example illustrating I/O statistics that may be tracked and maintained for a single logical device, such as a LUN that is a thin or virtually provisioned logical device, in an embodiment in accordance with techniques herein. The example 2400 is a table of entries or cells with columns denoting particular extents 1 through N 2402, and rows 2404 denoting the different SPs configured from PDs of different storage tiers. In this example, SP1 is a pool of flash drives or EFDs, SP2 is a pool of 15K RPM rotating disk drives, and SP3 is a pool of 10K RPM rotating disk drives. A set of I/O statistics may be tracked and maintained for each cell or entry of the table whereby up to 3 sets of I/O statistics may be tracked and maintained for each extent. In this example, a set of I/O statistics may be tracked for a particular entry denoted by a particular extent number and a particular SP or tier if there has been any physical storage allocated for that particular extent on the particular SP or tier. For example, as described herein, the unit of allocation and data movement may be at the chunk subextent level. Thus a single extent may have storage allocated in multiple SPs or storage tiers. For example, each entry of the table 2400 including an "X" may denote a particular extent having physical storage allocated on a particular SP or storage tier. For example, extent 1 has storage allocated in SP 1/tier 1 and SP 2/tier 2, extent 3 has storage allocated in SP2/tier2, extent 5 has storage allocation in SP 2/tier 2 and SP 3/tier 3. Each entry, such as 2410, of the table may include a set of I/O statistics such as described elsewhere herein.

Referring back to FIGS. 1 and 2, it should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes.

In at least one embodiment of a data storage system in accordance with techniques herein, the data storage system may be a data storage array including multiple CPU "cores" or processors partitioned to function as the different components, such as DAs, FAs, RAs and the like, and to perform tasks handled by such components. For example, a number of CPU processors or cores may be configured to function as DAs and read data from physical storage and write data to physical storage (e.g., performing back end I/O operations and processing tasks denoting a back end I/O workload). As another example, a number of CPU processors or cores may be configured to function as FAs and receive external I/Os such as from hosts or other clients of the data storage system (e.g. where such processors perform processing and handling of front end I/O operations denoting a front end I/O workload). The various CPU processors or cores may have their own memory used for communication between other CPU processors or cores rather than utilize a global memory accessible to all storage processors. In such embodiments, memory 26 may represent memory of the CPU processors or cores.

Generally, each host or front end I/O received by the data storage system may result in a different number of back end or physical storage device I/Os. For example, a host read that results in a read cache hit further results in no back end I/O workload since there is no need for the DA to retrieve data from the physical non-volatile storage, such as back end rotating disk drives, flash drives, and the like. When writing data of a received host I/O request to the physical device, the host write request may result in multiple reads and/or writes by the DA 23 in addition to writing out the host or user data of the request. For example, if the data storage system implements a RAID data protection technique, such as RAID-5, additional reads and writes may be performed such as in connection with writing out additional parity information for the user data. Thus, observed data gathered to determine workload, such as observed numbers of reads and writes, may include a front end workload and a back end workload. The front end (FE) workload may be based on the number of I/O operations (reads and writes) received by the FE components (e.g., FAs) of the data storage system (e.g., I/Os received at FAs from hosts or external client I/Os). The back end (BE) workload may be based on the I/O operations (read and writes) performed by the DA (e.g., BE read and write commands may correspond, respectively, to physical storage device accesses such as disk reads and writes that may result from a host I/O request received by an HA).

Consistent with description elsewhere herein, the BE I/O workload denotes the I/O workload, such as an I/O rate in number of average number of I/Os per second, directed to the storage pools (SPs) of physical non-volatile storage devices of the back end of the data storage system. In at least one embodiment in accordance with techniques herein the BE I/O workload, also simply referred to as BE workload, may also be expressed as an I/O rate and may be based on the total number of host or FE read cache misses, total write operations destaged, and an additional factor F to account for any BE workload generated from internal data storage system operations. As a result, the factor F may be used to account for the additional BE or physical storage device reads and/or writes performed, for example, due to RAID group rebuild operations, additional physical device reads and/or writes for RAID groups due to parity, data movement or migration of data such as between storage tiers of different performance storage devices where with data movements may be performed by a data storage optimizer to meet performance requirements and/or improve system health and performance.

The BE I/O workload in one embodiment in accordance with techniques herein may be determined periodically, such per sampling period or time period, for an SP which may then be used in further calculating an I/O performance metric for each SP, and physical storage devices (PDs) included in the SPs, for the same sampling or time period. Consistent with description elsewhere herein, data movements such as performed by the data storage optimizer may be modeled for SPs, as well as per PD, per extent and the like (e.g., generally per storage entity), to predict, forecast or model the performance of such storage entities if selected one or more candidate data movements are performed (e.g., such as for demotions and/or promotions of an extent or data portion based on changes in I/O workload of the data portion, to remove or alleviate a violation such as related to capacity or performance). As described elsewhere herein, the forecasted, predicted or modeled performance expected for a candidate data movement may be modeled by accordingly modeling the proposed shift or change of the BE I/O workload. For example, modeling movement of a data portion from SP1 to SP2, or PD1 to PD2 may include modeling movement or shifting the data portion's capacity and I/O workload from, respectively, SP 1 to SP 2 or PD1 to PD2.

At least embodiment in accordance with techniques herein may use a time-series exponential smoothing model with a smoothing or decay constant Alpha, such as used in EQUATION D1 below. Different suitable values for Alpha may be selected and used in EQUATION D1 with different metrics for workload and/or performance depending on the reactiveness or speed with which the predicted, forecasted or modeled metrics change over time in accordance with changes in actual or observed metric values over time. Such values for Alpha may be accordingly adjusted to give appropriate weight to actual or observed metric values and predicted metric values.

In at least one embodiment in accordance with techniques herein, the metric may generally be any desired I/O workload or performance based metric such as denoting read I/O workload, write I/O workload, a combination or collective read and write I/O workload, a particular type of read I/O workload (e.g., sequential vs random read), and the like. Examples of different metrics that may be used in connection with EQUATION D1 are described elsewhere herein. For example, consider a write I/O workload as the metric for a storage entity, such as an extent, or a single PD. The predicted or forecasted metric for a next time period "t+1" may be determined in accordance with both the actual or measured metric value from the previous time period "t" and also the predicted or forecasted metric value from the previous time period "t". The predicted metric for time period "t+1" may be a time series exponential smoothing model using a smoothing or decay constant "Alpha". In such an embodiment in accordance with techniques herein, $F_{t+1}$, denoting the predicted or forecasted metric for a storage entity determined for a sampling period t+1, may be expressed as follows in EQUATION D1:

$$F_t + i = (Alpha * A_t) + ((1-Alpha) * F_t) \quad \text{EQUATION D1}$$

where

"At" is the actual observed or measured metric for the storage entity for the sampling period "t";

"Alpha" is the decay coefficient;

"$F_t$" is the forecasted or predicted metric value for the storage entity for the sampling period "t"; and "$F_{t+1}$" is the forecasted or predicted metric value for the storage entity as calculated based on EQUATION D1 for the next sample period "t+1".

Generally, Alpha is a decay coefficient or smoothing constant selected accordingly to give a desired amount of weight to the actual measured metric value for a time period "t" and where 1−Alpha thus denotes the desired amount of weight given to the predicted or forecasted metric value for the time period "t", where both such values At and Ft are used in determining Ft+1, the next predicted, forecasted or modeled metric value for the next time period "t+1". As can be seen in EQUATION D1, the closer the decay coefficient Alpha is to zero, the lesser the weight given to At, the actual measured metric value for time period "t" and thus the greater the weight given to Ft, the predicted metric value for time period "t".

An embodiment in accordance with techniques herein may collect statistics for each extent, or more generally data portion, as described in more detail elsewhere herein. In at least one embodiment described in following paragraphs, write I/O workload for PDs and data portions or extents may be measured in an amount of data written per unit of time, such as megabytes written per second. In at least one embodiment described in following paragraphs read I/O workload for PDs may be measured in read I/Os per unit of time, such as a number of read I/Os per second. It may be that each read I/O is the same size. In the event that read I/Os may be of different sizes, an embodiment may measure read I/O workload to account for differences in sizes of reads. It will be appreciated by those skilled in the art that it is straight forward to account for variations in I/O sizes in connections with measurements of I/O workloads, such as by normalizing and I/O workload for I/O size differences. For example, an embodiment may measure I/O workload in terms of amount of data transferred per second (or other unit of time), where the read I/O workload may be expressed in amount of data read per second. As an alternative, an embodiment may normalize the I/O workload expressed in terms of I/Os per second based on different I/O sizes. For example, a first read I/O may read "N" bytes of data and a second I/O may read "2N" bytes of data (N being a non-zero integer). In this case, the read I/O workload before normalization may be 2 read I/Os and after normalization may be 3 read I/Os whereby the second read I/O is equated, adjusted or normalized to 2 read I/Os since it reads twice as much data N as the first read I/O.

It should be noted that although embodiments of the techniques described herein are used with thin devices providing virtual storage provisioning, the techniques herein may also be used in connection with other types of suitable devices such as those not providing virtual provisioning.

An embodiment in accordance with techniques herein may include multiple media types or technologies of flash memory-based storage devices, or more generally, multiple write endurance classifications. For example, an embodiment may include any two or more of the following media types or technologies of flash memory-based storage devices where each flash type or technology may be a different write endurance classification:

1. SLC—single level cell
2. eMLC—enterprise multi-level cell
3. MLC—multi-level cell
4. TLC—triple-level or tri-level cell
5. cMLC—(consumer grade) multi-level cell The above is a ranking in terms of expected writes/GB whereby the top or highest/first ranked flash type is able to sustain the greatest number of writes/GB of all types of all types considered/ranked/listed and the bottom or lowest/last ranked flash type is able to sustain the least number writes/GB of all types considered and included in the foregoing ranking. Thus, the above is a ranking of flash types, or write endurance classifications of different flash memory-based devices, based on their relative expected write endurance. Generally, an embodiment in accordance with techniques described below may include at least two different media types having different write endurances. For example, an embodiment may include SLC and MLC flash storage devices, where SLC devices are included in a first storage tier, and MLC devices are included in a second different storage tier. Both of the foregoing tiers may be subject to data movement optimizations such as may be performed by a data optimizer as described above.

Each of the different media types having a different write endurance classification may have an expected lifetime expressed in an expected number of writes or erasure cycles performed before the physical storage device is expected to experience failure whereby the physical device may no longer be reliable for storing and retaining data written thereto.

Consistent with discussion elsewhere herein, generally, different media types or different types of flash-based physical storage devices each have a lifetime or usage expectancy based on wear. In this case, the wear is based on the number of writes or erasure cycles performed to the physical device. Described in following paragraphs are techniques illustrated with examples using different media types of flash storage devices. However, more generally, such techniques are applicable for use with any physical storage media having a lifetime and expected usage based on wear, such as based on an expected number of writes or erasure cycles performed within the lifetime of the physical device prior to the physical device experiencing failure (e.g., unable to be used for accurately and reliably storing data). Following examples illustrating techniques herein refer to an embodiment having 2 types of flash media—SLC and MLC—for simplicity although an embodiment may include an number of media types for flash-based or other suitable device types subject to wear out (e.g., based on a number of writes performed to the physical device).

Flash PDs of the different flash types or technologies may be included in an embodiment in accordance with techniques herein in different capacities. For example, an embodiment of a data storage system may include SLC flash PDs having a 4 terabyte (TB) capacity and other SLC flash PDs having a 1 TB capacity. The same I/O workload (e.g., write 100 megabytes/second and 1000 reads/second) may be issued to 2 flash PDs of the same flash type or technology but of different capacities. The inventors have determined that a first of the foregoing 2 flash PDs having the higher capacity will have a lower read RT than the other second flash PD having a lower capacity. This is due to the fact that the greater the flash capacity there is to spread the write I/O workload, the better the read performance.

Described in following paragraphs are techniques that may be used in connection with obtaining consistent read RT performance despite such differences in write performance among different flash PDs having the same flash technology but varying capacities.

Figure 41:
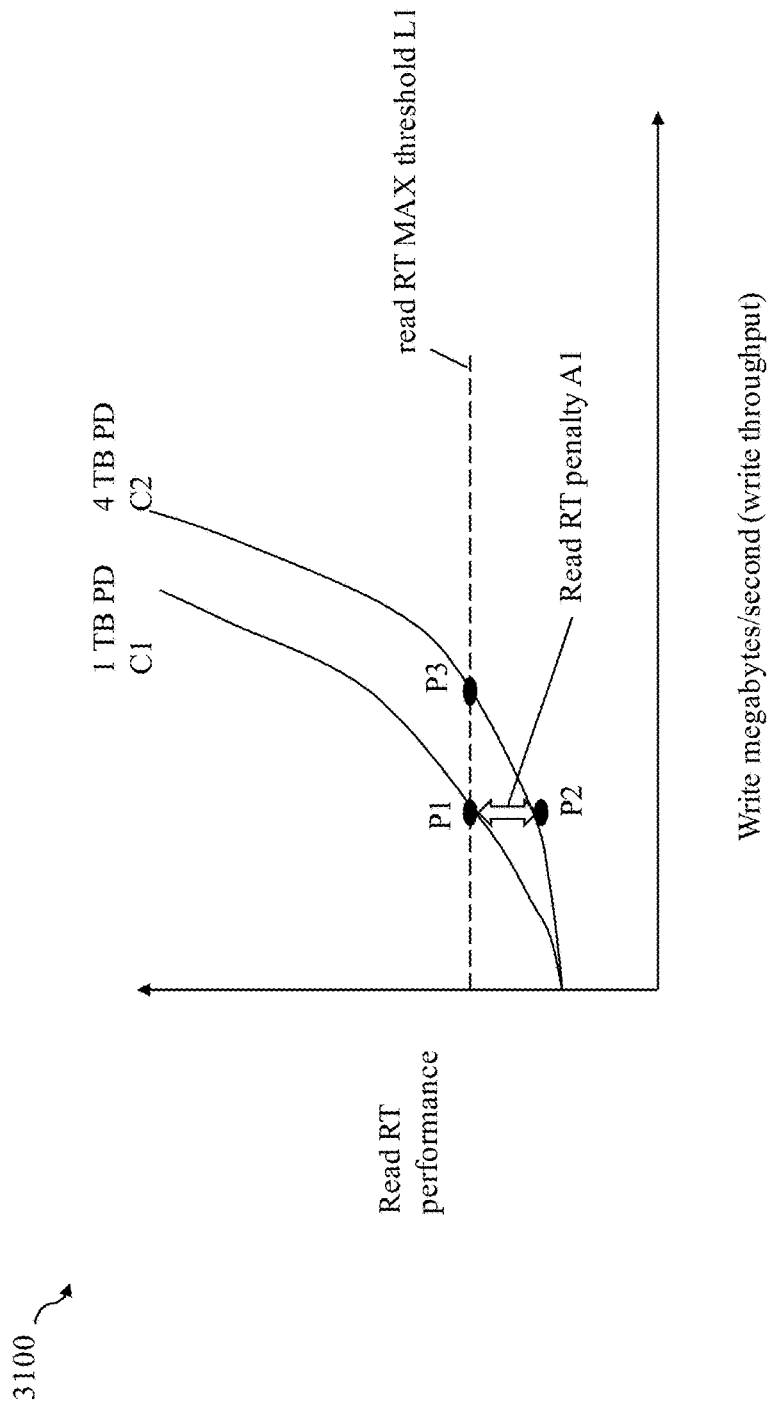
FIGS. 41, 42A and 42B are graphical illustrations of read response time performance.

In FIG. 41 described below, presented is a graphical illustration of the impact of write performance differences (due to different capacity flash PDs of the same flash technology) on read RT performance.

Referring to FIG. 41, shown is an example illustrating a difference in read RT performance, or read penalty, between different two flash PDs each with different capacities when the same I/O workload is directed to each flash PD. The example 3100 is a graphical illustration of read RT performance for two PDs, such as for 1 TB PD of a flash type, such as SLC, and a second 4 TB PD of the same flash type as the 1 TB PD. The Y axis denotes read RT performance for different write I/O workloads on the X axis where write I/O workloads are expressed in megabytes per second (MBS) written and the read I/O workload is constant at 1000 read I/Os per second. In this illustration, the same I/O workload is directed to both the 1 TB PD and the 4 TB PD at each point in time. Additionally, the read I/O workload is held constant at each point in time, such as at 1000 read I/Os per second, while the write I/O workload directed to both PDs increases over time although the same write I/O workload is directed to both PDs at each point in time. For example, point P1 denotes the read RT obtained for the 1 TBD PD for a first write I/O workload and the constant read I/O workload of 1000 read I/Os per second. Point P2 denotes the read RT obtained for the 4 TB PD for the same first write I/O workload and the same constant read I/O workload of 1000 read I/Os per second. For points P1 and P2, the line A1 denotes the read RT performance difference, or read penalty, between the 1 TB PD and the 4 TB PD. Line or curve C1 denotes the read RT performance curve for the 1 TB PD for various write I/O workloads while holding the read I/O workload constant. Line or curve C2 denotes the read RT performance curve for the 4 TB PD for various write I/O workloads while holding the read I/O workload constant. Line L1 denotes the straight line through a point on the Y axis for the read RT maximum threshold where read RT values on the Y axis higher than L1 may not be acceptable read RT performance measurements. Thus, point P1 denotes the point of maximum I/O workload conditions for the 1 TB PD in order to achieve a read RT of the maximum threshold level L1, and point P3 denotes the point of maximum I/O workload conditions for the 4 TB PD in order to achieve a read RT of the maximum threshold level L1. Based on P3 and P1, it can be observed that, for the same read I/O workload directed to both the 1 TB PD and the 4 TB PD, the 4 TB PD is able to handle a much larger write I/O workload than the 1 TB PD while both PDs have the same read RT denoted by L1. Through experimentation, the inventors have determined that the 4 TB PD may be able to handle approximately 1.6 times the relative write I/O workload of the 1 TBD PD while obtaining the same read RT denoted by L1 (e.g., relative difference in write I/O workload between P1 and P3 is that P3 denotes a write I/O workload that is approximately 1.6 times the write I/O workload denoted by P1).

Based on the curves C1 and C2, it can be observed that for the same I/O workload directed to the two PDs of different capacities, the larger capacity 4 TB PD consistently obtains a better read RT performance than the smaller capacity 1 TB PD.

In a similar manner, varying read RT performance may be observed through simulation, testing, and the like, in connection with other flash PDs—both having the same flash type or technology but different capacities than as illustrated in FIG. 41—to obtain the particular relative difference in write I/O workload to achieve the same read RT performance of both flash PDs.

What will now be described are techniques that may be performed in connection with ensuring that different types of flash PDs (e.g., SLC, MLC, etc.) having different storage capacities per PD can be effectively mixed. Since the DA, or flash PD interface controller, is likely to have constant performance, additional flash PD capacity serviced by the DA can become a performance bottleneck if the I/O workloads directed to the different PDs are not managed proportional to the capacities of the different flash PDs. In connection with techniques described herein, an embodiment may perform include processing with a goal of keeping constant and consistent measured read RT performance (e.g., average RT per read I/O) where the read RT is with respect to read I/Os collectively on all the different capacity flash PDs of different flash technologies. Such techniques described in following paragraphs provide for optimized controller performance across a set of multiple flash PDs where the set may include flash PDs of different flash types (e.g., SLC and MLC) and the PDs of the set may have different storage capacities.

Figure 42A:
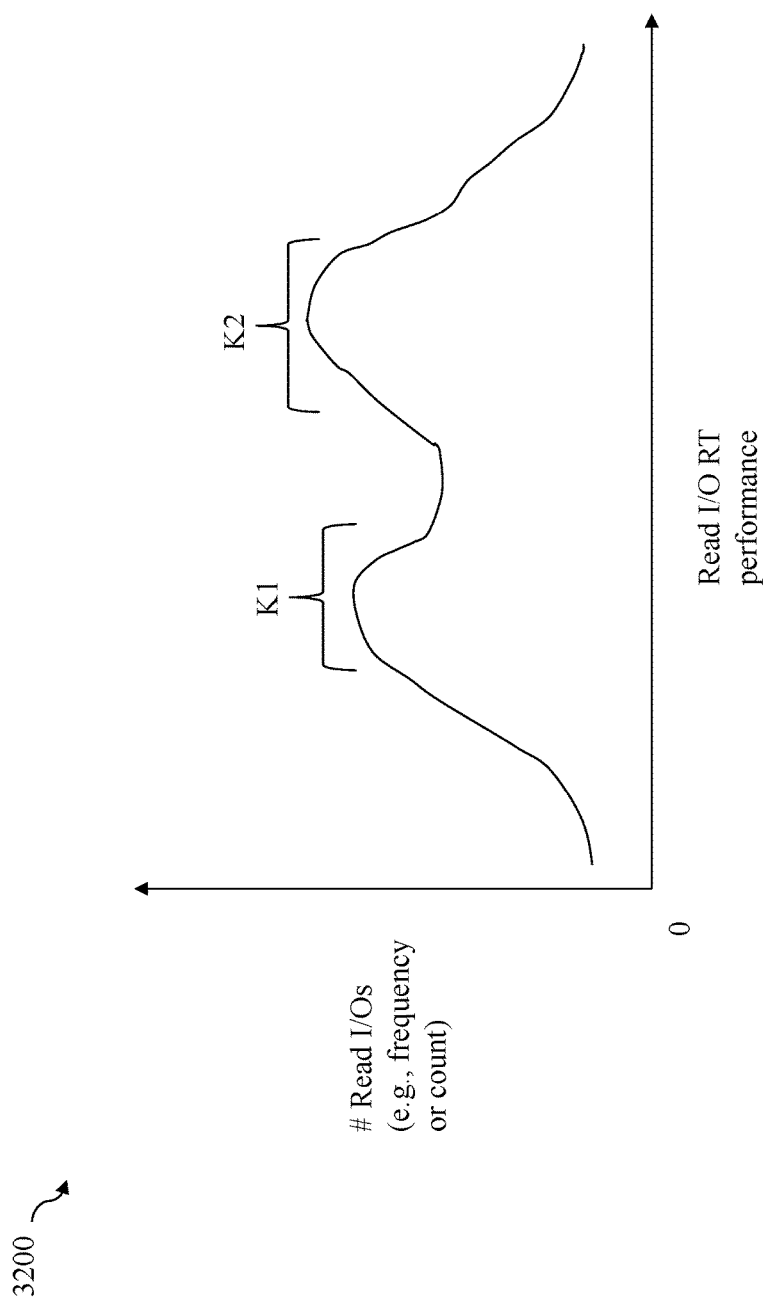

Referring to FIG. 42A, shown is a graphical illustration of read RT frequency distribution that may be obtained prior to performing techniques herein. The example 3200 denotes a typical or characteristic bimodal distribution that may be obtained in connection with the 4 TB PD and the 1 TB PD if the same I/O workload is sent to both such PDs at a point in time such as described above in connection with FIG. 41, prior to performing techniques herein described in following paragraphs. The 4 TB flash PD may be of the same flash type or technology (e.g., SLC, MLC, etc.) as the 1 TB flash PD as in FIG. 41. In the graph of 3200, the X axis includes different read RT values and the Y axis denotes the frequency, count or number of read I/Os having each particular read RT denoted on the X axis. In the example 3200, it can be observed that the first peak K1 may primarily comprise contributions for read I/Os directed to the larger 4 TB PD and that the second peak K2 may primarily comprise contributions for read I/Os directed to the smaller 1 TB PD.

With the above-noted goal of achieving approximately constant or consistent read RT (e.g., within a specified acceptable amount of variation) across all the flash PDs of different capacities, the read RT distribution of FIG. 42A may be obtained in connection with processing performed to balance the workload of the flash PDs. The example 3200 denotes a "before" snapshot of the read RT distribution prior to performing subsequent processing steps. The subsequent steps described below may perform data movements that balance or redistribute the workload to obtain a more constant read RT across all flash PDs of different capacities.

In an embodiment in accordance with techniques herein, consistent or constant read RT performance may be obtained and maintained across the flash PDs of different capacities and different flash technologies through management and balancing of read I/O workload, write I/O workload and idle capacity across the flash PDs of different capacities and flash technologies.

In connection with such techniques, the read I/O workload (e.g. such as number of read I/Os per second) across the flash PDs should not exceed a specified read I/O workload limit or target where the same read I/O workload limit or target is specified for each of the flash PDs (e.g., independent of flash type/technology and independent of per flash PD capacity). It is desirable that the read I/O workload be distributed evenly, or within some specified tolerance or difference, among the flash PDs.

In connection with such techniques, the write I/O workload, such as specified in amount of data written/second (e.g., megabytes written/second), directed to each flash PD should not exceed a specified write I/O workload limit or target. Each particular flash PD may have a specified write I/O workload limit or target determined in accordance with a relative write workload ratio or relative write pressure ratio, with respect to other flash PDs under consideration. The relative write workload ratio or write pressure ratio may be based on a difference in write performance obtained between flash PDs of different capacities. Such flash PDs considered when determining the relative write workload ratio or write pressure ratio therebetween may all be of the same flash type or technology (e.g., all SLC, all MLC) even though such flash PDs may have different or varying capacities. Thus, all flash PDs considered for determining a particular relative write workload ratio or write pressure ratio may be of a same flash type or technology. In this manner, a different relative write workload ratio or write pressure ratio may be determined for each different flash type or technology with respect to the different capacity flash PDs of that particular flash type or technology. For example, as discussed above in connection with FIG. 41, a first relative write workload ratio or write pressure ratio of 1.6:1 may be specified for SLC PDs having a 4 TB capacity and a 1 TB capacity.

Data movements may be performed between flash PDs to facilitate maintaining the relative write workload ratio or write pressure ratio for the particular flash technology. Such data movement may be performed to ensure that each such flash PD remains under a specified write I/O workload limit determined in accordance with the relative write workload ratio or write pressure ratio for the particular flash technology. For example, a first write I/O workload limit or target may be defined for the 1 TB SLC PD and a second write I/O workload limit or target may be defined for the 4 TB SLC PD where the second write I/O workload limit is 1.6 times the first write I/O workload limit. Data movement may be performed to keep both the foregoing 1 TB and 4 TB SLC PDs under their respective write I/O workload limits.

Additionally, it may be desirable that the write I/O workload be distributed evenly, or within some specified tolerance or difference, among the flash PDs of the same flash type/technology and same capacity in accordance with the write I/O workload limit specified for the flash PDs. For example, consider an embodiment having two 1 TB SLC PDs having the above-noted first write I/O workload limit. Besides keeping both of the 1 TB SLC PDs under the first write I/O workload limit, data movements may be performed to keep the write I/O workload directed to both the 1 TB SLC PDs evenly distributed evenly (e.g., where the write I/O workload of each of the 1 TB SLC PD is the same, or approximately so within a specified tolerance). To further illustrate, consider another example where all flash PDs may not exceed their specified write I/O workload limit or target. Additionally, it may be desirable to consider the set of flash PDs having the same write I/O workload limit or target and ensure that the write I/O workload is evenly distributed across all flash PDs of the set. For example, consider the set of SLC PDs having a 4 TB capacity where no PD of the set exceeds the write I/O workload limit or target. Processing may be performed to ensure that each 4 TB SLC PD of the set has the same measured write I/O workload (or be the same within some specified tolerance or difference).

In connection with such techniques, the idle capacity of each flash PD should not exceed a specified idle capacity limit or target. An idle capacity limit or target may be specified for each flash PD based on a relative capacity ratio (also referred to as just capacity ratio) between the different relative capacities of the flash PDs. For example, consider a 4 TB flash PD and a 1 TB flash PD having a relative capacity ratio of 4:1. In this case, the 4 TB flash PD has an idle capacity limit or target that is 4 times that of the 1 TB flash PD. In this case, if there is a total of 1¼ TB of idle capacity across both the 1 TB PD and 4 TB PD, the 1 TB PD has an idle capacity limit or target=¼ TB, and the 4 TB PD has an idle capacity limit or target=1 TB. Additionally, it may be desirable that the idle data portions be distributed evenly (e.g., or within some specified tolerance or difference) across all flash PDs of the same capacity. For example, all flash PDs may not exceed their respective idle capacity limits or targets. It may desirable that each PD having the same capacity, and thus the same idle capacity limit or target, have the same amount of idle data portions (or be the same within some specified tolerance or difference). Thus, for example, for all 4 TB flash PDs, an embodiment may perform data movements to ensure that the PDs are under and maintain their idle capacity limit established based on the relative capacities of other flash PDs. Additionally, for all the 4 TB flash PDs, data movements may be performed to facilitate each of the 4 TB flash PDs having the same measured idle capacity (or be the same within some specified tolerance or difference).

In this manner, an embodiment in accordance with techniques herein may control and achieve approximately the same read RT performance (or be the same within some specified tolerance or difference) across flash PDs of different capacities and flash technologies by controlling/regulating/balancing: the measured write I/O workloads of flash PDs to be in accordance with specified write I/O workload limits determined in accordance with relative write ratio or relative write pressure ratio of each flash technology; the measured read I/O workloads of flash PDs to be in accordance with a specified read I/O workload limit that is the same for each flash PD; and the measured idle capacity of flash PDs to be in accordance with specified idle capacity limits established based on the relative capacities of the flash PDs.

Figure 42B:
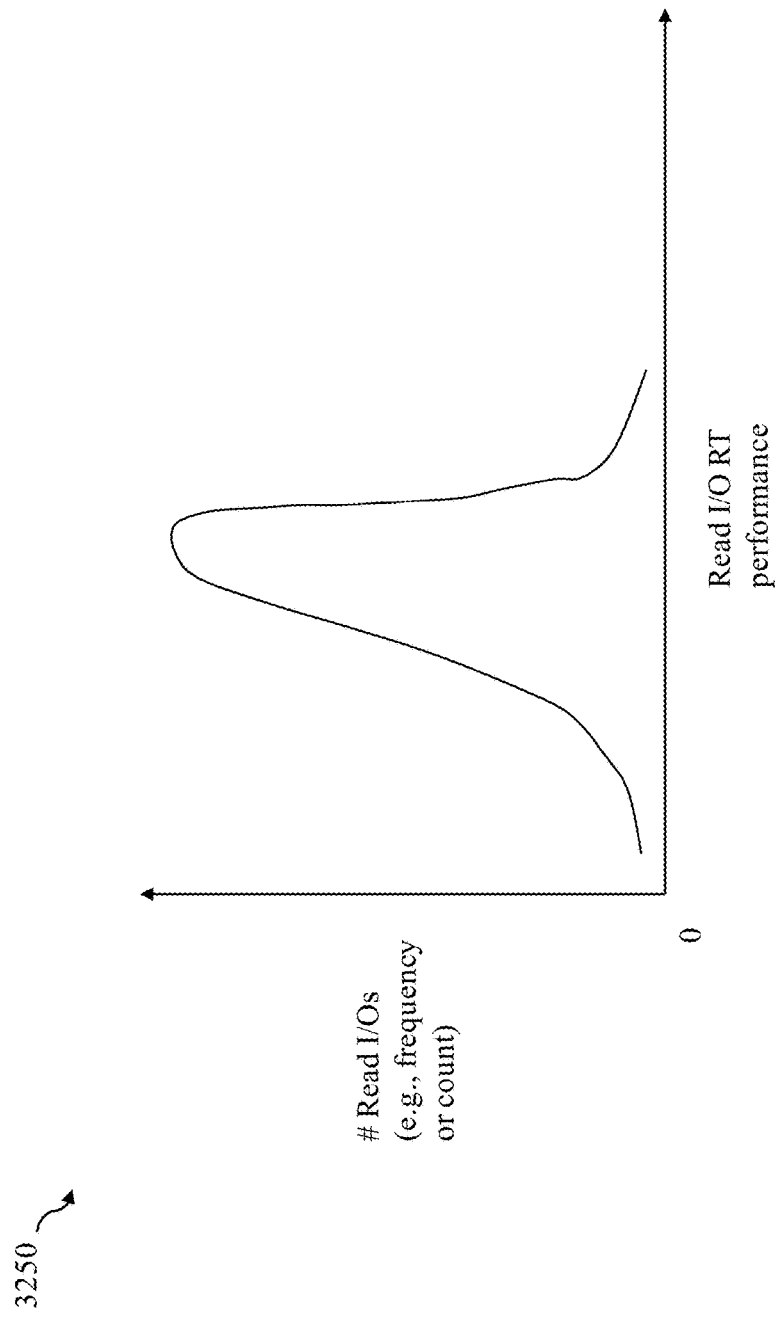

Referring to FIG. 42B, shown is an example 3250 illustrating a desired end goal or after snapshot of read I/O performance with respect to all flash PDs in an embodiment utilizing techniques herein. The example 3250 graphically illustrates read I/O RT performance on the X axis and the number, frequency or count of read I/Os on the Y axis as illustrated in FIG. 42A. In the example 3250, the resulting curve is that of a more consistent RT performance within specified tolerance limits. Such tolerance limits may be determined in any suitable manner such as based on statistical standard deviation or other relative values based on the read I/O RT of the population of read I/Os. For example, the curve of FIG. 42B may illustrate that at least a specified amount of read I/Os (e.g., 90%) have a measured read RT that is within some specified tolerance (e.g., + or −) from the average read I/O RT of the population (e.g., 90% of all read I/Os have a read RT that is within 2 standard deviations of the average read RT). Thus, techniques herein described in following paragraphs may be performed to reduce variations in measured read I/O RT across the different flash PDs of different flash technologies and different capacities.

Figure 42C:
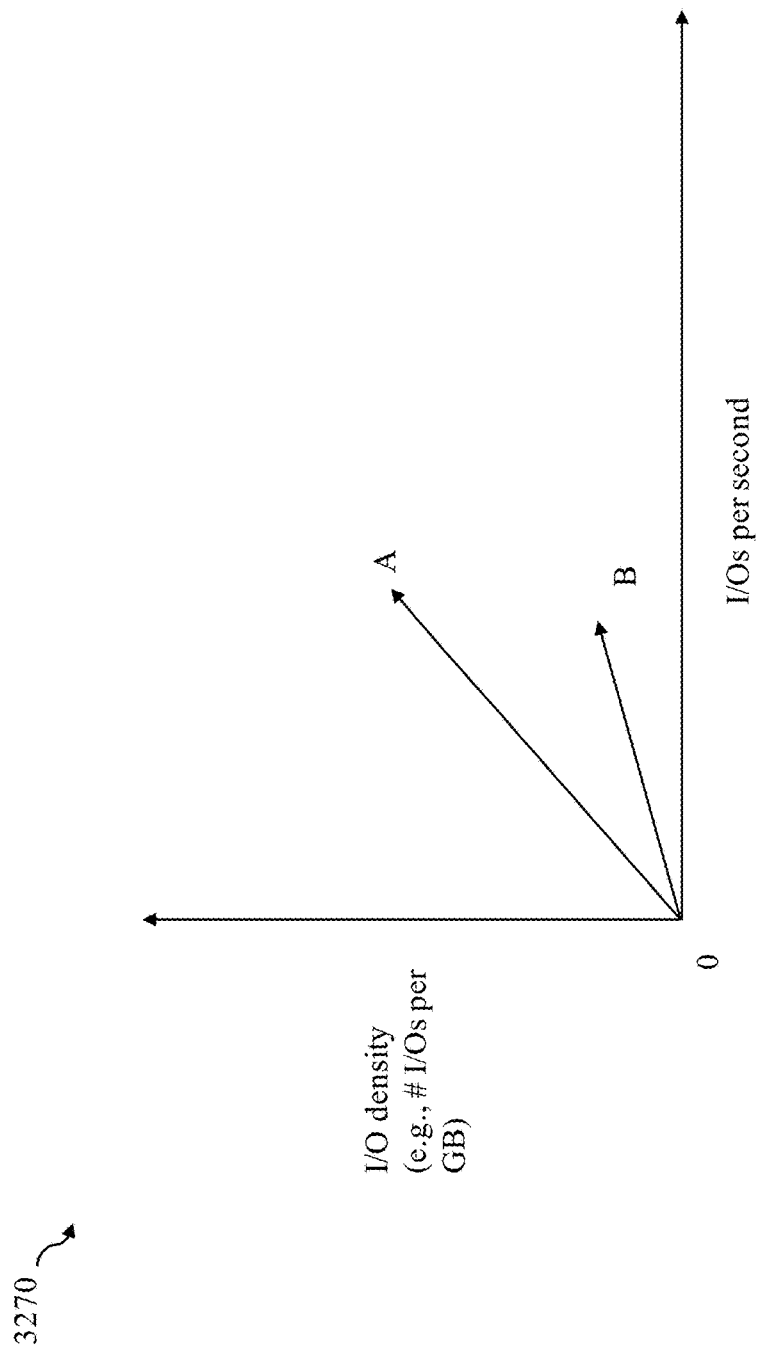
FIG. 42C is an example illustrating I/O density for different capacity flash devices in an embodiment in accordance with techniques herein.

Referring to FIG. 42C, shown is an example 3270 illustrating another desired end goal or after snapshot of read I/O performance with respect to all flash PDs in an embodiment utilizing techniques herein. The example 3270 graphically illustrates I/O density or number of I/Os per GB of storage, on the X axis and the number of I/Os per second on the Y axis as illustrated in FIG. 42A. In connection with a 1 TB flash PD and a 4 TB flash PD of the same flash type or technology as discussed above, vector A may denote the relationship between I/O density and the number of I/Os per second for the 1 TB flash PD and vector B may denote the relationship between I/O density and the number of I/Os per second for the 4 TB flash PD.

As a first step in accordance with techniques herein, an embodiment may establish or define limits or targets such as those noted above and elsewhere herein. An embodiment may establish: A) a write I/O workload limit or target for each flash PD; B) a read I/O workload limit or target for each PD; and C), an idle capacity limit or target for each PD based on different (relative) PD capacities. In one aspect, the foregoing limits may be further characterized as ideals, targets or goals to be achieved in order to obtain consistent read RT performance across the flash PDs having different capacities.

In connection with establishing B) a read I/O workload limit for each PD, the read I/O workload limit may be the same for all flash PDs (e.g., independent of flash technology and independent of flash PD capacity). In this manner, the aggregated read I/O workload directed to all flash PDs under consideration may be distributed evenly (or approximately so within specified tolerances or acceptable amount of variation. For example, the aggregated or total read I/O workload may be distributed evenly between a 4 TB flash PD and a 1 TB flash PD where such PDs may be of the same or different flash technology.

In connection with establishing A) a write I/O workload limit for each PD, such write I/O workload limits may be relatively determined for different capacity flash PDs of the same flash technology using the (relative) write workload ratio or write pressure ratio for that particular flash technology. As described elsewhere herein, the relative write workload ratio reflects the relative write performance differences between different capacity flash PDs of the same flash technology. The relative write workload ratio, and thus relative write I/O workload limits for different capacity flash PDs of the same flash technology may be determined through experimentation and modeling, or more generally, any suitable technique or source such as illustrated in FIG. 41. The write I/O workload limits may be based on the differences or variations in relative write performance of the different PD capacities of the same flash type or technology. As described elsewhere herein, the write I/O workload limits associated with flash PDs of different capacities but having the same flash technology may be determined in accordance with a relative write workload ratio (also referred to as write workload ratio or write pressure ratio). If such relative write I/O workload limits (determined in accordance with the write workload ratio for a particular technology) for flash PDs of the same particular flash technology and varying capacities are maintained along with the equal read I/O workloads for each PD, a constant or consistent read RT results (with respect to read I/Os across the collective set of PDs having different capacities). In connection with the example described herein for 1 TB PD and 4 TB PD of the same flash technology, the 4 TB PD should have approximately 1.6 times the write I/O workload as the 1 TB PD. It should be noted that the foregoing relative ratio may vary with the particular flash PDs and associated relative capacities used in an embodiment. The particular ratio of 1.6 to 1 is only one example for illustrative purposes.

Establishing C) an idle capacity limit for each PD may be based on different (relative) PD capacities. In particular, the idle capacity limits of the flash PDs may be determined using an idle capacity ratio denoting the relative different flash PD capacities. For example, with a 1 TB flash PD and a 4 TB flash PD, the 4 TB flash PD has a relative idle capacity limit that is 4 times that of the 1 TB flash PD. The idle capacity ratio may be 1:4 with respect to the 1 TB capacity flash PD relative to the 4 TB capacity flash PD.

As a second step in connection with techniques herein, processing may be performed to analyze the performance and workload of the flash PDs under consideration to detect a trigger condition indicating one or more data movements are to be performed. As described below, the detection of a trigger condition may denote the existence of a condition for which data movements are desired for more optimal workload balancing among the flash PDs. As described herein, the foregoing workload balancing through data movements may be performed to achieve consistent read RT performance across flash PDs of different technologies and different capacities. Such conditions may be used in connection with detecting violations and/or outliers with respect to read performance and/or workload conditions.

As a first case (CASE I) in connection with the second step, the read RT performance of the flash PDs under consideration may be obtained and analyzed. For each flash PD, the measured average read RT may be determined per PD and also an overall average Read RT may be determined with respect to the entire population of read I/Os directed to all flash PDs under consideration. Processing may be performed to determine whether the average read RT for each PD is an outlier, or varies more than a specified allowable variation, with respect to the overall average read RT of the entire population (e.g., all PDs under consideration). Thus, CASE I may define a trigger condition that, if detected, results in performing further processing including data movements. The CASE I trigger condition is noted above where one or more flash PDs have a measured read RT that is an outlier, or varies more than the specified allowable difference of the population (e.g., each flash PD may be required to have a measured read RT that is within a specified amount of every other flash PD's measured read RT).

In connection with CASE I, processing may be performed to monitor the read RT for each of the flash PDs under consideration and determine whether there is a need to correct or adjust for variations in measured read RT of any of the flash PDs. A variation in read RT as a trigger condition may be based on the observed or measured read RT per flash PD. If any one or more of the flash PDs have a measured read RT that exceeds (or more generally varies from) the mean or average read RT more than a specified acceptable variation, then processing or actions may be performed with the goal of correcting or alleviating the variation in the flash PD's measured read RT. In connection with correcting or alleviating an inconsistency in read RT for a flash PD (and thus obtaining a consistent read RT across all flash PDs), techniques herein may consider enforcement of limits or targets in the following in priority order:

i) enforcing flash PD write I/O workload limits or targets; (highest priority)

ii) enforcing the flash PD read I/O workload limit or target; (second highest ranked priority) and iii) enforcing flash PD idle capacity limits or targets. (lowest ranked priority)

In connection with the foregoing priority, it should be noted that, for example, a violation of, or exceeding, a lower priority limit may be allowed if such a violation achieves enforcement of a higher priority limit. Thus, if it is not possible to achieve all established limits, then an embodiment may achieve enforcement of higher/highest ranked limits as a first goal prior to achieving enforcement of lower ranked limits and conditions. Thus actions, such as data movements, may be taken to meet, in priority order limits and conditions associated with i), ii) and iii) in connection with CASE I (responsive to detecting a read RT inconsistency).

In connection with i) enforcing flash PD write I/O workload limits or targets, processing may include determining what flash PDs exceed their associated write I/O workload limit. Additionally, in connection with i), a flash PD may be under its write I/O workload limit but processing associated with i) may include further determining what flash PDs are outliers, or vary from established write I/O workload limits (e.g., under or over established write I/O workload limits) more than a specified acceptable variation or tolerance. For example, in connection with processing for i), an embodiment may determine those one or more flash PDs each exceeding an associated write I/O workload limit, or more generally, not within a specified range above and below the established write I/O workload limit. Additionally, processing of i) may include considering write I/O workload consistency among/with respect to flash PDs of the same flash technology and having the same capacity.

For example, flash PDs of the same flash technology and of the same capacity classification may all be under the established write I/O limit (e.g., all 1 TB or all 4 TB PDs are less than write I/O limit). For such flash PDs, processing may further be performed to ensure all flash PDs in same capacity classification of the same flash technology have approximately the same write I/O workload and may redistribute accordingly as needed. A flash PD may be an outlier if its write I/O workload is outside of specified bounds with respect to the measured relative write I/O workload of the population of flash PDs considered. (e.g., measured average PD write I/O workload for a first PD exceeds bounds of measured average write I/O workload with respect to all PDs considered. For example, a lower bound may be established that is a specified tolerance less than the average write I/O workload measured across all PDs under consideration/ (population), and an upper bound may be established that is a specified tolerance more than the average write I/O workload measured across all PDs under consideration/(population). The first PD classified as an outlier may have a measured I/O workload that is less than the lower bound or more than the upper bound. Furthermore, an embodiment may define a target or destination flash PD that accepts write I/O workload as one that has a measured write I/O workload generally less than its written I/O workload limit. As a variation, an embodiment may define a target or destination flash PD that accepts write I/O workload as one that has a measured write I/O workload that is at least a specified amount below its written I/O workload limit. In a similar manner, an embodiment may define a source flash PD that migrates, donates or transfer out write I/O workload as one that has a measured write I/O workload generally more than its written I/O workload limit. As a variation, an embodiment may define a source flash PD that migrates, donates or transfer out write I/O workload as one that has a measured write I/O workload that is at least a specified amount above its written I/O workload limit. Source flash PDs with respect to write I/O workload may also be characterized as over utilized with respect to write I/O workload. Target flash PDs with respect to write I/O workload may also be characterized as underutilized with respect to write I/O workload.

If a flash PD has a measured write I/O workload meeting one of the specified conditions associated with i) enforcing its write I/O workload limit, processing may be performed to move one or more data portions from the flash PD to one or more target flash PDs that can accept additional write I/O workload. In connection with foregoing i), the one or more specified conditions may include any of: a flash PD measured I/O workload exceeding its write I/O workload limit; a flash PD measured I/O workload varying more than a specified acceptable amount above or below its write I/O workload limit; and a flash PD measured I/O workload varying more than a specified acceptable amount from other measured I/O workloads of other flash PDs of the same flash technology and capacity.

For source flash PDs donating or migrating write I/O workload, data portions stored on a source flash PD may be ranked, from highest to lowest, in terms of write I/O workload. Data portions may be moved or migrated from the source flash PD in order, from highest to lowest write I/O workload, until the source flash PD is under its established write I/O workload limit. Consistent with discussion elsewhere herein, a target PD accepting write I/O workload may be monitored to ensure it does not exceed its own write I/O workload limit, or possibly any other associated limit (e.g., read I/O workload limit).

In connection with CASE I, ii) enforcing the read I/O workload limit across all flash PDs, an embodiment in accordance with techniques herein generally want all flash PDs under consideration to have the same, or approximately the same (within a specified tolerance or variation), read I/O workload. Processing of ii) to enforce the read I/O workload limit may include determining those flash PDs having a measured average read I/O workload that is an outlier with respect to the average read I/O workload limit or target. In at least one embodiment, a flash PD in violation of the read I/O workload limit may exceed the read I/O workload limit, or more generally, be outside of specified bounds of variation (e.g., either under or over) with respect to the read I/O workload. For example, a flash PD in violation of the read I/O workload limit may be under its it's read I/O workload limit and further less than a specified minimum amount below the read I/O workload limit (and thereby characterized as an outlier in that the PD is underutilized by more than a specified tolerance (e.g., varies below the read I/O workload limit beyond some specified allowable variation)).

In a manner similar to as described in connection with i) and elsewhere herein, source flash PDs donating, migrating or transferring out read I/O workload may be determined; and target flash PDs accepting additional read I/O workload from source PDs may be determined. Source PDs donating read I/O workload may be those flash PDs exceeding the read I/O workload limit. As a variation, source PDs may be those flash PDs exceeding the read I/O workload limit by at least a specified amount (more than an acceptable amount of variation from the read I/O workload limit). Target PDs accepting read I/O workload may be those flash PDs having a measured read I/O workload that is lower than the read I/O workload limit. As a variation, target PDs may be those flash PDs accepting read I/O workload having a measured read I/O workload that is lower than the read I/O workload limit by at least a specified amount (e.g., measure read I/O workload is less than an acceptable amount of variation from the read I/O workload limit). Consistent with discussion elsewhere herein, a target PD accepting read I/O workload may be monitored to ensure it does not exceed the read I/O workload limit, or possibly any other associated limit (e.g., write I/O workload limit).

For a source flash PD donating or transferring out read I/O workload, data portions of the source flash PD may be ranked, in terms of decreasing read I/O workload and data portions may be migrated from the source to a target PD accepting read I/O workload where data portions of the source having the highest/higher read I/O workload are moved out prior to other data portions of the source having lower read I/O workload.

In connection with CASE I, iii) enforcing the idle capacity limits of flash PDs, processing may be performed to ensure that each flash PD has a measured idle capacity that is less than its idle capacity limit, or more generally, within a specified acceptable amount of variation above or below its idle capacity limit. As described elsewhere herein, such idle capacity limits are determined relative to the different capacities of flash PDs. Additionally, as with the write I/O workload, processing may be performed to further ensure that the idle capacity of all PDs of the same capacity have approximately the same relative amount of idle capacity.

In a manner similar as described above, source flash PDs donating, migrating or transferring out idle capacity may be determined; and target flash PDs accepting idle capacity I from source PDs may be determined. Source PDs donating idle capacity may be those flash PDs exceeding their associated idle capacity limit. As a variation, source PDs may be those flash PDs exceeding their idle capacity limit by at least a specified amount (more than an acceptable amount of variation from the idle capacity limit). Target PDs accepting idle capacity may be those flash PDs having a measured idle capacity that is lower than the idle capacity limit for the target PD. As a variation, target PDs may be those flash PDs accepting idle capacity having a measured idle capacity that is lower than the idle capacity limit by at least a specified amount (e.g., measured idle capacity is less than an acceptable amount of variation from the idle capacity limit). Consistent with discussion elsewhere herein, a target PD accepting idle capacity may be monitored to ensure it does not exceed its idle capacity limit. Data movements of idle capacity from a source to a target accepting idle capacity may be performed until the source flash PD is below, or more generally, within specified bounds or tolerances of, its idle capacity limit.

Thus in connection with obtaining consistent read RT across flash PDs, an embodiment may perform any one or more of: redistribute write I/O workload, redistribute read I/O workload, and redistribute idle capacity. Such redistribution may be performed in connection of enforcement of various limits described herein. Such redistribution may be performed by performing data movements (e.g., movement or migration of data portions between source and target flash PDs in order to alleviate or correct detected conditions, violations or inconsistencies with respect to read RT and various limits described herein.

In addition to enforcing limits or conditions associated with i), ii) and iii) noted above for CASE I responsive to initially determining a read RT inconsistency with respect to a flash PD, each of the limits or conditions associated with i), ii) and iii) noted above may also be independently enforced. For example, it may be that there is no detected inconsistency with respect to any flash PD read RT in which case the initial trigger condition of CASE I is never fired. However, an embodiment in accordance with techniques herein may also perform processing to consider and enforce each of i), ii) and iii) independently.

In at least one embodiment in accordance with techniques herein as described above, the individual flash PDs may be in an unprotected configuration in that they are not configured into one or more RAID groups. Thus, the granularity or unit of management may be characterized as per flash PD.

As a variation, techniques herein may be performed using a RAID group as the granularity or unit of management. Each RAID group may be configured to include multiple flash PDs of the same flash type or technology and also where all the flash PDs of the single RAID group have the same capacity. Each RAID group may be configured using any number of flash PDs and to have any desired RAID level (e.g., RAID-1, RAID-5, RAID-6, and the like). To further illustrate, in an unprotected configuration having individual flash PDs, the configuration may include a first set of two 1 TB SLC PDs, a second set of two 4 TB SLC PDs, a third set of three 2 TB MLC PDs, and a fourth set of four 4 TB MLC PDs (e.g., total of 11 flash PDs). In such an embodiment, techniques herein may ensure that the read I/O RT across all the PDs is about the same (e.g., within a specified tolerance or difference). A first relative write workload ratio or write pressure ratio may be determined with respect to the first and second sets of SLC PDs; and a second relative write workload ratio or write pressure ratio may be determined with respect to the third and fourth sets of MLC PDs. For illustration purposes, assume the first relative write workload ratio or write pressure ratio for the SLC PDs is 1:1.3 and the second relative write workload ratio or write pressure ratio for the MLC PDs is 1:1.6. Four write I/O workload limits or targets may be established for the four sets of flash PDs. The write I/O workload limit of the second set may be 1.3 times the write I/O workload limit of the first set. The write I/O workload limit of the fourth set may be 1.6 times the write I/O workload limit of the third set. Techniques herein may ensure that each flash PD is below its associated write I/O workload limit and also may ensure that each PD maintains a measured write I/O workload within specified bounds of variation of the write I/O workload limits (e.g., goal of maintaining the write I/O workload limits and thus relative write workload ratio for the PDs).

Additionally, techniques herein may ensure that each flash PD of the same set (e.g., having the same flash technology and capacity) has approximately the same write I/O workload. Techniques herein may ensure that each of the flash PDs has approximately the same read I/O workload. Techniques herein may determine an idle capacity ratio with respect to the relative different flash PD capacities of 1 TB, 2 TB and 4 TB, whereby the idle capacity ratio is 1:2:4. Three idle capacity limits may be established for the foregoing 3 different capacities in accordance with the idle capacity ratio. Techniques herein may ensure that each flash PD is below its associated idle capacity limit and also attempt to maintain measured idle capacity of each PD within specified bounds of variation of the idle capacity limits (e.g., goal of maintaining the idle capacity limits and thus the idle capacity ratio for the PDs). Additionally, techniques herein may ensure that each flash PD having the same capacity has approximately the same amount of idle capacity. In connection with ensuring the foregoing conditions, data movements may be performed if a condition is detected which violates any of the foregoing conditions. Thus, the data movements may be performed with the goal of alleviating or removing the detected violation.

In the foregoing example, the 11 flash PDs of the four sets may be in an unprotected or non-RAID configuration. Techniques herein, for example, establish limits and measure workload per PD. As a variation, an embodiment may include multiple RAID groups where each RAID group includes any suitable number of flash PDs for a desired RAID configuration. Each single RAID group includes PDs of the same flash type or technology and each PD in a single RAID group has the same capacity. For example, consider a configuration with a first RAID group including a suitable number of multiple 4 TB SLC PDs for RAID-1 configuration, a second RAID group including a suitable number of 2 TB MLC PDs for a RAID-5 configuration, and a third RAID group including a suitable number of 1 TB SLC PDs for a RAID-6 configuration. In such a configuration, limits and ratios may be established as described herein whereby each RAID group is treated in a manner similar to each individual flash PD of the unprotected or non-RAID configuration. For example, a capacity ratio of the relative capacities of the 3 RAID groups may be 1:2:4. A relative write I/O workload ratio may be specified for the first and third SLC RAID groups.

One technique that may be used in an embodiment to determine such outliers, such as different flash PDs having extreme performance or workload relative to the population, may be based on quartiles. For example, outliers may be those read I/Os having a read RT in the lower and upper quartiles. Generally, the quartiles of a ranked set of data values are the three points that divide the data set into four equal groups, each group comprising a quarter of the data. The first quartile ($Q_1$) is defined as the middle number between the smallest number and the median of the data set. The second quartile ($Q_2$) is the median of the data. The third quartile ($Q_3$) is the middle value between the median and the highest value of the data set. Thus, the quartiles of a ranked set of data values are the four subsets whose boundaries are the three quartile points. Thus an individual item might be described as being "in the upper quartile" (e.g., having a value greater than Q3).

As known in the art, the median of the data set of read RTs may be determined by arranging all the observations from lowest value to highest value and determining the median as the middle value (e.g., the median of {2, 2, 5, 11, 12} is 5). If there are an even number of observations, then there is no single middle value and the median may be alternately defined, for example, as the mean or average of the two middle values. The point or boundary Q2 is the median partitioning the data set into two equal halves (or approximately equal halves such as within a specified tolerance or amount. From Q2, the other points or boundaries Q1 and Q3 may be determined.

The first quartile Q, also called the lower quartile or the 25th percentile, splits off the lowest 25% of data from the highest 75%. The second quartile Q2, also called the median or the 50th percentile, partitions the data set in half. The third quartile Q3, also called the upper quartile or the 75th percentile, splits off the highest 25% of data from the lowest 75%. The interquartile range (IQR) is the difference between the upper and lower quartiles, thus IQR=$Q_3$-Q1. Generally, the IQR may be characterized as a measure of variability, based on dividing a data set into quartiles.

Figure 43:
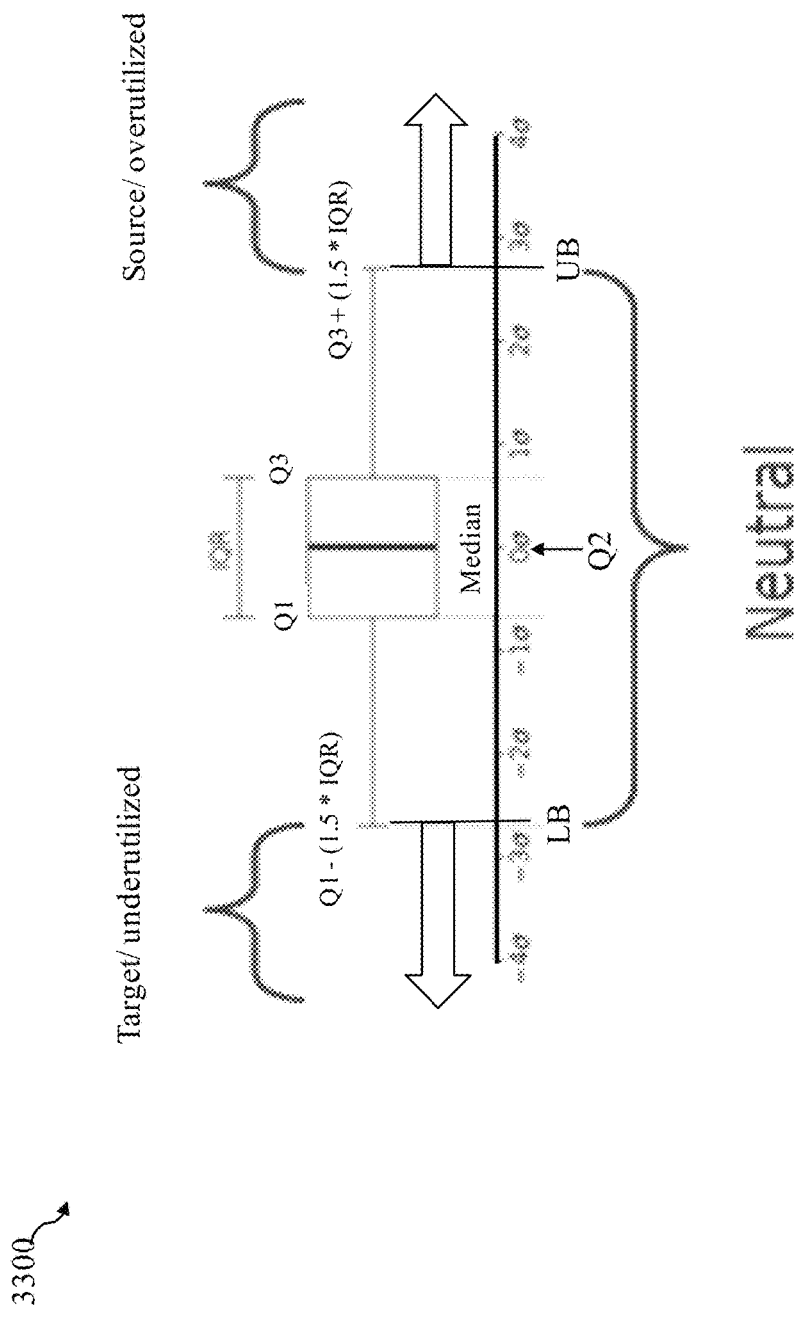
FIG. 43 is an example illustrating a plot in connection with values of a metric in an embodiment in accordance with techniques herein.

In connection with determining the foregoing relative outliers of the population in terms of per flash PD read RT performance, reference is made to FIG. 43 which illustrates a plot of the data that may be used to determine the median as well as the lower Q1 and upper Q3 quartiles as boundaries. For example, consider an unprotected non-RAID configuration as described elsewhere herein (e.g., FIGS. 41 and 42A) including a 1 TB PD and a 4 TB PD. Thus, for example, the read I/O RTs for all read I/Os directed to both the 1 TB PD and the 4 TB PD may be analyzed to obtain the plot as in FIG. 43. The value of Q1 may be determined as the median of the lower half of the data (e.g., median value between the smallest read RT of the population and Q2). The upper quartile value is the median of the upper half of the data (e.g., median value between Q2 and the largest read RT value of the population).

In connection with detecting outliers relative to the entire read RT population (e.g., read I/Os directed to both the 1 TB PD and the 4 TB PD), lower and upper boundaries or thresholds may be determined. In at least one embodiment, the IQR may be used to characterize the data when there may be extremities or outliers. In at least one embodiment, the lower boundary or threshold LB may be determined as Q1−(1.5*IQR), and the upper boundary or threshold UB may be determined as Q3+(1.5*IQR) (e.g., where Q1 and Q3 are the first and third quartile values, respectively). In this embodiment, any flash PD having an average read RT outside these defined bounds or thresholds LB and UB may be considered an outlier.

Points or values for Q1, Q2, Q3, LB and UB are denoted in the example 3300 of FIG. 43. In at least one embodiment, each flash PD of the population may be classified based on its measured average read RT. In such an embodiment, a flash PD may be classified as an outlier with respect to read RT if the flash PD's average read RT is greater than UB, or lower than LB. In such an embodiment, a flash PD that has average read RT within the specified UB and LB bounds may not be an outlier and thus not trigger performing any action to adjust the PD's read RT. Responsive to the flash PD being classified as an outlier with respect to read RT, a responsive action may be taken to correct the inconsistency in read RT by enforcement of limits or targets including any of write I/O workload limits, read I/O workload limits, and idle capacity limits.

A plot and determination of median, quartiles, and UB and LB values as in FIG. 43 may more generally be determined with respect to a set of flash PDs in an unprotected non-RAID configuration or a set of RAID groups, and any desired metric. For example, an embodiment may determine a plot and associated values as in FIG. 43 for flash PDs in an unprotected non-RAID configuration based on write I/O workloads of PDs that have the same flash technology or type and that also have the same capacity in order to determine if any of the PDs has a write I/O workload that is inconsistent or varies by a sufficient amount (with respect to the write I/O workload of all flash PDs considered). As described above, each such flash PD considered may be of the same flash technology and same capacity, and one or more of the PDs may also be under the PD's respective specified write I/O workload limit or target. However, a plot such as in connection with FIG. 43 with respect to the write I/O workloads of the flash PDs under consideration may be used in connection with determining whether any flash PD is an outlier and thus varies by a sufficient amount with respect to the population/all PDs under consideration. In such an embodiment, a PD may be considered an outlier if its measured write I/O workload is less than LB or greater than UB. Furthermore, if the flash PD has a measured write I/O workload less than LB, the flash PD may be classified as underutilized and thus a target or destination PD that can accept write I/O workload from a source PD. If the flash PD has a measured write I/O workload more than LB, the flash PD may be classified as over utilized and thus a source PD that can donate, migrate, or transfer out write I/O workload to a target or destination PD.

In a similar manner, an embodiment may determine a plot and associated values as in FIG. 43 with respect to idle capacity of flash PDs as described elsewhere herein. For example, an embodiment may determine a plot and associated values as in FIG. 43 for flash PDs based on measured idle capacity per PD of PDs that have the same capacity in order to determine if any of the PDs has an idle capacity that is inconsistent or varies by a sufficient amount (with respect to the measured idle capacities of all flash PDs considered). As described above, each such flash PD considered may have the same capacity and there may be a first flash PD also under the PD's specified idle capacity limit or target. A plot such as in connection with FIG. 43 with respect to the idle capacity of the flash PDs under consideration may be used in connection with determining whether any flash PD is an outlier and thus varies by a sufficient amount with respect to the population/all PDs under consideration. In such an embodiment, a PD may be considered an outlier if its measured idle capacity is less than LB or greater than UB. Furthermore, if the flash PD has a measured idle capacity less than LB, the flash PD may be classified as underutilized (in terms of idle capacity) and thus a target or destination PD that can accept idle capacity data portions from a source PD. If the flash PD has a measured idle capacity more than LB, the flash PD may be classified as over utilized (in terms of idle capacity) and thus a source PD that can donate, migrate, or transfer out idle capacity to a target or destination PD.

In an embodiment in accordance with techniques herein, for any data movement performed, such as from a source flash PD to a target or destination flash PD, the resulting I/O workload(s) and/or performance of the source and/or target flash PD may be modeled. In connection with performing such modeling, an embodiment may use modeling to ensure that any data movement performed does not result in a modeled I/O workload or performance that violates specified limits or conditions. For example, a data movement from a source to a target PD may be modeled to ensure that the data movement does not result in the target PD exceeding an associated write I/O workload limit of the target PD, does not result in the target PD exceeding the read I/O workload limit and does not result in the target PD exceeding an associated idle capacity limit of the target PD. In at least one embodiment, movements of data portions to a target PD may be performed so long as all the foregoing limits associated with the target PD are not exceeded. Once a first target PD, for example, can no longer accept write I/O workload from a source without exceeding the first target PD's write I/O workload limit, movement of subsequent data portions from the source may continue with a second different target PD not exceeding its associated limits.

Figure 44:
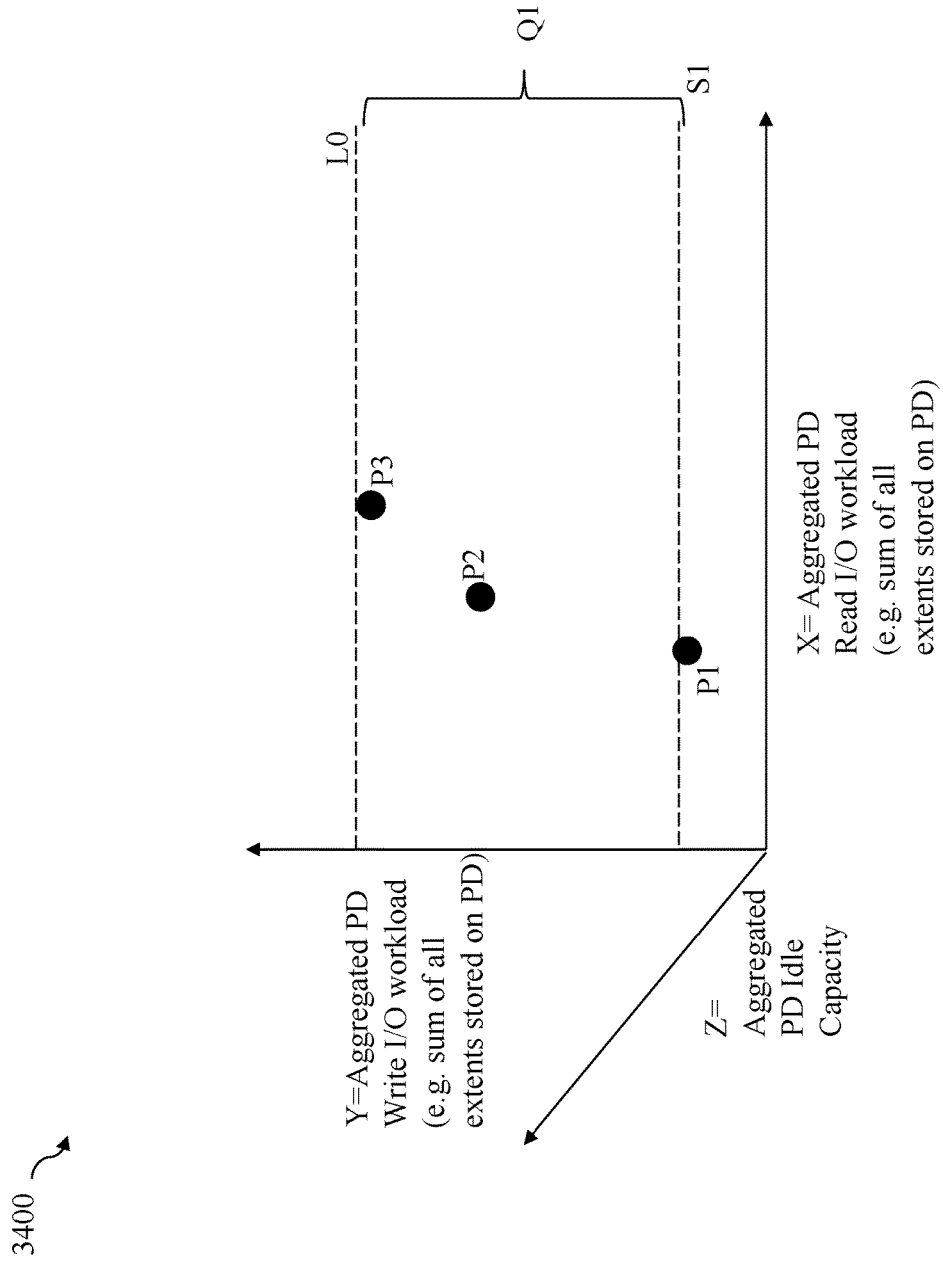
FIG. 44 is an example illustrating modeling workload and capacity of a flash PD in accordance with defined limits in an embodiment in accordance with techniques herein.

Referring to FIG. 44, shown is an example 3400 graphically representing the cumulative or aggregated I/O workload that may be determined for an underutilized flash PD serving as a target (e.g., to which an extent or data portion from a source flash PD may be moved where) in an embodiment in accordance with techniques herein. The target flash PD may be underutilized with respect to any one or more of write I/O workload, read I/O workload and idle capacity. In the example 3400, the X axis may denote the aggregated PD read I/O workload denoting the sum read I/O workload for all extents stored on the PD, the Y axis may denote the aggregated PD write I/O workload denoting the sum write I/O workload for all extents stored on the PD, and the Z axis may denote the sum or aggregated idle capacity for all extents stored on the PD. Each of the foregoing axis may denote a different dimension associated with a target flash PD subject to an associated limit or target. For example Line L0 denotes the write I/O workload limit for the target PD. Other dimensions associated with the X and Z axis are also similarly subject to associated limits as described herein but omitting for simplicity.

At a first point in time prior to relocating or moving any extents to the underutilized target PD, point P1 may denote the current read and write I/O workload and associated idle capacity of the PD. The graph 3400 may be used in connection with determining and modeling the expected workload of the target PD after moving selected one or more extents to the target PD. For example, assume that a first extent E1 is a candidate for data movement to the target PD. To model movement of E1 to the target PD, E1's observed or measured read and write I/O workload and idle capacity may be added to the graphical representation 3400 resulting in modeling workload of the target PD to now be at P2. In second extent E2 is a candidate for data movement to the underutilized PD. To model movement of E2 to the target PD, E2's observed or measured read and write I/O workload may be added to the graphical representation 3400 resulting in modeling workload of the underutilized PD to now be at P3. The goal is to allow movement of extents to the target PD so that the target PD has an expected or modeled I/O workload whereby the total or aggregated write I/O workload, read I/O workload and idle capacity for the PD does not exceed specified limits associated with each of the foregoing. In this case, it may be that no further extent having additional write I/O workload may be moved to the modeled target PD since to do so would cause the target PD to exceed its write I/O workload limit. In a similar manner, an embodiment in accordance with techniques herein may perform processing to move extents, or more generally data portions from a source flash PD to the illustrated target PD until any one of the limits for the target PD associated with the X, Y or Z dimensions would be exceeded.

In the example 3400, S1 may be a line denoting the starting write I/O workload for the target underutilized PD which may accept write I/O workload so long as the write I/O workload limit denoted by L0 is not exceeded. In this manner, Q1 may denote the maximum amount of write I/O workload that may be added to the underutilized PD whereby Q1 denotes the maximum amount of write I/O workload of extents that can be moved from source flash PDs to the illustrated target PD.

In a similar manner, such modeling may also similarly include modeling the source PD in connection with determining when a detected condition or violation associated with the source PD has been corrected (e.g., when the source PD's measured write I/O workload is below the source PD's specified write I/O workload limit).

Figure 45:
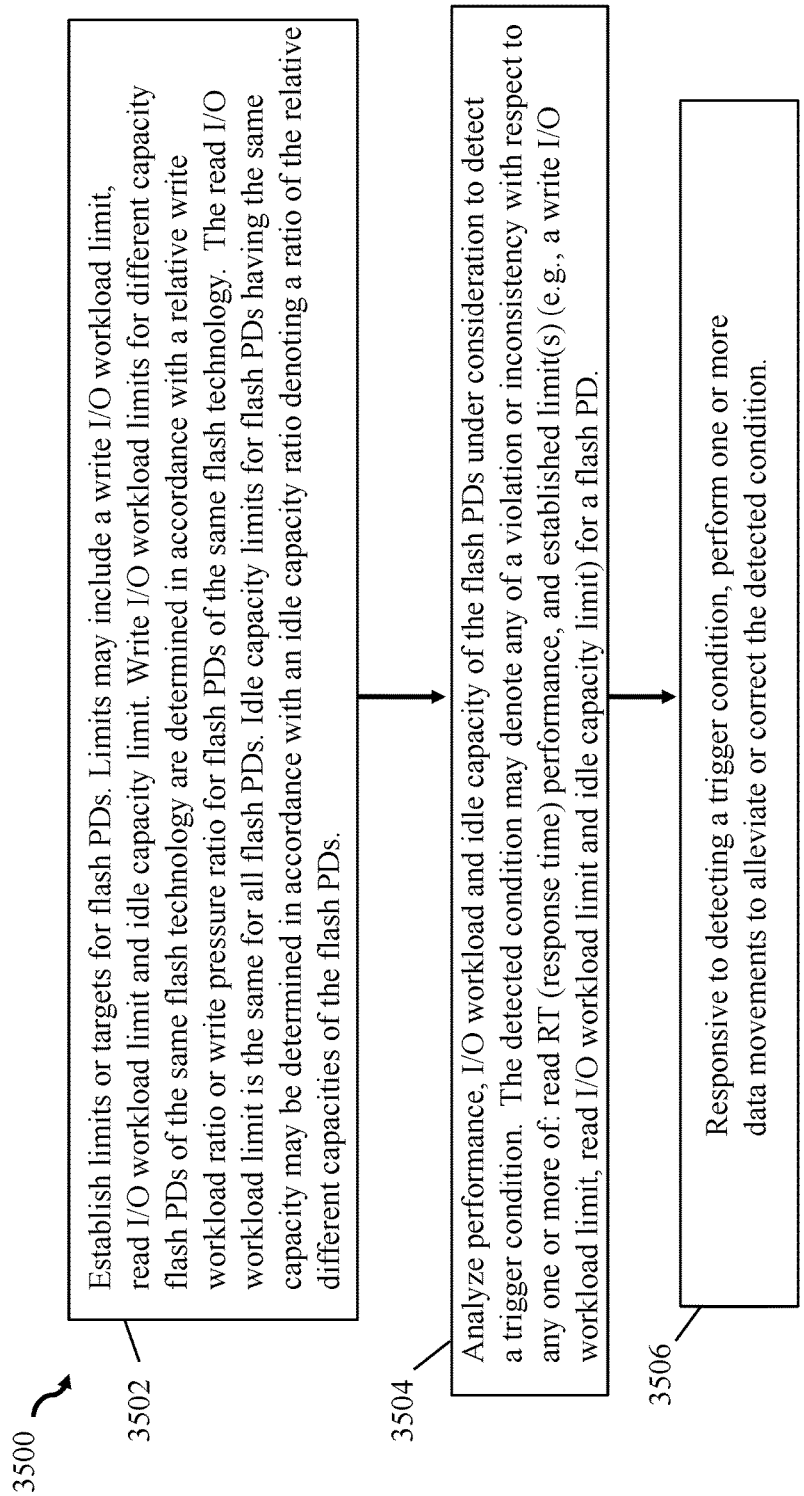
FIG. 45 is a flowchart of processing steps that may be performed in connection with established limits and detecting an inconsistency or violation in an embodiment in accordance with techniques herein.
Figure 46:
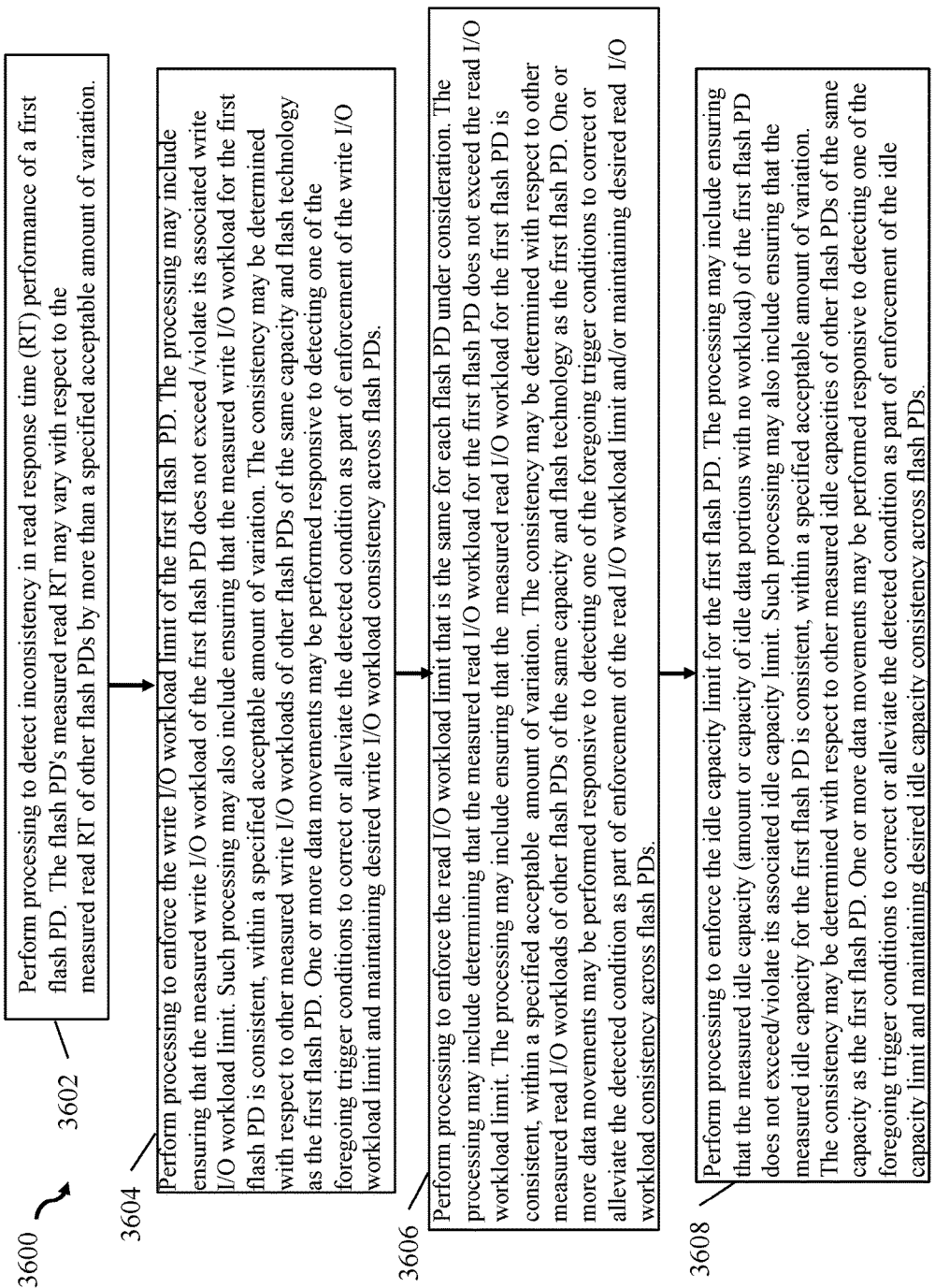
FIG. 46 is a flowchart of processing steps that may be performed to detect a flash drive with inconsistent read response time performance and to control or regulate the read response time performance of the flash drive in an embodiment in accordance with techniques herein.

What will now be described with reference to FIGS. 45 and 46 are flowcharts summarizing processing described above that may be performed in an embodiment in accordance with techniques herein.

Referring to FIG. 45, shown is a first flowchart 3500 of processing that may be performed in an embodiment in accordance with techniques herein. At step 3502, processing may be performed to define or establish limits or targets for the flash PDs. Limits for each PD may include a write I/O workload limit, read I/O workload limit and idle capacity limit. Write I/O workload limits for different capacity flash PDs of the same flash technology are determined in accordance with a relative write workload ratio or write pressure ratio for flash PDs of the same flash technology. The read I/O workload limit is the same for all flash PDs. Idle capacity limits for flash PDs having the same capacity may be determined in accordance with an idle capacity ratio denoting a ratio of the relative different capacities of the flash PDs.

At step 3504, processing may be performed to analyze performance, I/O workload and idle capacity of the flash PDs under consideration to detect a trigger condition. The detected condition may denote any of a violation or inconsistency with respect to any one or more of: read RT performance, and one or more established limits (e.g., a write I/O workload limit, read I/O workload limit and idle capacity limit) for a flash PD.

At step 3506, processing may be performed responsive to a detected trigger condition. The processing may include taking an action to perform one or more data movements to alleviate or correct the detected condition (e.g., violation or inconsistency) in step 3504. In connection with performing the data movements, a source flash PD and a target flash PD may be determined. Generally, a source flash PD may be characterized as under utilized with respect to any one or more of read I/O workload, write I/O workload and idle capacity. The target flash PD characterized as over utilized with respect to any one or more of read I/O workload, write I/O workload and idle capacity. When moving a data portion from the source to the target flash PD, the movement of the data portion from the source to the target flash PD may be modeled. Such modeling may include determining the resulting write I/O workload, read I/O workload, idle capacity and read RT performance of the target PD to ensure that the modeled result does not indicate that the target PD would exceed one of its limits or desired read RT as a result of moving the data portion. Such modeling may also similarly include modeling the source PD in connection with determining when a detected condition or violation associated with the source PD has been corrected (e.g., when the source PD's measured write I/O workload is below the source PD's specified write I/O workload limit).

Referring to FIG. 46, shown is a second flowchart 3600 of processing that may be performed in an embodiment in accordance with techniques herein. At step 3602 processing may be performed that detects an inconsistency in read RT performance for a first flash PD. The first flash PD's measured read RT may vary with respect to the measured read RT of other flash PDs by more than a specified acceptable amount of variation (e.g., first flash PD's measured read RT may differ from measured read RTs of other flash PDs by more than an acceptable amount). As described herein, subsequent processing steps 3604, 3606 and 3608 may be performed to control or regulate the read RT performance in order to obtain consistent read RT performance among all flash PDs by varying or controlling the first measured read I/O response time of the first flash storage device by enforcing, for the first flash storage device, a write I/O workload limit, a read I/O workload limit, and an idle capacity limit. Such enforcement may further include varying, adjusting or controlling any one or more of the write I/O workload, the read I/O workload and/or the idle capacity of the first flash storage device.

At step 3604, processing may be performed to enforce the write I/O workload limit of the first flash PD. The processing may include ensuring that the measured write I/O workload of the first flash PD does not exceed/violate its associated write I/O workload limit. Such processing may also include ensuring that the measured write I/O workload for the first flash PD is consistent, within a specified acceptable amount of variation. The consistency may be determined with respect to other measured write I/O workloads of other flash PDs of the same capacity and flash technology as the first flash PD. One or more data movements may be performed responsive to detecting one of the foregoing trigger conditions to correct or alleviate the detected condition as part of enforcement of the write I/O workload limit and maintaining desired write I/O workload consistency across flash PDs.

At step 3606, processing may be performed to enforce the read I/O workload limit that is the same for each flash PD under consideration. The processing may include determining that the measured read I/O workload for the first flash PD does not exceed the read I/O workload limit. The processing may include ensuring that the measured read I/O workload for the first flash PD is consistent, within a specified acceptable amount of variation. The consistency may be determined with respect to other measured read I/O workloads of other flash PDs of the same capacity and flash technology as the first flash PD. One or more data movements may be performed responsive to detecting one of the foregoing trigger conditions to correct or alleviate the detected condition as part of enforcement of the read I/O workload limit and/or maintaining desired read I/O workload consistency across flash PDs.

At step 3608, processing may be performed to enforce the idle capacity limit for the first flash PD. The processing may include ensuring that the measured idle capacity (amount or capacity of idle data portions with no workload) of the first flash PD does not exceed/violate its associated idle capacity limit. Such processing may also include ensuring that the measured idle capacity for the first flash PD is consistent, within a specified acceptable amount of variation. The consistency may be determined with respect to other measured idle capacities of other flash PDs of the same capacity as the first flash PD. One or more data movements may be performed responsive to detecting one of the foregoing trigger conditions to correct or alleviate the detected condition as part of enforcement of the idle capacity limit and maintaining desired idle capacity consistency across flash PDs.

In connection with flowchart 3600, the initial condition triggering the processing is in step 3602 where the read RT performance of the first flash PD is inconsistent with respect to measured read RTs of other flash PDs. Additionally, as also described herein, it may be that the read RT performance of flash PDs is relatively consistent, with respect to one another and a specified acceptable amount of variation. However, it may still be possible that there is an independent violation and/or inconsistency with respect another condition as specified in any one of steps 3604, 3606, and 3608. In this case, an embodiment may also perform analysis and enforcement of in connection with each of steps 3604, 3606, and 3608 independently and separately. For example, an embodiment may determine that the read RT performance of flash PDs is relatively consistent, with respect to one another and a specified acceptable amount of variation. Subsequently, step 3604 may be performed independent of the read RT performance or despite there being relatively consistent read RT performance of flash PDs under consideration. For example, one of the flash PDs may violate or exceed its associated write I/O workload limit despite there being relatively consistent read RT performance of flash PDs under consideration. In a similar manner, step 3606 may be performed independent of the read RT performance or despite there being relatively consistent read RT performance of flash PDs under consideration. For example, one of the flash PDs may violate or exceed the read I/O workload limit despite there being relatively consistent read RT performance of flash PDs under consideration. In a similar manner, step 3608 may be performed independent of the read RT performance or despite there being relatively consistent read RT performance of flash PDs under consideration. For example, one of the flash PDs may violate or exceed its idle capacity limit despite there being relatively consistent read RT performance of flash PDs under consideration.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of obtaining consistent read performance comprising:
   receiving a plurality of measured read input/output (I/O) response times, each of the plurality of measured read I/O response times denoting a measured read I/O response time for a different one of a plurality of flash storage devices;
   determining, in accordance with a specified allowable variation, whether a first of the plurality of measured read I/O response times for a first of the plurality of flash storage devices is inconsistent with respect to other ones of the plurality of measured read I/O response times; and
   responsive to determining the first measured read I/O response time is inconsistent with respect to other ones of the plurality of measured read I/O response times, performing first processing that corrects or alleviates the inconsistency of the first measured read I/O response time, the first processing including varying the first measured read I/O response time of the first flash storage device by enforcing, for the first flash storage device, a write I/O workload limit, a read I/O workload limit, and an idle capacity limit.

2. The method of claim 1, wherein the first processing includes:
   receiving workload information for the first flash storage device, the workload information including a measured write I/O workload, a measured read I/O workload, and an amount of idle capacity;
   determining whether the workload information for the first flash storage device violates any of a first write I/O workload limit, a read I/O workload limit, and a first idle capacity limit; and
   responsive to determining the workload information for the first flash storage device violates any of the first write I/O workload limit, the read I/O workload limit, and the first idle capacity limit, performing a data movement that corrects or alleviates a detected violation of any of the first write I/O workload limit, the read I/O workload limit, and the first idle capacity limit.

3. The method of claim 2, wherein the first flash storage device has a first storage capacity and is a first type of flash technology, the plurality of flash storage devices includes a second flash storage device of the first type of flash technology, the second flash storage device having a second write I/O workload limit and having a second storage capacity different from the first storage capacity, and a write I/O workload ratio denotes a relative ratio of write performance achieved with the first storage capacity to write performance achieved with the second storage capacity, and wherein the first write I/O workload limit has a value determined in accordance with the write I/O workload ratio and the second write I/O workload limit.

4. The method of claim 3, wherein a first idle capacity ratio is a ratio of the first storage capacity relative to the second storage capacity, and the first idle capacity limit has a value determined in accordance with the first idle capacity ratio and a second idle capacity limit of the second flash storage device.

5. The method of claim 3, wherein the read I/O workload limit is the same limit enforced for the plurality of flash storage devices, and the write I/O workload ratio is a ratio of the first write I/O workload limit relative to the second write I/O workload limit.

6. The method of claim 5, further comprising:
determining whether the measured read I/O workload for the first flash storage device exceeds, by at least a specified amount, the read I/O workload limit;
responsive to determining that the measured read I/O workload for the first flash storage device exceeds, by at least a specified amount, the read I/O workload limit, performing second processing comprising:
ranking first data portions stored on the first flash storage device in accordance with decreasing read I/O workloads of the first data portions; and
selecting, in accordance with the ranking, a data portion set including one or more of the first data portions for movement from the first flash storage device to a target flash storage device of the plurality of flash storage devices.

7. The method of claim 6, wherein the target flash storage device is underutilized with respect to read I/O workload and wherein the one or more of the first data portions of the data portion set selected for movement to the target flash storage device do not result in a modeled read I/O workload for the target flash storage device exceeding the read I/O workload limit.

8. The method of claim 6, wherein each data portion in the data portion set has a read I/O workload that is greater than any other data portion of the first data portions not included in the data portion set.

9. The method of claim 3, wherein the plurality of flash storage devices includes a first set of flash storage devices of the first type of flash technology, the first set including the first flash storage device having the first storage capacity and the second flash storage device having the second storage capacity, and the method further includes:
determining, in accordance with a specified allowable variation, whether measured write I/O workloads of the flash storage devices of the first set are consistent; and
responsive to determining that a measured write I/O workload of any flash storage device of the first set is inconsistent, performing a data movement that alleviates or corrects an inconsistent measured write I/O workload of the any flash storage device of the first set.

10. The method of claim 2, further comprising:
determining whether the measured write I/O workload of the first flash storage device exceeds the first write I/O workload limit; and
responsive to determining the measured write I/O workload of the first flash storage device exceeds the first write I/O workload limit, performing second processing comprising:
ranking first data portions stored on the first flash storage device in accordance with increasing write I/O workloads of the first data portions; and
selecting, in accordance with the ranking, a data portion set including one or more of the first data portions for movement from the first flash storage device to a target flash storage device of the plurality of flash storage devices.

11. The method of claim 10, wherein the target flash storage device is underutilized with respect to write I/O workload and wherein the one or more of the first data portions of the data portion set selected for movement to the target flash storage device do not result in a modeled write I/O workload for the target flash storage device exceeding a specified write I/O workload limit of the target flash storage device.

12. The method of claim 10, wherein each data portion in the data portion set has a write I/O workload that is greater than any other data portion of the first data portions not included in the data portion set.

13. The method of claim 2, further comprising:
determining whether the amount of idle capacity of the first flash storage device exceeds the first idle capacity limit; and
responsive to determining the amount of idle capacity of the first flash storage device exceeds the first idle capacity limit, performing second processing comprising:
selecting a first set of one or more data portions stored on the first flash storage device for movement from the first flash storage device to a target flash storage device of the plurality of flash storage devices, each data portion of the first set having an idle workload.

14. The method of claim 1, wherein the plurality of flash storage devices includes at least a first flash storage device of a first flash technology and a second flash storage device of a second flash technology that is different from the first flash technology.

15. A system comprising:
a processor; and
a memory comprising code stored thereon that, when executed, performs a method of obtaining consistent read performance comprising:
receiving a plurality of measured read input/output (I/O) response times, each of the plurality of measured read I/O response times denoting a measured read I/O response time for a different one of a plurality of RAID groups, each of the plurality of RAID groups including flash storage devices of a same technology and a same capacity;
determining, in accordance with a specified allowable variation, whether a first of the plurality of measured read I/O response times for a first of the plurality of RAID groups is inconsistent with respect to other ones of the plurality of measured read I/O response times; and
responsive to determining the first measured read I/O response time is inconsistent with respect to other ones of the plurality of measured read I/O response times, performing first processing that corrects or alleviates the inconsistency of the first measured read I/O response time, the first processing including varying the first measured read I/O response time of the first RAID group by enforcing, for the first RAID group, a write I/O workload limit, a read I/O workload limit, and an idle capacity limit.

16. A non-transitory computer readable medium comprising code stored thereon that, when executed, performs a method of obtaining consistent read performance comprising:

receiving a plurality of measured read input/output (I/O) response times, each of the plurality of measured read I/O response times denoting a measured read I/O response time for a different one of a plurality of flash storage devices;

determining, in accordance with a specified allowable variation, whether a first of the plurality of measured read I/O response times for a first of the plurality of flash storage devices is inconsistent with respect to other ones of the plurality of measured read I/O response times; and responsive to determining the first measured read I/O response time is inconsistent with respect to other ones of the plurality of measured read I/O response times, performing first processing that corrects or alleviates the inconsistency of the first measured read I/O response time, the first processing including varying the first measured read I/O response time of the first flash storage device by enforcing, for the first flash storage device, a write I/O workload limit, a read I/O workload limit, and an idle capacity limit.

17. The non-transitory computer readable medium of claim 16, wherein the first processing includes:

receiving workload information for the first flash storage device, the workload information including a measured write I/O workload, a measured read I/O workload, and an amount of idle capacity;

determining whether the workload information for the first flash storage device violates any of a first write I/O workload limit, a read I/O workload limit, and a first idle capacity limit; and responsive to determining the workload information for the first flash storage device violates any of the first write I/O workload limit, the read I/O workload limit, and the first idle capacity limit, performing a data movement that corrects or alleviates a detected violation of any of the first write I/O workload limit, the read I/O workload limit, and the first idle capacity limit.

18. The non-transitory computer readable medium of claim 17, wherein the first flash storage device has a first storage capacity and is a first type of flash technology, the plurality of flash storage devices includes a second flash storage device of the first type of flash technology, the second flash storage device having a second write I/O workload limit and having a second storage capacity different from the first storage capacity, and a write I/O workload ratio denotes a relative ratio of write performance achieved with the first storage capacity to write performance achieved with the second storage capacity, and wherein the first write I/O workload limit has a value determined in accordance with the write I/O workload ratio and the second write I/O workload limit.

19. The non-transitory computer readable medium of claim 18, wherein a first idle capacity ratio is a ratio of the first storage capacity relative to the second storage capacity, and the first idle capacity limit has a value determined in accordance with the first idle capacity ratio and a second idle capacity limit of the second flash storage device.

20. The non-transitory computer readable medium of claim 18, wherein the read I/O workload limit is the same limit enforced for the plurality of flash storage devices, and the write I/O workload ratio is a ratio of the first write I/O workload limit relative to the second write I/O workload limit.

* * * * *